(12) United States Patent
Oommen et al.

(10) Patent No.: US 6,865,567 B1
(45) Date of Patent: Mar. 8, 2005

(54) METHOD OF GENERATING ATTRIBUTE CARDINALITY MAPS

(76) Inventors: Basantkumar John Oommen, 5942, 3rd Line Road, North Gower, Ontario (CA), K0A 2T0; Murali Thiyagarajah, 99 Clinton St., Unit F1, Concorde, NH (US) 03301

(*) Notice: Subject to any disclaimer, the term of this patent is extended or adjusted under 35 U.S.C. 154(b) by 0 days.

(21) Appl. No.: 09/487,328

(22) Filed: Jan. 19, 2000

(30) Foreign Application Priority Data

Jul. 30, 1999 (CA) .............................................. 2279359

(51) Int. Cl.[7] .......................................... G06F 17/30
(52) U.S. Cl. ................................................... 707/2
(58) Field of Search ............................. 707/104.1, 102, 707/2, 1, 100

(56) References Cited

U.S. PATENT DOCUMENTS

| | | | | |
|---|---|---|---|---|
| 588,968 A | * | 8/1897 | Ferrel .............................. | 188/9 |
| 4,950,894 A | * | 8/1990 | Hara et al. ................... | 250/587 |
| 4,956,774 A | * | 9/1990 | Shibamiya et al. ............ | 707/2 |
| 5,167,228 A | * | 12/1992 | Czeisler et al. ............... | 607/88 |
| 5,883,968 A | * | 3/1999 | Welch et al. ............... | 382/100 |
| 5,950,185 A | * | 9/1999 | Alon et al. .................... | 707/1 |
| 5,987,468 A | * | 11/1999 | Singh et al. ................. | 707/100 |
| 6,146,830 A | * | 11/2000 | Friend et al. .................. | 435/6 |
| 6,278,989 B1 | * | 8/2001 | Chaudhuri et al. ............ | 707/2 |
| 6,401,088 B1 | * | 6/2002 | Jagadish et al. ............... | 707/6 |

* cited by examiner

Primary Examiner—Safet Metjahic
Assistant Examiner—Sana Al-Hashemi
(74) Attorney, Agent, or Firm—David J. French

(57) ABSTRACT

This invention provides a novel means for creating a histogram for use in minimizing response time and resource consumption when optimizing a query in a database, and other like structures, the histogram being created by placing ordered elements into specific range until the next element to be considered for inclusion in the range is a predetermined distance from the (generalized) mean value associated with the elements within the range, whereupon that next element is placed in the following range. Similarly, the following ranges are closed when the next element to be considered for inclusion in the range is greater than a predetermined distance from the (generalized) mean value associated with the elements in that range, whereupon that next element is placed in the following range. For each range, the location and size of the range is recorded with, for example, the mean value, the slope or other attribute characterizing one or more elements in the range. The invention has also applications in pattern recognition, message routing, and in actuarial sciences.

61 Claims, 47 Drawing Sheets

Query Processing Architecture

Secondary Partitioning of the Value Domain in Sector 3.

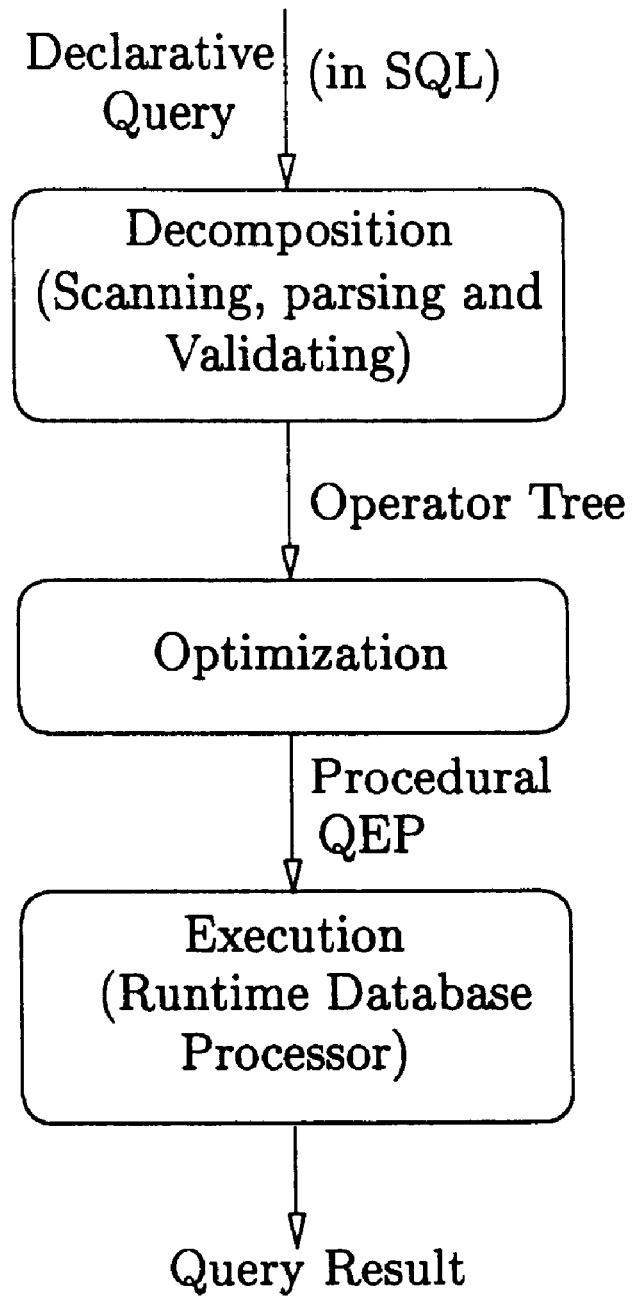
Figure 1: Query Processing Architecture

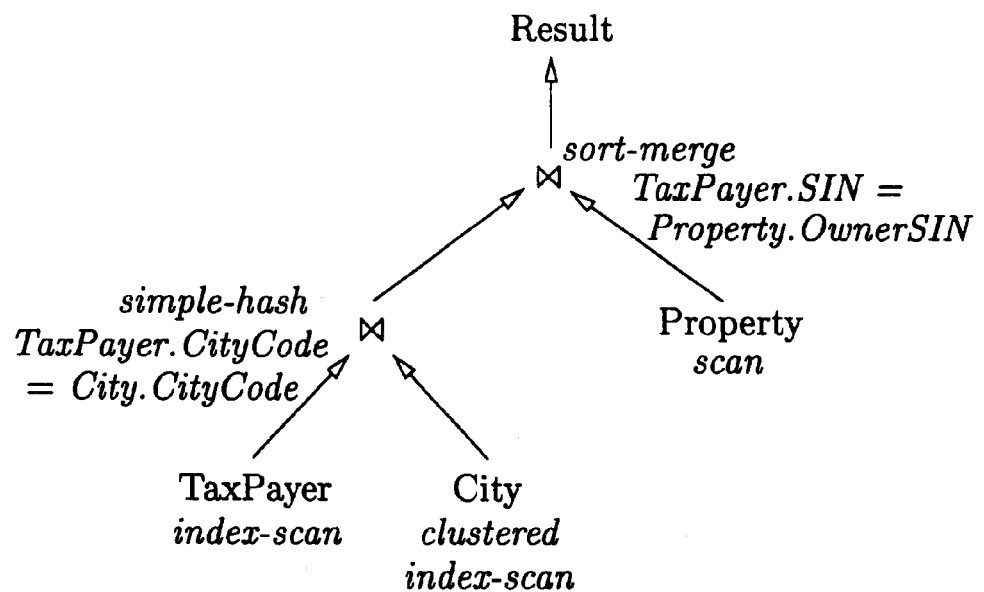
Figure 2: An Annotated Query Tree

TaxPayer:

| SIN | CityCode | Name | DOB | Balance |
|---|---|---|---|---|
| 501-112-347 | 4679 | John Smith | 09/22/70 | $3,218.00 |
| 123-456-091 | 4518 | John Doe | 12/30/58 | $1,093.15 |
| ⋮ | ⋮ | ⋮ | ⋮ | ⋮ |
| 318-231-089 | 1023 | Sally White | 04/15/73 | $4,125.00 |

Property:

| Type | OwnerSIN | Tax |
|---|---|---|
| Condo | 318-231-089 | $6,312 |
| Single | 435-010-987 | $1,459 |
| ⋮ | ⋮ | ⋮ |
| Cottage | 010-345-180 | $2,010 |
| Single | 123-456-091 | $4,590 |

City:

| CityCode | CityName | Population |
|---|---|---|
| 4518 | Ottawa | 990,310 |
| 4679 | Nepean | 725,910 |
| ⋮ | ⋮ | ⋮ |
| 2310 | Kingston | 980,000 |
| 8927 | Hull | 378,124 |

Figure 3: Example Relations from Property Tax Assessor's Office

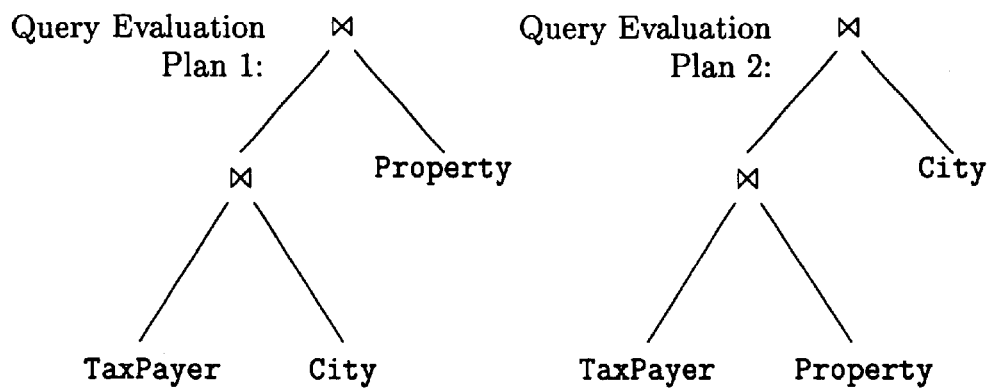
Figure 4: Two Alternative Query Evaluation Plans

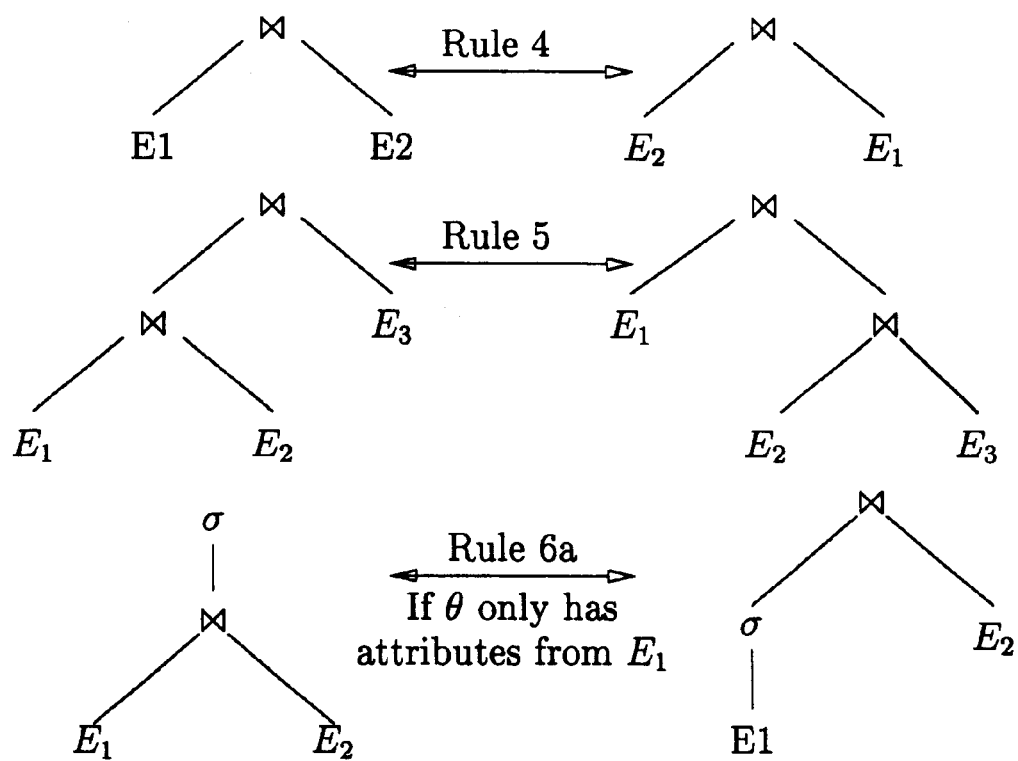
Figure 5: Equivalent Transformations.

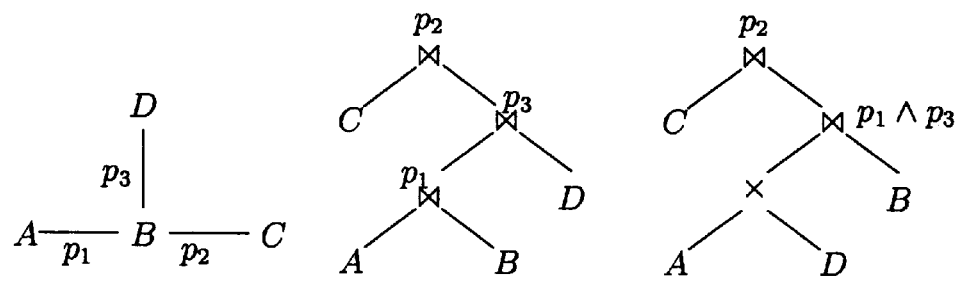
Figure 6: Query Graph and its Operator Trees.

$R_1 \longrightarrow R_2 \longrightarrow \quad \ldots \quad \longrightarrow R_{n-1} \longrightarrow R_n$ Figure 7: A string query.

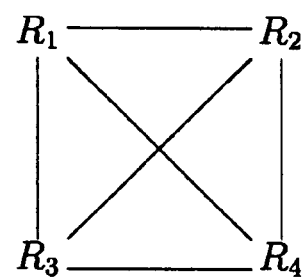
Figure 8: A completely connected query on 4 nodes.

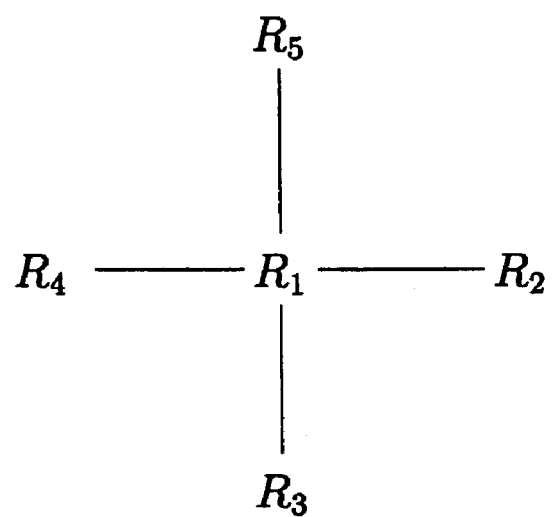
Figure 9: A star query on 5 nodes.

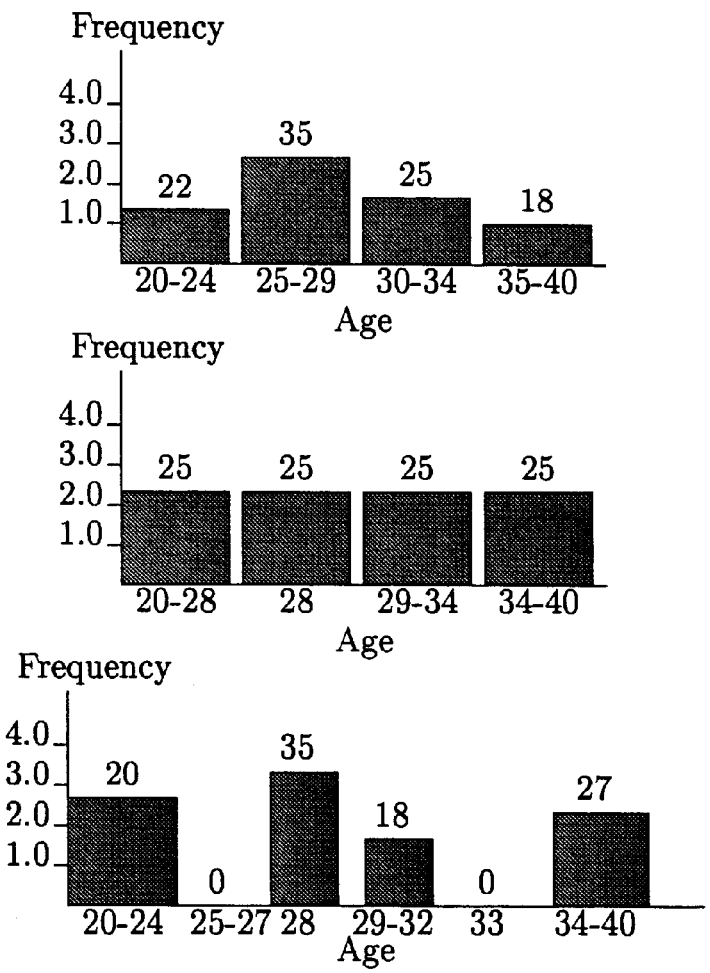
Figure 10: Equi-width, Equi-depth and Variable-width Histograms.

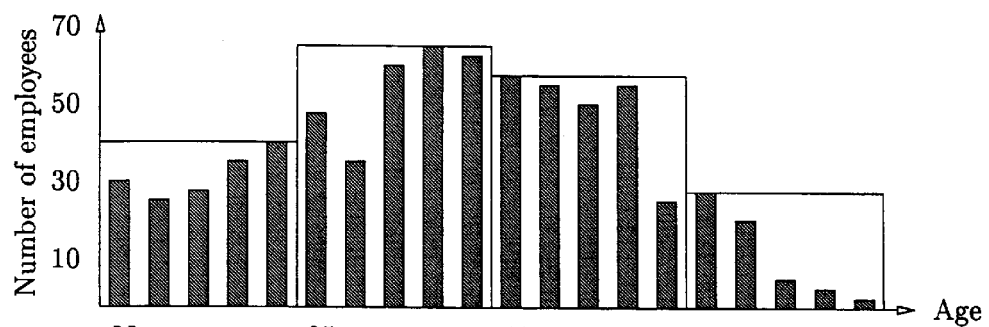
(a) Equi-width Histogram for the Employe Age Distribution
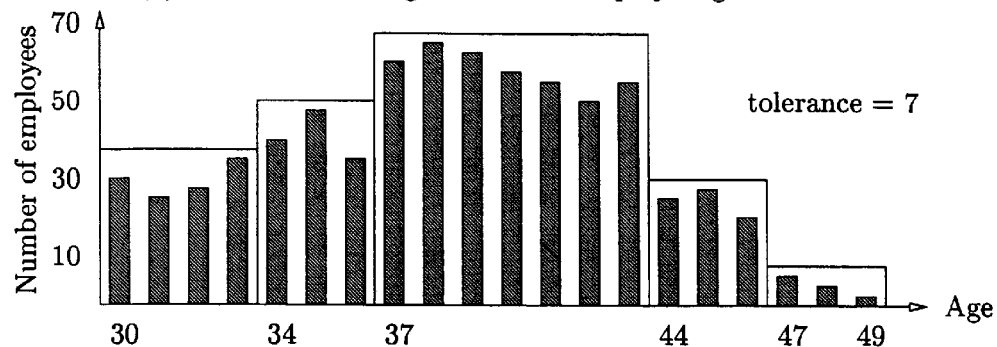
(b) Corresponding Rectangular ACM
Figure 11: An Example of the Rectangular Attribute Cardinality Map

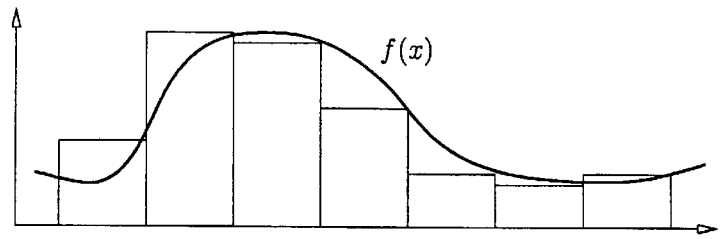
(a) Equi-width Histogram
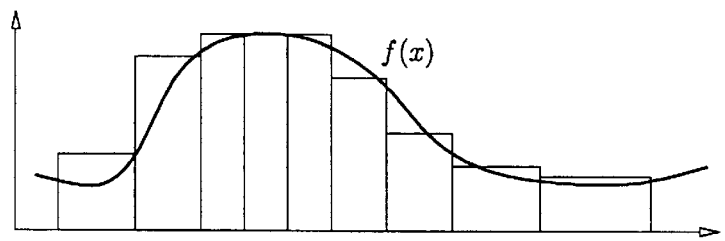
(b) Equi-depth Histogram
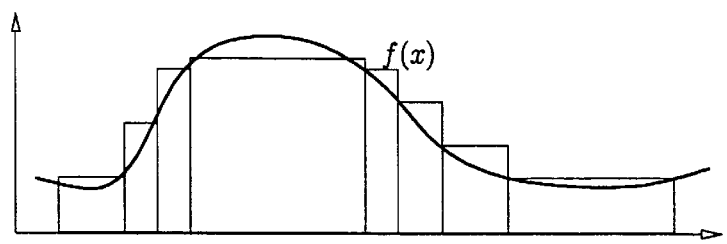
(c) Rectangular ACM
Figure 12: Comparison of R-ACM and Traditional Histograms. Note in (a), the sector widths are equal, in (b) the areas of the sectors are equal, in (c) the sector widths become smaller whenever there is a significant change in the frequencies of the attribute values.

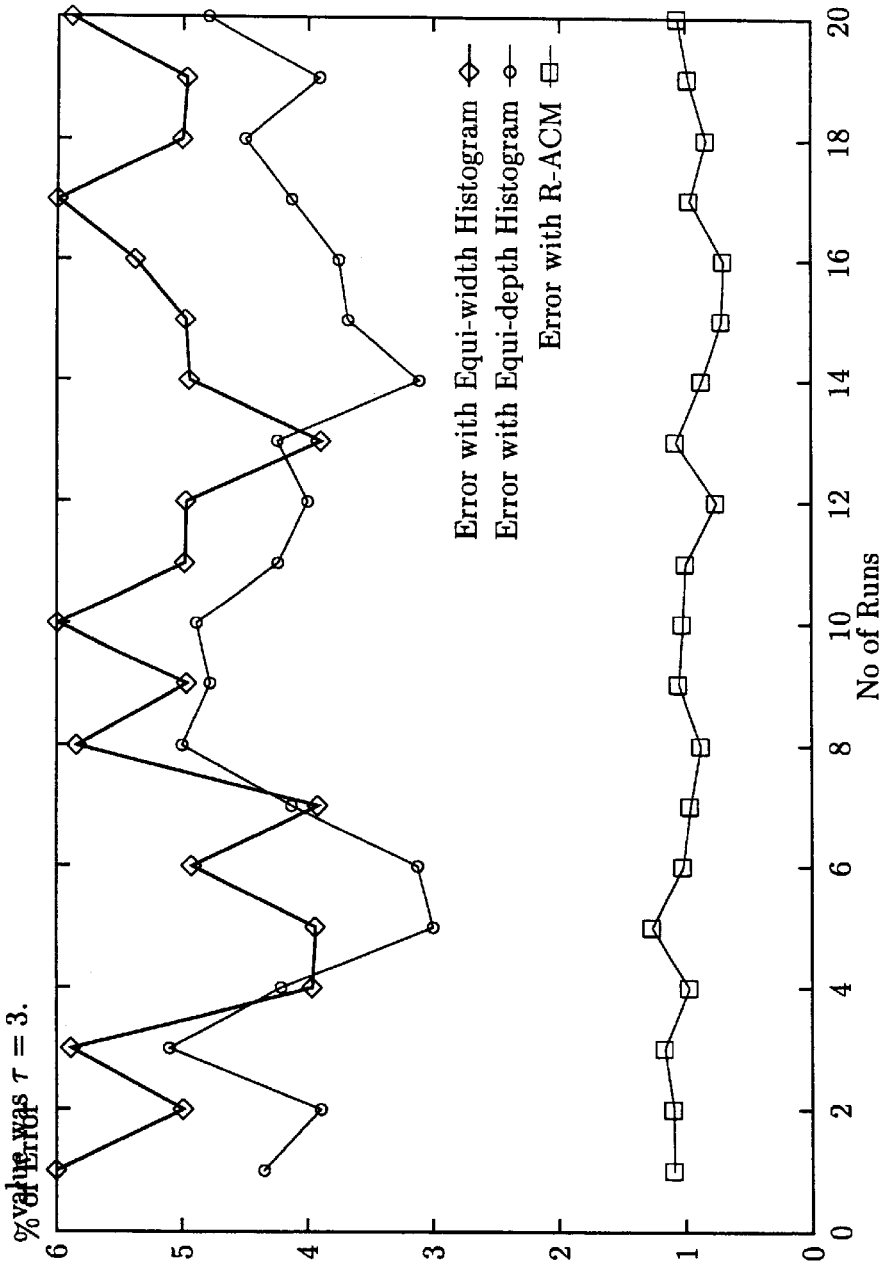
Figure 13: Comparison of Equi-width, Equi-depth Histograms and the R-ACM for Frequency (Probability) Estimation: Each experiment was run 500,000 times to get the average percentage errors. Estimation errors are given for exact match on a random distribution with 100,000 tuples and 1000 distinct values. For the R-ACM, tolerance value was $\tau = 3$.

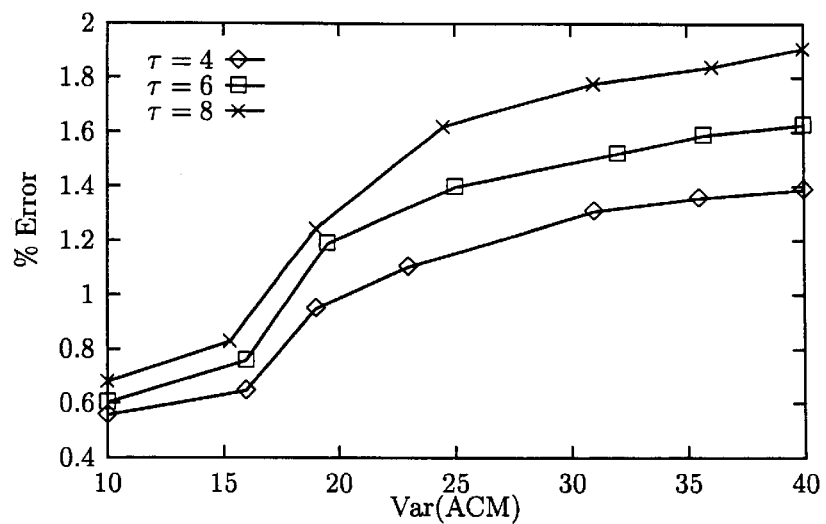
Figure 14: Frequency Estimation Error vs ACM Variance: The ACM sectors were partitioned using three different tolerance values and the resulting ACM variances were computed for various data distributions. Using random selection queries (matches), the errors between the actual and the expected frequencies were obtained.

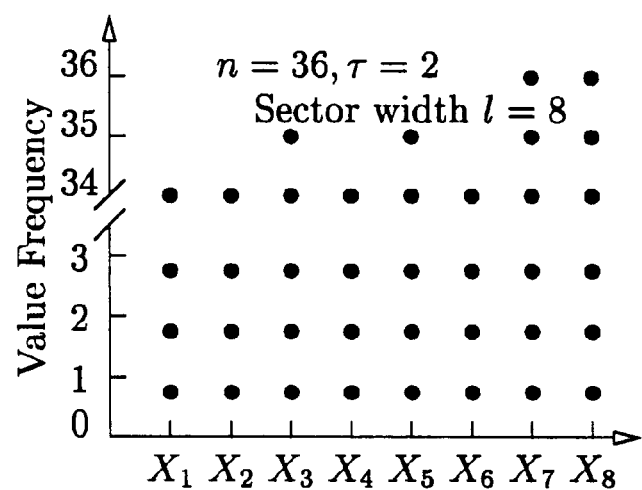
Figure 15: Distribution of Values in an ACM Sector

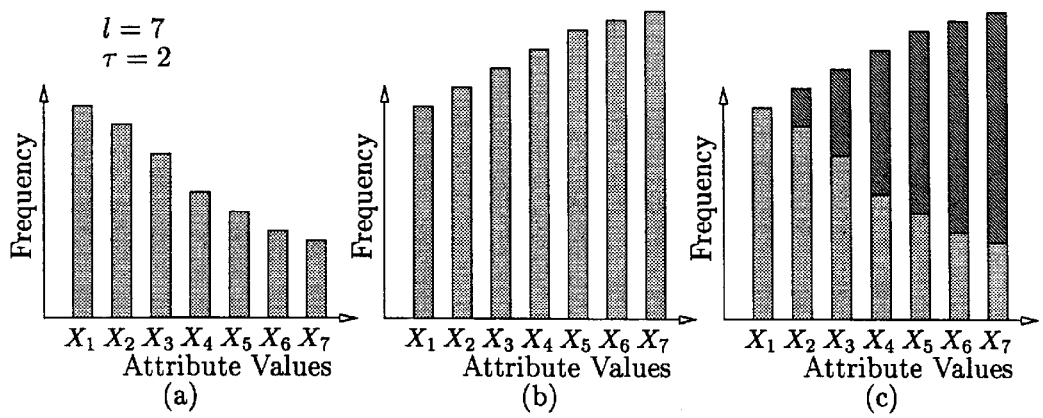
Figure 16: (a) A decreasing R-ACM sector; (b) An increasing R-ACM sector; (c) Superimposition of the decreasing and increasing frequency distributions.

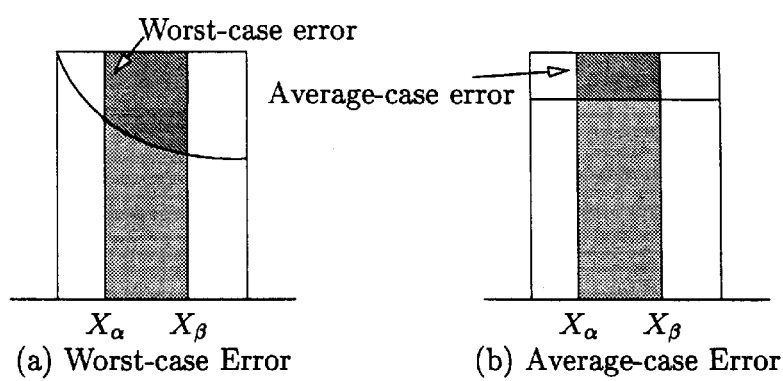
Figure 17: Estimation of a Range Completely within an R-ACM Sector

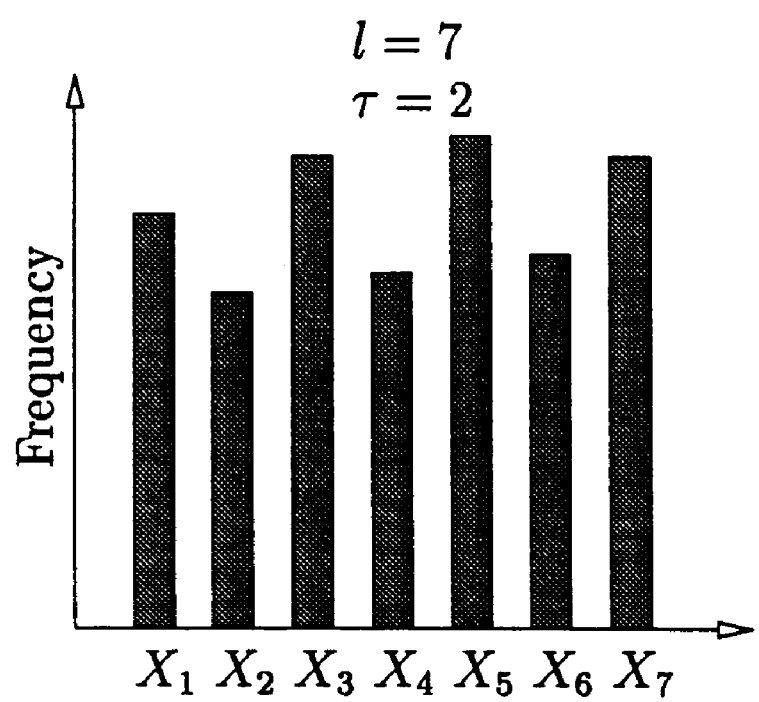
Figure 18: A Random R-ACM Sector

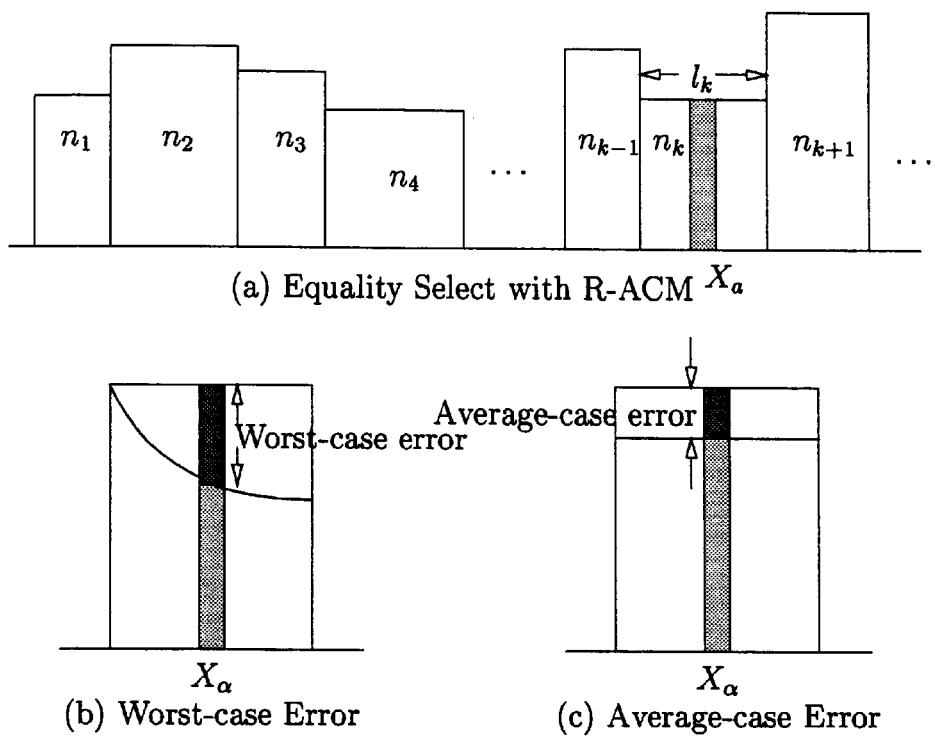
Figure 19: Estimation of Equality Select Using the R-ACM

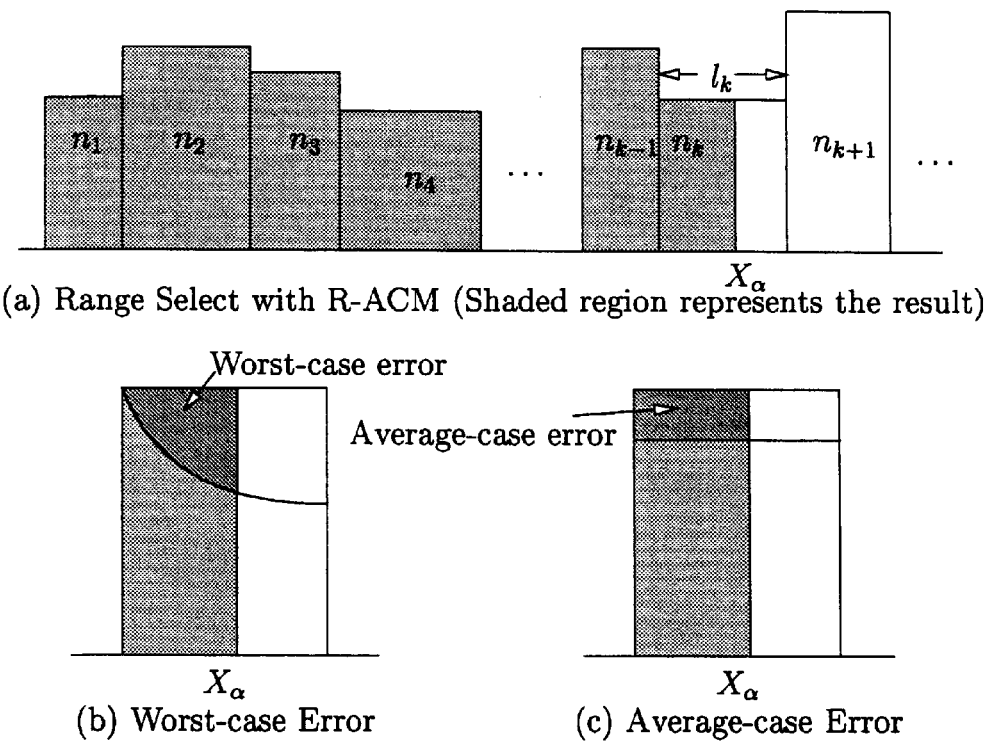
Figure 20: Estimation of Range Select Using the R-ACM

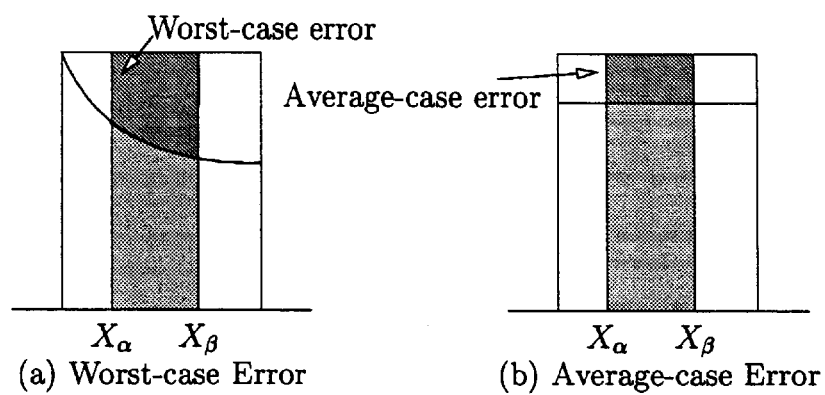
Figure 21: Estimation of a Range Completely within an R-ACM Sector

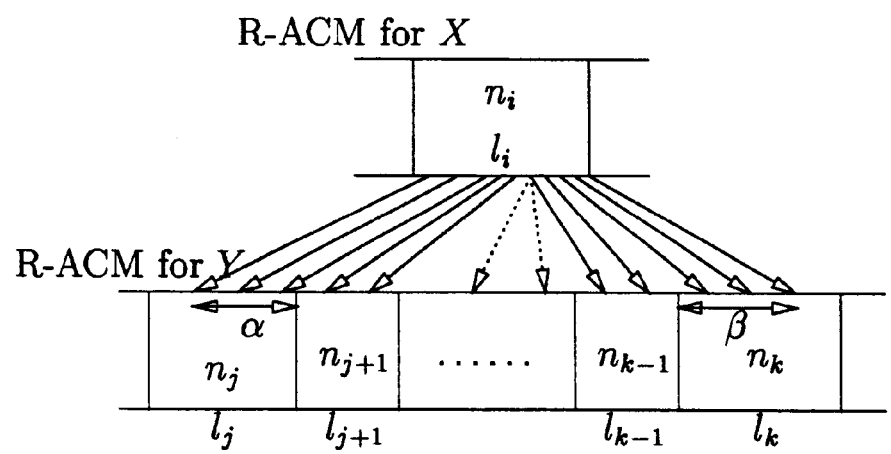
Figure 22: Estimating Result Size of $R \bowtie_{X=Y} S$

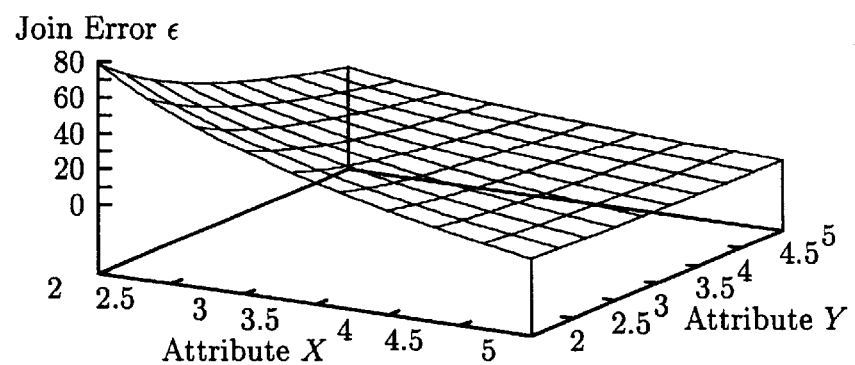
Figure 23: Join Estimation Error and the Positions of Attribute Values

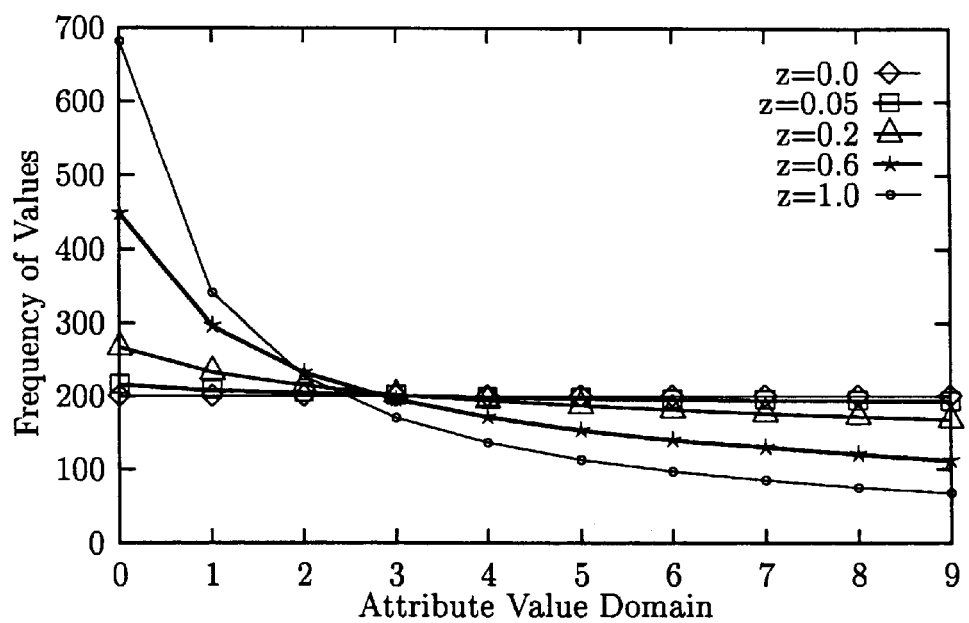
Figure 24: Zipf Distributions for Various $z$ Parameters

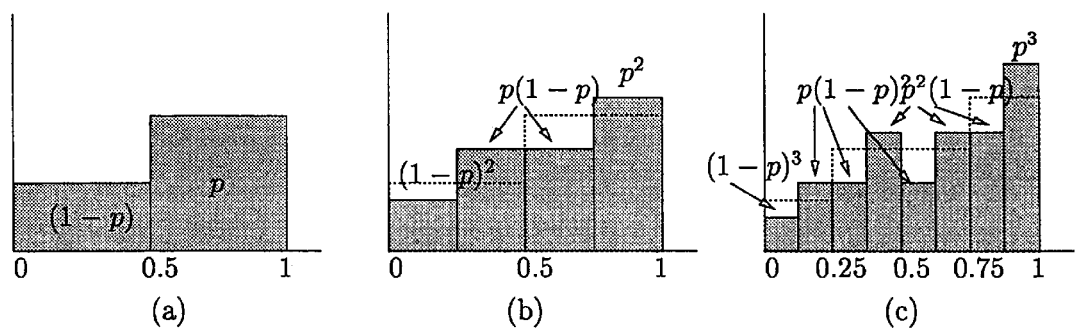
Figure 25: Generation of a Multi-fractal Distribution - First three steps

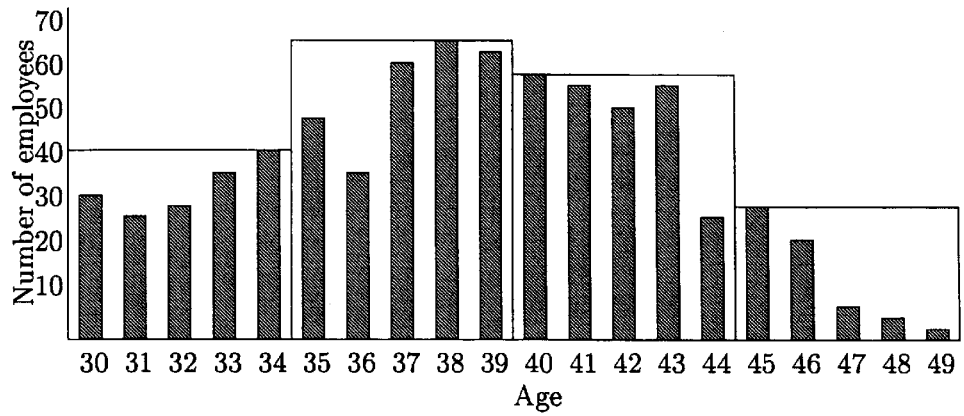
(a) Equi-width Histogram for the Employe Age Distribution
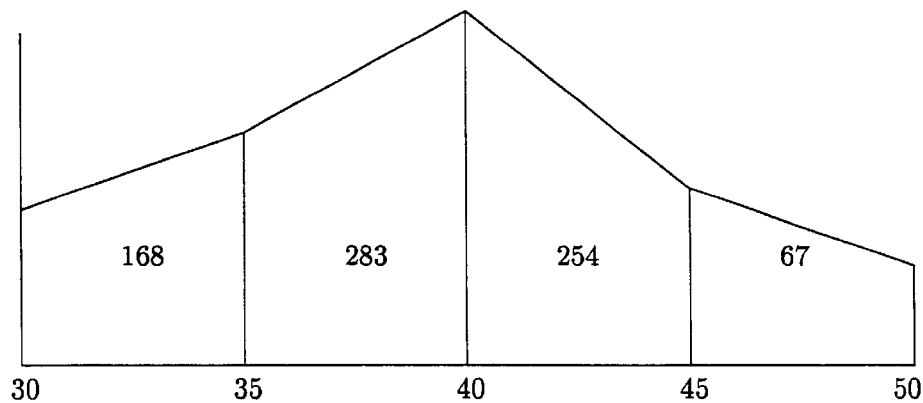
(b) Corresponding Trapezoidal ACM
Figure 26: An Example for Constructing the Trapezoidal Attribute Cardinality Map

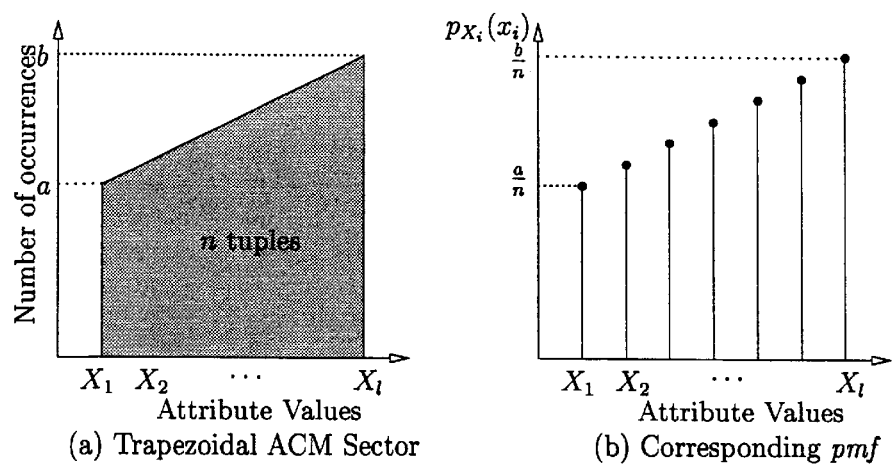
Figure 27: Trapezoidal ACM sector and its corresponding probability mass function

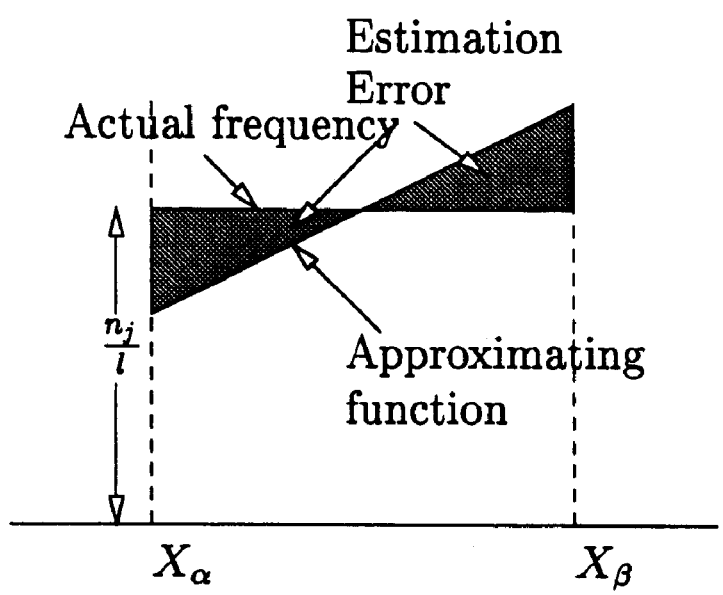
Figure 28: Average Case Error in T-ACM

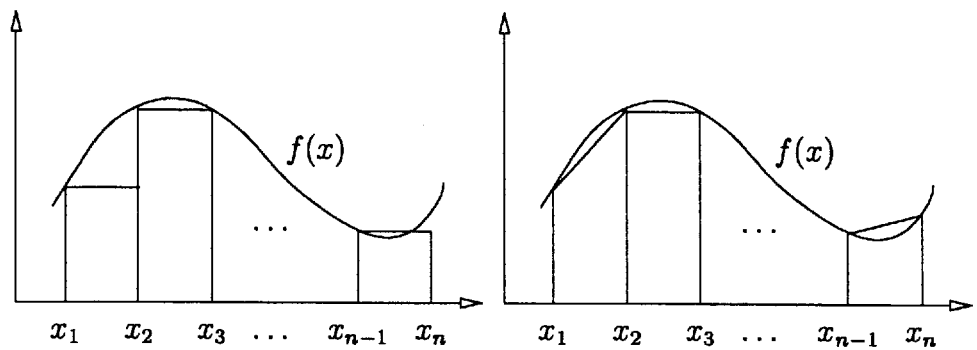
Figure 29: Comparison of Histogram and Trapezoidal ACM

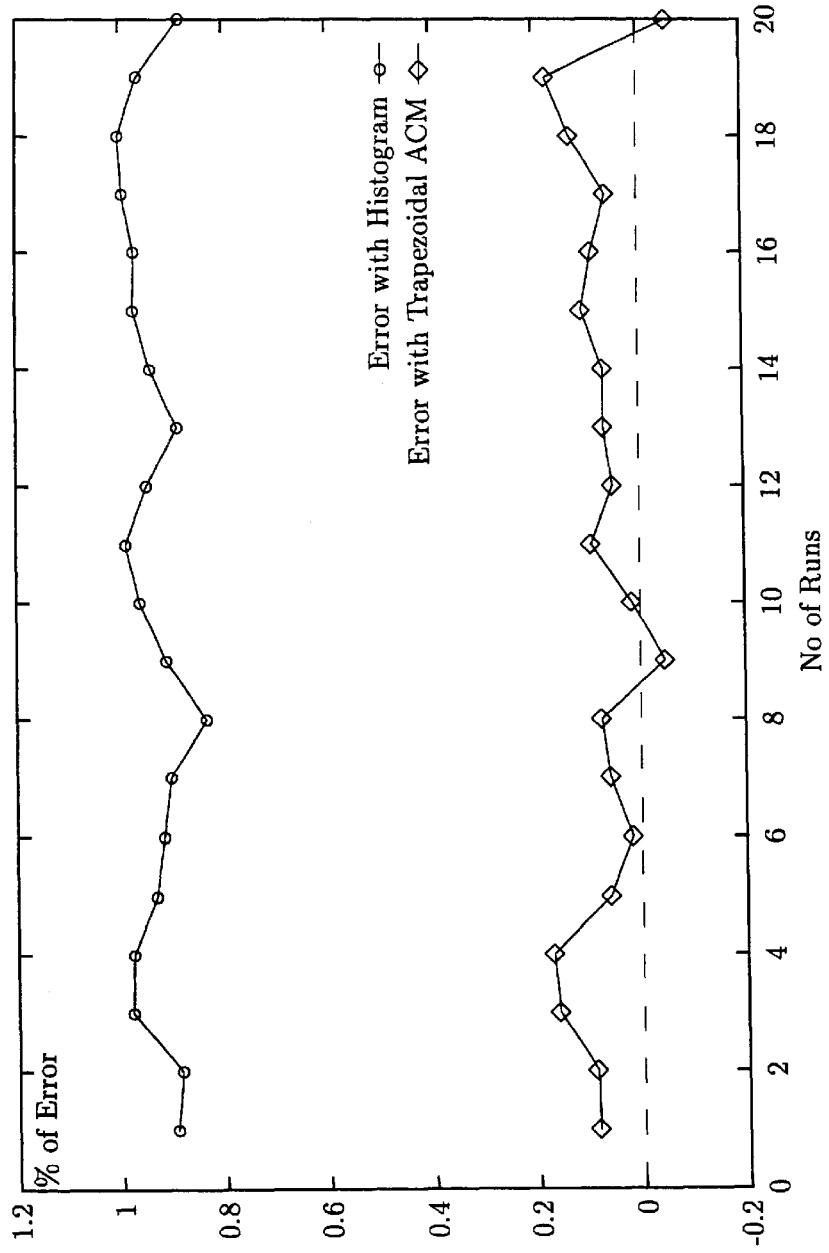

Figure 30: Comparison of Histogram and the T-ACM for Probability Estimation: Each experiment was run 100,000 times to get the average percentage of errors in the estimated occurrence of the attribute values. Estimation errors are given for exact match on a random distribution with 100,000 tuples and 1000 distinct values. Both histogram and T-ACM were of equi-width type with a sector width of 5 and no of sectors equal to 200.

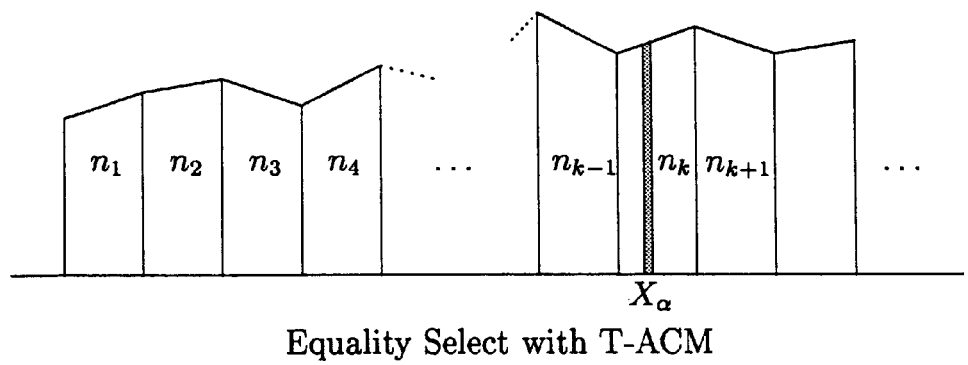
Equality Select with T-ACM
Figure 31: Equality Select Using the T-ACM

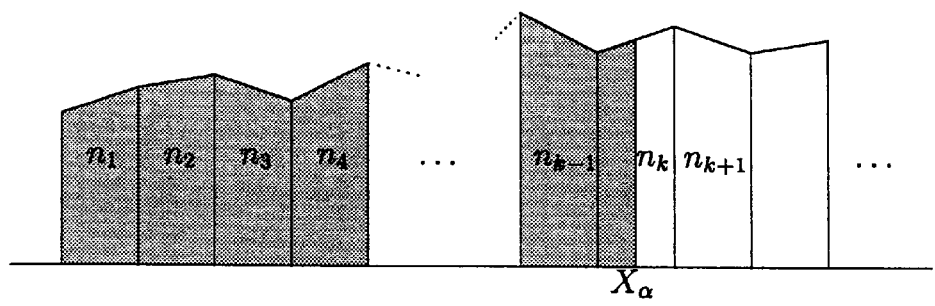
Range Select with T-ACM (Shaded region is the result of select)
Figure 32: Result Estimation of Range Select Using the T-ACM

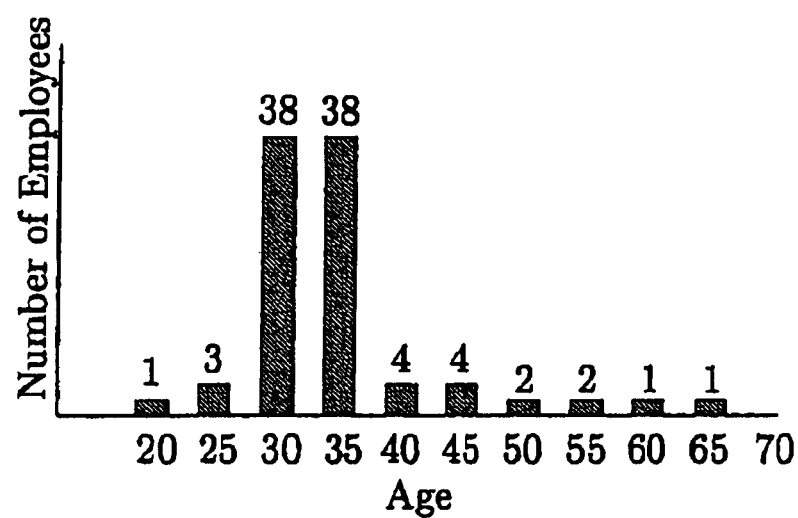
Figure 32A: Histogram of the number of employees as a function of age.

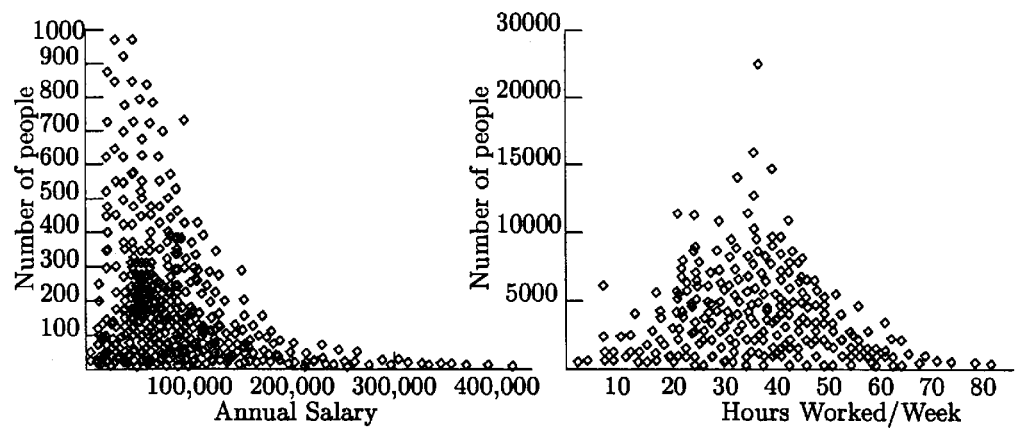
Figure 33: Frequency Distributions of Selected Attributes from the U.S. CENSUS.

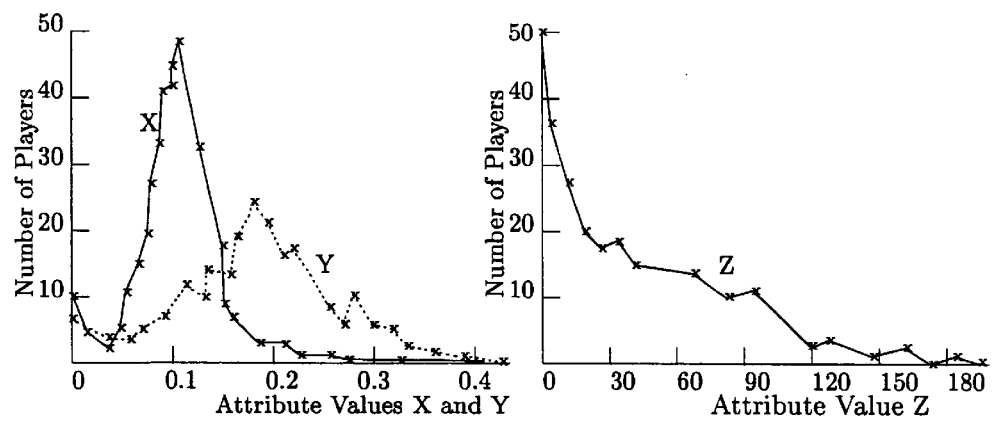
Figure 34: Frequency Distributions of Selected Attributes from the NBA Statistics.

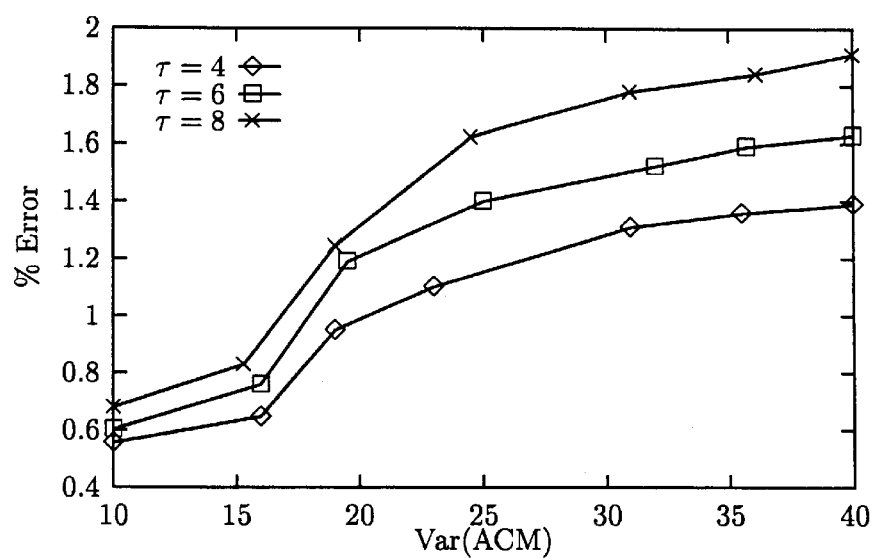
Figure 35: Estimation Error Vs Variance of the R-ACM: U.S. CENSUS Database

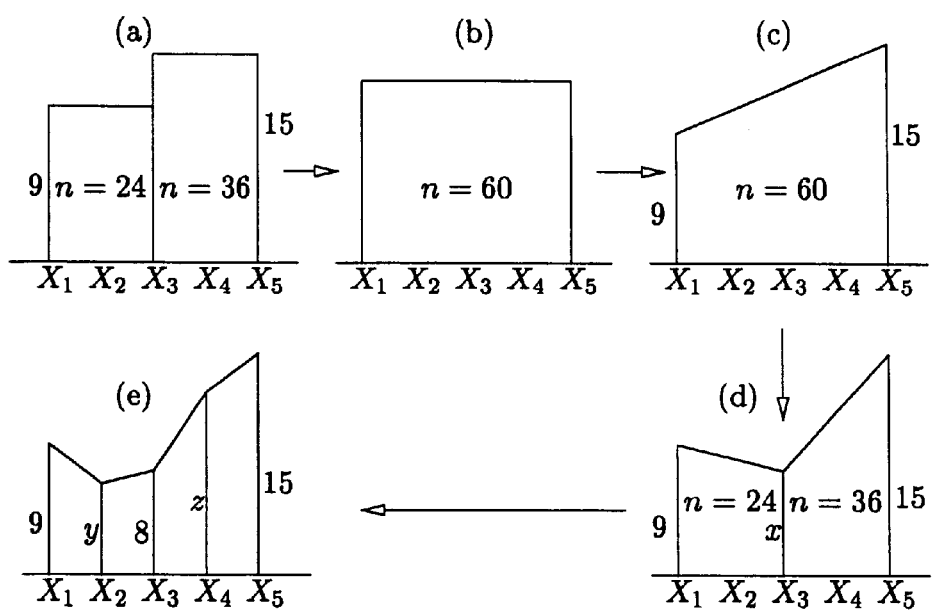
Figure 36: Construction of a T-ACM

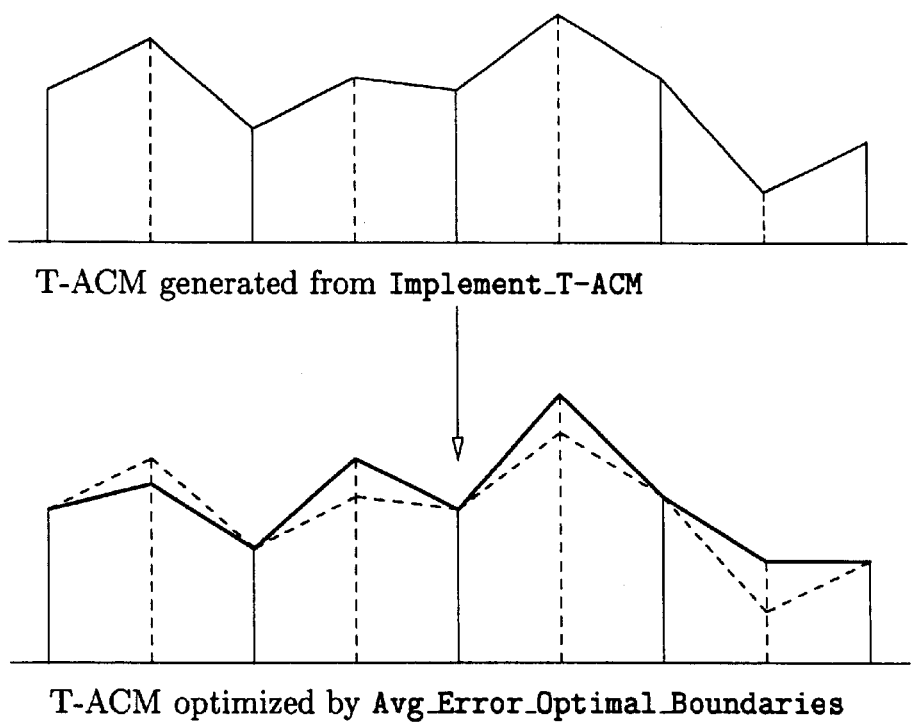
Figure 37: Generation of a (near) Optimal T-ACM

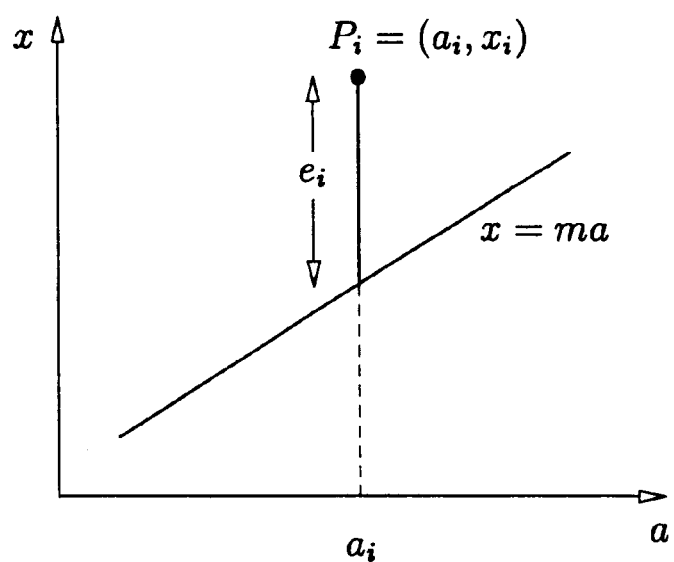
Figure 38: Minimizing the Average Estimation Error.

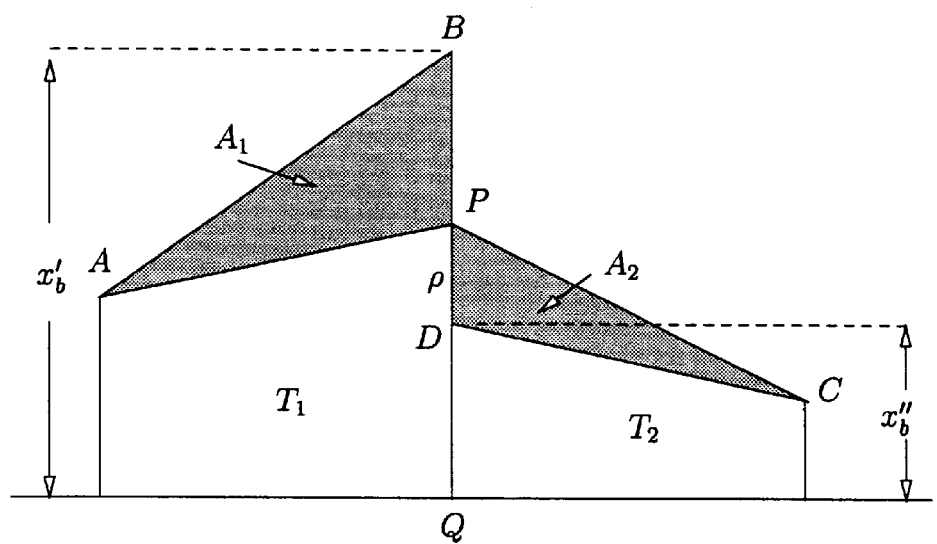
Figure 39: Finding Optimal T-ACM Sectors.

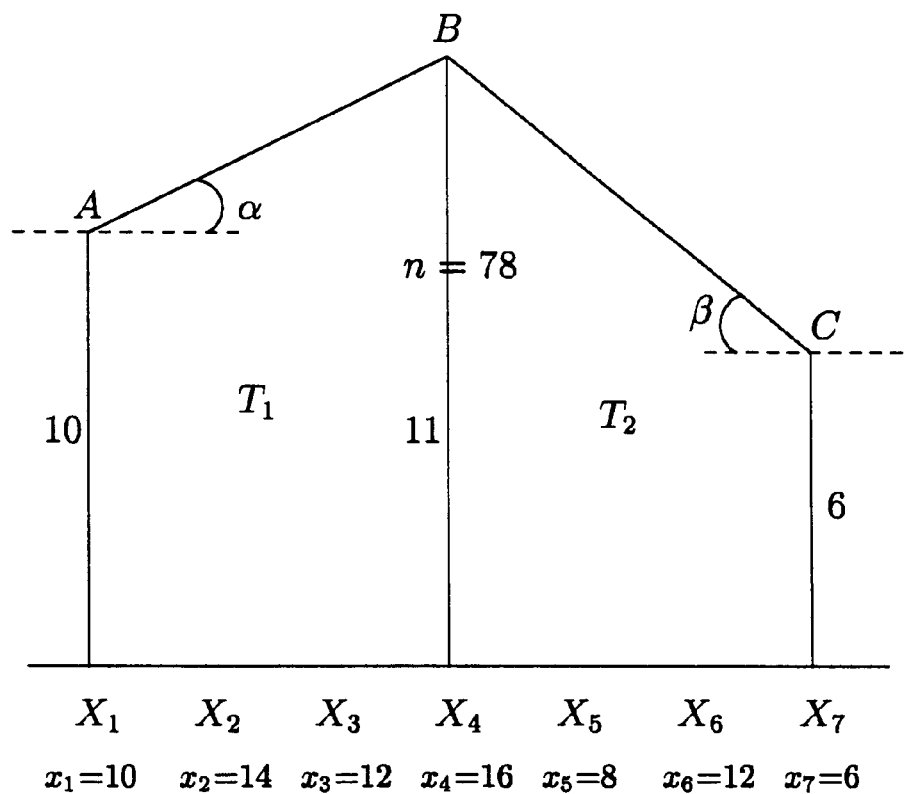
Figure 40: Optimizing the T-ACM sectors

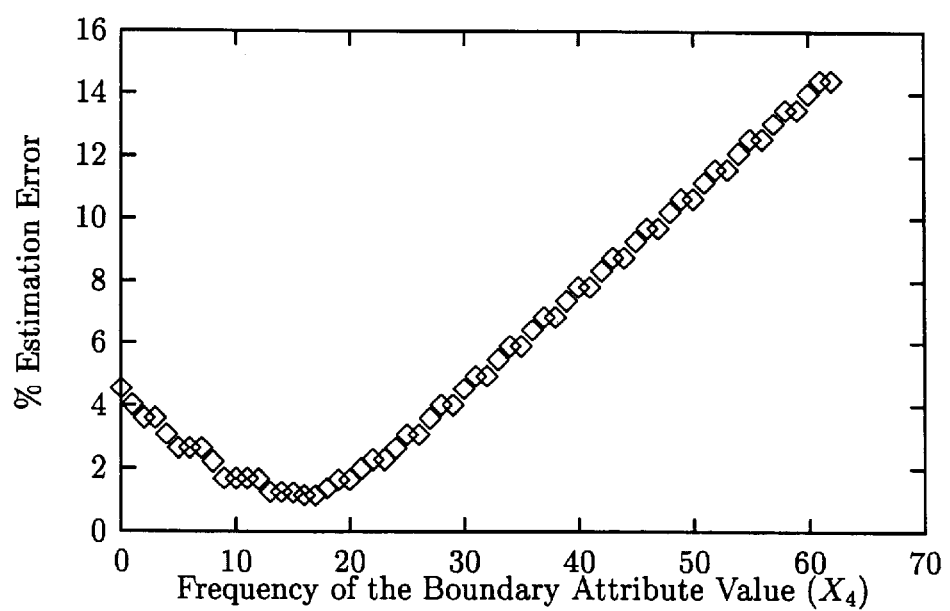
Figure 41: Percentage Estimation Error Vs Boundary Frequencies

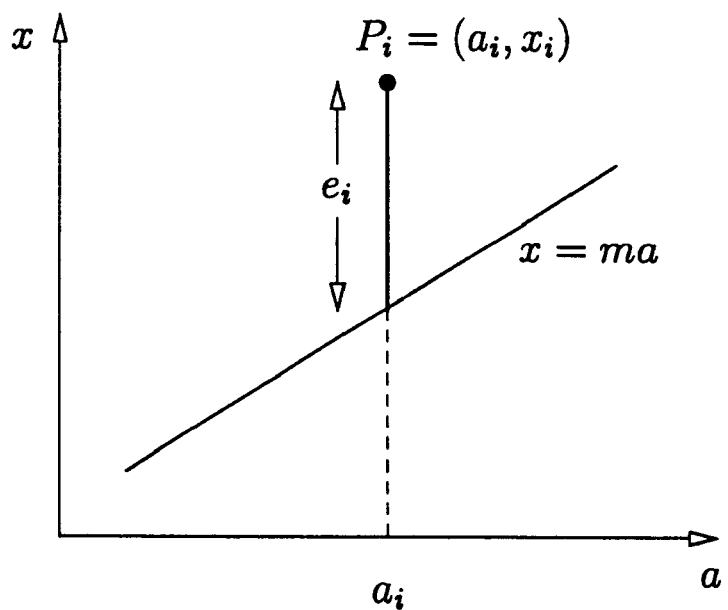
Figure 42: Least Squares Estimation Error.

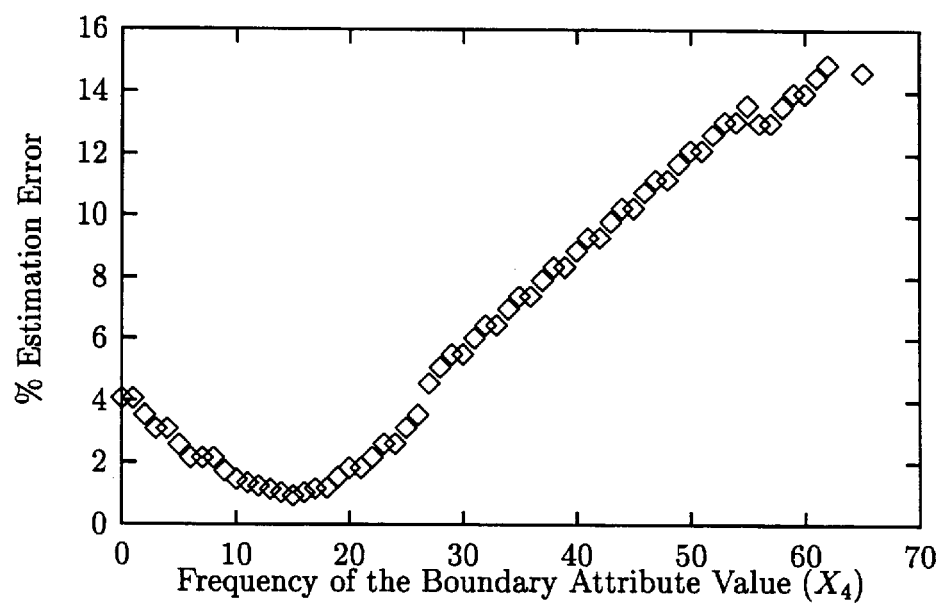
Figure 43: Optimal Boundary Frequencies: Least Square Error Method.

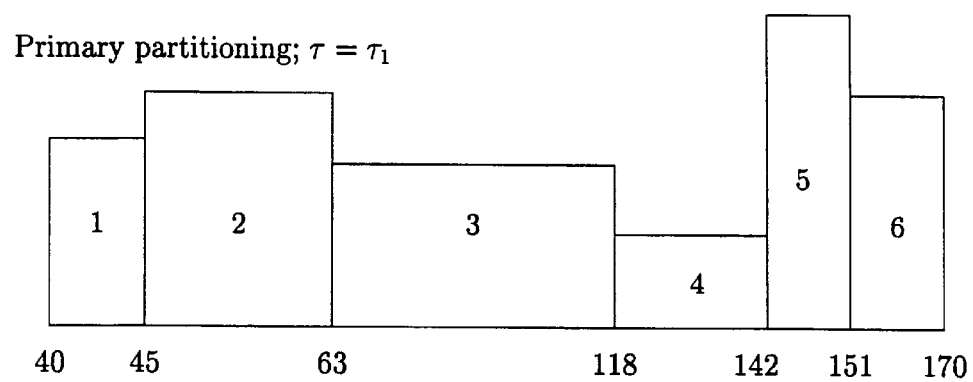
Figure 44: Primary Partitioning of an Attribute Value Domain

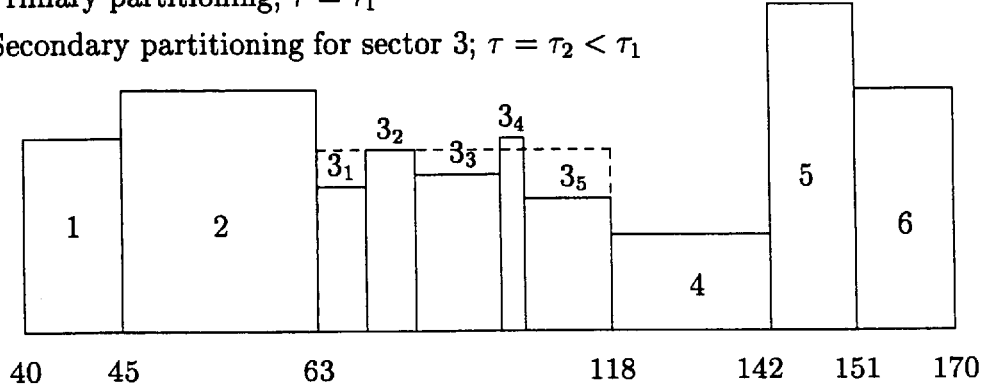
Figure 45: Secondary Partitioning of the Value Domain in Sector 3

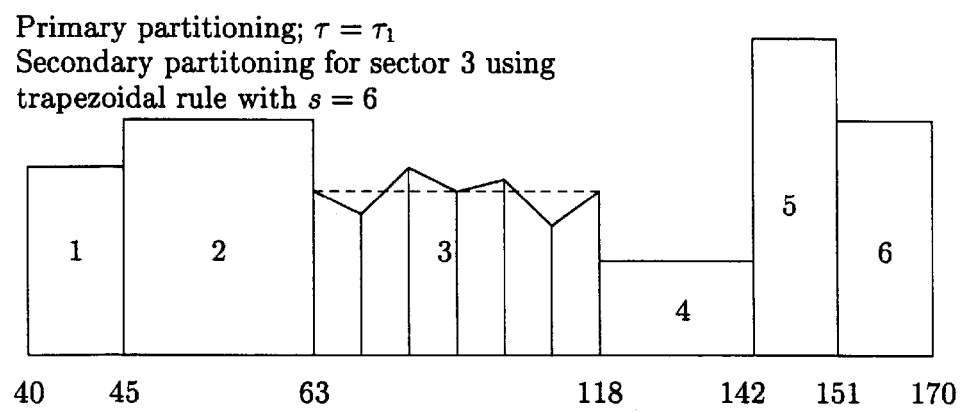
Figure 46: Secondary Partitioning of the Value Domain in Sector 3.

METHOD OF GENERATING ATTRIBUTE CARDINALITY MAPS

1. FIELD OF THE INVENTION

The present invention relates generally to estimation involving generalized histogram structures and more particularly to a method of result size estimation in query optimization.

2. BACKGROUND OF THE INVENTION

One of the main uses of computers is storing and retrieving large amounts of data efficiently. The computer system used for this purpose are known as database systems and the software that manages them are known as database management systems (DBMS). The DBMS facilitates the efficient management of data by (i) allowing multiple users concurrent access to a single database, (ii) restricting access to data to authorized users only, and (iii) providing recovery from system failures without loss of data integrity. The DBMS usually provides an easy to use high-level query/data manipulation language such as the Structured Query Language (SQL) as the primary interface to access the underlying data.

SQL, the most commonly used language in modern-day DBMSs, is a declarative language. Thus, it shields users from the often complex procedural details of accessing and manipulating data. Statements or commands expressed in SQL are generally issued by the user directly, using a command-line interface. The advantage of the declarative SQL is that the statements only need to specify what answer is expected, and not how it should be computed. The actual sequence by which an SQL command is computed is known as the procedural Query Evaluation Plan (QEP). The procedural QEP for a given non-procedural SQL statement is generated by the DBMS and executed to produce the query result. Typically, for a given query, there are many alternative procedural QEPs that all compute the result required. Each QEP, however, has its own cost in terms of resource use and response time. The cost is usually expressed in terms of the I/O operations such as the number of disk reads and writes, and the amount of CPU work to execute a given QEP. The problem of devising the best procedural QEP for a query so as to minimize the cost is termed query optimization.

In all brevity, given a declarative SQL query, the DBMS's Query Optimizer module determines the best possible procedural QEP to answer it. In order to do this, the query optimizer uses a model of the underlying system to select from a large set of candidate plans an efficient plan as quickly as possible. Efficiency of the QEP is measured in terms of resource utilization and response time.

The cost incurred in evaluating a QEP is proportional to the number of operations, including disk reads, writes and CPU work required to compute the final answer from the base relations. The size of the final result of a query as well as the sizes of the base relations will be the same regardless of which QEP, from among many possible candidate QEPs, is chosen by the query optimizer. Hence the cost of a QEP depends on the size of the intermediate relations generated during the computation of the query, as this is the single most important factor responsible for the difference in the costs of various QEPs of the given query. Hence by choosing a QEP that has smaller intermediate relations then other QEPs, it is possible to minimize the cost involved in computing the final result of the given query. Although this is easy to explain, due to the large number of possible alternative QEPs, computing the sizes of the intermediate relations accurately for each possible QEP is virtually an impossible task. Hence, one approach is to approximately estimate the sizes of the intermediate relations.

A complete set of glossary is found in many undergraduate database text books, including [Elmasri and Navathe, 1994], pp 137–177.

2.1 Query Optimization: An Overview

Query optimization for relational database systems is a combinatorial optimization problem, which makes exhaustive search unacceptable as the number of relations in the query increases. The query optimization process is generally divided into three distinct phases, namely query decomposition, query optimization and query execution as shown in FIG. 1.

In the query decomposition module, the declarative SQL query is first scanned, parsed and validated. The scanner sub-module identifies the language components in the text of the query, while the sparser sub-module checks the query syntax. The validator checks that all attribute and relation names are valid and semantically meaningful. The query is then translated into an internal format expressed in relational algebra in the form of a query Operator Tree. Using this operator tree as its input, the query optimizer module searches for a procedural plan with an optimal ordering of the algebraic operators. This optimal procedural plan is represented by an annotated query tree. Such trees encode procedural choices such as the order in which operators are evaluated and the method for computing each operator. Each tree node represents one or several relational operators. Annotations on the node represent the details of how it is to be executed. For example, a join node may be annotated as being executed by a hash-join, and a base relation may be annotated as being accessed by an index-scan. The choices of the execution algorithms are based on the database and system characteristics, for example, the size of the relations, available memory, type of indexes on a given attribute etc.

This fully annotated operator tree with the optimal QEP is then passed on to the query execution engine where all the low level database operations are carried out and the answer to the query is computed. An example annotated query tree is shown in FIG. 2.

2.1.1 An Example

FIG. 3 shows an example relational database from a Property Tax Assessor's office.

This database consists of three relations, namely,

TaxPayer(<u>SIN</u>, <u>CityCode</u>, Name, DOB, Balance),

Property(Type, <u>OwnerSIN</u>, Tax) and

City(<u>CityCode</u>, CityName, Population).

Assume that these relations have the following cardinalities:

|TaxPayer|=12×10$^6$ tuples,

|Property|=3×10$^6$ tuples, and

|City|=4000 tuples.

Given these pieces of information, it is possible to answer the following declarative query:

Query: Find the name, city and tax information of all property owners.

To illustrate the large difference in the execution cost that exists among various QEPs, two QEP's are compared for this query using a simple cost model based on the number of I/O operations. Since the disk I/O is usually the dominant factor[1] in the query response time, it is assumed the cost of evaluation a QEP is given by the total number of all tuples read and written to generate the final answer. In addition, the cost of reading the two input relations and then writing the resulting relation back on to the disk is also considered.

[1]Actually, a realistic cost model should include many other factors such as various join algorithms, availability of indexes and other auxiliary access methods, effects of caching and available memory, data skew etc.

From the set of many alternatives, two possible QEPs shown in FIG. 4 are analyzed below. The QEPs execute the answer to the query as described below:

Query Evaluation Plan 1:

In the first QEP, the relations TaxPayer and City are joined to determine the city information for each person where he or she lives. This join generate an intermediate relation. This intermediate relation is then joined with the relation Property to compute the final results.

The first join requires the relations TaxPayer and City to be read. This results in $12 \times 10^6 + 4000$ reads. Assuming the result of this join is written back to the disk, it would require $12 \times 10^6$ writes. Note that the size of the intermediate result is $12 \times 10^6$. The second join requires the above intermediate relation and the relation Property to be read. This involves an additional $12 \times 10^6 + 3 \times 10^6 = 15 \times 10^6$ reads. Since the final result contains $3 \times 10^6$ tuples, it requires that many write operations. Hence the total number of operations required for the first QEP is $N_1 = (12 \times 10^6 + 4000) + (12 \times 10^6) + (15 \times 10^6) + (3 \times 10^6) = 42,004,000$.

Query Evaluation Plan 2:

Joining the relation TaxPayer and Property, an intermediate relation with all the property owners can be obtained. This intermediate relation is then joined to the relation City to determine the information of the city for each tax payer.

In the second, QEP, the first join requires $12 \times 10^6 + 3 \times 10^6$ reads and $3 \times 10^6$ writes. The second join requires another $3 \times 10^6 + 4000$ reads and $3 \times 10^6$ writes. Hence the total number of operations required for the second QEP is $N_2 = (12 \times 10^6 + 3 \times 10^6) + (3 \times 10^6) + (3 \times 10^6 + 4000) + (3 \times 10^6) = 24,004,000$, which is almost half of the first QEP.

Using a simple cost model, this short example with two different QEPs illustrates that the cost of one plan is sometimes half of the other. Most of the real-world queries are complex queries with many relations, and with a more sophisticated realistic cost model, one can generate QEPs with substantially different costs. The task of a query optimizer is to judiciously analyze the possible QEPs and choose the one with the minimal cost.

2.2 Goals of Query Optimization

The main goals of a query optimizer are that of minimizing both the response time and resource consumption. These optimization goals are often conflicting. For example, a QEP which computes the result of a query quickly but requires all available memory and CPU resources is probably not desirable because it would virtually deprive other users from accessing the database.

Finding good solutions for a query is resource intensive, but can reduce the actual evaluation cost considerably. For example, let $T_o$ be the time taken to find an optimal QEP and let $T_c$ be the time taken to execute the optimal QEP and obtain the results. If the average time taken to execute a random QEP is $T_{avg}$, then ideally $T_o + T_c << T_{avg}$.

As queries get more complex in terms of the number of relations involved or alternative algorithms for computing an operator the number of potential alternative QEPs that to be considered explodes. The number of alternatives quickly increases with the number of relations etc. into the order of millions, while the differences between the cheapest and most expensive QEP can easily be several orders of magnitude. Even with simple string queries with n relations, there are $(2(n-1))!/(n-1)!$ different join orders. For joins involving small number of relations, this number is acceptable; for example, with n=5, the number is 1680. However, as n increases, this number rises quickly. With n=10, the number of different join orders is greater than 176 billion!

As a rule of thumb, for small queries with no more than four or five relations all QEPs are generated within a few seconds. In this case the optimization time, $T_o$, is often a fraction of the response time improvement gained.

Apart from the fact that the execution space of QEPs is usually very large, the computation of a single join operation itself is one of the most time consuming tasks. To compute the join of N relations, (N−1) dyadic join operations have to be performed. Since the size of the relations joined determines the cost of a single join operation, the order in which all N relations are joined is preferably chosen in such a way so as to minimize the overall cost of computing the join of N relations.

Unfortunately, finding the optimal join order has been proven to be an NP-hard problem while, at the same time, it is one area where considerable cost benefits can be derived. Only for specific join ordering cases, exact and optimal solutions have been obtained [Boral and Zaniolo, 1986, Ibaraki and Kameda, 1984]. In addition, most of the optimization techniques proposed in the literature cannot be applied to large queries. For example, two popular early day database systems, namely, System R and Ingres use algorithms that essentially perform an exhaustive search over the entire QEP domain. This is probably adequate in their implementation because they do not allow large queries with more than 15 joins.

The problem of optimizing a query can be formally states as follows:

Problem 1 Given a relational query Q, an execution space E and a cost function C(QEP) over elements of E, find the query evaluation plan QEP∈E such that, (1) QEP computes Q (2) There does not exist QEP'∈E such that QEP' also computes Q and C(QEP')<C(QEP).

where the execution space E is the space of QEPs considered by the optimizer.

Finding an optimal QEP is a computationally intractable problem, especially when the query involves more than, say, ten relations. One obvious approach is to decrease the size of the execution space E, but although it would reduce the time and/or space requirement, it has the tradeoff of reducing the chances of finding good plans. Another approach consists of estimating the costs of QEPs using the standard statistical information available in the database catalog. In fact, most commercial DBMSs use some form of statistics on the underlying data information about the available resources in order to estimate the cost of a query plan approximately. Since these

TABLE 1

Statistical Information found in a typical DBMS Catalogue

| Notation | Explanation |
| --- | --- |
| $N_R$ | Number of tuples in relation R |
| $b_R$ | Number of disk blocks storing relation R |
| $s_R$ | Size of a tuple of relation R in bytes |
| $bf_R$ | Blocking factor of relation R. This is the number of tuples of relation R that fit into one disk block |
| $\delta(A, R)$ | Number of distinct values of attribute A in relation R. |
| $\phi(A, R)$ | Selection cardinality of attribute A in relation R. Given a relation R and an attribute A of the relation, $\phi(A, R)$ is the average number of records that satisfy an equality condition on attribute A. | statistics are used to provide approximate estimates of query costs, the validity of the optimizer's decisions may be affected. On the other hand, since optimizers use these costs only for comparison purposes, approximate estimates for the costs of the QEPs are usually sufficient as long as these estimates are reasonably close to the actual cost of executing the QEP. For example, if the actual time units of execution of two plans $P_1$ and $P_2$ are 10 and 20 respectively, and the estimated times are 5 and 15, the optimizer will still pick $P_1$ as the less expensive plan, and this will be done correctly. On the other hand, if the estimated times are 5 and 4, the optimizer will pick the suboptimal plan $P_2$. This is an extremely important issue because costs of plans often differ considerably, and choosing a suboptimal plan often results in severe performance degradation, defeating the very purpose of query optimization.

Query optimizers make use of the statistical information stored in the DBMS catalogue to estimate the cost of a QEP. Table 1 lists some of the commonly used statistical information utilized in most of the current commercial DBMSs.

In addition to these pieces of information, most DBMSs also maintain information about the indices[2] in their catalogues. These pieces of information include values such as the average fan-out, number of levels in an index etc.

[2]Indices refer to the actual data structures used to store and retrieve the physical records of base and intermediate relations.

Since the actual evaluations of all possible QEPs in space E is very difficult, like all other investigators in this area, one approach is to approximately estimating the costs of QEPs.

Consider the cost C of joining two relations $R_1$ and $R_2$ on a common attribute X, using the nested-loop join algorithm [Selinger et al., 1979]. If $b_{R_1}$ and $b_{R_2}$ are the number of disk blocks required for relations $R_1$ and $R_2$ respectively, then the cost formula in terms of number of disk accesses is, $$C = b_{R_1} + b_{R_1} \times b_{R_2} + \left( \frac{js \times |R_1| \times |R_2|}{bf_{R_1 R_2}} \right)$$

where js is the join selectivity[3] of these other operators and $bf_{R_1 R_2}$ is the blocking factor for the resulting relation.

[3]Selectivity of an operator is the ratio of the result size and the product of its input sizes. For the join operator, the join selectivity js=$|(R_1 \bowtie_c R_2)|/(|R_1| \times |R_2|)$ From the above cost formula, it is apparent that the following quantities are crucial for the query optimizer in order to estimate the cost of such an operation:

(a) Query Result Size: The cost formula for the above join algorithm depends on the sizes of the input relations, which is true for nearly all relational operators. In a query with several operators, an input to an operator may itself be the result of another operator(s). This shows the importance of developing techniques to estimate the result sizes of these other operators.

(b) Query Result Distributions: The result size of a join or any other relational operator depends mainly on the data distribution(s) of its input relation(s). Again the input to this operator may itself be the relation which results from invoking another operator(s). This means that techniques to estimate the distribution of a query result are also desirable.

(c) Disk Access Costs: This is the cost of searching for, reading, and writing data blocks that reside on secondary storage, mainly on disk. The cost of searching for records in a file depends on the type of access structures on that file, such as its ordering, hashing, and primary or secondary indexes. In addition, factors such as whether the file blocks are allocated contiguously on the same disk cylinder or scattered on the disk affect the access cost.

The design of a good query optimizer involves developing techniques to efficiently and accurately estimate the various query result sizes. The objective of this invention is to provide new techniques that would provide more accurate query result size estimation results than the state-of-the-art methods used in the current database systems. There are other topics of concern in query optimization such as implementation algorithms for various relational operations, physical access plans for retrieving records etc., but they are not addressed herein.

In order to completely solve the above estimation problem, it is useful to develop result size estimation techniques for each of the relational operators. Most of the current commercial DBMSs employ methods based on one or more of the following techniques to estimate the above quantities:
1. Sampling based technique
2. Parametric techniques
3. Probabilistic counting techniques and
4. Non-parametric or histogram based techniques.

These techniques are briefly reviewed below. The accuracy of these estimates is often of critical importance since the selection of an optimal QEP from an exponential number of alternatives solely depends on these estimates. Despite the widespread usage of the above techniques in many commercial database systems, their accuracy has not been studied extensively.

3 PRIOR ART

Query optimization has been a very active research field in the database community for the last two decades.

Apart from the area itself being vast, the techniques used to optimize a query search itself are varied. At the top most level, the query optimizer has to distinguish the various query evaluation plans. This is a problem in its own right. The question of pruning these query evaluation plans, and discarding the less promising ones without actually processing them in any depth, is itself, a huge area of research. Additionally, for any given query evaluation plan, the question of estimating its efficiency without actually processing the query is a problem that has captivated much research.

3.1 A Top-down Approach to Query Optimization

Early work in query optimization essentially followed two distinct tracks, namely, the bottom up and top down. Database researchers found the query optimization problem, when posed in a general context, to be both difficult and complex—and indeed, intractable with regard to optimality. They, in the early days, mainly undertook a bottom-up approach, considering only special cases. This included, for example, finding "optimal" strategies to implement major relational operations and finding "optimal" methods to execute simple subclasses of queries. As better strategies emerged with time, researchers attempted to obtain "optimal" strategies for relatively larger and more complex queries by composing the results from the smaller building blocks.

As the number and sizes of the commercial databases grew, the need for functional optimization systems resulted in the development of full-scale query evaluation techniques. These techniques provided more general solutions and handled query optimization in a uniform, though heuristic manner [Astrahan and Chamberlin, 1975, Makinouchi et al., 1981, Niebuhr and Smith, 1976, Wong and Youseffi, 1976]. Obviously, generating a query optimization plan out of smaller building blocks, often did not achieve optimal system efficiency. This led the researchers to move towards a top-down approach that incorporated more knowledge about special-case optimization opportunities into the general procedures. This top-down approach also incorporated many general algorithms, which were augmented by combinatorial cost-minimization techniques for choosing between the various potential query evaluation plans.

Using the top-down approach, the general query optimization is divided into the following steps:

(1) Use logical transformation techniques to change the given query so that (a) the query is represented in a standardized form, (b) the query is simplified such that the same operation is not computed twice, and (c) the query is ameliorated so as to organize the computation to apply procedures developed for special case scenarios.

(2) Represent the transformed query as alternative sequences of simple elementary relational operations that are computed using known implementation techniques. This makes it possible to compute the associated execution cost for the evaluation plan. This step generates a set of potential access plans that simplify the process of evaluating the original query.

(3) Compute the execution cost for each access plan in the above access plan set.

(4) Execute the cheapest access plan and return the results.

The first step of this procedure involves logical transformation of the query, and thus it is, generally, independent of the underlying data. Hence this step is often handled at compile time. But in order to properly carry out steps (2) and (3), and to generate optimal query evaluation plan, sufficient knowledge about the underlying data distribution is required.

The face that steps (2) and (3) require some prior knowledge about the underlying data poses a number of difficulties. First of all, if the data distribution is dynamic, steps (2) and (3) can be carried out only at run time. Consequently some gain in the overall execution efficiency is sacrificed in order to minimize the optimization cost. Another difficulty is that the DBMS should maintain a catalogue or a meta-database about the pertinent statistical information about the underlying data distributions. It is obvious that in order to benefit from such as optimization strategy one must compare the costs of gathering and maintaining such information in the DBMS catalogue against the cost savings in the overall optimization process.

3.1.1 Query Transformation

Any relational algebraic query can be transformed into a number of semantically equivalent expressions. The work on transformation of a given expression into an equivalent query by means of well defined transformation rules is discussed below. The objectives of query transformation can be described as the following:

1. Obtaining a normalized starting point for query optimization (called standardization).
2. Eliminating the duplication of effort (called simplification) and
3. Generating query expressions that have superior evaluation performance compared to the initial query (called amelioration).

A number of works [Jarke and Schmidt, 1981, Kim, 1982, Palermo, 1972] have been done to define a normalized starting post for representing a query for the purpose of query optimization.

One of the main differences between any two equivalent expressions is their degree of redundancy [Hall, 1976]. In other words executing a query with redundant expression results in carrying out a number of unnecessary duplicated operations. Hence query simplification steps should involve the transformation of a redundant query expression into an equivalent non-redundant one by applying simple logical transformation rules listed below.

3.1.2 Transformation Rules

A transformation or equivalence rules says that expressions of two forms are equivalent. This implies that one expression can be transformed to the other while preserving equivalence. When two relations have the same attributes ordered in a different manner, and equal number of tuples, the two expressions that generate them are considered to be preserve equivalent. Modern-day query optimizers heavily use equivalence rules to transform initial expressions into simpler logically equivalent expressions.

A number of commonly used general equivalence rules for transforming relational algebraic expressions are given below. Three equivalent transformations are shown in FIG. 5. The predicates in the query expressions are denoted by $\theta_i$, attributes are denoted by $L_i$, and the algebraic expression is denoted by $E_i$. Since the result of a relational algebraic expression itself is a relation, a relation name R can appear anywhere in place of an expression.

1. Conjunctive selection operations can be simplified into a sequence of individual selections. This transformation operation is known to as a cascade of $\sigma$.

$$\sigma_{\theta_1 \wedge \theta_2}(E) = \sigma_{\theta_1}(\sigma_{\theta_2}(E)).$$

2. Selection operations applied successively onto a relation are commutative.

$$\sigma_{\theta_1}(\sigma_{\theta_2}(E)) = \sigma_{\theta_2}(\sigma_{\theta_1}(E)).$$

3. In a sequence of projection operations, only the final operation is required to compute the results. This transformation operation is known as a cascade of $\pi$.

$$\pi_{L_1}(\pi_{L_2}(\ldots(\pi_{L_n}(E))\ldots)) = \pi_{L_1}(E).$$

4. Selections can be processed together with Cartesian products and $\theta$-joins.

$$\sigma_\theta(E_1 \times E_2) = E_1 \bowtie_\theta E_2. \quad (a)$$

This expression is indeed the definition of the theta join.

$$\sigma_{\theta_1}(E_1 \times_{\theta_2} E_2) = E_1 \bowtie_{\theta_1 \wedge \theta_2} E_2. \quad (b)$$

5. A theta-join operation is commutative.

$$E_1 \bowtie_\theta E_2 = E_2 \bowtie_\theta E_1.$$

Note that the natural join operation is also commutative, since the natural-join operator is actually a special case of the theta-join operator.

6. (a) Natural join operations are associative.

$$(E_1 \bowtie E_2) \bowtie E_3 = E_1 \bowtie (E_2 \bowtie E_3).$$

(b) Theta joins can be associative as shown below.

$$(E_1 \bowtie_{\theta_1} E_2) \bowtie_{\theta_2 \wedge \theta_3} E_3 = E_1 \bowtie_{\theta_1 \wedge \theta_3} (E_2 \bowtie_{\theta_2} E_3).$$

where $\theta_2$ involves attributes from only $E_2$ and $E_3$. Since any of these predicates can be empty, the Cartesian product (x) is an associative operation. It is important to observe that the properties of commutativity and associativity of join operations are important for join reordering in query optimization.

7. The selection operation and the theta join operation are distributive under the conditions states below:

(a) Selection operation distributes over the theta join operation when all the attributes in selection predicate $\theta_0$ involve only the attributes of one of the expressions ($E_1$) being joined.

$$\sigma_{\theta_0}(E_1 \bowtie_\theta E_2) = (\sigma_{\theta_0}(E_1)) \bowtie_\theta E_2.$$

(b) Selection operation distributes over the theta distribution when selection condition $\theta_1$ involves only the attributes of $E_1$ and $\theta_2$ involves only the attributes of $E_2$.

$$\sigma_{\theta_1 \in \theta_2}(E_1 \bowtie_\theta E_2) = (\sigma_{\theta_1}(E_1)) \bowtie_\theta (\sigma_{\theta_2}(E_2)).$$

8. The projection operation and the theta join operation are distributive.

(a) Suppose the attributes $L_1$ and $L_2$ belong to the expressions, $E_1$ and $E_2$, respectively. Assume that the join predicate $\theta$ has only attributes in $L_1 \cup L_2$. This means, $$\pi_{L_1 \cup L_2}(E_1 \bowtie_\theta E_2) = (\pi_{L_1}(E_1)) \bowtie_\theta (\pi_{L_2}(E_2)).$$

(b) Consider a join $E_1 \bowtie_\theta E_2$. Assume the attributes, $L_1$ and $L_2$ belong to the expression $E_1$ and $E_2$, respectively. Assume the attribute $L_3$ is from the expression $E_1$ which are involved in join predicate $\theta$, but are not in $L_1 \cup L_2$, and let attribute $L_4$ of $E_2$ that are involved in join condition $\theta$, but are not in $L_1 \cup L_2$. This means, $$\pi_{L_1 \cup L_2}(E_1 \bowtie_\theta E_2) = \pi_{L_1 \cup L_2}((\pi_{L_1 \cup L_3}(E_1)) \bowtie_\theta (\pi_{L_2 \cup L_4}(E_2))).$$

9. The union operation and the intersection are commutative set operations.

$$E_1 \cup E_2 = E_2 \cup E_1 \text{ and } E_1 \cap E_2 = E_2 \cap E_1.$$

It is important to note that set difference operation is not commutative.

10. The union operation and intersection operation are associative set operations.

$$(E_1 \cup E_2) \cup E_3 = E_1 \cup (E_2 \cup E_3) \text{ and } (E_1 \cap E_2) \cap E_3 = E_1 \cap (E_2 \cap E_3).$$

11. The selection operation distributes with the union, intersection, and set difference operations.

$$\sigma_P(E_1 - E_2) = \sigma_P(E_1) - \sigma_P(E_2).$$

When substituting the set difference (−) with either one of $\cup$ or $\cap$, selection operation is distributive with the union and intersection operations.

12. The projection and union operations are distributive.

$$\pi_L(E_1 \cup E_2) = (\pi_L(E_1)) \cup (\pi_L(E_2)).$$

The proof of the above equivalence is straightforward and is presented in the work of [McKenna, 1993]. Also, the preceding list is only a partial list of equivalences. More equivalence involving extended relational operators, such as the outer join and aggregation, are constructed from the above list.

The process of query simplification does not always produce a unique expression. Many non-redundant expressions exist that are equivalent to the one generated by a given equivalence transformation. The evaluation of expressions corresponding to a given query may differ significantly with respect to performance parameters, such as the size of the intermediate results and the number of relation elements accessed.

3.2 Query Evaluation 3.2.1 One-Variable Expressions

These are the simplest algebraic expressions used to select a given set of attribute values from a single relation. A simple approach to evaluate such an expression is to read every corresponding attribute value of the relation, and to check whether it satisfies each term of the expression. Obviously this approach is very expensive, especially when the query expression involves large relations. In these situations, there have been many techniques proposed to minimize the number of attribute values accessed and the number of tests applied to an accessed attribute value. These are briefly discussed below.

One of the commonly employed techniques to minimize the number of record accesses is by means of data structures that provide direct access paths, so that an exhaustive sequential search is avoided. This is accomplished by maintaining the relation in a sorted form with respect to one or more attributes so that records are easily accessed. This also facilitates a binary search on the sorted attribute values. A use of such a technique is the evaluation of range queries [Bolour, 1991, Davis and Winslow, 1982].

Another commonly used technique is hashing. Hashing technique has many variants and its major advantage is that it provides fast direct access to records without requiring that the attribute values are maintained in a sorted order.

In addition to hashing, techniques used indexes play an important role is providing direct and ordered access to records. Indexes are often combined with multi-list structures. The idea of an index is based on a binary relationship between records being accessed. Specifically the index method uses tuple identifiers or keys to establish a binary relationship between records, so that traversal becomes much faster than a sequential search. The indexing method is either one-dimensional or multi-dimensional A one-dimensional index implements record access based on a single relation attribute, whereas a multidimensional index implements record access based on a combination of attributes. Two popular approaches for implementing one-dimensional indexes are ISAM [Corporation, 1966] and B-tree [Bayer and McCreight, 1972] structures. A detailed discussion on multidimensional index structures is found in the work of Bentley and Friedman [Bentley and Friedman, 1979].

The logical transformation rules are often applied at run time to a query expression to minimize the number of tests applied to an accessed record or attribute value of a relation. Changing the order in which individual expression components are evaluated sometimes results in performance increases. A number of techniques utilizing a priori probabilities of attribute values, to obtain optimal evaluation sequences for specific cases are discussed in [Hanani, 1977].

3.2.2 Two-Variable Expressions Query expression that describe conditions for the combination of records from two relations are known as two-variable expressions. Usually two-variable expressions are formed by monadic sub-expressions and dyadic sub-expressions. Monadic expressions restrict single variables independently of each other, whereas dyadic expressions provide the relationship between both variables. In what follows the basic strategies for the evaluation of a single dyadic expression, and methods of the evaluation of any two-variable expressions are discussed.

Method 1 Nested_Iteration_Join
for i:=1 to $N_1$ do
   read the $i^{th}$ element of $R_1$;
   for j:=1 to $N_2$ do
     read $j^{th}$ element of $R_2$;
     compute the join based on join predicate;
   end;
end;

There are two major approaches to implementing the join operation, namely order-dependent and order-independent strategies. The nested iteration method is a simple approach that is independent of the order of record access. In this method, every pair of records from the relation is accessed and concatenated if the join predicate is satisfied. A nested iteration based join list is Method 1.

Let $N_1$ and $N_2$ be the number of records of the relations read in the outer and inner loops respectively. It is clear that $N_1+N_1*N_2$ disk accesses are required to evaluate the dyadic term, assuming that each record access requires one disk access.

The nested iteration method is improved by using an index on the join attribute(s) of the relation $R_2$. This strategy does not require accessing $R_2$ sequentially for each record of $R_1$ as the matching $R_2$ records are accessed directly [Griffeth, 1978, Klug, 1982]. Hence using an index $N_1+N_1*N_2*j_{12}$ record accesses are needed, where $j_{12}$ is a join selectivity factor representing the Cartesian product of $R_1$ and $R_2$.

In a paged-memory environment, the idea of the method iteration method is extended to be nested block method [Kim, 1982]. In this method, a main memory buffer is used to hold one or more pages of both relations, where each page contains a set of records.

The nested block algorithm is essentially similar to the nested iteration method. The only difference is that memory pages are red instead of single records of the relation. Using this approach the number of disk accesses required to compute the join is reduced to $P_1+(P1/B1)*P_2$, where $P_1$ and $P_2$ are the number of pages required to store the outer and inner relations of the algorithm respectively and $B_1$ is the number of pages of the outer relation occupying the main memory buffer. It is easy to observe that it is always more efficient to read the smaller relation in the outer loop (i.e., make $P_1<P_2$). If the smaller relation is maintained entirely in the main memory buffer, then only $P_1+P_2$ disk accesses are needed to form the join.

Another approach, based on the order in which records of the relations are retrieved, is known as the merge method. In this approach, both relations are scanned in ascending or descending order of join attribute values and merged according to the join predicate. Almost $N_1+N_2+S_1+S_2$ disk accesses are required to form the join, where $S_1$ and $S_2$ are the number of disk accesses needed to sort the relations being joined. This method is an excellent choice when both relations are already sorted by the same criterion. Of course, when the smaller relation is completely maintained in the main memory buffer, the nested block method is more efficient. Whenever an indexing mechanism exists, then when one relation is much larger than the other, nested iteration with indexes is preferable.

The strategies developed to evaluate one-variable expressions and computation of dyadic terms are also used to evaluate any arbitrary two-variable expressions. These strategies mainly differ in the manner they implement the access paths and methods, namely indexing mechanisms and the order in which the component expressions are evaluated. [Blasgen and Eswaran, 1976], [Niebuhr and Smith, 1976], and [Yao, 1979] describe many different approaches and compare their conclusion that usually there is no a priori best algorithm for a general evaluation process and thus the query optimizer must rely on heuristics or alternatively choose the optimal plan through an expensive cost comparison of potentially many alternatives for each query.

3.2.3 Multi-variable Expressions

A query optimizer designed to process any arbitrary query should incorporate strategies for evaluating multi-variable expressions.

One of the popular techniques, known as parallel processing of query components evaluates an expression by avoiding repeated access to the same data. This is usually achieved by simultaneous or parallel evaluation of multiple-query components. Usually all monadic terms associated with a given variable are evaluated first and all dyadic terms in which the same variable participates are partially evaluated parallely [Palermo, 1972]. This also includes parallel evaluation of logical connectors such as AND existing among the various terms, that always minimizes the size of intermediate query results [Jarke and Schmidt, 1982]. A strategy where aggregate functions and complex sub-queries are computed concurrently, has been proposed by Klug [Klug, 1982]. Parallel processing of query components requires appropriate scheduling strategies for the overall efficient optimization. A few interesting techniques for parallel scheduling for query processing have been proposed by Schmidt [Schmidt, 1979].

Another strategy that is useful for scheduling parallel optimization is the pipelining of operations that works on the partial output of preceding operations. This is described in [Smith and Chang, 1975, Yao 1979].

Another method known as the feedback technique combines the tasks of simultaneous evaluation of query components and pipelining, using partial results of a join operation [Clausen, 1980].

3.3 Access Plans

The combination of these building blocks into an efficient and optimal evaluation procedure for an arbitrary standardized, simplified, and ameliorated query expression is discussed below.

The access plan selection strategies use the transformed and simplified query, the storage structures and access paths, and a simple mathematical cost model to generate an optimal access plan. This is usually achieved by the following procedure:

1. Find all possible logical access plans for evaluating the given query. A logical access plan is defined as a sequence of operations or of intermediate results leading from existing relations to the final result of a query.
2. Obtain details of the physical representation of data such as access paths, statistical information stored in the data-dictionary.
3. Using the mathematical cost model based on the access paths and processing costs, select the cheapest access plan.

3.3.1 Generation of Access Plans

The sequence of operations or intermediate results leading from the existing data structures to a query result is known as an access plan for a query. An ideal query optimizer generates an optimal access plan with a minimal optimization effort.

Two completely different methods were proposed in [Smith and Chang, 1975] and [Yao, 1979]. Smith and Change use a fixed set of query transformation rules. This approach usually results in a single access plan, which need not be optimal. Yao's approach generates all non-dominated access plans that are possible in a given scenario. Obviously generating every single possible access plan becomes prohibitively expensive for complex queries.

In addition to the above methods, there are other strategies that resort to methods that lie between heuristic selection and detailed generation of alternative access plans. This includes an SQL nested block method based on a hierarchical technique used in System R [Selinger et al., 1979]. In this strategy, in addition to generating and comparing the evaluation plans for each query block, the sequence in which how query blocks are evaluated is also computed. The disadvantage of this method is that as this approach requires a user-specified block structure, the initial query normalization step is pushed into the actual query processing phase [Kim, 1982], INGRES also uses a somewhat similar approach [Wong and Youseffi, 1976].

3.3.2 Cost Analysis of Access Plans

The query optimizer chooses a physical access plan for a given query either on the basis of a set of heuristic rules or on the basis of a mathematical cost model involving the underlying data structures and access methods. Merrett discussed a top-down approach for cost analysis based on the storage structures [Merrett, T. H., 1977]. Though the techniques presented in [Merrett, T. H., 1977] have been significantly improved on since 1977, it is worth mentioning that Merrett's ideas were seminal and initiated the work in the area of cost analysis in relational database systems. In particular, Merrett provides general principles that allow a database analyst either to quickly estimate the costs of a wide variety of alternatives, or to analyze fewer possibilities in depth. He also provides a number of techniques that can be used at any level of the iterative design process.

A brief review of some of the cost models and their use in the query optimization is given below.

Even though working storage requirements or CPU costs are considered to be important factors by some researchers, the number of secondary storage accesses or I/O operations is considered to be the most important one in designing a cost model for analyzing any physical access plan. The number of secondary storage accesses is mainly dependent on the size of the operands used in the query, the type of access structures used, and the size of the temporary buffers available in the main memory.

In the initial stages of the evaluation, the sizes of most of the operands are known, at least approximately. In addition, available index methods for the attribute values involves are also known. But in the later stages of the evaluation, most intermediate relations are the results of preceding operations, and consequently, the cost model estimates their size by using information about the original data structures and any other information available from the DBMS catalogue, such as the selectivity of the operations already performed on them. Unfortunately, there are no generally accepted well defined formulae for estimating the size of intermediate results.

It is possible to construct a simpler model, using only a few parameters by imposing restrictions on the assumptions about the data. The result size estimate analysis discussed in [Selinger et al., 1979] uses only information already available in the database catalogue. Obviously this requires many assumptions about data and queries to complete the cost model [Astrahan and Chamberlin, 1975]. On the other hand, the result size estimate analysis proposed by Yao assumes that detailed selectivity data is known [Yao, 1979], without stating how this detailed information is obtained.

In the late 1980s and early 1990s, researchers began to carefully describe and critically analyze all underlying assumptions about database characteristics. The objective was to formally generate valid parameters for the cost model that enable the optimizer to do the following:

1. estimate a result size for any relational operation, and
2. estimate parameter values for intermediate results based on the previous results and base relations.

Cost models based on such techniques relate the database state as run time as the result of a random process. This random process is assumed to generate relations from the Cartesian product of the attribute value domains, based on some probability distribution and by invoking certain other general principles such as the functional dependencies of the underlying database schema [Glenbe and Grady, 1982, Richard, 1981]. These assumptions enable one to derive parameters in order to compute the size of any intermediate result of more complex relational operations.

These assumptions have been critically involved in [Christodoulakis, 1981] and [Montgomery et al., 1983]. They have shown that these assumptions often lead to a bias against direct-access structures in selection plans. However, to date, there has been no practical and simple cost model or formula with more general assumptions, which does not require detailed catalogue information.

3.3.3 Selection of Access Plans

Selection of access plans is often based on either heuristic rules or cost estimates. Some approaches, proposed in the literature, combine heuristic reduction of access plan choices with enumerative cost minimization techniques. A number of experimental studies show that combinatorial analysis significantly improves the database performance.

Cost estimates can be used in the access plan selection process in two different ways. The first approach estimates the costs of each alternative access plan completely. The major advantage of this approach is that it is possible to make use of techniques like parallelism or feedback in such situations. But, obviously the overall optimization effort is high.

In the second method, a parallel incremental generation of the cost of strategies is proposed. The main advantage of this method is that it permits whole families of strategies with common parts to be evaluated concurrently. Hence this approach results in a significant reduction in the overall optimization effort. One good example using this approach is the heuristic method proposed by Rosenthal and Reiner [Rosenthal and Reiner, 1982], in which the "optimizer" keeps only the current-optimal way to generate each intermediate result, and discards any other sub-optimal methods.

A more popular method is the dynamic-programming query optimization strategy, This is actually an extension to the second method, in which, at each level, only the next operation to be performed is determined based on the optimal sub-plans. As in any dynamic programming technique, this method has actual information about all its operands, including intermediate result sizes that are used to update the estimates of the remaining steps. This dynamic approach has two obvious drawbacks. Firstly, it has a potential of getting stuck in local optima if no adequate look ahead is planned. Furthermore, in the more general setting, the method leads to prohibitively high optimization cost.

3.4 Query Optimization Using Join Re-Ordering

3.4.1 Query Graphs and Join Trees

Query graph is a commonly used pictorial representation of a relational query. In a query graph, nodes denote the relation names, and edges represent the respective predicates. If a predicate expression, p, references the attributes of two relations, say $R_i$ and $R_j$, then an edge labeled p is said to exist between the nodes of these two relations. Denoting the edges of the query graph as $\{p_1, \ldots, p_n\}$ and nodes as $\{R_1, \ldots, R_m\}$, the result of a query graph $G=(V, E)$ is defined as a Cartesian product followed by relational selection: $\sigma_{p1 \wedge p2 \ldots \wedge pn}(R_1 \times \ldots \times R_m)$.

Instead of using the straight definition of product followed by selection of the query tree stated above, simple Join trees are used to evaluate queries. A join tree is defined as an operator tree whose inner nodes are labeled by the relational join operators and whose leaves are labeled by base relations. The computation of the result of a join tree is always carried out in a computed bottom-up fashion. The nodes of the join trees are usually annotated to reflect the type of join-algorithm used. These generally include algorithms such nested loops, hash, sort merge and so on. It should be noted that some of the binary trees on the relations of the query are not actually join trees since they may involve the use of Cartesian products.

The query graphs and join trees are two different forms of representing a given query. A query graph merely represents a collection of relations and their corresponding predicate expressions. It does not specify any evaluation order for the expressions involved. On the other hand, a join tree specifies clearly the inputs to each relational operator, and the order in which how they should be evaluated.

FIG. 6 shows a query graph, and two possible operator trees that solve the query.

3.4.2 Join Tree Topologies

Join trees are classified into two major categories, namely linear join trees and bushy join trees. For every join operator in a join tree, if at least one of the two input relations is a base relation, then the join tree is called linear, otherwise it is called bushy. Using this classification, bushy search space is defined as a set of join trees when there is no restriction on the topology of the trees. Similarly a linear search space is defined as a set of join trees where the topology of the trees is restricted to only linear join trees. The linear search space is actually a subset of the bushy search space. Since join trees do not distinguish between right and left subtrees, they are unordered. Since each of the n–1 internal nodes of an unordered tree of n leaves can have two choices, a total of $2^{n-1}$ ordered trees can be generated from such an unordered tree.

The number of alternative join trees exponentially increases when considering the various implementation algorithms available for each join operator in the tree. Some of the commonly used join algorithms are hash-join, nested-loop and merge-scan. For example, for a query graph involving n relations where each join has x alternative implementation schemes available, then for each query tree which was previously unordered, one can generate a pool of $x^{n-1}$ ordered trees.

3.4.3 Structured Query Graphs

When presented with an arbitrary query graph, finding the total number of valid join trees is a computationally intractable problem. On the other hand, when the topology of the query graph is "structured", it is relatively easy to find the exact number of join trees using standard combinatorial methods [Lanzelotte et al., 1993]. The number of unlabeled binary trees is shown in [Knuth, 1968]to be equal to the Catalan number. Three well known query graph topologies, string, completely connected and star query graphs are discussed below.

String Query: Both end nodes of a string query have degree 1 and all other n–2 nodes have degree 2 as shown in FIG. 7. String queries are frequently encountered

TABLE 2

Number of join trees for structured query graphs.

| Search Space | String Query | Completely Connected | Star |
|---|---|---|---|
| Linear join trees | $2^{n-2}$ | n! | (n–1)! |
| Bushy join trees | $\dfrac{(2n-2)!}{n!(n-1)!}$ | $\dfrac{(2n-2)!}{(n-1)!}$ | (n–1)! | in the verification of foreign key relationships and in object-oriented database environments.

Completely Connected Query:

This is also known as a clique. These type of query graphs are not usually found in day to day operations of a DBMS. The main use of such a graph is as a test case for its large number of evaluation orders. It is clear that the query graph for a completely connected query of n relations, has n nodes of degree n–1. Since every node of this graph is connected to every other node, these graphs are also called complete or n–1 regular graphs. FIG. 8 depicts a clique on four nodes.

Star Query:

Online analytical processing (OLAP) applications often use star queries. In the query graph of a star query of n relations, there are n–1 nodes with degree 1 and one central node with degree n–1 as shown in FIG. 9. It is interesting to note that for a star query, all valid join trees involve join operators that have at least one operator as a base relation. Hence in a star query, the number of bushy search space is the same as the linear join tree search space.

For the three query graph topologies discussed above, namely string, completely connected and star the exact number of unordered linear and bushy join trees is listed in Table 2.

3.5 Join Tree Selection Methods

Optimal join tree selection is a search problem which depends on the three factors, namely the join tree search space, the coat model and the search strategy or search algorithm. The join tree search space contains all valid join trees, both bushy and linear. The cost model is usually a simple mathematical model that annotates a cost to each operator in the tree. The search algorithm is the actual procedure that finds the optimal join tree in the search space using the cost model. Most of the modern-day query optimizers use three different search strategies, namely (a) exhaustive search (b) probabilistic techniques (c) non-exhaustive deterministic algorithms.

3.5.1 Exhaustive Search

Exhaustive search is sometimes efficient when the join tree search spaces are not too large. For most of the relational queries this should be less than ten relations. There are two different exhaustive search techniques commonly in use. These are namely, dynamic programming and transformation-based search methods. Dynamic programming and transformation-based search are also known as the bottom-up and top-down search methods.

1. Dynamic Programming: Early database systems such as System R described in [Salinger et al., 1979] and Starburst described in [Hasan and Pirahesh, 1988, Ono and Lohman,1990] used dynamic programming to find optimal join trees or query evaluation plans. This strategy is very simple and easy to comprehend. The dynamic programming algorithm first considers the individual base relations in a bottom-up fashion and adds new relations until all pairs of relations are joined to generate the final result. A table for storing the intermediate result sizes is maintained so that the sequence of the next join operation can be determined based on the cheapest alternative currently known.

2. Transformation-based: The Volcano query optimizer and the Cascades described in [Graefe, 1995] query optimizer use the transformation based exhaustive search approach. This strategy works by applying various transformation rules to the initial query tree recursively until no new join trees are generated. These optimizers use an efficient storage structure for storing the information about the partially explored search space, in order to avoid generating the same query trees.

3.5.2 Probabilistic Algorithms

Finding a globally optimal join tree in a very large search space, specially in a bushy search space involving more than 10 relations, is usually a difficult problem. One approach is to use probabilistic algorithms to eliminate the less promising portions of the search space. These algorithms improve the search performance by avoiding the worst join trees during the search process, instead of looking for the best join tree. A number of different probabilistic algorithms such as *Iterative Improvement* (II) [Swami and Gupta, 1988], *Simulated Annealing* (SA) [Ioannidis and Wong, 1987]and their variations *Toured Simulated Annealing* (TSA) [Lanzelotte et al., 1993] and *Two Phase Optimization* (2PO) [Ioannidis and Kang, 1990] are currently in use for searching large query tree search space. All these algorithms are based on rewriting join trees based on the algebraic properties of the join operator such as commutativity and associativity in order to generate alternative query trees.

All of the above probabilistic algorithms look for an optimal join tree in the following manner. First, an arbitrary join tree is generated by the algorithm to represent the given query. Then, applying the logical transformation rules, new join trees are generated. For each new join tree, using a simple cost model, the algorithm computes an estimated cost. The new join tree is retained as the current solution, if the cost is found to be below a specified value. The transformation rules are applied again on the current solution to generate new join trees in a recursive manner. This recursive process is carried out until a stopping condition, such as a time limit or level of cost improvement, is met.

The algorithm TSA finds the optimal join tree by performing simulated annealing repeatedly. Each time the algorithm picks a new query tree as its starting point. The 2PO algorithm combines the features of the II algorithm and the SA algorithm. It first performs II for a given period of time, then using the output from the II phase as its starting query tree, it performs SA until the final globally optimal query tree is obtained.

3.5.3 Non-exhaustive Deterministic Algorithm

An efficient non-exhaustive deterministic algorithm using a block-wise nested-loop join algorithm was first proposed in [Ibaraki and Kameda, 1984]. This algorithm generates optimal linear join trees, especially for acyclic queries. A variant of this algorithm was described in [Boral and Zaniolo, 1986], in which the search strategy employs an arbitrary join algorithm based on the available access paths instead of a nested-loop join algorithm.

3.6 Statistical Estimations in Database Systems

The quantitative properties or statistics that summarize the instances of a database are important for query optimization. In this section the major estimation techniques used to obtain the database statistics that have some commonalities with the present invention are reviewed.

Query optimization is an NP-hard problem due to the exponential growth of the number of alternative QEPs with the number of relations in the query. Due to this reason, most database systems are forced to make a number assumptions in order to quickly select an optimal QEP. Christodoulakis investigated the relationships of a number of frequently used assumptions and the accuracy of the query optimizer [Christodoulakis, 1983a, Montgomery et al., 1983]. In specific, he considered the following issues in his study:

1. Uniformity of attribute values: Every attribute value in the corresponding value domain has the same frequency.
2. Attribute independence: The data distributions of various attributes in a relation are independent of each other. The value of two attributes (say A and B) are independent if the conditional probability of an A value given a B value is equal to the probability of obtaining the A value by itself.
3. Uniformity of queries: Queries reference all attribute values in a given attribute value domain with equal probabilities.
4. Constant number of records per block: The number of tuples in each file block is the same. Hence the probability of referencing any block is $1/B$, where B is the number of blocks.
5. Random placement: The probability of a record in a file appearing in a query is the same, regardless of its location among the different pages of a disk. That is, the probability of referencing any tuple is $1/N$, where N is the number of tuples.

One can easily observe that assumptions 1 and 2 have a direct relationship to the estimates of the sizes of plan operations, thus determine their accuracy. Similarly assumption 3 impacts the size estimate of queries that are associated with a given parameter, as well as the physical database design problems. Assumptions 4 and 5 affect the estimation of logical block accesses for a given attribute value, Though these statistical assumptions simplify the factors involved in the estimation of the cost of a QEP, they also decrease accuracy of these estimates. In order to increase the estimation accuracy, some modem query optimizers incorporate more detailed cost models for assumptions 1 and 2. Few optimizers incorporate assumptions 3, 4, and 5 in more detail, since these assumptions are more difficult to analyze.

Christodoulakis studied the effects of the above assumptions on a number of frequently encountered problems such as the estimation of the (1) number of block accesses for a given number of tuples, (2) number of block accesses for all queries on a given attribute, (3) number of block accesses for queries with multi-attributes, and (4) number of distinct attribute values resulting from a selection operation. Using these studies, he proved that the expected cost of a query estimated using these assumptions is an upper bound on the actual cost of the QEP. For example, he showed that the uniformity and independence assumptions lead to a worst-case estimate for the number of distinct attribute values. He further demonstrated that most commercial database systems using these assumptions are prone to use expensive query evaluation strategies. This indicates that non-uniformity, non-independence, and non random placement that usually exist in a real-world data distribution could be exploited in a query optimizer in order to reduce the system cost. He also argued that optimizers that use these often erroneous assumptions tend to ignore direct access structures because these cost estimates often favor the simpler structures. His investigation in this area was a catalyst in motivating further research in this area for better result size estimation techniques. He also discussed a number of mathematical techniques such as Schur concavity [Marshall and Olkin, 1979] in database performance evaluation, The size estimation of select and join queries on a heavily skewed data distribution were thoroughly investigated by Montgomery et al [Montgomery et al., 1983]. In this study, they estimated the result sizes of select and join operations using uniformity assumptions and compared them with the actual result sizes. They also constructed a few models of size estimation using formulae that closely describe the skewed data distributions under study. They reported that the size estimates for the select operations based on the widely used uniformity assumption actually overestimate the actual result size by 200–300%. The size estimates for the join operations were reported to be 200–300% lower than the actual join sizes.

The local and distributed cost models based on the uniformity assumption that is used for single table sorting and two table joins in R* were experimentally verified and validated in [Mackert and Lohman, 1986a, Mackert and Lohman, 1986b]. They also further reported that the CPU costs are usually a significant portion of the overall, cost for sort operations. In addition, they also found that size estimation is a significant issue in the overall cost, including I/0 and CPU costs. Considering the nested loop join method, they reported that most query optimizers based on uniformity assumption overstate the evaluation cost, when an access structure is used to retrieve the attribute values and when the inner table fits in main memory. This indicates that the cost of evaluating the nested loop join is usually sensitive to parameters such as join cardinality, the outer table's cardinality, and the memory used to maintain the inner table.

The relationship of join selectivity and the selection of the optimal nesting order involving four and five variable queries were studied by Kumar and Stonebraker [Kumar and Stonebraker, 1987]. A query processor that behaves similarly to the System R optimizer was built. This query processor considered the nested loop and merge scan join algorithms, using only two-way joins. It also considered the availability of any secondary indexes on the inner join table. The sensitivity of a query with respect to changes in the joint selectivity was derived. This was obtained as the ratio between the cost of the optimal evaluation plan and the plan used by the query processor. They found that most optimal evaluation plan under varying selectivities was either the one that minimizes the average cost ratio or the one that minimizes the maximum cost ratio. Using the sensitivity factor as a parameter, they further measured the sensitivity of four and five variable queries under a number of join selectivities. Their experimental results showed that, assuming the query evaluation plan was selected using their criteria, the best query evaluation plan is usually insensitive to changing join selectivities.

The relationship of the assumption of random placement of tuples to pages and the dependence of multiple attribute values were investigated by Vander Zander et al. [Vander Zander et al., 1986]. A query of the form, "Select the tuples from relation R where R.A=constant" when R is clustered according to another attribute, say B, was used for this type of experiments. They found that whenever there is a high correlation between the attributes A and B, the assumption of random placement of tuples to pages is always violated. This was evident from the skewed pattern of tuple distributions to the pages.

Recently in [Ioannidis and Christodoulakis, 1991] proved that the worst case errors incurred by the uniformity assumption propagate exponentially as the number of joins in the query increase. As a result, except for very small queries, errors may become extremely high, resulting in inaccurate estimates for result sizes and hence for the execution costs.

Despite the overwhelming evidence that most of the common assumptions either overestimate or underestimate the true statistics by a wide margin, the query optimization literature abounds with a variety of estimation techniques, most of them discussed in the extensive survey by Mannino, Chu, and Sager [Mannino et al., 1988]. The various estimation techniques can be grouped into four broad classes as follows:
1. Probabilistic counting techniques
2. Sampling based techniques
3. Parametric techniques
4. Non-parametric techniques 3.6.2 Probabilistic Counting Techniques The probabilistic counting techniques are useful for estimating the number of distinct attribute values in the result of projecting a relation over a given subset of attributes. Flajolet and Martin [Flajolet and Martin, 1985] proposed a technique for estimating the number of distinct values in a multi-set, which generates an estimate during a single pass through the data. This technique was extended by Shukla et al for estimating the size of multidimensional projections such as the cube operator [Shukla et al., 1996]. Their experiments have shown that these techniques based on multidimensional projections usually result in more accurate estimates than sampling based techniques. The applicability of these techniques to other operators has not yet been resolved.

3.6.2 Sampling based Techniques

Sampling based techniques are mainly used to compute result estimates during query optimization time. They compute their estimates by collecting and processing random samples of the data The major advantage of these techniques is that since they do not rely on any precomputed information about the data, they are not usually affected by database changes. Another advantage is that they do not require any storage overhead. These techniques also provide a probabilistic guarantee on the accuracy of the estimates. The major disadvantages of these techniques include the disk I/Os, CPU overhead during query optimization and the extra overhead for recomputing the same information since they are not preserved across queries. The sampling based techniques are highly desirable whenever a parameter needs to be estimated once with high accuracy in a dynamic environment. One good example is in the context of a query profiler. A number of different methods on the sampling based techniques have been extensively discussed in the Prior Art literature.

Traditionally the sampling based size estimation techniques use two distinct models, namely, point space model [Hou et al., 1991] and urn model [Lipton et al., 1990] for result size estimation. These size estimation techniques can be classified into random sampling and systematic sampling.

The idea behind the random sampling technique is that the tuples are chosen randomly from their set so that every tuple has an equal probability of being chosen. The random sampling techniques are either random sampling with replacement or random sampling without replacement. In random sampling with replacement, a tuple that is drawn randomly is put back into the data set and available for subsequent selections. But, in random sampling without replacement, any selected tuple is not returned to the original data set.

In systematic sampling technique, all the tuples in a sampled block or page are be used as sampled tuples. This obviously increases efficiency by reducing the number of I/O operations. But its accuracy is highly related to the uniformity of data across blocks. This means, whenever the tuples are clustered, sampled data could become highly biased resulting in increased estimation error [Hou et al., 1991].

Most of the sampling techniques used in modern-day database systems are based on random sampling with replacement. Some of the widely used techniques are discussed briefly in the following sections.

3.6.3 Adaptive Sampling

Adaptive sampling technique and its variants were proposed in [Lipton et al., 1990]. This technique expresses the stopping condition for sampling in terms of the sum of samples and the amount of sample taken. They provide an asymptotic efficiency of their algorithm and discuss the practicality of their method for estimating the result sizes of select and join operations. Their method provides a bound on the sample size necessary to obtain a desired level of estimation accuracy, providing sanity bounds to handle queries for which the underlying data distribution is skewed.

3.8.4 Double Sampling

In Double sampling technique [Hou et al., 1991], sampling is divided into two phases. In the first phase, x number of tuples are sampled. These samples are used to obtain the estimated mean and variance and to compute the number of samples y to be obtained in the second phase. The number of samples y is computed based on the desired level estimation accuracy, confidence level, and the estimated mean and variance obtained in the first phase. If y>x, then an additional y−x samples are obtained during the second phase of sampling. Otherwise, the number of samples, x, obtained in the first phase is sufficient to provide the desired level of estimation accuracy and confidence level.

3.6.5 Sequential Sampling

Sequential sampling is a random sampling technique for estimating the sizes of query results [Hass and Swami, 1992]. This is a sequential process in which the sampling is topped after a random number of steps based on a stopping criterion. The stopping criterion is usually determined based on the observations obtained from the random samples so far. For a sufficient number of samples, the estimation accuracy is predicted to lie within a certain bound. The method is asymptotically efficient and does not require any ad hoc pilot sampling or any assumptions about the underlying data distributions.

3.8.8 Parametric Techniques

Parametric techniques use a mathematical distribution to approximate the actual data distribution A few popular examples include the uniform distribution, multi-variate normal distribution or Zipf distributions. The parameters used to construct the mathematical distribution are usually obtained from the actual data distributions, and consequently the accuracy of this parametric approximation mainly depends on the similarity between the actual and parameterized distributions. Two major advantages of the parametric technique are (a) their relatively small overhead and (2) small run-time costs. But their downside is that the real-world data hardly conform to any simple mathematical formula. Consequently parametric approximations often result in estimation errors. Another disadvantage of this method is that since the parameters for the mathematical distribution are always precomputed, this technique results in further errors whenever there is a change in the actual data distribution.

An interesting variant of this approach is the algebraic technique, where the actual data distribution is approximated by a polynomial function. Regression techniques are usually used to obtain the coefficients of this polynomial. Another promising algebraic technique involves adaptively approximating the distribution by a six-degree polynomial, whose coefficients are obtained dynamically based on a query feedback mechanism [Gelenbe and Gardy, 1982]. The main disadvantages in using the above noted algebraic techniques include the difficulties in choosing the degree of the polynomial model and uniformly handling result-size estimates for operators other than simple selection predicates, Some of the positive results obtained in the work of Wei Sun et al [Sun et al., 1993]on algebraic techniques indicate that they have a potential of generating closely matching parametric distributions.

The uniform distribution is the simplest and applies to all types of variables, from categorical to numerical and from discrete to continuous. For categorical or discrete variables, the uniform distribution provides equal probability for all distinct categories or values. In the absence of any knowledge of the probability distribution of a variable, the uniform distribution is a conservative, minimax assumption. Early query optimizers such as System R relied on the uniformity and independence assumptions. This was primarily due to the small computational overhead and the ease of obtaining the parameters such as maximum and minimum values.

The use of the uniform distribution assumption has been criticized, however, because many attributes have few occurrences with extreme values. For example, few companies have very large sales, and few employees are very old or very young. The Zipf distribution has been suggested by Fedorowicz [Fedorowicz, 1984, Fedorowicz, 1987] and Samson and Bendell [Samson and Bendell, 1983] for attributes with a skewed distribution such as the occurrence of words in a text.

Christodoulakis [Christodoulakis, 1983b] demonstrated that many attributes have unimodal distributions that can be approximated by a family of distributions. He proposed a model based on a family of probability density functions, which includes the Pearson types 2 and 7, and the normal distributions. The parameters of the models such as mean, standard variation, and other moments are estimated in one pass and dynamically updated. Christodoulakis demonstrated the superiority of this model over the uniform distribution approach using a set of queries against a population of Canadian engineers.

Faloutsos [Faloutsos et al., 1996] showed that using multi-fractal distribution and 80–20 law, one better approximates real-world data than with the uniform and Zipf distributions. His method also provides estimates for supersets of a relation, which the uniformity assumption based schemes cannot provide.

3.6.7 Non-parametric or Histogram-based Techniques

In order to avoid the restrictions of particular parametric methods, many researchers have proposed non-parametric methods for estimating a distribution. The oldest and most common of these methods is the histogram. These techniques approximate the underlying data distribution using precomputed histograms. They are probably the most common techniques used in the commercial database systems such as DB2, Informix, Ingres, Microsoft SQL Server, Oracle, Sybase, and Teradata—see Table 3. The essence of the histogram is to divide the range of values of a variable into intervals, or buckets and, by exhaustive scanning or sampling, tabulate frequency counts of the number of observations falling into each bucket. The frequency counts and the bucket boundaries are stored as a distribution table. The distribution tables are used to obtain upper and lower selectivity estimates. Within those bounds, a more precise estimate is then computed by interpolation or other simple techniques. Since the histograms are precomputed, they often incur errors in estimation if the database is updated and hence require regular re-computation. It has been shown

TABLE 3

Histograms used in commercial DBMSs.

| Vendor | Product | Histogram Type |
|---|---|---|
| IBM | DB2-6000 (Client-Server) | Compressed(V, F) Type |
| IBM | DB2-MVS | Equidepth, Subclass of End-Biased(F, F) |
| Oracle | Oracle7 | Equidepth |
| Sybase | System 11 | Equidepth |
| Tandem | NonStop SQL/MP | Equidepth |
| NCR | Teradata | Equidepth |
| Informix | Online Data Server | Equidepth |
| Microsoft | SQL Server | Equidepth | that significant effort is required to identify the correct form of histograms that incur small errors for all estimation problems.

Most of the database research on histograms is in the context of simple elementary relational operations such as selections. One of the first works on histograms was by Piatetsky-Shapiro and Connel where they analyzed the effect of histograms on minimizing the error for selection queries [Piatetsky-Shapiro and Connell, 1984]. These histograms involved two distinct classes, namely, equi-width histograms and equi-depth histograms [Kooi, 1980]. One of their major results is that the worst-case and average case errors in both the equality and range selection queries are usually smaller in the equi-depth histograms than the equi-width histograms.

Extending the work of Kooi, [Muralikrishna and Dewitt, 1988] investigated the use of multi-dimensional equi-depth histograms for result size estimations. Multidimensional attributes are very common in geographical, image and design databases. A typical query with a multidimensional attribute is to find all the objects that overlap a given grid area. By building histograms on multiple attributes together, their techniques were able to capture dependencies between those attributes. They proposed an algorithm to construct equal-height histograms for multidimensional attributes, a storage structure, and two estimation techniques. Their estimation methods are simpler than the single-dimension version because they assume that multidimensional attributes will not have duplicates.

Many other related works have been done using variable-width histograms for estimating the result size of selection queries, where the buckets are chosen based on various criteria [Kamel and King, 1985, Kooi, 1980, Muthuswamy and Kerschberg, 1985]. A detailed description of the use of histograms inside a query optimizer can be found in Kooi's thesis [Kooi, 1980]. It also deals with the concept of variable-width histograms for query optimization. The survey by Manning, Chu, and Sager [Mannino et al., 1988] provides a list of good references to work in the area of statistics on choosing the appropriate number of buckets in a histogram for sufficient error reduction. Again this work also mainly deals with the context of selection operations.

Merrett and Otoo [Merrett, T. H., and Otoo, E., 1979] showed how to model a distribution of tuples in a multidimensional space. They derived distributions for the relations that result from applying the relational algebraic operations.

In their work, a relation was modeled as a multidimensional structure where the dimension was equal to the number of attributes in the relation. They divided each dimension, i, into $c_i$ number of equal width sectors. The values for $c_i$, $1 \leq i \leq n$, are chosen such that the resulting structure can completely fit into the available memory, where n is the dimension of the multidimensional array.

Scanning through the relation for each attribute, the cells of the multidimensional structure are filled with integer numbers corresponding to the number of tuples that occupy the respective value ranges of the attributes.

Denoting the value of the count for a cell (a, b) of relation R(A, B) as $d^{AB}_{ab}(R)$, and assuming uniformity of tuples within each cell, they showed that the expected number of tuples within a cell from a projection is, $$d^A_a(R[A]) = n\left[1 - \left(1 - \frac{1}{n}\right)^{d^A_a(R)}\right].$$

Using the multidimensional representation, they show that the number of tuples resulting from joining a sector $a_1$ of R and $a_2$ of S is equal to, $$d^{ABC}_{a_1 \cap a_2 bc}(Q) = \frac{n d^{AB}_{a_1 b}(R) d^{AC}_{a_2 c}(S)}{n_1 n_2},$$

where $n_1$ is the number of values in sector $a_1$, $n_2$ is the number of values in sector $a_2$, n is the overlap between $a_1$ and $a_2$, and b and c are the remaining attributes in the respective relations.

The above value for the join is valid only when the two cells from the relations have overlapping sectors on the joining attribute. The above join estimation depends on the number of overlapping attribute values, n. Since there is no way to compute the value of n, they resort to estimate it based on how the two sectors overlap along the joining attributes. They showed that there are 11 possible ways in which the sectors can overlap. By defining a rule to approximately guess the value for n for each of the 11 possible ways of overlap, they show how to estimate the result size of join from two cells.

Estimating the result sizes of selection operations using the equi-width histogram is very simple. The histogram bucket where the attribute value corresponding to the search key lies is selected. Then the result size of the selection operation is simply the average number of tuples in that bucket. But the main problem with this simple strategy is that the maximum estimation error is related to the height of the tallest bucket. Consequently a data distribution with widely varying frequency values will result in very high estimation error rate. Another problem associated with the equi-width histogram is that there are no proven statistical method to choose the boundaries of a bucket as this would require some prior knowledge about the underlying data distribution. This invariably has an effect on the estimation accuracy of the selection operations.

Fortunately there are some statistical techniques that can be used to select the bucket widths or the number of buckets based on the number of tuples in the attribute value domain being mapped. During early days of statistical analysis of data using histograms, a popular rule known as Sturge's rule was used to obtain the number of buckets. The Sturge's rule, based on the binomial distribution, states that the number of buckets for n tuples is equal to $1+\log_2 n$, which is a reasonably accurate value under most circumstances. The modern statistical techniques provide more optimal rules for any given attribute value domain and error rates [Tapia and Thompson, 1978]. It is important to note that the simple Sturges' rule usually yields estimation results which are closer to the modern statistical techniques for up to 500 tuples. The modern statistical literature also provides a number of parameters such as the mean error rate and mean-squared error rate, which are very useful in computing the size of the error within a multiple of a power of the given attribute value domain without any further knowledge of the data distribution. Although the equi-width approach is very simple to implement, its asymptotic accuracy is always lower than the estimation accuracy of the most modern techniques, including the kernel and nearest neighbor techniques [Tapia and Thompson, 1978]. It has been shown in [Tapia and Thompson, 1978] that the asymptotic mean-squared error obtained using the equi-width approach is $O(n^{-2/3})$, while that of the more recent methods are $O(n^{-4/5})$ or even better.

In the equi-width. histogram, proper choice of the bucket width usually results in an optimal estimation error rate. Similarly, in the equal-height histogram method, the result size estimation error is directly related to the height of the histogram buckets. A strategy known as the nearest neighbor method in the field of density estimation, in which the bucket height is kept the same over the entire attribute value domain, is optionally used to control the estimation error in the equal-height method by varying the number of buckets. The main problem with this approach is that some prior knowledge about the data distribution is required in order to construct the sector widths so as to guarantee that same number of tuples falling in each bucket. One common approach is to arrange the attribute value in an ascending or descending order, and to then set the bucket boundaries at every $k^{th}$ attribute value. A less expensive approach would be to employ some sampling techniques to approximately set the bucket boundaries. It has been shown that the estimation accuracy and performance improve asymptotically by allowing buckets to have overlapping attribute value ranges.

The above technique was further improved in [Moore and Yackel, 1977], by applying the large-n properties. They showed that by allowing some adjustment for the differences between two methods, using the large-n theorem for one method, it is possible to translate it into a large-n theorem for another estimation method without any additional proof.

Another type of histogram method, often known as variable kernel technique in the density estimation field, uses a partitioning strategy based on criteria other than the equal frequency. Mathematical analysis of the variable kernel technique has been found to be difficult.

Lecoutre showed how to obtain a value of the cell width for minimizing the integrated mean squared error of the histogram estimate of a multivariate density distribution [Lecoutre, Jean-Pierre, 1985]. By considering a density estimator based on k statistically equivalent blocks, he further proved the $L^2$ consistency of this estimator, and described the asymptotic limiting behavior of the integrated mean square error. He also gave a functional form for the optimum k expressed in terms of the sample size and the underlying data distribution.

A similar technique was proposed by Scott for choosing the bin-width based on the underlying data distribution [Scott, David, 1979]. But his procedure assumes a Gaussian reference standard and requires only the sample size and an estimate of the standard deviation. He also investigated the sensitivity of this procedure using several probability models that violate the Gaussian assumption.

Using a maximal difference criterion, Christodoulakis [Christodoulakis, 1981] proposed a variable-width histogram, This utilized a uniformity measure for selecting the bucket ranges. This maximal difference criterion brings together attribute values that have a similar ratio of tuples. In other words, the criterion states the maximum and minimum proportions of the attribute values in the bucket must be less than some constant, which is usually based on the individual attribute. He further showed that this criterion reduces the estimation error on all attribute values. This strategy seems most applicable where queries are not uniformly spread over the attribute value domain.

Another method proposed by Kamel and King [Kamel and King, 1985] is based on pattern recognition to partition the buckets of variable-width distribution tables. In pattern recognition, a frequently encountered problem is to compress the storage space of a given image without distorting its actual appearance. This problem is easily restated in the context of the selectivity estimation problem to partition the data space into nonuniform buckets that reduce the estimation error using an upper bound on storage space. The idea is to partition the attribute domain into equal-width buckets and compute a homogeneity measure for each bucket. The homogeneity is defined as the measure of the non-uniformity or dispersion around the average number of occurrences per value in the cell. The value of homogeneity for a given bucket is computed by a given function or by using sampling techniques.

A number of multivariate analogs of the equal-width and equal-height methods is found in the density estimation literature. Considering the equi-width case, a two or three dimensional cells of equal area or volume can be partitioned, in the joint attribute value domain. The number of tuples with combined values in each cell is obtainable. Considering the equi-depth case, variable width buckets, each with approximately, say x, nearest neighbors, can be derived, The difficulty in this multiattribute situation is that the shape of the cell must also be selected. A square or a cube is a natural choice, when dealing with the equi-width analog. When the range or variation of one attribute's values is smaller than another's, a rectangular shaped cell is an obvious choice.

Ioannidis and Christodoulakis proposed optimal histograms for limiting worst-case error propagation in the size of join results [Ioannidis and Christodoulakis, 1992]. They identified two classes of histograms, namely, serial and end-biased histograms that are associated with optimal worst-case error for join operations. End-biased histograms are frequently encountered in modern-day database systems. By considering simple t-clique queries, where queries involve only equi join operations without any function symbols, they showed that the optimal histograms for reducing the worst-case error is always serial. They also further showed that for t-clique queries with a large number of joins, high-biased histograms, which are a subclass of end-biased, are always optimal. The main disadvantage of the serial histograms are that the attribute values need to be sorted with respect to their respective frequencies before being assigned to buckets.

Ioannidis et al. [Ioannidis and Poosala, 1995] discussed the design issues of various classes of histograms and balancing practicality and optimality of them in the use of query optimization. They also investigated various classes of histograms using different constraints such as V-Optimal, MaxDiff, Compressed, and Spline-based, and sort and source parameters such as Frequency, Spread, and Area. They further provided various sampling techniques for constructing the above histograms and concluded that the V-optimal histogram is the most optimal one for estimating the result sizes of equality-joins and for selection predicates.

3.7 Patents

Many methods of query optimisation for use in data base systems are known. The purpose of research in this area is to improve performance for large database systems. For example, a histogram of the data or of sampled data within the database is often used to estimate sizes of results of operations in order to determine a good approach to follow in processing a complex query.

In U.S. Pat. Nos. 5,864,841 and 5,664,171 to Agrawal, a method is presented for ordering data within a data set in order to produce a histogram or other data representation thereof. It is important that a method of ordering data exists or the term range has little meaning. A range is often defined as a grouping of elements having a property defining an order thereof. A contiguous range is defined as a grouping between two or more points in an ordered set. Once the ordering is determined, a histogram can be formed from the data The method of ordering the data is repeatable and is therefore repeated when order is unknown.

In U.S. Pat. No. 5,689,696 to Gibbons et al. a method of generating a high biased histogram is presented. The method comprises the steps of filtering the elements within a data set to eliminate those elements having associated values below a threshold. The histogram is formed from the remaining, unfiltered, elements. Unfortunately, though such a system is advantageous in some query optimisation processes, it is not applicable in a broad range of query optimisation problems. Because of the biasing, some statistical knowledge of search parameters and statistical distribution of data are necessary in order to maximise the benefits derived from such a method when used for query optimisation.

In U.S. Pat. No. 5,870,752 to Gibbons et al. a method of maintaining buckets or bins within an histogram is presented. The method comprises the steps of splitting a bucket into two adjacent buckets when more than a predetermined number of tuples—aggregate value—results for the bucket. Consider for example the case, when a range of ages from 25 to 29 a bucket is formed. A club has 140 members within that age range, that bucket, and the maximum number of members within any given bucket is 140. Addition of another member results in the bucket being split into two buckets. Unfortunately, though this limits bucket size, it does not provide any additional information relating to a single element within a bucket. In particular, limiting bucket size is an attempt to produce ranges wherein elements are more closely correlated. That said, the additional correlation is not truly present, and within a single range many very different values may be placed.

As an example, consider the above bucket with 140 members. It is unknown whether one age element, for example 28, has 140 members or zero members. When the bucket is split, it remains unknown whether or not there are any members of 28 years of age. Thus, there may be considerable estimation error using the method disclosed by Gibbons et al.

Another approach to query optimisation relates to limiting duplicate operations in order to determine a best approach to execute a search query. In U.S. Pat. No. 5,659,728 to Bhargava et al., a method of query optimisation based on uniqueness is proposed.

In U.S. Pat. Nos. 5,469,568; 5,542,073; and 5,761,653 issued to Schiefer et al., methods for determining join selectivities based on selecting a result for "equivalent" join operations as the largest of possible results is proposed. The methods outlined are intended to improve effectiveness of approximations used during a query optimisation process.

Clearly, there are advantages to improving the quality of estimates based on which query optimisation is performed. Optimally, each stage of query optimisation is provided with accurate data. Unfortunately, such an approach requires solving each possible operation, which in effect, obviates query optimisation. Therefore, enhancing accuracy of estimates provided to a query optimiser without incurring prohibitive processing costs is essential.

It is an object of the present invention to provide a method of generating a histogram of data within a data set.

It is a further object of the invention to provide the histogram with ranges, bins, wherein data elements within the range are associated with values having only a determinable variance from a mean of the values associated with elements within the range, such that each value within the bin is within known tolerances of the mean.

4 SUMMARY OF THE INVENTION

In accordance with the invention there is provided a method of generating a histogram from data elements and their associated values. First a data set is provided representing a plurality of elements and a value associated with each element, the data set having a property defining an order of the elements therein. At least one range is determined, each of the at least one range having at least an element, a mean of each range equal to the mean of the values associated with the at least an element within said range, and an area of each range equal to the product of the mean of said range and the number of elements within said range, a specific range from the at least a range comprising a plurality of elements from the data set adjacent each other within the defined order, wherein the mean of the specific range is within a predetermined maximum distance from a value associated with an element within the specific range, the predetermined maximum distance independent of the number of elements within the specific range and their associated values. Finally, for each range of the at least a range at least a value is stored relating to the mean and at least data relating to the size and location of the range.

Prior art histograms provide little or no data as to the content of an element within a range. For example, all tuples within the range may be associated with a same single element, resulting in a data set wherein each common element has an associated value of zero excepting the single element with a value equal to the number of tuples within the range, bin. It is evident, then, that for each estimated value, substantial error exists. This error is equal to the mean for each common element and to the number of tuples minus the mean for the single element.

Since according to the invention at least a value associated with one element is within a predetermined distance from the mean, it is known when using ranges determined according to the invention that the error is the mean for common elements, at most the predetermined distance for the one element, and at most the number of tuples minus the mean minus (the mean minus the predetermined amount) for the single element. This amount of maximum error is less than that resulting from using prior art histograms. Of course, according to several of the embodiments described herein, the maximum error is further restricted in a known fashion.

Other prior art methods attempt to limit error based on the associated values and the overall number of tuples within a range. For example, it has been suggested to use Parzen windows with a kernel function such as a Gaussian function, over a histogram to improve the resulting data. Though prior art methods may provide further data relating to the accuracy of a histogram, the data is determined based on histogram contents and/or original data content. Accordingly, computational costs in determining the histogram and/or statistical information relating to estimation accuracy are substantial. This has prevented practical application of these methods. According to the invention, the resulting accuracy of some estimates is based on a predetermined value and as such results in substantially reduced computational requirements. As many databases contain many millions of records, reducing computational requirements for processing each element is extremely advantageous.

For example according to an embodiment, determining at least a range includes the following steps:
(a) using a suitably programmed processor, defining a first bin as a current bin;
(b) using the suitably programmed processor, selecting an element and adding it to the current bin as the most recently added element to the current bin;
(c) selecting an element from within the data set, the selected element not within a bin and adjacent the most recently added element;
(d) determining a mean of the values associated with elements within the bin;
(e) when the most recently selected element differs from the mean by an amount less than a predetermined amount, adding the most recently selected element to the current bin as the most recently added element to the current bin and returning the step (c);
(f) when the selected element differs from the mean by an amount more than the predetermined amount, creating a new bin as the current bin and adding the selected element to the new bin as the most recently added element to the current bin and returning to step (c); and,
(g) providing data relating to each bin including data indicative of a range of elements within each bin as the determined at least a range.

Such a method results in a last element added to a bin being within a predetermined distance of the mean of the values associated with elements in said bin or range. Typically, each element is close to the mean, though a possibility of increasing or decreasing values within a single bin results in a greater possible maximum error than is typical. When the order of element addition to each bin is known, the maximum error is determinable for each element and is different for some elements. This results in a histogram with increased accuracy and a method of analysing limits on accuracy of data derived from the histogram.

According to another embodiment, determining at least a range includes the following steps:
(a) selecting an element from within the data set;
(b) determining a bin with which to associate the element;
(c) when the determined bin is empty, adding the element to the bin;
(d) when the determined bin is other than empty, determining a mean of the values associated with elements within the determined bin;
(e) when the most recently selected element differs from the mean by an amount less than a predetermined amount, adding the most recently selected element to the determined bin and returning to step (a);
(f) when the selected element differs from the mean by an amount more than the predetermined amount, adding the selected element to the determined bin and dividing the determined bin into one of two bins and three bins, one of which includes the selected element and returning to step (a); and,
(g) providing data relating to each bin including data indicative of a range of elements within the bin.

According to the above embodiment, it is possible to then merge adjacent bins in accordance with the following steps:
determining a first mean of a first selected bin;
determining a second mean of a second selected bin adjacent the first selected bin;
comparing the first and second means; and,
when the means are within a predetermined distance of each other, merging the first selected bin and the second selected bin to form a single merged bin including all the elements of the first selected bin and all the elements of the second selected bin.

According to yet another embodiment, determining at least a range includes the following steps:
(a) using a suitably programmed processor, defining a first bin as a current bin;
(b) using the suitably programmed processor, selecting an element and adding it to the current bin as the most recently added element to the current bin;
(c) selecting elements adjacent the most recently added element(s);
(d) determining a first mean of the values associated with elements within the bin and determining a second mean of the selected elements;
(e) when the second mean differs from the first mean by an amount less than a predetermined amount, adding the most recently selected elements to the current bin as the most recently added elements and returning to step (c);
(f) when the second mean differs from the first mean by an amount more than the predetermined amount, creating a new bin as the current bin and adding at least one of the selected elements to the new bin as the most recently added element(s) to the current bin and returning to step (c); and,
(g) providing data relating to each bin including data indicative of a range of elements within the bin.

All of the above embodiments have the property that they reduce the variation of the values associated with the elements within a range. In its most simple mathematical form this is achieved by determining the at least a range in terms of the mean of the elements within the current range, which is a function of well known $L_1$ norm of the elements in the current range. In other embodiments of the invention the at least a range can be computed using other $L_k$ norms. If a function of $L_\infty$ norm of the values within a range is used, the at least a range can be trivially computed using the maximum and minimum values of the current ranges, thus providing an alternate method to limit the variation of the values of the elements in the range. Various other embodiments of the invention are obtained when functions or other $L_k$ norms are used to determine the at least a range. Implementation of these embodiments is achieved using the Generalized positive-k mean and the Generalized negative-k mean as explained presently.

According to another embodiment, determining at least a range includes the following steps:
(a) using a suitably programmed processor, defining a first bin as a current bin;
(b) using the suitably programmed processor, selecting an element and adding it to the current bin as the most recently added element to the current bin;
(c) selecting an element from within the data set, the selected element not within a bin and adjacent the most recently added element;
(d) determining the Generalized positive-2 mean of the current bin as the square-root of the (sum of the squares of the values associated with elements within the bin divided by the number of the elements within the bin);
(e) determining the Generalized negative-2 mean of the current bin as the square of the (sum of the square-roots of the values associated with elements within the bin divided by the number of the elements within the bin);
(f) when the value associated with the selected element is lower than the said Generalized positive-2 mean, determining a difference between the value associated with the selected element and the said Generalized positive-2 mean, and when the value associated with the selected element is higher than the said Generalized negative-2 mean, determining a difference between the value associated with the selected element and the said Generalized negative-2 mean;

(g) when a difference is other than greater than the predetermined amount, adding the selected element to the current bin as the most recently added element to the current bin and returning to step (c);

(h) when a difference is greater than the predetermined amount, defining a new bin as the current bin, adding the selected element to the current bin as the most recently added element to the current bin, and returning to step (c); and, (i) providing data relating to each bin including data indicative of a range of elements within each bin as the determined at least a range.

According to yet another embodiment, determining at least a range includes the following steps:

(a) using a suitably programmed processor, defining a first bin as a current bin;

(b) using the suitably programmed processor, selecting an element and adding it to the current bin as the most recently added element to the current bin;

(c) selecting an element from within the data set, the selected element not within a bin and adjacent the most recently added element;

(d) determining the Generalized positive-k mean of the current bin for a predetermined k as the $k^{th}$-root of the (sum of the $k^{th}$ powers of the values associated with elements within the bin divided by the number of the elements within the bin);

(e) determining the Generalized negative-k mean of the current bin as the $k^{th}$ power of the (sum of the $k^{th}$-roots of the values associated with elements within the bin divided by the number of the elements within the bin);

(f) when the value associated with the selected element is lower than the said Generalized positive-k mean, determining a difference between the value associated with the selected element and the said Generalized positive-k mean, and when the value associated with the selected element is higher than the said Generalized negative-k mean, determining a difference between the value associated with the selected element and the said Generalized negative-k mean;

(g) when a difference is other than greater than the predetermined amount, adding the selected element to the current bin as the most recently added element to the current bin and returning to step (c);

(h) when a difference is greater than the predetermined amount, defining a new bin as the current bin, adding the selected element to the current bin as the most recently added element to the current bin, and returning to step (c); and, (i) providing data relating to each bin including data indicative of a range of elements within each bin as the determined at least a range.

The above two embodiments result in a last element being added to a bin, being within a predetermined distance of the mean of the value associated with the elements in the said bin or range, because the Generalized positive-k mean is always greater than the mean and the Generalized negative-k mean is always less than the mean.

According to yet another embodiment, obtained when the value of k is increased indefinitely in the above embodiment, determining at least a range includes the following steps:

(a) using a suitably programmed processor, defining a first bin as a current bin;

(b) using the suitably programmed processor, selecting an element and adding it to the current bin as the most recently added element to the current bin;

(c) selecting an element from within the data set, the selected element not within a bin and adjacent the most recently added element;

(d) determining a current largest value as the largest of the values associated with elements within the bin;

(e) determining a current smallest value as the smallest of the values associated with elements within the bin;

(f) when the value associated with the selected element is lower than the current largest value, determining a difference between the value associated with the selected element and the current largest value, and when the value associated with the selected element is higher than the current smallest value, determining a difference between the value associated with the selected element and the current smallest value;

(g) when a difference is other than greater than the predetermined amount, adding the selected element to the current bin as the most recently added element to the current bin and returning to step (c);

(h) when a difference is greater than the predetermined amount, defining a new bin as the current bin, adding the selected element to the current bin as the most recently added element to the current bin, and returning to step (c); and, (i) providing data relating to each bin including data indicative of a range of elements within each bin as the determined at least a range.

According to yet another embodiment, determining at least a range includes the following steps:

(a) selecting a group of elements within the data set and adjacent one another within the ordering;

(b) determining a mean of the values associated with each selected element;

(c) comparing a value associated with each selected element in the group to the mean value to determine a difference;

(d) when a value is different from the mean by more than a predetermined amount, returning to step (a); and, (f) when all values are different from the mean by less than or equal to the predetermined amount, creating a bin including the selected group of elements and returning to step (a).

Here, the maximum error is bounded by twice the predetermined distance since the difference is on either side. Again, for each element within a range, a same maximum error exists.

It is also possible to then grow the group according any of the above methods modified as necessary or using the following steps:

(f1) selecting an element adjacent the bin including the selected group of elements, the selected element other than an element within a bin;

(f2) determining a mean of the values associated with each element within the bin and the selected element; and, (f3) when the value of the selected element differs from the mean by less than or equal to the predetermined amount, adding the selected element to the bin and returning to step (f1).

Using a histogram formed according to the invention, maximum possible estimation errors are reduced and a quality of estimates derived from the histogram is predictable. Therefore, when a histogram according to the invention is used as a tool for aiding estimation, advantages result.

For example, in database query optimisers, it is useful to have estimates of sizes of data sets resulting from a particular operation. Using a histogram according to the invention allows for more accurate estimation and thus is believed to result in better query optimisation.

Of course, it is also advantageous that when an estimate results in two or more suitable courses of action, analysis of likely error is additional information for use in distinguishing between courses of action.

A histogram according to the invention is also useful in network routing, actuarial determinations, pattern matching, and open-ended searching of multiple data bases with limited time.

According to another embodiment of the invention, the histogram is generated using the following steps:
(a) providing a data set representing a plurality of elements and a value associated with each element, the data set having a property defining an order of the elements therein;
(b) determining a range within the data set, the range comprising a plurality of elements from the data set and adjacent within the order; and,
(c) storing a plurality of values indicative of a straight line defining an approximate upper boundary of the values associated with each element within the range, the straight line indicating different values for different elements within the range.

Preferably, the plurality of values is indicative of a range beginning, a range ending, a value at the range beginning and a value at the range ending.

Preferably, a range is determined so as to limit variance between values associated with elements in the range and the straight line in a known fashion, the limitation forming further statistical data of the histogram. For example, a best fit straight line is determined so as to limit average error between some values associated with elements in the range and the best fit straight line in a known fashion. Alternatively, a best fit straight line is determined so as to limit least squared error between some values associated with elements in the range and the best fit straight line in a known fashion.

According to another embodiment of the invention, the histogram is generated using the following steps:
(a) providing a data set representing a plurality of elements and a value associated with each element, the data set having a property defining an order of the elements therein;
(b) determining at least one range having a length such that the value associated with at least one element within the range is within a predetermined maximum distance of at least one other element within the range; and,
(c) for each range storing at least a value related to an estimate of a value associated with an element within the range and at least data relating to the size and location of the range.

It is an advantage of the present invention that estimating the size of specific data set ranges and of results of certain queries is more accurate.

For use in query optimisation, an exact measure of worst case accuracy and average case accuracy is determinable which is further useable by the query optimiser in weighing potential avenues. For example, when many approaches have a same estimated cost for the estimates determined from a histogram but different total costs when an average case error analysis is performed, distinguishing between the approaches is straightforward. Similarly a worst case error analysis is possible.

It is another advantage of the present invention that resulting histograms provide data relating to ranges in which values are somewhat correlated, even if by chance. For example, actuaries rely on data relating to individuals based on a plurality of different elements—sex, age, weight, habits, etc. Usually, age is divided based on certain statistical principles in increments of complete years or five-year periods, and so forth. Using a histogram generation technique according to the invention resulting, age ranges are based on similarities of values associated with elements within the ranges. This is advantageous in determining ranges for which values associated with elements are similar.

| | List of Figures | |
|---|---|---|
| 1 | Query Processing Architecture | 221 |
| 2 | An Annotated Query Tree | 222 |
| 3 | Example Relations from Property Tax Assessor's Office | 223 |
| 4 | Two Alternative Query Evaluation Plans | 224 |
| 5 | Equivalent Transformations. | 225 |
| 6 | Query Graph and its Operator Trees. | 226 |
| 7 | A string query. | 227 |
| 8 | A completely connected query on 4 nodes. | 228 |
| 9 | A star query on 5 nodes. | 229 |
| 10 | Equi-width, Equi-depth and Variable-width Histograms. | 230 |
| 11 | An Example of the Rectangular Attribute Cardinality Map | 231 |
| 12 | Comparison of R-ACM and Traditional Histograms. Note in (a), the sector widths are equal, in (b) the areas of the sectors are equal, in (c) the sector widths become smaller whenever there is a significant change in the frequencies of the attribute values. | 232 |
| 13 | Comparison of Equi-width, Equi-depth Histograms and the R-ACM for Frequency (Probability) Estimation: Each experiment was run 500,000 times to get the average percentage errors. Estimation errors are given for exact match on a random distribution with 100,000 tuples and 1000 distinct values. For the R-ACM, tolerance value was $\tau = 3$. | 233 |
| 14 | Frequency Estimation Error vs ACM Variance: The ACM sectors were partitioned using three different tolerance values and the resulting ACM variances were computed for various data distributions. Using random selection queries (matches), the errors between the actual and the expected frequencies were obtained. | 234 |
| 15 | Distribution of Values in an ACM Sector | 235 |

-continued

| | List of Figures | |
|---|---|---|
| 16 | (a) A decreasing R-ACM sector; (b) An increasing R-ACM sector; (c) Superimposition of the decreasing and increasing frequency distributions. | 236 |
| 17 | Estimation of a Range Completely within an R-ACM Sector | 237 |
| 18 | A Random R-ACM Sector | 238 |
| 19 | Estimation of Equality Select Using the R-ACM | 239 |
| 20 | Estimation of Range Select Using the R-ACM | 240 |
| 21 | Estimation of a Range Completely within an R-ACM Sector | 241 |
| 22 | Estimating Result Size of R⋈$_{X=Y}$ S | 242 |
| 23 | Join Estimation Error and the Positions of Attribute Values | 243 |
| 24 | Zipf Distributions for Various z Parameters | 244 |
| 25 | Generation of a Multi-fractal Distribution - First three steps | 245 |
| 26 | An Example for Constructing the Trapezoidal Attribute Cardinality Map | 246 |
| 27 | Trapezoidal ACM sector and its corresponding probability mass function | 247 |
| 28 | Average Case Error in T-ACM | 248 |
| 29 | Comparison of Histogram and Trapezoidal ACM | 249 |
| 30 | Comparison of Histogram and the T-ACM for Probability Estimation: Each experiment was run 100,000 times to get the average percentage of errors in the estimated occurrence of the attribute values. Estimation errors are given for exact match on a random distribution with 100,000 tuples and 1000 distinct values. Both histogram and T-ACM were of equi-width type with a sector width of 5 and no of sectors equal to 200. | 250 |
| 31 | Equality Select Using the T-ACM | 251 |
| 32 | Result Estimation of Range Select Using the T-ACM | 252 |
| 33 | Frequency Distributions of Selected Attributes from the U.S. CENSUS. | 254 |
| 34 | Frequency Distributions of Selected Attributes from the NBA Statistics. | 255 |
| 35 | Estimation Error Vs Variance of the R-ACM: U.S. CENSUS Database | 256 |
| 36 | Construction of a T-ACM | 257 |
| 37 | Generation of a (near) Optimal T-ACM | 258 |
| 38 | Minimizing the Average Estimation Error. | 259 |
| 39 | Finding Optimal T-ACM Sectors. | 260 |
| 40 | Optimizing the T-ACM sectors | 261 |
| 41 | Percentage Estimation Error Vs Boundary Frequencies | 262 |
| 42 | Least Squares Estimation Error. | 263 |
| 43 | Optimal Boundary Frequencies: Least Square Error Method. | 264 |
| 44 | Primary Partitioning of an Attribute Value Domain | 265 |
| 45 | Secondary Partitioning of the Value Domain in Sector 3 | 266 |
| 46 | Secondary Partitioning of the Value Domain in Sector 3. | 267 |

5 DETAILED DESCRIPTION OF THE INVENTION

In order to estimate data subset sizes for particular elements or ranges of elements, a data set having a property defining an order of the elements therein is provided. Each element has an associated value. As discussed above, a histogram of the data set comprises a plurality of ranges of elements within the data set and a mean value for each range. In order for the term range to have meaning, it is required that elements within the data set have ordering of some sort. That does not mean the elements are sorted or stored in an order, but merely that given three or more elements, a same ordering of those elements is predictably repeatable.

Within each range are a number of elements each having an associated value. Some of the associated values may be zero indicating no tuples associated with a specific element. That said, even when an associated value is zero, the element exists within its range as predictable from an ordering of the elements.

The present invention provides a method of determining ranges within an improved histogram, an Attribute Cardinality Map. During the process of determining a range, elements within the range are grouped together. Such a grouping is referred to herein and in the claims that follow as a bin. A bin with no elements grouped therein in an empty bin. Once ranges are determined, elements within a single bin form the elements within a single range. As such, bins act as receptacles for elements during a process of range determination.

An exemplary embodiment is set out below. The embodiment is selected for ease of implementation and quality of estimation results. Many variations of said embodiment are also possible. Some of these are set out following the exemplary embodiment.

The traditional histograms, namely equi-width and equi-depth histograms have two major drawbacks. First of all, their fundamental design objective does not address the problem of extreme frequency values within a given bucket. For example, in the equi-width case, all the bucket widths are the same regardless of the frequency distribution of the values. This means large variations between one frequency value to the other is allowed in the same bucket, resulting in higher estimation errors. This problem is somewhat reduced in the equi-depth case. But to avoid the extreme frequency values in a given bucket, a single attribute value may need to be allocated to several consecutive locations in the same bucket. This not only increases the storage requirement but also reduces the efficiency of estimation. The second drawback is that the traditional histograms are usually built at run-time during the query optimization phase using sampling methods. This obviously requires an I/O overhead during the optimization phase and tends to increase the overall optimization time. Moreover, unless sufficiently many samples are taken, the histograms built from the sampled data may not closely reflect the underlying data distribution.

The present invention uses ACM as a new tool for query result-size estimation to address the above drawbacks in the traditional histograms. Specifically, the R-ACM reduces the estimation errors by disallowing large frequency variations within a single bucket. The T-ACM reduces the estimation errors by using the more accurate trapezoidal-rule of numerical integration. Moreover, as both types of ACMs are catalogue based, they are precomputed, and thus will not incur I/O overhead during run-time.

5.1 Rectangular Attribute Cardinality Map

The Rectangular ACM (R-ACM) of a given attribute, in its simplest form, is a one-dimensional integer array that stores the count of the tuples of a relation corresponding to that attribute, and for some subdivisions for the range of values assumed by that attribute. The R-ACM is, in fact, a modified form of histogram. But unlike the two major forms of histograms, namely, the equi-width histogram, where all the sector widths are equal, and the equi-depth histogram, where the number of tuples in each histogram bucket is equal, the R-ACM has a variable sector width, and varying number of tuples in each sector. The sector widths or subdivisions of the R-ACM are generated according to a rule that aims at minimizing the estimation error within each subdivision.

TABLE 4

Notations Used in the Work

| Symbol | Explanation |
|---|---|
| $x_i$ | Number of tuples in attribute X for the $i^{th}$ value of X. |
| $E(X_i)$ | Expected number of tuples in attribute X for the $i^{th}$ value of X. |
| $n_j$ | No of tuples in the $j^{th}$ sector of an ACM. |
| $l_j$ | No of distinct values in the $j^{th}$ sector. (Also known as sector width). |
| s | Number of sectors in the ACM. |
| $\tau$ | Allowable tolerance for an R-ACM |
| $\xi$ | Size of a relation. |
| N | Number of tuples in the relation. |

The R-ACM is either one-dimensional or multi-dimensional depending on the number of attributes being mapped. To introduce the concepts formally, the one-dimensional case is first described.

Definition 1 A One dimensional Rectangular ACM: Let $V=\{v_i : 1 \leq i \leq |V|\}$, where $v_i < v_j$ when $i<j$, be the set of values of an attribute X in relation R. Let the value set V be subdivided into s number of sector widths according to the range partitioning rule described below. Then the Rectangular Attribute Cardinality Map of attribute X is an integer array in which the $j^{th}$ index maps the number of tuples in the $j^{th}$ value range of the set V for all j, $1<j \leq s$.

Rule 1 Range Partitioning Rule: Given a desired tolerance value $\tau$ for the R-ACM, the sector widths, $l_j$, $1 \leq j \leq s$, of the R-ACM should be chosen such that for any attribute value $X_i$, its frequency $x_i$ does not differ from the running mean of the frequency by more than the tolerance value $\tau$, where running mean is the mean of the frequency values examined so far in the current sector.

For example, consider the frequency set {8, 6, 9, 7, 19, 21, 40} corresponding to the values {$X_0$, $X_1$, $X_2$, $X_3$, $X_4$, $X_5$, $X_6$} of an attribute X. Using a tolerance value $\tau=2$, the attribute value range is partitioned into the three sectors, {8, 6, 9, 7}, {19, 21}, {40} with sector widths of 4, 2, and 1 respectively.

5.1.1 Generating the Rectangular ACM

Using the range partitioning rule, method Generate_R-ACM partitions the value range of the attribute X into s variable width sectors of the R-ACM.

The input to the method are the tolerance value $\tau$ for the ACM and the actual frequency distribution of the attribute X. The frequency distribution is assumed to be available in an integer array A, which has a total of L entries for each of the L distinct values of X. For simplicity reasons, it is assumed that the attribute values are ordered integers from 0 to L−1. The output of the method is the R-ACM for the given attribute value set.

Generate_R-ACM generates the R-ACM corresponding to the given frequency value set. Assuming that the frequency distribution of X is already available in array A, the running time of the method Generate_R-ACM is O(L) where L is the number of distinct attribute values.

The tolerance value, $\tau$, is an input to the above method. The question of how to determine an "optimal" tolerance value for an R-ACM is addressed using adaptive techniques set out below.

EXAMPLE 1

FIG. 11 shows the histogram and the R-ACM of the Age attribute of a relation Emp(SIN, Age, Salary) between Age=30 and Age=49. Note that the actual frequency for every age value is shown in the histogram as shaded rectangles. Whenever the frequency of the current age differs from the frequency of the running mean value for age in the sector by more than the allowed tolerance value $\tau=8$, a new partition is formed. From the ACM, the number of tuples in this relation with ages in the range of $34 \leq Age \leq 36$ is 130 and the estimate for the number of employees having age=48 is 15/3=5.

Pseudocode to implement the above method is as follows.
Method 2 Generate_R-ACM
Input: tolerance $\tau$, frequency distrib. of X as A[0 . . . L−1]
Output: R-ACM
begin
    Initialize_ACM; /* set all entries in ACM to zero */
    current_mean:=A[1]; j:=0;
    ACM[j]:=A[1];
    for i:=1 to L−1 do /* for every attribute value */
        if abs (A[i]−current mean)<$\tau$
            ACM[j]:=ACM[j]+A[i];
            /* compute the running mean */
            current_mean:=(current_mean*i+A[i])/(i+1);
        else begin
            $l_j$:=i−1; /* set the sector width */
            j++; /* move to next sector */
            current_mean:=A[i];
            ACM[j]:=A[i];
        end;
    end;
    End Generate_R-ACM;

Since the ACM only stores the count of the tuples and not the actual data, it does not incur the usually high I/O cost of having to access the base relations from secondary storages. Secondly, unlike the histogram-based or other parametric and probablistic counting estimation methods, ACM does not use sampling techniques to approximate the data distribution. Each cell of the ACM maintains the actual number of tuples that fall between the boundary values of that cell, and thus, although this leads to an approximation of the density function, there is no approximation of the number of tuples in the data distribution.

The one-dimensional R-ACM as defined above is easily extended to a multi-dimensional one to map an entire multi-attribute relation. A multi-dimensional ACM is, for example, used to store the multi-dimensional attributes that commonly occur in geographical, image, and design databases.

5.1.2 Rationale for the Rectangular ACM

Without loss of generality, consider an arbitrary continuous frequency function f(x). FIG. 12 shows the histogram partitioning of f(x) under the traditional equi-width, equi-depth methods and the R-ACM method. In the equi-width case, regardless of how steep the frequency changes are in a given sector, the sector widths remain the same across the attribute value range. This means the widely different frequency values of all the different attribute values are assumed to be equal to that of the average sector frequency. Thus there is an obvious loss of accuracy with this method. On the other hand, in the equi-depth case, the area of each histogram sector is the same. This method still has a number of sectors with widely different frequency values and thus suffers from the same problem as the equi-width case. In the R-ACM method, whenever there is a steep frequency change, the corresponding sector widths proportionally decrease or the number of sectors proportionally increases. Hence the actual frequencies of all the attribute values within a sector are kept closer to the average frequency of that sector. This partitioning strategy advantageously increases the estimation accuracy. FIG. 13 shows a comparison of probability estimation errors obtained on all three estimation methods for synthetic data.

The rationale for partitioning the attribute value range using a tolerance value is to minimize the variance of values in each ACM sector, and thus to minimize the estimation errors. Since variance of an arbitrary attribute value $X_k$ is given as $$Var(X_k) = E\left[\left(x_k - \frac{n_j}{l_j}\right)^2\right],$$

forcing the difference between the frequency of a given value and the mean frequency to be less than the tolerance $\tau$, i.e:

$$x_k - \frac{n_j}{l_j} \leq \tau,$$

ensures that the variance of the values falls within the acceptable range. It later becomes clear that minimizing the variance of the individual sectors results in a lower value for the variance of the ACM.

To demonstrate the relationship between the selection estimation error and the variance of the ACM, an experiment was conducted in which the underlying data distribution was changed and the variance was computed for three different tolerance values. The errors between the estimated and actual size of random matches are plotted against the computed variance of the ACM and shown in FIG. 14.

5.1.3 Density Estimation Using Rectangular ACM

The properties of the R-ACM with regard to density approximation using a one-dimensional Rectangular ACM sector of width l and n tuples are set out below. The following assumption is made to render the analysis feasible.

Assumption 1 The attribute values within a Rectangular ACM sector are uniformly distributed.
Rationale: Since the sector widths of the R-ACM are chosen so that the frequency of the values within the sectors do not differ by more than the allowed tolerance, $\tau$, these frequencies are within predetermined limits of each other. The original System R research work relied on the often erroneous assumption that the frequencies of an attribute value are uniformly distributed across the entire attribute value domain. With the adoption of the equi-width and equi-depth histograms in the modern-day database systems, this was improved by making the uniformity assumptions only within histogram buckets. Uniformity assumption within an R-ACM sector is a much weaker assumption than that used in any other prior art histograms, due to its partitioning strategy.

Using the above uniformity assumption, the probability mass distribution for the R-ACM is derived.
Lemma 1 The probability mass distribution for the frequencies of the attribute values in an R-ACM is a Binomial distribution with parameters (n, 1/l).
Proof: Since there are l distinct values in the sector, the probability of any of these l values, say $X_i$, occurring in a random assignment of that value to the sector is equal to 1/l. (See FIG. 15).

Consider an arbitrary permutation of the n tuples in the sector. Suppose the value $X_i$ occurs exactly $x_i$ times. This means all the other (l−1) values must occur a combined total of (n−$x_i$) times. Since the probability of $X_i$ occurring once is 1/l, the probability of it not occurring is $$\left(1 - \frac{1}{l}\right).$$

Hence the probability of an arbitrary permutation of the n tuples, where the value $X_i$ occurs exactly $x_i$ times and the other values collectively occur n−$x_i$ times is, $$\left(\frac{1}{l}\right)^{x_i}\left(\frac{l-1}{l}\right)^{n-x_i}. \tag{1}$$

Clearly, there are $$\binom{n}{x_i}$$

different permutations of the n tuples in the sector where the above condition is satisfied. Hence the total probability that an arbitrary value $X_i$ occurs exactly $x_i$ times is, $$p_{X_i}(x_i) = \binom{n}{x_i}\left(\frac{1}{l}\right)^{x_i}\left(\frac{l-1}{l}\right)^{n-x_i} \tag{2}$$

which is exactly the Binomial distribution with parameters $$\left(n, \frac{1}{l}\right).$$

This proves the lemma.

5.1.4 Maximum Likelihood Estimate Analysis for the Rectangular ACM

Frequency distribution for a given attribute value in the R-ACM obeys a Binomial distribution. With this as a background, a maximum likelihood estimate for the frequency of an arbitrary attribute value in an R-ACM sector is determined. In classical statistical estimation theory, estimating the parameters such as the mean or other unknown characterizing parameters of the distribution of one or more random variables is usually conducted. Here estimating the value of the occurrence of the random variable, the frequency $x_i$, which is "inaccessible" is desired. To do this the maximum likelihood estimate is derived, which maximizes the corresponding likelihood function. Indeed the result is both intuitively appealing and quite easy to comprehend.

Theorem 1 For a one-dimensional rectangular ACM, the maximum likelihood estimate of the number of tuples for a given value $X_i$ of attribute X is given by, $$\hat{x}_{ML} = \frac{n}{l}$$

where n is the number of tuples in the sector containing the value $X_i$ and l is the width of that sector.

Proof: From Lemma 1 it is known that the frequency distribution of a given attribute value in an R-ACM sector is a Binomial distribution. So the probability mass function of the frequency distribution of an attribute value $X=X_a$ in an R-ACM sector can be written as, $$f(x) = \binom{n}{x} p^x (1-p)^{n-x}$$

where x is the number of occurrences of $X_a$. Let $$\mathcal{L}(x) = f(x) = \binom{n}{x} p^x (1-p)^{n-x}.$$

L(x) is the traditional likelihood function of the random variable X on the parameter x which is to be maximized. To find out the maximum likelihood estimate for this parameter x and taking natural logarithm on both sides of the likelihood function, $$\ln \mathcal{L}(x) = \ln n! - \ln x! - \ln(n-x)! + x\ln p + (n-x)\ln(1-p) \quad (3)$$

$$= \ln \Gamma(n+1) - \ln \Gamma(x+1) - \ln \Gamma(n-x+1) +$$
$$x\ln p + (n-x)\ln(1-p)$$

where $\Gamma(x)$ is the Gamma function given by, $$\Gamma(x) = \int_0^\infty e^{-t} t^{x-1} dt.$$

Now using the well known identity, $$\Gamma(\alpha) = \frac{\Gamma(\alpha+k+1)}{\alpha(\alpha+1) \ldots (\alpha+k)}$$

$$\Gamma(n-x+1) = \frac{\Gamma(n+1)}{(n-x+1)(n-x+2) \ldots n} \quad \text{and}$$

$$\Gamma(x+1) = \frac{\Gamma(n+1)}{(x+1)(x+2) \ldots n}.$$

Thus substituting the above expressions for $\Gamma(n-x+1)$ and $\Gamma(x+1)$ in Equation 3, $$\ln \mathcal{L}(x) = -\ln \Gamma(n+1) + x\ln p + (n-x)\ln(1-p) +$$
$$\ln(x+1) + \ln(x+2) + \ldots + \ln n +$$
$$\ln(n-x+1) + \ln(n-x+2) + \ldots + \ln n$$

Now differentiating ln L(x) with respect to x, $$\frac{d}{dx} \ln \mathcal{L}(x) = \ln p - \ln(1-p) + \sum_{r=x+1}^{n-x} \frac{1}{r}.$$

Setting $$\frac{d\{\mathcal{L}(x)\}}{dx} = 0,$$

and noting that $$\sum_{r=x+1}^{n-x} \frac{1}{r} \leq \ln\left(\frac{n-x}{x}\right),$$

$\hat{x}_{ML}$ of x is obtained as, $$\frac{p(n-x)}{(1-p)x} \geq 1.$$

This inequality is solved for $x \leq np$. But, by virtue of the underlying distribution, since the likelihood function monotonically increases until its maximum, $$\hat{x}_{ML} = np.$$

Due to the uniformity assumption within an R-ACM sector, $$p = \frac{1}{l}.$$

So, $$\hat{x}_{ML} = \frac{n}{l}.$$

Hence the theorem.

The maximum likelihood estimate, $\hat{x}_{ML}=np$, derived using the Gamma function above is, most of the time, not an integer. In fact, the maximum likelihood estimate reaches its upper limit of np at integer values only in very special cases. Considering the analogous discrete case, we have the following theorem.

Theorem 2 For a one-dimensional rectangular ACM, the maximum likelihood estimate of the number of tuples for a given value $X_i$ of attribute X falls within the range of, $$\frac{(n+1)}{l} - 1 \leq \hat{x}_{ML} \leq \frac{(n+1)}{l},$$

where n is the number of tuples in the sector containing the value $X_i$ and l is the width of that sector.

Proof: The probability mass function $$f(x) = \binom{n}{x} p^x (1-p)^{n-x}$$

is a steadily increasing function until it reaches the maximum likelihood value, $x=\hat{x}_{ML}$. For any $x > \hat{x}_{ML}$, f(x) is a steadily decreasing function. Hence an integer value for the maximum likelihood estimate is obtained by solving the following two discrete inequalities simultaneously.

$$f(x)-f((x+1)>0 \quad (4)$$
$$f(x)-f((x-1)>0 \quad (5)$$

From Equation (4), $$f(x) - f(x+1) > 0$$

$$\binom{n}{x}p^x(1-p)^{n-x} - \binom{n}{x+1}p^{x+1}(1-p)^{n-x-1} > 0$$

$$\frac{n!}{x!(n-x)!}(1-p) - \frac{n!}{(x+1)!(n-x-1)!}p > 0$$

$$\frac{1-p}{n-x} - \frac{p}{x+1} > 0 \text{ or } x > p(n+1) - 1.$$

Similarly considering Equation (5), by using similar algebraic manipulation, $$f(x) - f(x-1) > 0$$

$$\binom{n}{x}p^x(1-p)^{n-x} - \binom{n}{x-1}p^{x-1}(1-p)^{n-x-1} > 0 \text{ or}$$

$$x < p(n+1).$$

Since $p = \frac{1}{l}$, the theorem follows.

5.1.5 Expected Value Analysis for the R-ACM and Self-Join Error Estimate

The maximum likelihood estimate of the frequency of a given attribute value indicates that the attribute value would have a frequency of $\hat{x}_{ML}$ with maximum degree of certainty when compared to the other possible frequency values. But even though the attribute value occurs with the maximum likelihood frequency with high probability, it can also occur with other frequencies with smaller probabilities. Hence in order to find the worst-case and average-case errors for result size estimations, another estimate is obtained which includes all these possible frequency values. One such estimate is the expected value of the frequency of a given attribute value. The Binomial model is used to find the expected value of the frequency of an attribute value as given in the following lemma and to develop a sequence of results regarding the corresponding estimates. Lemma 2 For a one-dimensional rectangular ACM, the expected number of tuples for a given value $X_i$ of attribute X is $E(X_i)=n/l$, where n is the number of tuples in the sector containing the value $X_i$ and l is the width of that sector.

Proof: From Equation (2), the probability that the value $X_i$ occurs exactly k times is, $$p_{X_i}(k) = \binom{n}{k}\left(\frac{1}{l}\right)^k\left(\frac{l-1}{l}\right)^{n-k}$$

which is a Binomial distribution with parameters (n, 1/l). The result follows directly from the fact that the mean of the binomial distribution, Binomial (n, p), is np, where p is the probability of success.

The above result is very useful in estimating the results of selection and join operations.

5.1.6 Estimation Error with Rectangular ACM

It has been shown that even a small error in the estimation results, when propagated through several intermediate relational operations, can become exponential and be devastating to the performance of a DBMS [Ioannidis and Christodoulakis, 1991].

The variance of a random variable X measures the spread of dispersion that the values of X can assume and is defined by $Var(X) = E\{[X-E(X)]^2\}$. It is well known that $Var(X) = E(X^2) - [E(X)]^2$. Thus the variance of the frequency of the $k^{th}$ value of the attribute X in the $j^{th}$ sector is given as, $$Var(X_k) = E\left[\left(x_k - \frac{n_j}{l_j}\right)^2\right]$$

Expanding the right hand side, $$Var(X_k) = \sum_{i=0}^{n_j} x_k^2 \binom{1}{l_j}^i \left(1 - \frac{1}{l_j}\right)^{n_j-i} - \left(\frac{n_j}{l_j}\right)^2 \quad (6)$$

Lemma 3 The variance of the frequency of an attribute value X in sector j of an R-ACM is, $$Var(X) = \frac{n_j(l_j - 1)}{l_j^2} \quad (7)$$

Proof: It is well known that the variance of a Binomial distribution with parameters (n, p) is np(1−p). Using the property of the Binomial distribution, the expression for the variance given in Equation (6) is reduced to the one given in lemma.

Lemma 4 The sector variance of the $j^{th}$ rectangular ACM sector is, $$Var_j = \frac{n_j(l_j - 1)}{l_j} \quad (8)$$

Proof: $Var(X_k)$ is same for all k, $1 \leq k \leq l_j$, in a given sector. Since the random variables are independent, summing up the variances of all the values in the sector will give an upper bound for the estimation error or variance of the sector. The result follows.

Similarly, summing up the variances of all the sectors, an expression for the variance of the entire ACM is obtained which is given in the following lemma. Lemma 5 The variance of an R-ACM is given by, $$Var(ACM) = \sum_{i=1}^{s} Var_i \quad (9)$$

where s in the number of sectors in the ACM.

Proof: The result follows directly from the fact that the variances in each sector are independent, and thus summing up the sector variances yields the variance of the entire ACM.

5.1.7 Error Estimates and Self-Joins

It is interesting to study the join estimation when a relation is joined with itself. These self-joins frequently occur with 2-way join queries. It is well known that the self-join is a case where the query result size is maximized because the highest occurrences in the joining attributes correspond to the same attribute values. Assuming that the duplicate tuples after the join are not eliminated, the following lemma results.

Lemma 6 The error, $\epsilon$, resulting from a self-join of relation R on attribute X using a rectangular ACM is given by, $$\epsilon = Var(ACM) + \sum_{j=1}^{s} \left\{ \sum_{k=1}^{l_j} x_k^2 - \frac{n_j^2 + n_j l_j - n_j}{l_j} \right\}.$$

Proof: Since there are $$L = \sum_{i=1}^{s} l_j$$

values for attribute X, the actual value, $\xi$ and expected value $\kappa$ of the join size can be estimated as follows.

$$\xi = \sum_{i=1}^{L} x_i^2 = \sum_{j=1}^{s} \sum_{k=1}^{l_j} x_k^2.$$

The frequency of an arbitrary attribute value is computed from the R-ACM as the expected value $E(x_i)$, which is the average frequency of the R-ACM sector. Hence the result of self-joining this attribute value is $[E(x_i)]^2$. Hence the size of the join computed by the ACM, $\kappa$, is, $$\kappa = \sum_{i=1}^{L} [E(x_i)]^2$$

$$= \sum_{j=1}^{s} \sum_{i=1}^{l_j} \left(\frac{n_j}{l_j}\right)^2 = \sum_{j=1}^{s} l_j \left(\frac{n_j}{l_j}\right)^2.$$

Hence the error in estimation of the self-join is, $$\xi - \kappa = \sum_{j=1}^{s} \sum_{k=1}^{l_j} x_k^2 - \sum_{j=1}^{s} l_j \left(\frac{n_j}{l_j}\right)^2$$

$$= \sum_{j=1}^{s} l_j \left\{ \frac{1}{l_j} \sum_{k=1}^{l_j} x_k^2 - \left(\frac{n_j}{l_j}\right)^2 \right\}.$$

But since $$Var(ACM) = \sum_{j=1}^{s} l_j Var_j,$$

adding and subtracting $Var(ACM)$ from RHS of the above expression results in, $$\xi - \kappa = \sum_{j=1}^{s} l_j Var_j + \sum_{j=1}^{s} l_j \left\{ \frac{1}{l_j} \sum_{k=1}^{l_j} x_k^2 - \left(\frac{n_j}{l_j}\right)^2 \right\} - \quad (10)$$

$$\sum_{j=1}^{s} l_j \frac{n_j(l_j - 1)}{l_j^2}$$

$$= Var(ACM) + \sum_{j=1}^{s} \left\{ \sum_{k=1}^{l_j} x_k^2 - \frac{n_j^2 + n_j l_j - n_j}{l_j} \right\}.$$

and the result is proved.

Observation 1 The error in self-join estimation of a relation from the R-ACM is $O(Var(ACM))$.

Experimental results with R-ACM indicate that the error in the self-join estimation is approximately equal to the variance of the ACM since the contribution due to the second term in Equation (10) seems to be less dominant. This agrees well with the results claimed by Ioannidis.

Theorem 3 The variance of a rectangular ACM corresponding to attribute X is, $$Var(ACM) = N - \sum_{j=1}^{s} \frac{n_j}{l_j}. \quad (11)$$

Proof: From Lemma 5, the variance of an R-ACM is given by $$Var(ACM) = \sum_{j=1}^{s} Var_j,$$

where $Var_j$ is the variance of the $j^{th}$ sector. But from Lemma 4, $Var_j = n_j(l_j-1)/l_j$. Hence, $$Var(ACM) = \sum_{j=1}^{s} \frac{n_j(l_j - 1)}{l_j}$$

$$= \sum_{j=1}^{s} n_j - \sum_{j=1}^{s} \frac{n_j}{l_j}$$

$$= N - \sum_{j=1}^{s} \frac{n_j}{l_j}.$$

Hence the theorem.

5.1.8 Worst-Case Error Analysis for the R-ACM

As mentioned earlier, forcing a frequency value to be within a given tolerance $\tau$ to the current mean ensures that the frequency distribution within an R-ACM sector is very close to uniform. Whenever every frequency value is always consistently smaller or always consistently greater than the current mean by the tolerance value $\tau$, the resulting sectors will be far from uniform. Definition 2 A distribution is said to be "least uniform" if for every attribute value of $X_i$, the frequency $x_i$ attains the value $x_i = \mu_{i-1} - \tau$, if $x_i$ is decreasing or $x_i = \mu_{i-1} + \tau$ if $x_i$ is increasing, where $\mu_{i-1}$ is the mean of the first $(i-1)$ frequencies. A sector of the former type is called a monotonically decreasing R-ACM sector. Similarly a sector of the latter type is called a monotonically increasing R-ACM sector.

The motivation for the above definition comes from the following observation. Assume that during the process of constructing an R-ACM sector, the next value $x_i$ is smaller than the current means $\mu_{i-1}$. If $x_i < \mu_{i-1} - \tau$ then, a new sector is generated. Hence the smallest value that $x_i$ can assume is $x_i = \mu_{i-1} - \tau$. The resulting distribution is shown in FIG. 16(a). This is formally given by the following lemma. This lemma is given for the case when the sector is a decreasing R-ACM sector, or in other words, when every frequency value is always smaller than the previous mean. The case for the increasing R-ACM sector is proved in an analogous way.

Lemma 7 A decreasing R-ACM sector is "least uniform", if and only if $$x_k = a - \sum_{i=1}^{k-1} \frac{\tau}{i} \quad \text{for } 1 \le k \le l_j.$$

Proof: Note that in this case, least uniformity occurs when the quantity $E_s(X) - x_i$ assumes its largest possible value or when $x_i$ assumes its minimum value, where $E_S(X)$ is the expected value of X in a sector, assuming that the frequency of the first value is $x_1=a$.

Basis: $x_1=a$: Since the current mean is $E_S(X)=a$, and the sector is a monotonically decreasing R-ACM sector, the minimum possible value for $x_2$ is obtained from $E_S(X)-x_2=\tau$. This is achieved when $x_2=a-\tau$.

Inductive hypothesis: Assume the statement is true for n=k. So the sector is the least uniform for the first k values and the frequencies take the following values:

$$x_1 = a$$
$$x_2 = a-\tau$$
$$x_3 = a-\frac{3\tau}{2}$$
$$\vdots \quad \vdots \quad \vdots$$
$$x_k = a-\sum_{i=1}^{k-1}\frac{\tau}{i}$$

For n=k+1: The minimum possible value for $x_{k+1}$ without creating a new sector is obtained when $E_S(X)-x_{k+1}=\tau$. This is achieved when $x_{k+1}=E_S(X)-\tau$. So, $$x_{k+1} = \frac{x_1+x_2+\ldots+x_k}{k}-\tau$$

$$= a - \frac{\tau+\frac{3\tau}{2}+\ldots+\sum_{i=1}^{k-1}\frac{\tau}{i}}{k}-\tau$$

$$= a - \frac{(k-1)\tau+(k-2)\frac{\tau}{2}+(k-3)\frac{\tau}{3}+\ldots+\frac{\tau}{k-1}}{k}-\tau$$

$$= a - \frac{k\tau\left(\frac{1}{1}+\frac{1}{2}+\frac{1}{3}+\ldots+\frac{1}{k-1}\right)-(k-1)\tau}{k}-\tau$$

$$= a - \sum_{i=1}^{k}\frac{\tau}{i}$$

This proves the lemma.

Lemma 8 An increasing R-ACM sector is "least uniform", if and only if $$x_k = a + \sum_{i=1}^{k-1}\frac{\tau}{i} \quad \text{for } 1\leq k \leq l_j.$$

Proof: The proof is analogous to that of Lemma 7 and omitted in the interest of brevity.

Theorem 4 If the value $X_i$ falls in the $j^{th}$ sector of an R-ACM, then the number of occurrences of $X_i$ is, $$\frac{n_j}{l_j}-\left|\tau\left[\ln\left(\frac{l_j}{i-1}\right)-1\right]\right| \leq x_i \leq \frac{n_j}{l_j}+\left|\tau\left[\ln\left(\frac{l_j}{i-1}\right)-1\right]\right|$$

where $n_j$ and $l_j$ are the number of tuples and the sector width of the $j^{th}$ sector.

Proof: Consider a sector from an R-ACM. Let the frequency of the first value $x_1$ be a. Note that the R-ACM sector will become a "skewed" one, if the subsequent values are all smaller or all greater than the previous mean by $\tau$. From Lemma 7 and Lemma 8, it is obvious that such sectors are the "least uniform" ones in an R-ACM, and consequently the largest estimation error occurs in such a "skewed" sector.

Assume that the frequency values from $x_1$ to $x_{l_j}$ decrease monotonically in this manner. In other words, if the mean of the first k values is $\mu_k$, then the next value will take its lowest allowable frequency, $\mu_k-\tau$. The resulting distribution is shown in FIG. 16(a). From Lemma 7, the frequency of an arbitrary attribute value $X_i$ is given by, $$x_i = a - \sum_{k=1}^{i-1}\frac{\tau}{k}$$

The expected value $E(X_i)$ is the mean frequency for the entire sector. So, $$E(X_i) = \frac{\sum_{k=1}^{l_j} x_k}{l_j}$$

$$= a - \tau\left(1+\frac{1}{2}+\ldots+\frac{1}{l_j-1}-\frac{l_j-1}{l_j}\right)$$

But the frequency of an arbitrary value $X_i$ is, $$x_i = a - \tau\left(1+\frac{1}{2}+\ldots+\frac{1}{i-1}\right)$$

So the estimation error is, $$x_i - E(X_i) = \tau\left(\sum_{k=i}^{l_j}\frac{1}{k}-1\right) \leq \left|\tau\left[\ln\left(\frac{l_j}{i-1}\right)-1\right]\right|$$

Hence, $x_i \geq \frac{n_j}{l_j}-\left|\tau\left[\ln\left(\frac{l_j}{i-1}\right)-1\right]\right|$ Similarly using symmetry, for an R-ACM sector with monotonically increasing frequency value, $$x_i \leq \frac{n_j}{l_j}+\left|\tau\left[\ln\left(\frac{l_j}{i-1}\right)-1\right]\right|.$$

The theorem follows. The composite effect of the monotonically decreasing frequency sequence and the monotonically increasing sequence restricts the set of frequency values which the attributes can take. FIG. 16(c) represents the range of likely frequencies when the frequencies in the sector are generated from the frequency of the first attribute value. Note that when the frequencies are generated based on the running mean, the worst case error will be at its maximum at the beginning of the sector and then gradually decrease towards the end of the sector. This is the result of the fact that the sample mean converges to the true mean and the variance tends to zero by the law of large numbers. What is interesting, however, is that by virtue of the fact the next sample deviates from the current mean by at most $\tau$, the error in the deviation is bounded from the mean in a logarithmic manner. If this is not taken into consideration, the above figure can be interpreted erroneously. The following example illustrates the implications of the above theorem.

EXAMPLE 2

Consider an R-ACM sector of width 10 containing 124 tuples, where the R-ACM is partitioned using a tolerance value $\tau=3$. Let us attempt to find the estimated frequency ranges for the attribute values (a) $X_3$ and (b) $X_6$.

(a). The frequency range of $X_3$ is, $$12.4 - |3(\ln 5 - 1)| \leq x_3 \leq 12.4 + |3(\ln 5 - 1)|$$
$$10.57 \leq x_3 \leq 14.23$$

(b). The frequency range of $X_6$ is, $$12.4 - |3(\ln 2 - 1)| \leq x_6 \leq 12.4 + |3(\ln 2 - 1)|$$
$$11.48 \leq x_6 \leq 13.32$$

Notice that in both the above cases, the possible frequency values from an equi-width or equi-depth histograms are $0 \leq x \leq 124$, where $x=x_3$ or $x_6$. The power of the R-ACM in the estimation is clearly advantageous.

5.1.9 Worst-Case Error in Estimating the Frequency of an Arbitrary Value $X_i$

The previous theorem gives an estimate of the number of occurrences of an arbitrary attribute value by considering the worst-case R-ACM sector. So the worst-case error in the above estimate is given by the frequency range that the attribute value can assume. The following theorem provides a worst-case error for this frequency estimation.

Theorem 5 The worst-case error, $\epsilon$, in estimating the frequency of an arbitrary attribute value $X_i$ in a rectangular ACM is given by, $$\epsilon = \left| \tau \left[ \ln\left(\frac{l}{i-1}\right) - 1 \right] \right|$$

where $\tau$ is the tolerance value used in generating the R-ACM. Proof: It was proved in Theorem 4 that the actual frequency of an attribute value can at most differ from the estimated frequency value $$\left| \tau \left[ \ln\left(\frac{l}{i-1}\right) - 1 \right] \right|.$$

Hence the theorem.

5.1.10 Worst-Case Error in Estimating the Sum of Frequencies in an Attribute Value Range Consider the three distinct cases when,
1. The attribute value range spans across one R-ACM sector.
2. The attribute value range falls completely within one R-ACM sector.
3. The attribute value range spans across more than one R-ACM sector.

In the first case, estimation using the R-ACM gives the accurate result ($n_j$) and there is no estimation error. The estimation error in the second case is shown in the example FIG. 17(a) and is given by the theorem below. The estimation error in the third case can be obtained by noting that it is in fact the combination of the first and second cases.

Theorem 6 An estimate for the worst-case error, $\epsilon$, in estimating the sum of frequencies of $X_i$ in the attribute value range, $X_\alpha \leq X_i \leq X_\beta$, when both $X_\alpha$ and $X_\beta$ fall completely within an R-ACM sector is given by, $$\epsilon = \left| \ln\left\{ l_j^{(\beta-\alpha+1)\tau} \frac{(\beta-1)!}{(\alpha-2)!} \right\} \right| - (\beta - \alpha + 1)\tau$$

where $\beta > \alpha$.
Proof: Using Theorem 4, the error resulting from this result size estimation is computed by summing up the worst-case error for each of the attribute values in the given value range.

Thus the following cumulative error results.

$$\epsilon = \sum_{i=\alpha}^{\beta} \left\{ \tau \left| \ln\left(\frac{l_j}{i-1}\right) - 1 \right| \right\}$$

$$= \tau \sum_{i=\alpha}^{\beta} \ln\left(\frac{l_j}{i-1}\right) - (\beta - \alpha + 1)\tau$$

$$= \left| \ln\left\{ l_j^{(\beta-\alpha+1)\tau} \frac{(\beta-1)!}{(\alpha-2)!} \right\} \right| - (\beta - \alpha + 1)\tau.$$

Hence the theorem follows.

5.1.11 Average Case Error in Estimating the Frequency of an Arbitrary Value $X_i$ Average case error occurs in a truly random sector. In a random sector, frequency values do not monotonically increase or decrease as in the least uniform case. Instead, they take on a random value around the mean bounded by the tolerance value. In other words, if the current mean is $\mu$, then the next frequency value is a random variable between $\mu-\tau$ and $\mu+\tau$. Whenever the next frequency value falls outside the range of $[\mu-\tau, \mu+\tau]$, then a new sector is generated.

Theorem 7 The average case error with a rectangular ACM is bounded by $2\tau$.

Proof: To compute the average case error, we are required to compute the error at every attribute value and then take its expected value by weighting it with the probability of the corresponding error. However, since the frequency of an attribute value varies only in the range of $[\mu-\tau, \mu+\tau]$, the maximum variation the frequency has is $2\tau$. It follows that the maximum error is always bounded by $2\tau$, and the result follows.

5.1.12 Average Case Error in Estimating the Sum of Frequencies in an Attribute Value Range Consider the case when the attribute value range completely falls within an R-ACM sector given by the following theorem. Theorem 8 The average case error with a rectangular ACM in estimating the sum of frequencies in the value range, $X_\alpha \leq X \leq X_\beta$, when both $X_\alpha$ and $X_\beta$ fall completely within the $k^{th}$ sector of the R-ACM is given by, $$\epsilon = 2(\beta - \alpha + 1)\tau$$

where $\beta > \alpha$ and $\tau$ is the tolerance value used to build the R-ACM.

Proof: From Theorem 7, the average-case error bound in estimating the frequency of an arbitrary attribute value $X_i$ is $2\tau$. Hence considering the errors for the attribute values in the range of $X_\alpha \leq X \leq X_\beta$, the cumulative error is, $$\epsilon = \sum_{i=\alpha}^{\beta} 2\tau = 2(\beta - \alpha + 1)\tau$$

and the theorem follows.

5.1.13 Tight Error Bound with R-ACM: A Special Case

In a random R-ACM sector, almost half of the attribute values tend to have frequency values below the sector mean and the other half above the frequency mean. So it is possible to re-arrange the attribute values in such a random sector so that the frequency values alternatively increase and decrease about the current mean. Considering such a random R-ACM sector where the frequency values alternatively increase and decrease by the tolerance $\tau$ about the current mean. For example, the current frequency value $x_k$ is derived from the current mean $\mu_{k-1}$ by the expression, $$x_k = \mu_{k-1} + (-1)^{k+1}\tau.$$

The current frequency mean is also given by the following recurrence expression.

$$\mu_k = \mu_{k-1} + \frac{(-1)^{k+1}\tau}{k}.$$

A random sector with frequency values which alternatively increase and decrease about the current mean is depicted in FIG. 18 and the corresponding frequency and mean values are given in Table 5. Considering the case of such a random sector leads to the following lemma.

Lemma 9 The estimation error in a rectangular ACM with frequency values which

TABLE 5

First few values of $x_k$ and $\mu_k$

| k | $x_k$ | $\mu_k$ |
|---|---|---|
| 1 | $\alpha$ | $\alpha$ |
| 2 | $\alpha - \tau$ | $\alpha - \tau/2$ |
| 3 | $\alpha + \tau/2$ | $\alpha - \tau/6$ |
| 4 | $\alpha - 7\tau/6$ | $\alpha - 5\tau/12$ |
| 5 | $\alpha + 7\tau/12$ | $\alpha - 13\tau/60$ | alternatively increase and decrease about the current mean is given by, $$x_i - E(X_i) = \tau \left| \left( \sum_{k=2}^{i} \frac{(-1)^{k+1}}{k} + \ln 2 - 1 \right) \right|.$$

Proof: The expected value $E(X_i)$ is the mean frequency for the entire sector. So, $$E(X_i) = \frac{\sum_{k=1}^{l_j} x_k}{l_j} = \mu_{l_j}$$

$$= a + \tau \left\{ -\frac{1}{2} + \frac{1}{3} - \ldots + \frac{(-1)^{l_j+1}}{l_j} \right\}.$$

For sufficiently large $l_j$, the above becomes, $$E(X_i) \approx a - (1 - \ln 2)\tau.$$

But the frequency of an arbitrary value $X_i$ is, $$x_k = \mu_{k-1} + (-1)^{k+1}\tau$$

$$= a + \tau \left\{ -\frac{1}{2} + \frac{1}{3} - \ldots + \frac{(-1)^{i+1}}{i} \right\}$$

$$= a + \tau \sum_{k=3}^{i+1} \frac{(-1)^k}{k-1}$$

Hence the estimation error is, $$x_i - E(X_i) = \tau \left| \left( \sum_{k=2}^{i} \frac{(-1)^{k+1}}{k} + \ln 2 - 1 \right) \right|.$$

The lemma follows.

Note that the above estimation error is always smaller than $0.8069\tau$ and thus is better than the average case error.

5.1.14 Size Estimation of Selection Operations Using the R-ACM

The selection operation is one of the most frequently encountered operations in relational queries. In general, the select operation is denoted by $\sigma_p(R)$, where p is a Boolean expression or the selection predicate and R is a relation containing the attributes specified in p. The selection predicate p is specified on the relation attributes and is made up of one or more clauses of the form, ⟨Attribute⟩ ⟨comparison operator⟩ ⟨Constant⟩, or ⟨Attribute1⟩ ⟨comparison operator⟩ ⟨Attribute2⟩.

The comparison operator can be any operator in the set, $\{=, <, \leq, >, \geq, \neq\}$. The selection predicates can be either range predicates or equality predicates depending upon the comparison operators. Furthermore, the selection clauses can be arbitrarily connected by the Boolean operators, AND, OR, and NOT to form a general selection condition. The comparison operators in the set $\{=, <, \leq, >, \geq, \neq\}$ apply to attributes whose domains are ordered values, such as numeric or date domains. Domains of strings of characters are considered ordered based on the collating sequences of the characters used in the system under consideration. If the domain of an attribute is a set of unordered values, only the comparison operators in the set $\{=, \neq\}$ are applied to that attribute.

In general, the result of a select operation is determined as follows. The selection predicate, p, is applied independently to each tuple t in the relation R. This is done by substituting each occurrence of an attribute $A_i$ in the selection predicate with its value in the tuple $t[A_i]$. If the condition evaluates to be true, then the tuple t is selected. All the selected tuples appear in the result of the select operation. The relation resulting from the select operation has the same attributes as the relation specified in the selection operation.

It is assumed that the selection predicates contain only a single clause. First of all, this is done for ease of analysis. Extending the work to any arbitrary number of clauses is straight forward. Finding the estimation for the result sizes of various selection predicates requires finding the estimates, $E(\sigma_{X=X_\alpha}(R))$, $E(\sigma_{X<X_\alpha}(R))$, $E(\sigma_{X>X_\alpha}(R))$, $E(\sigma_{X \leq X_\alpha}(R))$, $E(\sigma_{X \geq X_\alpha}(R))$ and $E(\sigma_{X \neq X_\alpha}(R))$. Using the theoretical results obtained earlier, estimation bounds for each of these six conditions are found. But instead of computing each of these six estimates independently, only the estimation bounds for the estimates $E(\sigma_{X \leq X_\alpha}(R))$ and $E(\sigma_{X=X_\alpha}(R))$ are determined. The estimation bounds for the other four selection conditions are obtained from the following relationships between the various selection conditions.

5.1.15 Relationships between Selection Conditions

Understanding the following relationships enables one to obtain the estimation results for every selection condition from the two estimates, $E(\sigma_{X \leq X_\alpha}(R))$ and $E(\sigma_{X=X_\alpha}(R))$.

These relationships are given in the form of lemmas here. Their proofs are omitted.

Lemma 10 If N is the total number of tuples for the attribute, then for every X the following conditions hold:

$$E(\sigma_{X<X_\alpha}(R))+E(\sigma_{X=X_\alpha}(R))+E(\sigma_{X>X_\alpha}(R))=N$$

$$E(\sigma_{X\leq X_\alpha}(R))=E(\sigma_{X<X_\alpha}(R))+E(\sigma_{X=X_\alpha}(R))$$

$$E(\sigma_{X\geq X_\alpha}(R))=E(\sigma_{X>X_\alpha}(R))+E(\sigma_{X=X_\alpha}(R))$$

Lemma 11 If $X_{min}$ and $X_{max}$ are the minimum and maximum values for the attribute respectively, then, $$E(\sigma_{X>X_{max}}(R))=0,$$

$$E(\sigma_{X<X_{min}}(R))=0.$$

Lemma 12 For every $X_\alpha$ and $X_\beta$ such that $X_\alpha < X_\beta$, $$E(\sigma_{X<X_\alpha}(R))\leq E(\sigma_{X<X_\beta}(R)).$$

Lemma 13 For every $X_\alpha$, $$E(\sigma_{X=X_\alpha}(R))\geq 0.$$

The following corollary gives some further properties, which are inferred from the above lemmas.

Corollary 1 For any arbitrary attribute value X and a given attribute value $X_\alpha$, $$E(\sigma_{X\leq X_{\max}}(R)) = N$$

$$E(\sigma_{X\geq X_{\min}}(R)) = N$$

$$E(\sigma_{X<X_a}(R)) \leq E(\sigma_{X\leq X_a}(R)).$$

Hence from the above lemmas and corollary, using the estimates $E(\sigma_{X=X_\alpha}(R))$, and $E(\sigma_{X\leq X_\alpha}(R))$, the estimates for the other four selection predicates are obtained as follows:

$$E(\sigma_{X>X_\alpha}(R))=N-E(\sigma_{X\leq X_\alpha}(R))$$

$$E(\sigma_{X\geq X_\alpha}(R))=N-E(\sigma_{X\leq X_\alpha}(R))+E(\sigma_{X=X_\alpha}(R))$$

$$E(\sigma_{X<X_\alpha}(R))=E(\sigma_{X\leq X_\alpha}(R))-E(\sigma_{X=X_\alpha}(R))$$

$$E(\sigma_{X\neq X_\alpha}(R))=N-E(\sigma_{X=X_\alpha}(R)).$$

5.1.16 Result Estimation of Equality Select Using the R-ACM

For a relational query with an equality select predicate, $X=X_\alpha$, where $X_\alpha$ is a constant value in the domain of attribute X, the estimate of the result size of the query, $\sigma_{X=X_\alpha}(R)$ where the attribute value $X_\alpha$ is in position $\alpha$ of the $k^{th}$ R-ACM sector is given by the following lemma.

Lemma 14 An estimate obtained by using the expected value analysis for the result of the equality select query, $\sigma_{X=X_\alpha}(R)$, using an R-ACM is, $$E(|\sigma_{X=X_\alpha}(R)|) = \frac{n_k}{l_k}$$

where $n_k$ is the number of tuples in the $k^{th}$ R-ACM sector and $l_k$ is the number of distinct attribute values (or width) of the $k^{th}$ sector respectively.

Proof: This result is a direct consequence of Theorem 2.

Because of the fact that the estimate using the expected value and the maximum likelihood estimate are essentially identical, the estimate is referred to as the maximum likelihood estimate. When estimating the result size of the above query using the R-ACM, obviously associated worst-case and average-case errors are of concern. These errors are shown in FIG. 19(b) and (c).

Lemma 15 If the value $X_\alpha$ falls in the $k^{th}$ sector of an R-ACM, then the worst-case error in estimating the number of tuples of $X_\alpha$ by using its maximum likelihood estimate is, $$\epsilon = \tau \left| \ln\left(\frac{l_k}{\alpha-1}\right) - 1 \right|$$

where $n_k$ and $l_k$ are the number of tuples and the sector width of the $k^{th}$ sector.

Proof: This is a direct result from Theorem 4.

Lemma 16 The average case error with a rectangular ACM in estimating the equality select query, $\sigma_{X=X_\alpha}(R)$ by using its expected value $2\tau$, where $\tau$ is the tolerance value used to build the R-ACM.

Proof: This is a direct result of Theorem 7.

5.1.17 Result Estimation of Range Select Using the R-ACM

As mentioned earlier, among the various selection predicates, it is sufficient to find the estimate for the range select query $\sigma_{X\leq X_\alpha}(R)$. With this estimate and the estimate found above for $\sigma_{X=X_\alpha}(R)$, the estimates for all other range predicates are obtainable.

Theorem 9 The maximum likelihood estimate for the range select query $\sigma_{X\leq X_\alpha}(R)$ using the R-ACM is given by, $$S_{ML}(|\sigma_{X\leq X_\alpha}(R)|) = \sum_{j=1}^{k-1} n_j + \frac{z_\alpha n_k}{l_k}$$

where the attribute value $X_\alpha$ is in the $k^{th}$ sector of the R-ACM and is the $z_a^{th}$ attribute value in the sector.

Proof: The attribute values which satisfy the query $\sigma_{X\leq X_\alpha}(R)$ occupy the first $k-1$ R-ACM sectors and up to and including the $z_a^{th}$ location of the $k^{th}$ R-ACM sector. Hence the query result size is found by summing up the number of tuples in the first $k-1$ sectors of the R-ACM and the maximum likelihood estimate of the tuples for the first $z_\alpha$ attribute values in the $k^{th}$ sector of the R-ACM. First of all, there is no estimation error in the first $k-1$ sectors. The maximum likelihood estimate of the tuples for the first $z_\alpha$ attribute values in the $k^{th}$ sector is found.

Assuming the frequencies of the first $z_\alpha$ attribute values in the $k^{th}$ R-ACM sector are $x_1, x_2, \ldots, x_{z_\alpha}$, a likelihood function on these frequencies is obtained by considering their join probability mass functions. But instead, without loss of generality, consider the join probability mass function for the first two attribute values. Due to their uncorrelatedness, the likelihood function is written as, $$\mathcal{L}(x_1, x_2) = \binom{n_k}{x_1} p^{x_1}(1-p)^{n_k-x_1} \binom{n_k}{x_2} p^{x_2}(1-p)^{n_k-x_2}$$

$$= \binom{n_k}{x_1}\binom{n_k}{x_2} p^{x_1+x_2}(1-p)^{2n_k-(x_1+x_2)}.$$

Taking natural logarithm on both sides of the likelihood function, $$\ln\mathcal{L}(x_1, x_2) = 2\ln n_k! - \ln x_1! - \ln(n_k - x_1)! - \ln x_2! - \ln(n_k - x_2)! +$$

$$(x_1+x_2)\ln p + [2n_k - (x_1+x_2)]\ln(1-p)$$

$$= 2\ln\Gamma(n_k+1) - \ln\Gamma(x_1+1) - \ln\Gamma(n_k-x_1+1) + -\ln\Gamma(x_2+1)$$

-continued
$$-\ln\Gamma(n_k - x_2 + 1) + (x_1 + x_2)\ln p + [2n_k - (x_1 + x_2)]\ln(1 - p)$$

Now using the well known identity, $$\Gamma(\alpha) = \frac{\Gamma(\alpha + k + 1)}{\alpha(\alpha + 1)\ldots(\alpha + k)}$$

and simplifying the above log likelihood function, $$\ln\mathcal{L}(x_1, x_2) = -2\ln\Gamma(n_k + 1) + (x_1 + x_2)\ln p + [2n_k - (x_1 + x_2)]\ln(1 - p) +$$
$$\ln(x_1 + 1) + \ln(x_1 + 2) + \ldots + \ln n + \ln(n_k - x_1 + 1) +$$
$$\ln(n_k - x_1 + 2) + \ldots + \ln n \ln(x_2 + 1) + \ln(x_2 + 2) +$$
$$\ldots + \ln n + \ln(n_k - x_2 + 1) + \ln(n_k - x_2 + 2) + \ldots + \ln n$$

Now taking the partial derivative of $\ln\mathcal{L}(x_1, x_2)$ with respect to $x_1$, $$\frac{\partial\{\ln\mathcal{L}(x_1, x_2)\}}{\partial x_1} = \ln p - \ln(1 - p) + \sum_{r=x_1+1}^{n_k - x_1} \frac{1}{r}.$$

Setting $$\frac{\partial\{\ln\mathcal{L}(x_1, x_2)\}}{\partial x_1} = 0,$$

and noting that $$\sum_{r=x_1+1}^{n_k - x_1} \frac{1}{r} \leq \ln\left(\frac{n_k - x_1}{x_1}\right),$$

$\hat{x}_{ML}$ of $x_1$ is obtained as, $$\frac{p(n_k - x_1)}{(1 - p)x_1} \geq 1,$$

or using Theorem 1, $$\hat{x}_{ML} = n_k p = \frac{n_k}{l_k}.$$

Similarly, finding $$\frac{\partial\{\ln\mathcal{L}(x_1, x_2)\}}{\partial x_1}$$

and setting it to zero, the maximum likelihood estimate for $x_2$ as $\hat{x}_{ML} = \frac{n_k}{l_k}$.

Hence considering the join probability mass function of all other attribute values in this sector, it is shown that each of their maximum likelihood estimates is equal to $$\hat{x}_{ML} = \frac{n_k}{l_k}.$$

Thus the maximum likelihood estimate of the number of tuples for the first $z_\alpha$ attribute values is equal to, $$\sum_{i=1}^{z_\alpha} \frac{n_k}{l_k} = \frac{z_\alpha n_k}{l_k}.$$

Hence the maximum likelihood estimate for the range select query $\sigma_{X \leq X\alpha}(R)$ is given by, $$S_{ML}(|\sigma_{X \leq X_\alpha}(R)|) = \sum_{j=1}^{k-1} n_j + \frac{z_\alpha n_k}{l_k}.$$

Hence the theorem.

As mentioned earlier when estimating the range select queries, three distinct cases should be considered. Here, it is sufficient to consider the second case only. Considering the selection query $\sigma_{X_\alpha \leq X \leq X_\beta}(R)$, where the attribute values $X_\alpha$ and $X_\beta$ fall within the $k^{th}$ R-ACM sector and $\alpha < \beta$, the following theorem results.

Theorem 10 Using the R-ACM, the maximum likelihood estimate of the range selection query $\sigma_{X_\alpha \leq X \leq X_\beta}(R)$, where the attribute values $X_\alpha$ and $X_\beta$ fall completely within the $k^{th}$ R-ACM sector is given by, $$S_{ML}(|\sigma_{X_\alpha \leq X \leq X_\beta}(R)|) = \frac{(\beta - \alpha + 1)n_k}{l_k}$$

where $\beta > \alpha$.

Proof: Using Theorem 9, we obtain, $$E_{ML}(|\sigma_{X_\alpha \leq X \leq X_\beta}(R)|) = E_{ML}(|\sigma_{X \leq X_\beta}(R)|) - E_{ML}(|\sigma_{X < X_\alpha}(R)|)$$
$$= \sum_{j=1}^{k-1} n_j + \frac{\beta n_k}{l_k} - \sum_{j=1}^{k-1} n_j - \frac{(\alpha - 1)n_k}{l_k}$$
$$= \frac{(\beta - \alpha + 1)n_k}{l_k}.$$

The theorem follows.

In Theorem 15, considering a monotonically decreasing R-ACM sector, the worst-case error is bound for an arbitrary attribute value as, $$\epsilon = \left|\tau\left[\ln\left(\frac{l_k}{\alpha - 1}\right) - 1\right]\right|.$$

The following lemma gives a bound for the worst-case error (shown in FIG. 21(a)) in the above select operation.

Lemma 17 The worst-case error, $\epsilon$, in estimating the query $\sigma_{X_\alpha \leq X \leq X_\beta}(R)$ by using the maximum likelihood estimate, when both $X_\alpha$ and $X_\beta$ fall completely within the $k^{th}$ sector of the R-ACM is given by, $$\epsilon = \left|\ln\left\{t_j^{(\beta - \alpha + 1)\tau} \frac{(\beta - 1)!}{(\alpha - 2)!}\right\}\right| - (\beta - \alpha + 1)\tau$$

where $\beta > \alpha$.
Proof: This follows directly from Theorem 6.

The following lemma gives a bound for the average-case error (shown in FIG. 21(b)) in the above select operation.

Lemma 18 The average case error with a rectangular ACM in estimating the range select query, $\sigma_{X_\alpha \leq X \leq X_\beta}(R)$ by using its maximum likelihood estimate, when both $X_\alpha$ and $X_\beta$ fall completely within the $k^{th}$ sector of the R-ACM is given by, $$\epsilon = 2(\beta - \alpha + 1)\tau$$

where $\beta > \alpha$ and $\tau$ is the tolerance value used to build the R-ACM. Proof: This is a direct result of Theorem 8.

5.1.18 Size Estimation of the Join Operation Using the R-ACM

The join operation, denoted by the symbol ⋈, is used to combine related tuples from two relations into single tuples. This operation is very important for any relational database system with more than a single relation, because it allows us to process relationships among relations. Also joins are among the most expensive operators in relational DBMSs. In fact, a large part of query optimization consists of determining the optimal ordering of join operators. Estimating the result size of a join is very essential to finding a good QEP.

The general form of a join operation with an arbitrary predicate on two relations $R(A_1, \ldots, A_n)$ and $S(B_1, \ldots, B_n)$ is, $$R \bowtie_{predicate} S$$

where predicate is the join condition. A join condition is of the form, <condition>AND<condition>AND . . . AND<condition>
where each condition is of the form $A_i \theta B_j$. $A_i$ and $B_j$ have the same domain and $\theta$ is one of the comparison operators $\{=, <, \leq, >, \geq, \neq\}$. A join operation with such a general join condition is called a theta join. The most common join involves join conditions with equality comparisons only. Such a join, where the only comparison operator used is $=$, is called an equijoin.

As mentioned earlier in this chapter, the approximate data distribution corresponding to an ACM is used in the place of any actual distribution to estimate a required quantity. Specifically, the approximate data distributions are derived using the techniques developed earlier for all joining relations. When the value domain is approximated in a discrete fashion the result size is estimated by joining these data distributions using, say, a merge-join algorithm. Essentially, for each distinct value in the approximate value domains of the ACMs, its frequencies in all the ACMs are multiplied and the products are added to give the join result size. It is clear that, in addition to approximating the frequency domain with high accuracy, an accurate ACM for this case should also approximate the value domain with high accuracy in order to correctly identify the joining values. The case when the join operation involves multiple attribute predicates requires the multi-dimensional version of the R-ACM, which is a promising area for future research.

5.1.19 Assumption of Attribute Value Independence

Several queries in practice contain multiple attributes from the same relation. The result sizes of such queries depend on the joint data distributions of those attributes. Due to the large number of such attribute value combinations, determining the probabilistic attribute dependencies is very difficult. In fact, most commercial DMBSs adopt the attribute value independence assumption. Under this assumption, the data distributions of individual attributes in a relation are statistically independent of each other.

The following lemma provides an estimation of the result for joining two sectors of the R-ACMs of domain compatible attributes X and Y which are independent.

Lemma 19 Consider the equality join of two domain compatible attributes X and Y. If the $i^{th}$ sector from the R-ACM of attribute X has a matching attribute values with the $j^{th}$ sector from the R-ACM of attribute Y, the expected number of tuples resulting from joining the two sectors is, $$\hat{\xi} = \frac{\alpha n_{iX} n_{jY}}{l_{iX} l_{jY}}$$

where $n_{iX}$ and $n_{iY}$ are the number of tuples in the $i^{th}$ sector of attribute X and $j^{th}$ sector of attribute Y respectively.
Proof: From Lemma 2 we know, that the expected frequency of a given attribute value in the $i^{th}$ R-ACM sector is given by, $$E(x) = \frac{n_{iX}}{l_i}$$

where $n_i$ is the number of tuples in the $i^{th}$ R-ACM sector and $l_i$ is the sector width of the $i^{th}$ R-ACM sector. Hence if $\alpha$ matching values which need not be contiguous are in the sectors, each of them will yield the same expected value. Thus the total join size is, $$\hat{\xi} = E\left(\sum_{k=1}^{\alpha} x_k \times y_k\right)$$

where $x_k$ and $y_k$ are the frequencies of the attribute values $X_k$ and $Y_k$. Assuming that the attributes X and Y are independent or uncorrelated of each other and using the expressions for $E(x_k)$ and $E(y_k)$, the above becomes, $$\hat{\xi} = \sum_{k=1}^{\alpha} \{E(x_k) \times E(y_k)\}$$

whence, $$\hat{\xi} = \sum_{k=1}^{\alpha} \left(\frac{n_{iX}}{l_{iX}}\right)\left(\frac{n_{jY}}{l_{jY}}\right)$$

$$= \frac{\alpha n_{iX} n_{jY}}{l_{iX} l_{jY}}.$$

Since the term inside the summation above is the same for all the $\alpha$ attribute values, the lemma follows.

Corollary 2 For the special case, when the sectors of the join attributes have equal sector widths, $l_{iX} = l_{jY} = l = \alpha$, then the estimated size of the sector join is, $$\hat{\xi} = \frac{n_{iX} n_{jY}}{l}$$

5.1.20 Estimated Result Sizes

Consider an equijoin $R|\times|_{X=Y} S$ where attributes X and Y are from relations R and S respectively. Assume that the R-ACMs for both attributes X and Y are available, consider a more general case, where a sector from the R-ACM for attribute X has matching values with more than one sector from the R-ACM for attribute Y. The problem is to estimate the size of the join $R|\times|_{X=Y} S$.

Note that the attribute values in the R-ACMs are in an ascending order. Consider the $i^{th}$ sector from the R-ACM for the attribute X. Suppose it has meaning values in the R-ACM for attribute Y with all the sectors in the range from sector j to sector k. Assume that there are $\alpha$ matching values from the $j^{th}$ sector and $\beta$ matching values from the $k^{th}$ sector. Also assume that all the values in sectors $j+1$ to $k-1$ of Y have matching values from sector i of X. (See FIG. 22).

Hence the estimated join size resulting from joining sector i of X to the matching sectors of Y, $$\hat{\xi}_i = \frac{n_i}{l_i}\frac{\alpha n_j}{l_j} + \frac{n_i}{l_i}n_{j+1} + \ldots + \frac{n_i}{l_i}n_{k-1} + \frac{n_i}{l_i}\frac{\beta n_k}{l_k}$$

$$= \frac{n_i}{l_i}\left(\frac{\alpha n_j}{l_j} + n_{j+1} + \ldots + n_{k-1} + \frac{\beta n_k}{l_k}\right)$$

Hence the estimated join size of $R|\times|_{X=Y} R$ is the summation of all such $\hat{\xi}_i$, i.e:

$$\hat{\xi} = \sum_{i=1}^{s_x} \hat{\xi}_i$$

where $s_x$ is the number of sectors in attribute X.

Similarly, in order to estimate the size of the entire join of relations R and S, Lemma 19 is used for every intersecting sector of the R-ACM of attribute X and the R-ACM of attribute Y. This is given by the following theorem.

Theorem 11 Considering an equijoin $R|\times|_{X=Y} S$ of two relations R and S, with domain compatible attributes X and Y, the maximum likelihood estimate for the size of the join using an R-ACM is, $$\hat{\xi} = \sum_{i=1}^{s_X} \sum_{j=1}^{\gamma_i} \alpha_{ij} \frac{n_{i_X} n_{j_Y}}{l_{i_X} l_{j_Y}}$$

where $s_X$ is the number of sectors in the R-ACM of attribute X and $\alpha_{ij}$ is the number of intersecting values of the $i^{th}$ sector of the R-ACM of X and the $j^{th}$ sector of the R-ACM of Y. $\gamma_i$ is the number of sectors from the R-ACM of Y which intersect the $i^{th}$ R-ACM sector of X.

Proof: The proof follows directly from Lemma 19.

Note that the estimation of join sizes using an ACM is similar to the merge phase of the sort-merge join algorithm. Since the attribute values in the ACM are already in a sequentially ascending order, unlike the sort-merge join algorithm, the sorting step is not required for an ACM. When estimating the join size using two ACMs, if the number of distinct values in the smaller ACM is L, then the join estimation only uses L number of integer multiplications and an equal number of additions.

5.1.21 Estimation of Join Error

The estimation error resulting from an equality join of two attributes is usually much higher than the estimation errors resulting from the equality select and range select operations.

Lemma 20 Considering the equality join of two domain compatible attributes X and Y with $X_i=Y_j$, if the expected result size of the equality selection query, $\sigma_{X=X_i}$ using an ACM is $\hat{x}_i$ and that of $\sigma_{Y=Y_j}$, then the maximum error resulting from joining the attributes X and Y on the values $X_i$ and $Y_j$ is given by $$\epsilon = |(\hat{x}_i \epsilon_y + \hat{y}_j \epsilon_x + \epsilon_x \epsilon_y)|$$

where $\epsilon_x$ and $\epsilon_y$ are the estimated errors resulting from the equality selection queries $\sigma_{X=X_i}$ and $\sigma_{X=Y_j}$ respectively.

Proof: Assume that the actual frequency values of $X_i$ and $Y_j$ are $x_i$ and $y_j$ respectively. Hence the actual size of the join contribution from these values is, $$\xi = x_i y_j.$$

But the expected size of the join contribution from the above values is, $$\hat{\xi} = \hat{x}_i \hat{y}_j.$$

Thus the maximum error resulting from joining the values $X=X_i$ and $Y=Y_j$ is, $$\epsilon = |\xi - \hat{\xi}|$$

$$= |x_i y_j - \hat{x}_i \hat{y}_j|$$

The possible values for $x_i$ can be either $(\hat{x}_i - \epsilon_x)$ or $(\hat{x}_i + \epsilon_x)$. Similarly the possible values for $y_j$ can be either $(\hat{y}_j - \epsilon_y)$ or $(\hat{y}_j + \epsilon_y)$. Note that out of the 4 possible value combinations of these expected values, only $(\hat{x}_i + \epsilon_x)(\hat{y}_j + \epsilon_y)$ gives the largest error. Hence the maximum error becomes, $$\epsilon = |\hat{x}_i \hat{y}_j - (\hat{x}_i + \epsilon_x)(\hat{y}_j + \epsilon_y)|$$

$$= |\hat{x}_i \epsilon_y + \hat{y}_j \epsilon_x + \epsilon_x \epsilon_y|.$$

The lemma follows.

Considering all the values of attributes X and Y, it is possible to find the cumulative error in the estimation of a join. Hence using the results on estimation errors obtained earlier, the join errors for both the worst-case and average-case situations in R-ACM and T-ACM are found.

Corollary 3 The error resulting from an equality join of two domain compatible attributes X and Y, is given by, $$\epsilon = \sum_{j=1}^{s_X} \sum_{i=1}^{l_j} (\hat{x}_i \epsilon_{y_k} + \hat{y}_k \epsilon_{x_i} + \epsilon_{x_i} \epsilon_{y_k})$$

where k is an index on the R-ACM of Y such that $X_i=Y_k$ and $\epsilon_{x_i}, \epsilon_{y_k}$ are the errors resulting from the equality selection queries $\sigma_{X=X_i}$ and $\sigma_{Y=Y_k}$ respectively.

Proof: The proof follows from the previous lemma.

Lemma 21 Considering the equality join of two domain compatible attributes X and Y with $X_i=Y_j$, if the expected result size of the equality selection query, $\sigma_{X=X_i}$, using an R-ACM is $\hat{x}_i$ and that of $\sigma_{Y=Y_j}$ is $\hat{y}_j$, then the worst-case error resulting from joining the attributes X and Y on the values $X_i$ and $Y_j$ is given by, $$\epsilon = \ln\left(\left[\frac{l_q}{e(j-1)}\right]^{\tau_y \hat{x}_i}\left[\frac{l_p}{e(i-1)}\right]^{\tau_x \hat{y}_j}\right) + \ln\left[\frac{l_q}{e(j-1)}\right]^{\tau_y} \ln\left[\frac{l_p}{e(i-1)}\right]^{\tau_x}$$

where $\tau_x$ and $\tau_y$ are the tolerance values used to generate the R-ACMs of attributes X and Y respectively and $l_p$ and $l_q$ are the sector widths of the R-ACMs corresponding to the attribute values $X_i$ and $Y_j$ respectively.

Proof: It follows from Lemma 20 that the maximum join error when joining the values $X_i$ and $Y_j$ is equal to, $$\epsilon = |\hat{x}_i \epsilon_y + \hat{y}_j \epsilon_x + \epsilon_x \epsilon_y|.$$

But from Theorem 5, the worst-case error is estimating the selection query, $\sigma_{X=X_i}$ is equal to, $$\epsilon_x = \left|\tau_x\left[\ln\left(\frac{l_p}{i-1}\right)-1\right]\right|, \text{ for } i > 1.$$

Similarly, the worst-case error in estimating the selection query, $\sigma_{Y=Y_j}$ is equal to, $$\epsilon_y = \left|\tau_y\left[\ln\left(\frac{l_q}{j-1}\right)-1\right]\right|, \text{ for } j > 1.$$

Hence the worst-case error in joining the attribute values $X_i$ and $Y_j$ is written as, $$\epsilon = |\hat{x}_i\epsilon_y + \hat{y}_j\epsilon_x + \epsilon_x\epsilon_y|$$

$$= \ln\left(\left[\frac{l_q}{e(j-1)}\right]^{\tau_y\hat{x}_i}\left[\frac{l_p}{e(i-1)}\right]^{\tau_x\hat{y}_j}\right) + \ln\left[\frac{l_q}{e(j-1)}\right]^{\tau_y}\ln\left[\frac{l_p}{e(i-1)}\right]^{\tau_x}$$

and the lemma follows.

Since the worst-case error in estimating the selection queries $\sigma_{X=X_i}$ and $\sigma_{Y=Y_j}$ is dependent on the positions of the attribute values $X_i$ and $Y_j$ within the corresponding R-ACM sectors, the worst-case error in the above join is also dependent on the positions of the attribute values being joined. FIG. 23 shows the relationship of the worst-case join estimation error and the positions i,j of the attribute values $X_i$ and $Y_j$ within the R-ACM sectors. Note that the join estimation has the lowest worst-case error when both $X_i$ and $Y_j$ are the last attribute values in their corresponding sectors.

5.1.22 Data Distributions for the Experiments

The synthetic data from a random number generator invariably produces a uniform distribution. Since real-world data is hardly uniformly distributed, any simulation results from using such synthetic data are of limited use. So two powerful mathematical distributions, namely the Zipf distribution and the multi-fractal distribution were used. Since these distributions generate frequencies with wide range of skews, they provide more realistic simulation results.

Overview of Zipf Distributions

Nature is full of phenomena which seem to obey a few laws. Some, such as falling apples, are explained satisfactorily based on certain laws of physics or mechanics. On the other hand, there are some events, such as those occurring in chaotic systems, which do not exhibit any apparent regularity. There is another type of phenomena which exhibit empirically observable regularities, but do not directly yield to explanation using simple laws of nature. These empirical phenomena have been observed in domains as diverse as population distributions, frequency distributions of words, income distributions and biological genera and species.

G. K. Zipf first proposed a law, called the Zipf's law, which we observed to be approximately obeyed in many of these domains [Zipf, 1949]. Zipf's law is essentially an algebraically decaying function describing the probability distribution of the empirical regularity. Zipf's law can be mathematically described in the context of our problem as follows.

For an attribute value X of size N with L distinct values, the frequencies generated by the Zipf distribution are given by, $$f_i = N \cdot \frac{1/i^z}{\sum_{i=1}^{L} 1/i^z}, \text{ for } 1 \leq i \leq L.$$

The skew of the Zipf distribution is a monotonically increasing function of the z parameter, starting from z=0, which is the uniform distribution. The frequency sets of several Zipf distributions with different z values are plotted in FIG. 24. These frequency distributions were all generated for N=2000 and L=10.

One of the common claims in database literature is that many attributes in real-world database contain a few attribute values with high frequencies and the rest with low frequencies, and hence are modeled satisfactorily by Zipf distributions. Statistical literature abounds with information on modeling real-life data by Zapf distributions.

Overview of Multi-fractal Distributions

The relationship of multi-fractals with the "80-20" law is very close, and seem to appear often. Several real-world distributions follow a rule reminiscent of the 80-20 rule in databases. For example, photon distributions in physics, or commodities such as gold, water, etc distributions on earth etc., follow a rule like "the first half of the region contains a fraction p of the gold, and so on, recursively, for each sub-region." Similarly, financial data and people's income distributions follow similar patters.

With the above rule, the attribute value domain is recursively decomposed at k levels; each decompositions halves the input interval into two. Thus, eventually $2^k$ sub-intervals of length $2^{-k}$ result.

In the following distribution of probabilities, as illustrated in FIG. 25. At the first level, the left half is chosen with probability (1−p), while the right half is with p; the process continues recursively for k levels. Thus, the left half of the sectors will host (1−p) of the probability mass, the left-most quarter will host $(1-p)^2$ etc.

In the following experiments, a binomial multi-fractal distribution is used with N tuples and parameters p and k, with $2^k$ possible attribute values. Note that when p=0.5, the uniform distribution results. For a binomial multi-fractal,

| Count | Relative Frequency |
|---|---|
| $C_0^k$ | $p^k$ |
| $C_1^k$ | $p^{(k-1)}(1-p)^1$ |
| ... | ... |
| $C_a^k$ | $p^{(k-a)}(1-p)^a$ |
| ... | ... |

In other words, out of the $2^k$ distinct attribute values, there are $C_\alpha^k$ distinct attribute values, each of which will occur $N*p^{(k-\alpha)}(1-p)^\alpha$ times. Thus, for example, out of the $2^k$ distinct attribute values, there is $C_0^k=1$ attribute value that occurs $p^k$ times.

5.1.23 Experiments Using Synthetic Data

In the first set of experiments, the actual estimation errors of both selection and join operations were performed using the R-ACM on various synthetic data distributions such as
1. uniform data distribution,
2. Zipf data distribution, and
3. multi-fractal data distribution.

Using these experiments, the performance of the R-ACM, in terms of the result size estimation accuracy, under various frequency skews was verified.

In the second set of experiments, the performance of the R-ACM under various tolerance values, $\tau$ was studied.

Finally, in the third set of experiments, the performance of the R-ACM was compared to that of the traditional equi-width and equi-depth histograms under various synthetic data distributions for both select and join operations.

5.1.24 Queries Used in the Experiments

The select and join operations are the two most frequently used relational operations in database systems. Thus for the experiments queries that use these two operations are implemented.

For estimating the result sizes of select operations, two types of select operations, namely the exact-match select and the range select are used. The exact-match select operation, denoted $\sigma_{X=X_i}(R)$, retrieves all the tuples from the relation R, for which the attribute X has the value $X_i$. The range select operation retrieves all the tuples falling within an attribute value range. For example, the query $\sigma_{X \leq X_i}(R)$, retrieves all the tuples from the relation R, for which the attribute value X has values less than $X_i$. For the join operation, the most frequently encountered equi-join operation is used. The equi-join operation, denoted $R|\times|_{X=Y} S$, combines all the tuples in the relations R and S whenever the value of attribute X from relation R is equal to the value of attribute Y from relation S.

5.1.25 Estimation Accuracy of the R-ACM under Various Synthetic Data Distributions Whenever there is a steep frequency change in a data distribution, there will be a proportional increase in the number of sectors in the corresponding portions of the R-ACM. In other words, generally speaking, $\tau \propto 1/S$, where S is the storage requirement for the given tolerance value, $\tau$. Hence for an R-ACM to map a data distribution with a large number of frequency skews, the scheme would require proportionally large storage requirements to maintain the desired estimation accuracy. Thus, a fair comparison study of the performance of the R-ACM under various data distribution should be based on the storage requirements for the R-ACM as opposed to the tolerance values. Consequently, a fixed size for R-ACMs is used in this group of experiments. This is done by increasing or decreasing the tolerance values as required for each of the data distributions under study.

In this set of experiments, the relative estimation errors are computed for the selection and join operations under the above mentioned data distributions. The relative estimation error is obtained as a ratio by subtracting the estimated size from the actual result size and dividing it by the actual result size. Obviously, the cases where the actual result sizes were zero were not considered for error estimation. The results were obtained by averaging the estimation errors over a number of experiments and are shown in Tables 6, 7, and 8 for the three different frequency distributions. A

TABLE 6

Estimation Accuracy of the R-ACM under Uniform Distribution

| Operation    | Actual Size | Estimated Size | Percentage Error |
|--------------|-------------|----------------|------------------|
| Equi-select  | 96          | 99.2           | 3.33%            |
| Range-select | 3048        | 3090.8         | 1.40%            |
| Equi-join    | 253124      | 277727.6       | 9.72%            |

TABLE 7

Estimation Accuracy of the R-ACM under Zipf Distribution

| Operation    | Actual Size | Estimated Size | Percentage Error |
|--------------|-------------|----------------|------------------|
| Equi-select  | 326         | 354.4          | 8.70%            |
| Range-select | 1451        | 1535.2         | 5.81%            |
| Equi-join    | 263688      | 320460         | 21.53%           |

TABLE 8

Estimation Accuracy of the R-ACM under Multifractal Distribution

| Operation    | Actual Size | Estimated Size | Percentage Error |
|--------------|-------------|----------------|------------------|
| Equi-select  | 131         | 138.7          | 5.91%            |
| Range-select | 2058        | 2134.6         | 3.72%            |
| Equi-join    | 600632      | 689525.5       | 14.80%           | uniform attribute value domain was consistently used for this group of experiments.

5.1.26 Estimation Accuracy of the R-ACM and $\tau$

In this set of experiments, the result size estimates from the R-ACM are compared for three different tolerance values. Again the experiments were conducted with the uniform, Zipf and multifractal frequency distributions. As in the first group of experiments, the comparisons were done for simple (a) equality-select queries (b) range-select queries and (c) equi-join queries. The percentage estimation error corresponding to each tolerance value was computed as an average over a number of experiments and are shown in Tables 9, 10 and 11.

TABLE 9

Result Estimation Using R-ACM: Uniform Frequency Distribution

|              |             | Estimated Result | | | Percentage Error | | |
|--------------|-------------|------------|------------|------------|------------|------------|------------|
| Operation    | Actual Size | $\tau = 4$ | $\tau = 6$ | $\tau = 8$ | $\tau = 4$ | $\tau = 6$ | $\tau = 8$ |
| Equi-select  | 83          | 84.8       | 86.84      | 91.58      | 2.1%       | 4.63%      | 10.34%     |
| Range-select | 1378        | 1390.7     | 1421.6     | 1480.1     | 0.92%      | 3.17%      | 7.41%      |
| Equi-join    | 68938       | 72453.8    | 78520      | 85179.6    | 5.1%       | 13.9%      | 23.56%     |

To present the results related to the variances, variances of the R-ACM corresponding to each tolerance value under the uniform frequency distribution for equality-select operations in the above set of experiments are also computed. The percentage estimation errors and the corresponding variance of the R-ACM are given in Table 12. Observe that the percentage estimation error corresponding to the variance

TABLE 10

Result Estimation Using R-ACM: Zipf Frequency Distribution

| | | Estimated Result | | | Percentage Error | | |
|---|---|---|---|---|---|---|---|
| Operation | Actual Size | $\tau = 4$ | $\tau = 6$ | $\tau = 8$ | $\tau = 4$ | $\tau = 6$ | $\tau = 8$ |
| Equi-select | 396 | 427.36 | 469.97 | 504.27 | 7.92% | 18.68% | 27.34% |
| Range-select | 2219 | 2278.9 | 2343.7 | 2449.1 | 2.70% | 5.62% | 10.37% |
| Equi-join | 276328 | 304237 | 335020 | 369616 | 10.01% | 21.24% | 33.76% |

TABLE 11

Result Estimation Using R-ACM: Multifractal Frequency Distribution

| | | Estimated Result | | | Percentage Error | | |
|---|---|---|---|---|---|---|---|
| Operation | Actual Size | $\tau = 4$ | $\tau = 6$ | $\tau = 8$ | $\tau = 4$ | $\tau = 6$ | $\tau = 8$ |
| Equi-select | 218 | 223.19 | 229.75 | 243.46 | 2.38% | 5.39% | 11.68% |
| Range-select | 3195 | 3233.0 | 3322.2 | 3450.9 | 1.19% | 3.98% | 8.01% |
| Equi-join | 517566 | 548775 | 595097 | 661087 | 6.03% | 14.98% | 27.73% |

$V=1328$ is only 2.1%, but the percentage estimation error corresponding to the variance $V=1537$ is more than 10%.

TABLE 12

Variance of the R-ACM and the Estimation Errors

| | Estimated Result | | | Percentage Error | | |
|---|---|---|---|---|---|---|
| Actual Size | $v = 1328$ | $v = 1461$ | $v = 1537$ | $v = 1328$ | $v = 1461$ | $v = 1537$ |
| 83 | 84.8 | 86.84 | 91.58 | 2.1% | 4.63% | 10.34% |

5.1.27 R-ACM and the Traditional Histograms

This final set of experiments were conducted on both the traditional equi-width and equi-depth histograms and the R-ACM. In order to provide a fair comparison, a fixed amount of storage was used for all three techniques, thus varying the build

TABLE 13

Comparison of Equi-width, Equi-depth and R-ACM: Uniform Frequency Distribution

| | | Equi-width | | Equi-depth | | R-ACM | |
|---|---|---|---|---|---|---|---|
| Operation | Actual Size | Size | Error | Size | Error | Size | Error |
| Equi-select | 1632 | 2067.7 | 26.7% | 2022.0 | 23.9% | 1684.4 | 3.21% |
| Range-select | 28567 | 30832.4 | 7.93% | 29741.1 | 4.11% | 28924.1 | 1.25% |
| Equi-join | 698436 | 862568 | 23.5% | 811583 | 16.2% | 758571 | 8.61% |

TABLE 14

Comparison of Equi-width, Equi-depth and R-ACM: Zipf Frequency Distribution

| Operation | Actual Size | Equi-width | | Equi-depth | | R-ACM | |
|---|---|---|---|---|---|---|---|
| | | Size | Error | Size | Error | Size | Error |
| Equi-select | 368 | 593.9 | 61.4% | 563.8 | 53.2% | 401.9 | 9.23% |
| Range-select | 1982 | 2538.9 | 28.1% | 2414.1 | 21.8% | 2093.9 | 5.65% |
| Equi-join | 185368 | 314198 | 69.5% | 302149 | 63.0% | 223164 | 20.39% |

TABLE 15

Comparison of Equi-width, Equi-depth and R-ACM: Multifractal Frequency Distribution

| Operation | Actual Size | Equi-width | | Equi-depth | | R-ACM | |
|---|---|---|---|---|---|---|---|
| | | Size | Error | Size | Error | Size | Error |
| Equi-select | 618 | 808.3 | 30.8% | 781.1 | 26.4% | 644.14 | 4.23% |
| Range-select | 29076 | 31721.9 | 9.1% | 30995.0 | 6.6% | 29811.6 | 2.53% |
| Equi-join | 691444 | 979084 | 41.6% | 921695 | 33.3% | 763078 | 10.36% | parameters for the structures as required. The build parameters for the equi-width and the equi-depth histograms are the sector-width and the number of tuples per sector respectively. The build parameter for the R-ACM is the tolerance value, $\tau$. As before the percentage estimation errors for the three types of queries, namely, (a) equality-select (b) range-select and (c) equi-join were computed. The experiments were again conducted for the uniform, Zipf and multifractal frequency distributions. An analysis of the results follows.

5.1.28 Analysis of the Results

The results from the first set of experiments show that the estimation error with the uniform data distribution is the smallest and that with the Zipf data distribution is the largest. This is consequent to the fact that a much smaller tolerance value was used for the uniform data distribution than that for the Zipf data distribution, thus resulting in higher estimation accuracy.

The results from the second set of experiments show that the estimation accuracy is inversely proportional to the tolerance value, $\tau$. Even with a high skewed Zipf distribution, a tolerance value of $\tau=4$ provides a relatively small percentage estimation error of 7.92% for equality-select operations. As in the first group of experiments, it is evident that the estimation errors are the smallest with the uniform frequency distribution and are the largest with the highly skewed Zipf frequency distribution. In addition, the experimental results, summarized in Table 12, demonstrate that the variance of the R-ACM is inversely related to the estimation error. For example, the percentage estimation error corresponding to the variance V=1328 is only 2.1%, but the percentage estimation error corresponding to the variance V=1537 is more than 10%.

The third group of experiments demonstrate the superiority of the R-ACM over the traditional equi-width and the equi-depth histograms for query result size estimation. The result from this set of experiments show that the estimation error resulting from the R-ACM is a fraction of the estimation error from the equi-width and the equi-depth histograms. For example, from Table 13, the percentage estimation error with the R-ACM for equi-select operation on uniform frequency distribution is only 3.21%, whereas for the same operation, the equi-width and equi-depth histograms result in 26.7% and 23.9% estimation errors respectively—which is an order of magnitude larger. This disparity is more evident and striking for the highly skewed Zipf distribution. As can be seen from Table 14, the percentage estimation error for the equi-select operation using the R-ACM is only 9.23%, whereas for the same operation, the equi-width and equi-depth histograms result in an unacceptably high 61.4% and 53.2% respectively.

As described above, a method of generating an attribute cardinality map, a histogram, is presented wherein elements are selected from a first end of a sorted data set progressing sequentially toward an opposing end. Each element is compared to a running mean of a current bin to determine where to commence a new bin, a new range. The resulting bins each have at least one element having an associated value within a predetermined maximum distance of the mean. That is, at least one value is within the range of plus or minus the predetermined maximum distance, $\tau$, though all elements may be much closer and some may even be further. Of course, the predetermined maximum distance, $\tau$ for a bin is such, even when a value of $\tau$ less than the actual predetermined maximum distance is used. For example, when a range is very large, it is optionally divided by reducing $\tau$ for that range. There still remains a value within the predetermined distance and in fact, there now is a value within the distance of the reduced $\tau$.

Once the ranges are determined, data relating to the determined ranges and their associated means or approximations therefore are stored. Sometimes, the means and the ranges are determined using sampling of the elements within the data set instead of an exhaustive analysis. Of course, the resulting histogram is not as good as one generated using all of the data. That said, there are situations where computational efficiency is more significant than estimation accuracy where sampling of some data within the data set is a preferred method of determining ranges.

Alternatively, the data set is traversed in an alternating fashion toward a beginning of the data set and toward an end of the data set.

Further alternative, the data set is traversed in a random order or, equivalently, the data set is unsorted. Accordingly, an element is selected and an appropriate bin is determined or created for that element. When desired, bins having adjacent contiguous ranges are merged when their means have a predetermined statistical correlation or their elements have associated values with a predetermined statistical correlation.

In accordance with another embodiment, a plurality of elements is selected at a same time. Values associated with the elements are compared to each other to determine if they are within a predetermined distance of each other and therefore belong in a same bin or a same portion of a bin. When they do, a bin is formed or optionally the elements are merged into an adjacent bin. Once again, a step of merging bins so determined is optionally performed. Optionally, once a bin is formed according to the embodiment, one or more elements are added to each end of the bin according to this or another method. Preferably, the elements are within τ of the mean of the elements within the bin.

According to alternative embodiments which utilize the Generalized positive-k mean and the Generalized negative-k mean, a range comprises elements within a known predetermined maximum distance one from ever other, as the value of k is increased. For example, a maximum value associated with the elements within the range and a minimum value associated with the elements within the range are stored. The difference between the maximum and minimum value is maintained below a predetermined threshold value. This is formally seen to be a result of the following.

All of the above embodiments which deal with the arithmetic mean have the property that they reduce the variation of the values associated with the elements within a range. In its most simple mathematical form this is achieved by determining the at least a range in terms of the mean of the elements within the current range, which is a function of well known $L_1$ norm of the elements in the current range. In other embodiments of the invention the at least a range can be computed using other $L_k$ norms. If a function of $L_\infty$ norm of the values within a range is used, the at least a range can be trivially computed using the maximum and minimum values of the current ranges, thus providing an alternate method to limit the variation of the values of the elements in the range. Various other embodiments of the invention are obtained when functions of other $L_k$ norms are used to determine the at least a range. Implementation of these embodiments is achieved using the Generalized positive-k mean and the Generalized negative-k mean defined below. If $\{\alpha_1, \ldots, \alpha_n\}$ are the elements of a set of non-negative numbers, $\mu^{(k)}$ the Generalized positive-k mean is defined as $$\mu^{(k)} = \left(\frac{1}{n}\sum_{i=1}^{n} a_i^k\right)^{\frac{1}{k}}.$$

Similarly, we define the Generalized negative-k mean as, $$\mu^{(-k)} = \left(\frac{1}{n}\sum_{i=1}^{n} a_i^{(1/k)}\right)^{k}.$$

From the above it is seen that the arithmetic means is $\mu^{(1)}$. From the theory of Generalized mean values, $$\mu^{(-k)} \leq \mu^{(1)} \leq \mu^{(k)}.$$

This is the rationale for the embodiment which computes the width of the range in terms of the Generalized positive-k mean and the Generalized negative-k mean of the values associated with the elements in the current range.

When k goes to infinity, $\mu^{(k)}$ is the maximum of the elements in the set $\{\alpha_1, \ldots, \alpha_n\}$, $\mu^{(-k)}$ is the minimum of the elements in the set $\{\alpha_1, \ldots, \alpha_n\}$. This is the rationale for the embodiment which computes the width of the range in terms of the maximum and minimum values associated with the elements in the current range.

As indicated above, for any histogram formed according to the invention an estimate of a value associated with an element is determinable. Further, statistical data relating to a reliability of an estimate is also determinable. Such information is useful for query optimisation, actuarial calculations, network routing, and some forms of searching.

For example, in network routing a table of time ranges and network traffic is used to determine a best route for communicating via the network. Improving the quality of estimated network traffic improves routing within the network. Typical routing tables divide time into equi-width segments of an hour, a half hour, a quarter hour or the like. For example, at 10:18 network traffic might decrease as opposed to at 10:00 sharp. Thus, the ranges determined according to the above embodiments will define a range ending at 10:18 and as such network traffic is estimated approximately correctly even at 10:03.

A similar benefit is achieved in determining actuarial tables for use in actuarial calculations. It is currently common to use fixed width bins determined long ago. It would, however, be advantageous to use ranges determined from the data to accurately reflect data distribution. Thus the invention method is advantageous.

5.2 Trapezoidal Attribute Cardinality Map

A trapezoidal ACM is a modified form of the equi-width histogram where each histogram partition is a trapezoid instead of a rectangle. In fact, the trapezoidal ACM is obtained by replacing each of the rectangular sectors of the equi-width histogram by a trapezoid. The beginning and ending frequency values of each trapezoid sector is chosen so that the area of the resulting trapezoid is equal to the area of the "rectangle" of the histogram it is replacing.

Definition 3 A One dimensional Trapezoidal ACM: Let $V=\{v_i : 1 \leq i \leq |V|\}$, where $v_i < v_j$ when i<j, be the set of values of an attribute X in relation R. Let the value set V be subdivided into s equi-width sectors, each having sector width, l. Approximate each equi-width sector by a trapezoid in which the $j^{th}$ trapezoid is obtained by connecting the starting value, $a_j$, to the terminal value, $b_j$, where the quantities $a_j$ and $b_j$ satisfy:

(a) The starting value $a_j$ is a user-defined parameter.
(b) For all j>1, the starting value of the $j^{th}$ trapezoid, $a_j$, is the terminal value of the $(j-1)^{st}$ trapezoid, $b_{j-1}$.
(c) The area of the $j^{th}$ trapezoid exactly equals the area of the $j^{th}$ equi-width sector from which the exact computation of the quantity, $b_j$, is possible.

Then the Trapezoidal Attribute Cardinality Map of attribute X with initial attribute value $X_l$ and width l is the set $\{(a_i, b_i) | 1 \leq i \leq s\}$.

EXAMPLE 3

FIG. 26 shows the equi-width histogram and the trapezoidal ACM of the Age attribute of a relation Emp(SIN, Age, Salary) between Age=30 and Age=49. Note that the actual frequency for every age value is shown in the histogram as shaded rectangles. The starting and ending frequencies of each trapezoidal sector is chosen so that the area under the trapezoid is equivalent to the area of the corresponding rectangular sector of the histogram. From the trapezoidal ACM, the number of tuples in the relation with ages in the range of 35≦Age<40 is 283 and the estimate for the number of employees having Age=48 is 6. Compare this with the rectangular ACM in Example 1.

Finding the result size of a selection query on a range-predicate is a discrete case of finding the area under a curve. Thus any numerical integration technique used to find the area under a curve will fit our purpose well. More accurate and sophisticated methods such as Simpson's Rule exist which may also be used. The trapezoidal method, however, is relatively easy to use in a DBMS setting and is much superior to the traditional equi-width and equi-depth histograms currently in use. In addition to providing more accurate result estimation on selection queries on range predicates, it also gives better results on equality-match predicates.

5.2.1 Generating Trapezoidal ACM

Unlike the R-ACM, where the sector widths are variable, preferably, the sector widths of a T-ACM are all equal. Each sector or cell of a T-ACM stores the modeled frequency values of the first and last attribute values in that sector, which naturally leads to the number of tuples in the sector. Method Generate_T-ACM partitions the value range of attribute X into s equal width sectors of the T-ACM. The input to the method is the number of partitions, s. The frequency distribution is assumed to be available in an integer array A, which has a total of L entries for each of the L distinct values of X. Note that the input can also be an equi-width histogram. For simplicity, assume that the attribute values are ordered integers from 0 to L−1. The output of the method is the T-ACM for the given attribute value set. Since choosing the starting frequency value of the first trapezoidal sector is important for obtaining the subsequent $a_j$'s and $b_j$'s, it is discussed it below.

5.2.2 Determining the First Frequency Value, $\alpha_1$

Once the frequency of the first attribute value of the first sector of a T-ACM is known, the subsequent $a_j$'s and $b_j$'s are easily obtained following the method. Below are some of the methods for obtaining this quantity:
(1) $\alpha_1$ is a user-defined frequency value.
(2) $\alpha_1$ is obtained using the average of all the frequencies in the given attribute value domain.
(3) Use the frequency value from (2) above as the starting frequency of the first sector and compute all the $a_j$'s and $b_j$'s in a left-to-right manner. Again use the frequency value from (2) above as the terminal frequency of the last sector and compute all the $a_j$'s and $b_j$'s in a right-to-left manner. One possibility is to assign $\alpha_1$ to be the average of the first frequency values resulting from these two methods.

Here are two lemmas that are used in the process of generating a T-ACM.

Lemma 22 For each sector in the T-ACM, the number of tuples, $n_j$, is equal to, $$n_j = \left(\frac{a+b}{2}\right) \cdot l,$$

where a, b are the frequencies of the first and last attribute value in the sector and l is the number of distinct values in the sector.

Proof: This can be easily shown using the geometry of the trapezoidal sector.

This lemma is important because ensuring that $n_j$ is close to (a+b)l/2 would provide us the desired accuracy using trapezoidal approximation. Of course this need not be so when a and b are approximated.

Let $a_j$ be the frequency of the first attribute value in the $j^{th}$ sector. The first frequency value of the first sector, $\alpha_1$ is chosen to be either the actual frequency of the attribute value (i.e: $\alpha_1 = x_1$) or the average frequency of the entire attribute value range $$\left(i.e: a_1 = \frac{N}{sl}\right).$$

The subsequent values for $a_j, 2 \leq j \leq s$, do not need to be stored explicitly and can be obtained using Lemma 23.

Method 3 Generate_T-ACM

Input: No of sectors, s, frequence distrib.of X as A[0 ... L−1]

Alternatively, input can also be an equi-width histogram.

Output: T-ACM begin

Initialize_ACM;    /* set all entries in ACM to zero */

$$ACM[1] \cdot a := \frac{\sum_{i=0}^{L-1} A[i]}{L};$$ /* set $a_1$ to average frequency */ for j := 1 to s do    /* for every sector */ for i := 1 to l do    /* for every attrib. value */

ACM[j]·n := ACM[j]·n + A[(j−1)∗l+i];

end; {for} if(j > 1) then ACM[j]·a := ACM[j−1]·b;

ACM[j]·b := 2∗ACM[j]·n/l − ACM[j]a;

end; {for} end

End Generate_T_ACM;

Lemma 23 If the frequency of the first attribute value of the first sector of a T-ACM is $\alpha_1$, then the frequency of the first attribute value of the $j^{th}$ T-ACM sector, $a_j$, $2 \leq j \leq s$, is given by, $$a_j = (-1)^{j-1} \frac{2}{l} \left\{ a_1 + \sum_{k=1}^{j-1} (-1)^k n_k \right\}$$

where $n_k$ is the number of tuples in the $k^{th}$ sector.

Proof: Given the frequency of the first attribute value in a T-ACM sector, the frequency of the last attribute value in that sector is obtained by using Lemma 22. Hence the following first and last frequency values $a_j$'s and $b_j$'s for a T-ACM result.

$$a_1 = a \qquad\qquad b_1 = \frac{2n_1}{l} - a$$

$$a_2 = b_1 = \frac{2n_1}{l} - a \qquad\qquad b_2 = \frac{2n_2}{l} - a_2$$

$$\vdots \qquad\qquad\qquad \vdots$$

$$a_j = b_{j-1} = (-1)^{j-1} \frac{2}{l}\left\{a_1 + \sum_{k=1}^{j-1}(-1)^k n_k\right\} \quad b_j = \frac{2n_j}{l} - a_j$$

Hence the lemma.

In practice, $a_j$ is easily obtained from $a_{j-1}$ as shown in the Method 3. $\alpha_1$ is obtained by averaging the frequency values of the entire attribute range. Note that each entry of the ACM array is a record with three fields, namely n, a, b, which store the number of tuples, the frequency of the first value and the frequency of the last value in the sector respectively. Alternatively, other values providing same or similar information are used.

It is obvious that the method, Generate_T-ACM generates the T-ACM corresponding to the given frequency value set. Assuming the frequency distribution of X is already available in array A, the running time of the method Generate_A-ACM is O(L) where L is the number of distinct attribute values.

5.2.3 Density Estimation Using Trapezoidal ACM

Consider a trapezoidal ACM sector of sector width l with $n_j$ tuples. Assume that the tuples in this sector occur according to a trapezoidal probability distribution. In other words, the number of occurrences of the attribute values is not uniform, but it increases or decreases from the left most value a to the right most value b in the sector in a linear fashion as shown for example in FIG. 27 (a).

Since the probability of a given attribute value $X_i$ occurring is the number of occurrences of $X_i$ divided by the total number of tuples $n_j$, the probability mass function (pmf) $px_i(x_i)$ is sketched as shown in FIG. 27 (b).

Lemma 24 The probability of a given value $X_i$ occurring in the trapezoidal sector is, $$px_i(x_i) = \frac{a_j}{n_j} + \frac{2(n_j - a_j l)}{n_j l(l-1)} \cdot i \quad 1 \leq i \leq l-1 \quad (12)$$

where $a_j$ is the frequency for the first attribute value in the $j^{th}$ sector.

Proof: From the geometry of FIG. 27 (b), we know that $$p_{X_i}(x_i) = \frac{a_j}{n_j} + \frac{b_j - a_j}{n_j(l-1)} \cdot i \quad 1 \leq i \leq l-1$$

But, $b_j = \left(\frac{2n_j}{l} - a_j\right)$ from Lemma 22.

So, $p_{X_i}(x_i) = \frac{a_j}{n_j} + \frac{2(n_j - a_j l)}{n_j l(l-1)} \cdot i \quad 1 \leq i \leq l-1.$ This proves the lemma.

Lemma 25 The probability mass distribution for the frequencies of the attribute values in a T-ACM is a Binomial distribution with parameters $(n, px_i(x_i))$.

Proof: Consider an arbitrary permutation or arrangement of the n tuples in the sector. Suppose that value $X_i$ occurs exactly $x_i$ number of times, then all other (l-1) values occur a combined total $(n-x_i)$ times. Since the probability of $X_i$ occurring once is $px_i(x_i)$, where $px_i(x_i)$ is given by Lemma 24, the probability of this value not occurring is $(1-px_i(x_i))$. From hereafter, denote $px_i(x_i)$ simply as $p_i$ for convenience. Hence the probability of an arbitrary permutation of the n tuples, where the value $X_i$ occurs exactly $x_i$ number of times is, $$p_i^{x_i}(1-p_i)^{n-x_i}. \quad (13)$$

There are $(n/x_i)$ different permutations of the n tuples in the sector where $X_i$ occurs exactly $x_i$ number of times and all other values occur a combined total of $(n-x_i)$ times. Hence the probability that an arbitrary value $X_i$ occurs exactly $x_i$ number of times is, $$\binom{n}{x_i} p_i^{x_i}(1-p_i)^{n-x_i}. \quad (14)$$

In other words, each of the attribute values $X_1, X_2, \ldots, X_l$ forms a binomial distribution Binomial $(n, p_i)$ with a parameter determined by its location in the trapezoidal sector.

5.2.4 Maximum Likelihood Estimate Analysis for the Trapezoidal ACM

Theorem 12 For a one-dimensional trapezoidal ACM, the maximum likelihood estimate of the number of tuples for a given value $X_a$ of attribute X in the $k^{th}$ T-ACM sector is given by, $$\hat{x}_{ML} = a_k + \frac{2(n_k - a_k l)}{l(l-1)} \cdot z_\alpha$$

where $n_k$ is the number of tuples in the $k^{th}$ T-ACM sector, $a_k$ is the frequency of the first attribute value in the $k^{th}$ sector, l is the number of distinct attribute values (or width) of the T-ACM sectors and $X_a$ is the $z_a^{th}$ value in the T-ACM sector.

Proof: The proof of the theorem follows closely the analysis given for Theorem 1. The difference however is that the parameters of the Binomial distribution vary with the location of the attribute values. The details are omitted in the interest of brevity.

Thus using the arguments given in the proof for Theorem 1, $\hat{x}_{ML}$ of x is obtained as, $$\hat{x}_{ML} = n_k p.$$

But the probability of the $z_a^{th}$ attribute value, $X_a$, occurring in a T-ACM sector is given by, $$p_{X_\alpha}(x_\alpha) = \frac{a_k}{n_k} + \frac{2(n_k - a_k l)}{n_k l(l-1)} \cdot z_\alpha$$

where $a_k$ is the frequency of the first attribute value in the $k^{th}$ sector. So, $$\hat{x}_{ML} = a_k + \frac{2(n_k - a_k l)}{l(l-1)} \cdot z_\alpha.$$

Hence the theorem.

In most of the cases, the maximum likelihood estimate, $\hat{x}_{ML} = np$, which is derived using the Gamma function above is not an integer. In fact, the maximum likelihood estimate reaches its upper limit of np at integer values only in very special cases. The integer maximum likelihood value which is related to the above maximum likelihood estimate is determined by discretizing the space. For the analogous discrete case, the following therorem is given.

Theorem 13 For a one-dimensional trapezoidal ACM, the maximum likelihood estimate of the number of the tuples for a given value $X_i$ of attribute X falls within the range of, $$\frac{a_k}{n_k} + \frac{2(n_k - a_k l)}{n_k l(l-1)} \cdot z_\alpha(n_k+1) - 1 \leq \hat{x}_{ML} \leq \frac{a_k}{n_k} + \frac{2(n_k - a_k l)}{n_k l(l-1)} \cdot z_\alpha(n_k+1),$$

where $a_k$ is the frequency of the first attribute value in the $k^{th}$ sector, $n_k$ is the number of tuples in the $k^{th}$ sector containing the value $X_i$ and l is the width of that sector.

Proof: The proof of this theorem follows closely that of Theorem 2, so the details are omitted in the interest of brevity. Using the arguments from the proof of Theorem 2, $$p(n+1)-1 < x < p(n+1).$$

Since $$p = \frac{a_k}{n_k} + \frac{2(n_k - a_k l)}{n_k l(l-1)} \cdot z_\alpha,$$

the theorem follows.

5.2.5 Expected and Worst-Case Error Analysis for the T-ACM

The maximum likelihood estimation of the frequency of an attribute value shows that the attribute value would have a frequency of $\hat{x}_{ML}$ with high degree of certainty when compared to the other possible frequency values. But even though the attribute value occurs with the maximum likelihood frequency with high probility, it can also occur with other frequencies with smaller probabilities. Hence, the worst-case and average-case errors for the result size estimations is considered. First the expected value of the frequency of a given attribute value is obtained. Using the Binomial model for the T-ACM sector, the expected value of the frequency of an attribute value is found as given in the following lemma and a series of results is developed regarding the correponding query result-size estimates.

Lemma 26 Using a trapezoidal approximation, the expected number of tuples for a given value $X_i$ of attribute $X$ is, $$E(X_i) = a_j + \frac{2(n_j - a_j l)}{l(l-1)} \cdot i,$$

where $n_j$ is the number of tuples in the sector which contains value $X_i$ and $l$ is the sector width. The quantity $a_j$ is the number of occurences of the first attribute value in the $j^{th}$ sector.

Proof: The frequency distribution of attribute values in a T-ACM sector is a binomial distribution with parameters $(n, p_i)$ where $p_i$ is given by Lemma 24. Hence the expected value $E(X_i)$ is its mean, $$E(X_i) = n_j p_i = a_j + \frac{2(n_j - a_j l)}{l(l-1)} \cdot i$$

and the lemma follows.

5.2.6 Estimation Error with the Trapezoidal ACM

Lemma 27 the variance of the frequency of an attribute value $X_i$ in sector $j$ of a trapezoidal ACM is, $$\mathrm{Var}(X_i) = n_j p_i (1 - p_i), \text{ where } p_i = \frac{a_j}{n_j} + \frac{2(n_j - a_j l)}{n_j l(l-1)} \cdot i$$

Proof: The frequency distribution in a T-ACM sector is a binomial distribution with parameters $(n_j, p_i)$, where $p_i$ is given by Lemma 24. Hence the variance is $n_j p_i (1-p_i)$.

Lemma 28 The sector variance of the $j^{th}$ trapezoidal ACM sector is, $$Var_j = n_j - \frac{a_j(l+1)(a_j l - 2n_j)}{3 n_j (l-1)} - \frac{2 n_j (2l-1)}{3 l(l-1)}$$

where $a_j$ is the frequency of the first attribute value is the sector, $n_j$ is the number of tuples in the sector and $l$ is the sector width. ps Proof: Since the frequency values in the sector are assumed independent, summing up the variances of all frequency values in the sector will give us the expression for the variance of the entire sector. So, $$Var_j = \sum_{i=0}^{l-1} n_j p_i (1 - p_i)$$

$$= \sum_{i=0}^{l-1} n_j \left( \frac{a_j}{n_j} + \frac{2(n_j - a_j l)}{n_j l(l-1)} \cdot i \right) \left( 1 - \frac{a_j}{n_j} - \frac{2(n_j - a_j l)}{n_j l(l-1)} \cdot i \right).$$

Simplifying the above expression gives, $$Var_j = n_j - \frac{a_j(l+1)(a_j l - 2n_j)}{3 n_j (l-1)} - \frac{2 n_j (2l-1)}{3 l(l-1)}$$

and the lemma follows

Lemma 29 The variance of a T-ACM is given by, $$Var(ACM) = \sum_{j=1}^{s} Var_j$$

where $s$ is the number of sectors in the T-ACM, and $Var_j$ is the sector variance given in Lemma 28.

Proof: The lemma follows directly from the fact that the frequency values in each sector are independent of each other and thus summing up the variances of all the sectors will give the overall variance which is also an estimate for the estimation error.

5.2.7 Self-join Error with the Trapezoidal ACM

Since query result sizes are maximized for self-joins, as in the case of the R-ACM, in this section self-join and error estimation with the T-ACM are consiered. Assuming that the duplicate tuples after the join are not eliminated, the following lemma, results.

Lemma 30 The error, $\epsilon$, resulting from a self-join of relation $R$ on attribute $X$ using a trapezoidal ACM is given by, $$\epsilon = \sum_{j=1}^{s} \left( \sum_{k=1}^{l} x_k^2 - n_j^2 + n_j Var_j \right)$$

where $s$ is the number of sectors in the T-ACM, and $n_j$ is the number of tuples in the $j^{th}$ sector and $Var_j$ is the variance of the $j^{th}$ sector in Lemma 28.

Proof: Since there are $L = sl$ distinct values for attribute $X$, the actual value, $\xi$ and expected value $\kappa$ of the join size are estimated, for example, as follows.

$$\xi = \sum_{i=1}^{L} x_i^2 = \sum_{j=1}^{s} \sum_{k=1}^{l} x_k^2.$$

The frequency of an arbitrary attribute value is computed from the T-ACM as the expected value $E(x_i)$, which is the average frequency of the T-ACM sector. Hence the result of self-joining this attribute value would be $[E(x_i)]^2$. Hence the size of the join computed by the T-ACM, $\kappa$, is, $$\kappa = \sum_{i=1}^{L} [E(x_i)]^2 = \sum_{j=1}^{s} \sum_{i=0}^{l-1} [E(x_i)]^2 \quad (15)$$

$$= \sum_{j=1}^{s} n_j^2 \sum_{i=0}^{l-1} p_i^2.$$

But the variance of the $j^{th}$ sector $Var_j$ is, $$Var_j = \sum_{i=0}^{l-1} n_j p_i (1 - p_i) = n_j - n_j \sum_{i=0}^{l-1} p_i^2$$

So, $\sum_{i=0}^{l-1} p_i^2 = 1 - \dfrac{Var_j}{n_j}.$

Substituting the above expression in Equation (15), $$\kappa = \sum_{j=1}^{s} (n_j^2 - n_j Var_j).$$

Hence the error in estimation of self-join is, $$\xi - \kappa = \sum_{j=1}^{s} \sum_{k=1}^{l} x_k^2 - \sum_{j=1}^{s} (n_j^2 - n_j Var_j)$$

$$= \sum_{j=1}^{s} \left( \sum_{k=1}^{l} x_k^2 - n_j^2 + n_j Var_j \right)$$

and the lemma is proved.

Corollary 4 The error, $\epsilon$, resulting from a self-join of relation R on attribute X using a trapezoidal ACM is given by, $$\epsilon = \sum_{j=1}^{s} \left( \sum_{k=1}^{l} x_k^2 - \frac{a_j(l+1)(a_j l - 2n_j)}{3(l-1)} - \frac{2n_j^2(2l-1)}{3l(l-1)} \right)$$

where $a_j$ is the frequency of the first attribute value in the $j^{th}$ sector.

Proof: The proof follows from substituting $Var_j$ in the previous lemma with the expression obtained in Lemma 28.

5.2.8 Worst Case Error with the Trapezoidal ACM

Theorem 14 The worst-case error, $\epsilon$, in estimating the frequency of an arbitrary attribute value $X_i$ in a trapezoidal ACM is, $$\epsilon = \begin{cases} a_j + \dfrac{2(n_j - a_j l)}{l(l-1)} i & \text{if } i < \dfrac{l(l-1)(n_j - 2a_j)}{4(n_j - a_j l)}, \\ n_j - a_j - \dfrac{2(n_j - a_j l)}{l(l-1)} i & \text{if } i \geq \dfrac{l(l-1)(n_j - 2a_j)}{4(n_j - a_j l)}. \end{cases}$$

Proof: The expected frequency of the attribute value $X_i$ reported as a result of the T-ACM is, $$\hat{\xi} = n_j \left( \frac{a_j}{n_j} + \frac{2(n_j - a_j l)}{n_j l(l-1)} i \right)$$

where $$\left( \frac{a_j}{n_j} + \frac{2(n_j - a_j l)}{l(l-1)} i \right)$$

is the probability that attribute value $X_i$ occurs in the T-ACM sector. But the actual frequency $\xi$ of attribute value $X_i$ can be anywhere in the range of, $$\leq \xi \leq n_j.$$

Hence the maximum worst case error is, $$\epsilon = max(\hat{\xi}, n_j - \hat{\xi}).$$

Whenever $$\hat{\xi} < \frac{n_j}{2},$$

the maximum worst case error occurs when the actual frequency $\xi$ is equal to $n_j$. The maximum worst case error in this case is $n_j - \hat{\xi}$. Whereas whenever $$\hat{\xi} \geq \frac{n_j}{2},$$

the maximum worst case error occurs when the actual frequency $\xi = 0$ The maximum worst case error in this case is $\hat{\xi}$. Whether the expected frequency value $\hat{\xi}$ is smaller or larger than $$\frac{n_j}{2}$$

depends on the location of the attribute value $X_i$ within the T-ACM sector. The location of the attribute value when the expected frequency $\hat{\xi}$ is equal to $$\frac{n_j}{2}$$

is obtained by solving, $$a_j + \frac{2(n_j - a_j l)}{l(l-1)} i = \frac{n}{2}$$

and is equal to, $$i = \frac{l(l-1)(n_j - 2a_j)}{4(n_j - a_j l)}.$$

The theorem follows from the above.

When estimating the sum of frequencies in an attribute value range, there are three distinct cases to consider. These are namely the cases when,
1. The attribute value range spans across one T-ACM sector.
2. The attribute value range falls completely within one T-ACM sector.
3. The attribute value range spans across more than one T-ACM sector.

In the first case, estimation using the T-ACM gives the accurate result ($n_j$) and there is no estimation error. The estimation error in the second case is given by the theorem below. The estimation error in the third case can be obtained by noting that it is in fact the combination of the first and second cases.

Theorem 15 The worst-case error, 68, in estimating the sum of frequencies between the attribute values of $X=X_\alpha$ and $X=X_\beta$, when these attribute values fall completely within a T-ACM sector, is given by, $$\epsilon = \begin{cases} n_j - A & \text{if } A < \frac{n_j}{2}, \\ A & \text{if } A \geq \frac{n_j}{2} \end{cases}$$

where A is the sum of the expected frequencies between the attribute values $X_\alpha$ and $X_\beta$ and is equal to, $$A = a_j(\beta - \alpha + 1) + \frac{(n_j - a_j l)(\beta - \alpha + 1)(\beta - \alpha + 2)}{l(l-1)}.$$

Proof: The sum of the expected frequencies between the attribute values $X_\alpha$ and $X_\beta$ within a T-ACM sector is, $$A = \sum_{i=\alpha}^{\beta} \hat{\xi} = \sum_{i=\alpha}^{\beta} \left( a_j + \frac{2(n_j - a_j l)}{l(l-1)} i \right)$$

$$= a_j(\beta - \alpha + 1) + \frac{(n_j - a_j l)(\beta - \alpha + 1)(\beta - \alpha + 2)}{l(l-1)}.$$

But the actual sum of frequencies $\xi$ between the attribute values $X_\alpha$ and $X_\beta$ is anywhere in the range of, $$0 \leq \xi \leq n_j.$$

Hence the maximum worst case error is, $$\epsilon = \max(A, n_j - A).$$

Whenever $$A < \frac{n_j}{2},$$

the maximum worst case error occurs when the actual sum of frequencies, $\xi$, is equal to $n_j$. The maximum worst case error in this case is $n_j - A$. Whereas whenever $$A \geq \frac{n_j}{2},$$

the maximum worst case error occurs when the actual sum of frequencies, $\xi = 0$. The maximum worst case error in this case is of course A. Hence the theorem.

5.2.9 Average Case Error with Trapezoidal ACM

In this section an estimate for the average-case error with a trapezoidal ACM is presented. The average case error is much smaller than the worst-case error. The average-case is synonymous with a truly random sector in which all attribute values have the same or approximately same frequency value equal to the mean sector frequency, $$\frac{n_j}{l}.$$

The average case error in estimating the freqeuncy of an arbitrary value $X_i$ is obtained by either of two different methods, depending on how the frequencies of the attribute values are averaged. In the first case, the expected frequency of all attribute values in the sector is obtained by averaging over the entire sector. In the second case, the average frequency of an attribute value is obtained by averaging all the possible frequencies that this particular attribute value can assume. The average case errors in these two situations are given below.

Theorem 16 Assuming that the T-ACM sector has been obtained by processing a histogram bucket of size l eith $n_j$ tuples, the average error in estimating the frequency of an arbitrary attribute value $X_i$, obtained by averaging over all attribute values in this sector of the trapezoidal ACM is exactly zero.

Proof: The expected frequency of the attribute values in the sector computed by the T-ACM can be obtained by averaging over the entire sector as, $$E(\hat{\xi}_i) = \frac{1}{l} \sum_{i=0}^{l-1} \hat{\xi}_i$$

$$= \frac{1}{l} \sum_{i=0}^{l-1} n_j \left( \frac{a_j}{n_j} + \frac{2(n_j - a_j l)}{n_j l(l-1)} i \right) = \frac{n_j}{l}$$

where $$\left( \frac{a_j}{n_j} + \frac{2(n_j - a_j l)}{n_j l(l-1)} i \right)$$

is the probability that attribute value $X_i$ occurs in the T-ACM sector. But, if we assume that the T-ACM sector has been obtained by processing an equivalent histogram bucket of size l with $n_j$ tuples, then the actual frequency $\xi_i$ of attribute value $X_i$ in the average case is equal to, $$\xi_i = \frac{n_j}{l}.$$

Hence the average case error obtained by averaging over the entire range is equal to, $$\epsilon = \hat{\xi}_i - \xi_i = \frac{n_j}{l} - \frac{n_j}{l} = 0.$$

The theorem follows.

Note that in the case of an R-ACM, the actual frequencies of the attribute values are controlled by the tolerance, τ. That is why in the R-ACM unlike the T-ACM, the average case error is not equal to zero. In a T-ACM, due to the geometry of the T-ACM sector, each of the negative estimation errors in the right half of the sector cancels out with the corresponding positive estimation error on the left half of the sector, thus resulting in an overall zero average case error when the expectation operation is carried out by averaging over the entire sector. Note that this will not be the case for an expectation at any one particular attribute value.

Theorem 17 The upper bound of the average-case error, $\epsilon$, in estimating the frequency of an arbitray arbitrary attribute value $X_i$ in a trapezoidal ACM is, $$\epsilon = a_j + \frac{2(n_j - a_j l)}{l(l-1)} \cdot i - \frac{n_j}{l}.$$

Proof: The expected frequency of the attribute value computed by the T-ACM is, $$\hat{\xi} = n_j \left( \frac{a_j}{n_j} + \frac{2(n_j - a_j l)}{n_j l(l-1)} i \right)$$

where $$\left( \frac{a_j}{n_j} + \frac{2(n_j - a_j l)}{n_j l(l-1)} i \right)$$

is the probability that attribute value $X_i$ occurs in the T-ACM sector. But assuming that the T-ACM sector has been obtained from an equivalent histogram bucket of size l with $n_j$ tuples, we note that, due to the uniformity assumption within the histogram bucket, the frequency $\xi_i$ of attribute value $X_i$ in this histogram bucket is equal to, $$\xi_i = \frac{n_j}{l}.$$

Hence the average-case error is equal to, $$\epsilon = \hat{\xi} - \xi = a_j + \frac{2(n_j - a_j l)}{l(l-1)} \cdot i - \frac{n_j}{l}.$$

The theorem follows.

As before inthe worst-case error analysis, when estimating the sum of frequencies in an attribute value range, three distinct cases are considered. The theorem given below deals with the case of the average-case error when attribute value range falls completely within one T-ACM sector. The case when the attribute value range spans across one entire T-ACM sector is trivial and does not result in any estimation error. The case when the attribute value range spans across more than one T-ACM sector are solved by decomposing it into the first two cases.

Theorem 18 The average-case error,$\epsilon$, in estimating the sum of frequencies between the attribute values of $X=X_\alpha$ and $X=X_\beta$, when these values fall completely within a T-ACM sector, is given by, $$\epsilon = \frac{(\beta - \alpha)(\alpha + \beta - 3)(n_j - a_j l)}{l - 1}.$$

Proof: In a random T-ACM sector, all the frequency values are approximately equal to the mean frequency value. This is shown in FIG. 28 along with the T-ACM frequency distribution that is used to approximate the acutal frequency distribution. The shaded area between the acutal and approximate frequency distribution represents the cumulative estimation error. Also both lines intersect at the center of the sector or at $$i = \frac{l-1}{2}.$$

Hence an estimate for the estimation error is, $$\epsilon = \frac{n_j}{l} \left( \frac{l-1}{2} - \alpha + 1 \right) - \sum_{i=\alpha}^{\frac{l-1}{2}} \left( a_j + \frac{2(n_j - a_j l)}{l(l-1)} \right) i +$$

$$\sum_{i=\frac{l-1}{2}}^{\beta} \left( a_j + \frac{2(n_j - a_j l)}{l(l-1)} \cdot i \right) - \frac{n_j}{l} \left( \frac{l-1}{2} - \beta + 1 \right)$$

$$= \frac{(\beta - \alpha)(\alpha + \beta - 3)(n_j - a_j l)}{l - 1}$$

and the theorem follow.

5.2.10 Comparison of Trapezoidal ACM and Equi-Width Histogram

The rationale for the trapezoidal ACM is that the trapezoidal rule for numerical integration provides a more accurate estimation of the area under a curve than the left-end or right-end histogram or rectangular rule based methods. This is formally given by the following lemma.

Lemma 31 If the estimation error for computing the sum of frequencies of all the attribute values falling between X=a and X=b, using the trapezoidal ACM is $Error_T$ and that of using the histogram method is $Error_H$, then $Error_T < Error_H$.

Proof: Without loss of generality, consider a continuous function f(x). (See FIG. 29.) Let A* and A** be the approximations to the area under the function f(x) between x=a and x=b by these two methods respectively. Also let $\epsilon_1$ and $\epsilon_2$ be the errors introduced by the trapezoidal ACM and histogram methods in the estimated areas A* and A** respectively. Hence, $$\epsilon_1 = A^* - \int_a^b f(x) dx \text{ and } \epsilon_2 = A^{**} - \int_a^b f(x) dx.$$

The histogram method, also known as the rectangular rule, and the tapezoidal ACM, also known as the trapezoidal rule are two well known numerical integratoin techniques to approximate the area under a curve. It can be shown that using the trapezoidal rule, the estimation error, $\epsilon_1$, has the following bounds.

$$\frac{(b-a)^3}{12n^2} M_2^* \le \epsilon_1 \le \frac{(b-a)^3}{12n^2} M_2.$$

Similarly it can be shown that using the rectangular rule, the estimation error, $\epsilon_2$, hs the following bounds.

$$\frac{(b-a)^3}{6n^2}M_2^* + \frac{b^2}{2n}M_1^* \leq \epsilon_2 \leq \frac{(b-a)^3}{6n^2}M_2 + \frac{b^2}{2n}M_1.$$

In both bounds, the quantities $M^*_1$, $M_1$ are the smallest and largest values for the first derivative of f and $M^*_2$, $M_2$ are the smallest and largest values for the second derivative of f between x=a and x=b. Hence it follows that $Error_T < Error_H$.

Claim 1 if the frequency estimation error for an arbitrary attribute value using the trapezoidal ACM is $Error_T$ and that of using the equi-width histogram with the same number of sectors is $Error_H$, then $Error_T < Error_H$.

Rationale: Assume the actual frequency of an arbitray attribute value $X_i$ is $\xi$. Let the frequencies computed by an equi-width histogram and a T-ACM with the same number of sectors be $\hat{\xi}_H$ and $\hat{\xi}_T$ respectively. Use $E[(\xi-\hat{\xi})^2]$ as the measure for comparing the errors resulting from the histogram and the T-ACM. So, $$E_H\left[(\xi-\hat{\xi}_H)^2\right] = E_H\left[\left(\xi-\frac{n}{l}\right)^2\right]$$

$$= E(\xi^2) - \left(\frac{n}{l}\right)^2$$

$$= \frac{\sum_{k=0}^{l-1}\sum_{i=0}^{n}\binom{n}{x_i}x_i^2 p_H^{x_i}(1-p_H)^{n-x_i}}{l} - \left(\frac{n}{l}\right)^2$$

where $p_H$ is the probability of selecting one of the l attribute values in the histogram sector and is equal to 1/l. Similarly, $$E_T\left[(\xi-\hat{\xi}_T)^2\right] = E(\xi^2) - \left[E(\hat{\xi}_T)\right]^2$$

$$= \frac{\sum_{k=0}^{l-1}\sum_{i=0}^{n}\binom{n}{x_i}x_i^2 p_{T_k}^{x_i}(1-p_{T_k})^{n-x_i}}{l} - \left(\sum_{k=0}^{l-1}a + \frac{\frac{2(n-al)}{l(l-1)}\cdot k}{l}\right)^2$$

$$= \frac{\sum_{k=0}^{l-1}\sum_{i=0}^{n}\binom{n}{x_i}x_i^2 p_{T_k}^{x_i}(1-p_{T_k})^{n-x_i}}{l} - \left(\frac{n}{l}\right)^2$$

where $p_{T_k}$ is the probability of selecting the $k^{th}$ attribute value in a trapezoidal sector and is equal to $$\frac{a}{n} + \frac{2(n-al)}{nl(l-1)}\cdot k.$$

Analytically providing that $$\sum_{k=0}^{l-1}\sum_{i=0}^{n}\binom{n}{x_i}x_i^2 p_H^{x_i}(1-p_H)^{n-x_i} >$$

$$\sum_{k=0}^{l-1}\sum_{i=0}^{n}\binom{n}{x_i}x_i^2 p_{T_k}^{x_i}(1-p_{T_k})^{n-x_i}$$

is difficult.

5.2.11 Result Estimation of Equality Select Using the T-ACM

Consider a relational query with an equality select predicate, $X=X_\alpha$, where $X_\alpha$ is a constant value in the domain of attribute X. The estimate of the result size of the query, $\sigma x=x_\alpha$ (R), where the attribute value $X_\alpha$ is in position $\alpha$ of the $k^{th}$ T-ACM sector is sought. The following lemma gives this estimate.

Theorem 19 an estimate obtained by using the expected value analysis for the size of the equality select query, $\sigma x=x_\alpha$ (R), using a T-ACM is, $$E(|\sigma_{X=X_\alpha}(R)|) = a_k + \frac{2(n_k - a_k l)}{l(l-1)}\cdot z_\alpha$$

where $n_k$ is the number of tuples in the $k^{th}$ T-ACM sector, $a_k$ is the frequency of the first attribute value in the $k^{th}$ sector, l is the number of distinct attribute values or width of the T-ACM sectors and $X_\alpha$ is the $z^{th}_\alpha$ value in the T-ACM sector.

Proof: This is a direct result form Theorem 12.

Since the result size estimates using the expected value and the maximum likelihood estimate are very similar, in the subsequent derivations, the estimate is referred to as the maximum likelihood estimate. As before, both the worst-case and average case errors in the above equality select estimation are analyzed. The following lemma gives the worst-case error in an equality select operation.

Lemma 32 The worst-case error, $\epsilon$, in estimating the equality select operation, $\sigma x=x_\alpha$ (R) in a T-ACM using the maximum likelihood estimate is given by, $$\epsilon = \begin{cases} a_k + \frac{2(n_k - a_k l)}{l(l-1)}z_\alpha & \text{if } z_\alpha < \frac{l(l-1)(n_k - 2a_k)}{4(n_k - a_k l)}, \\ n_k - a_k - \frac{2(n_k - a_k l)}{l(l-1)}z_\alpha & \text{if } z_\alpha \geq \frac{l(l-1)(n_k - 2a_k)}{4(n_k - a_k l)}. \end{cases}$$

where the attribute value $X_\alpha$ is in the $z^{th}_\alpha$ position within the $k^{th}$ T-ACM sector.

Proof: This is a direct result from Theorem 14.

The average-case error in estimating the result size of the equality selection query, $\sigma x=x_\alpha$ (R) is obtainable by two different methods, depending on how the frequencies of the attribute values are averaged. In the first case, the expected frequency of all attribute values in the sector is obtained by averaging over the entire sector. In the second case, the average frequency of an attribute value is obtained by averaging all the possible frequencies that this particular attribute value can assume. These are given in the following lemmas.

Lemma 33 Assuming that the T-ACM sector has been obtained by processing a histogram bucket of size l with $n_j$ tuples, the average error in estimating the result size of the equality selection query, $\sigma x=x_\alpha$ (R), obtained by averaging over all attribute values in this sector of the T-ACM is exactly zero.

Proof: This is a direct result from Theorem 16.

Lemma 34 The upper bound of the average-case error, $\epsilon$, in the maximum likelihood estimate of the equality selection query, $\sigma x=x_\alpha$ (R) in a trapezoidal ACM is given by, $$\epsilon = a_k + \frac{2(n_k - a_k l)}{l(l-1)}\cdot z_\alpha - \frac{n_k}{l}$$

where $a_k$ is the frequncy of the first attribute value in the $k^{th}$ sector and $X_\alpha$ is in the $z^{th}_\alpha$ position of the T-ACM sector.

Proof: This is a direct consequence of Theorem 17.

5.2.12 Result Estimation of Range Select Using the T-ACM

Theorem 20 The maximum likelihood estimate for the range select query $\sigma x \leq x_\alpha$ (R) using a T-ACM is given by, $$S_{ML}(\sigma_{X \le X_\alpha}(R)) = \sum_{j=1}^{k-1} n_j + \alpha a_k + \frac{\alpha(\alpha+1)(n_k - a_k l)}{l(l-1)}$$

where $a_k$ is the frequency of the first atribute value in the $k^{th}$ sector.

Proof: The attribute vales which satisfy the query $\sigma x \le x_\alpha$ (R) occupy the first k−1 T-ACM sectors and up to and including the $\alpha^{th}$ T-ACM sector. Hence the query result size is found by summing up the number of tuples in the first k−1 sectors of the T-ACM and the estimate of the number of tuples for the first $\alpha$ attribute values in the $k^{th}$ sector of the T-ACM. The maximum likelihood estimate of the tuples for the first $z_\alpha$ attribute values in the $k^{th}$ sector are found.

Assume that the frequencies of the first $z_\alpha$ attribute values in the $k^{th}$ R-ACM sector are $x_1, x_2, \ldots, x_{z_\alpha}$. Obtain a likelihood function on these frequencies by considering their join probability mass functions. But instead, without loss of generality, consider the join probability mass function for the first two attribute values. So a likelihood function is written as, $$\mathcal{L}(x_1, x_2) = \binom{n_k}{x_1} p^{x_1}(1-p)^{n_k-x_1} \binom{n_k}{x_2} p^{x_2}(1-p)^{n_k-x_2}$$

$$= \binom{n_k}{x_1}\binom{n_k}{x_2} p^{x_1+x_2}(1-p)^{2n_k-(x_1+x_2)}.$$

Taking natural logarithm on both sides of the likelihod function and then taking the partial derivative of $\ln \mathcal{L}(x_1, x_2)$ with respect to $x_1$.

$$\frac{\partial \{\ln \mathcal{L}(x_1, x_2)\}}{\partial x_1} = \ln p - \ln(1-p) + \sum_{r=x_1+1}^{n_k-x_1} \frac{1}{r}.$$

Setting $$\frac{\partial \{\ln \mathcal{L}(x_1, x_2)\}}{\partial x_1} = 0,$$

and noting that $$\sum_{r=x_1+1}^{n_k-x_1} \frac{1}{r} \le \ln\left(\frac{n_k - x_1}{x_1}\right),$$

$\hat{x}_{ML}$ of $x_1$ is obtained as, $$\frac{p(n_k - x_1)}{(1-p)x_1} \ge 1 \text{ or } \hat{x}_{ML} = n_k p = \frac{n_k}{l_k}.$$

Similarly, finding $$\frac{\partial \{\ln \mathcal{L}(x_1, x_2)\}}{\partial x_1}$$

and setting it to zero, the maximum likelihood estimate for $x_2$ as $\hat{x}_{ML} = \frac{n_k}{l_k}$.

Hence considering the join probability mass fucntion of all other attribute values in this sector, each of their maximum likelihood estimate is equal to $$\hat{x}_{ML} = \frac{n_k}{l_k}.$$

Thus the maximum likelihood estimate of the number of tuples for the first $z_\alpha$ attribute values is equal to, $$\sum_{i=1}^{z_\alpha} \frac{n_k}{l_k} = \frac{z_\alpha n_k}{l_k}.$$

Hence the maximum likelihood estimate for the range select query $\sigma x \le x_\alpha$ (R) is given $$S_{ML}(|\sigma_{X \le X_\alpha}(R)|) = \sum_{j=1}^{k-1} n_j + \alpha a_k + \frac{\alpha(\alpha+1)(n_k - a_k l)}{l(l-1)}$$

Hence the theorem.

Using Theorem 15, the above estimate for the range select operation has the following worst-case estimation error:

$$\epsilon = \begin{cases} n_k - A & \text{if } A < \frac{n_k}{2}, \\ A & \text{if } A \ge \frac{n_k}{2} \end{cases}$$

where A is the estimated number of tuples that are less than the attribute value, $X_\alpha$, and is equal to, $$A = \alpha a_k + \frac{\alpha(\alpha+1)(n_k - a_k l)}{l(l-1)}.$$

where $a_k$ is the frequency of the first attribute value in the $k^{th}$ sector.

Similarly, using Theorem 18, we obtain the following estimate for the average-case error.

$$\epsilon = \frac{(\alpha-1)(\alpha-2)(n_k - a_k l)}{l-1}$$

where $a_k$ is the frequency of the first attribute value in the $k^{th}$ sector.

Theorem 21 The maximum likelihood estimate of the result size for the range selection query $\sigma x_\alpha \le x \le x_\beta$ (R), where the attribute values $X_\alpha$ and $X_\beta$ fall completely within the $k^{th}$ T-ACM sector is given by, $$S_{ML}(\sigma_{X_\alpha \le X \le X_\beta}(R)) = (\beta - \alpha + 1)\left\{a_k + \frac{(\beta + \alpha)(n_k - a_k l)}{l(l-1)}\right\}$$

where $a_k$ is the frequency of the first attribute value in the $k^{th}$ sector and $\beta > \alpha$.

Proof: The maximum likelihood value of the number of tuples in the $i^{th}$ attribute value $X_i$ of the $k^{th}$ T-ACM sector is given by, $$\hat{x}_{ML_i} = a_k + \frac{2(n_k - a_k l)}{l(l-1)} \cdot i.$$

Hence the maximum likelihood number of tuples falling in the range of $X_\alpha \leq X \leq X_\beta$ is, $$S_{ML}(\sigma_{X_\alpha \leq X \leq X_\beta}(R)) = \sum_{i=\alpha}^{\beta} \left(a_k + \frac{2(n_k - a_k l)}{l(l-1)} \cdot i\right)$$

$$= (\beta - \alpha + 1)\left\{a_k + \frac{(\beta + \alpha)(n_k - a_k l)}{l(l-1)}\right\}$$

and the theorem follows.

The following lemmas give estimates for the worst-case and average-case errors in the above select operation.

Lemma 35 The worst-case error in estimating the result size of the selection query, $\sigma x_\alpha \leq x \leq x\beta$ (R), where the attribute values $X_\alpha$ and $X_\beta$ fall completely within the $k^{th}$ T-ACM sector is given by, $$\epsilon = \begin{cases} n_k - \mathcal{A} & \text{if } \mathcal{A} < \frac{n_k}{2}, \\ \mathcal{A} & \text{if } \mathcal{A} \geq \frac{n_k}{2} \end{cases}$$

where A is the expected number of tuples between the attribute values $X_\alpha$ and $X_\beta$ and is equal to, $$A = a_k(\beta - \alpha + 1) + \frac{(n_k - a_k l)(\beta - \alpha + 1)(\beta - \alpha + 2)}{l(l-1)}.$$

Proof: This is a direct consequence of Theorem 15.

Lemma 36 The average-case error in estimating the result size of the selection query, $\sigma x_\alpha \leq x \leq x_\beta$ (R), where the attribute values $X_\alpha$ and $X_\beta$ fall completely within the $k^{th}$ T-ACM sector is given by, $$\epsilon = \frac{(\beta - \alpha)(\alpha + \beta - 3)(n_k - a_k l)}{l - 1}$$

where $\beta > \alpha$.

Proof: This is a direct consequence of Theorem 18.

5.2.13 Size Estimation of the Join Operation Using the T-ACM

Let $L_x$ and $L_y$ by the number of distinct attribute values in attributes X and Y respectively. Evaluating the equi-join operation, $R \bowtie_{x=y} S$ involves finding the matching attribute value $Y_q$ of relation S for every attribute value $X_p$, $1 \leq p \leq L_x$, of relation R. Since the attribute value domain in the T-ACM is already in an ascending order, this turns out to be a linear operation.

Method 4 Locate_Matching_Tuple $(X_i, j)$

Input: Attribute value, $X_i$, from the first T-ACM and location j of the current pointer into the second T-ACM.

Output: Location, j, of the matching attribute value, $Y_j$, from the second T-ACM.

begin while $(X_i \leq V[j])$ and $(j \leq L_y)$ do j++;

if $X_i = V[j]$ then return (j);/* location of mathcing tuple */ else return (-1);/* there is no matching tuple */end;

End Locate_Matching_Tuple;

The method Locate_Matching_Tuple $(X_i)$, given below, returns the location of the matching attribute value in the joining T-ACM. The array $V[0 \ldots L_y]$ maintains the value domain of the joining attribute Y. Note that the search for the matching tuple does not have to start from the first location of the T-ACM. Since the current attribute value $X_i$, i>0, is always larger than the previous attribute value $X_{i-1}$, it is sufficient to begin the search for the matching tuple from where the previous search ended. Indeed, the philosphy of the traversal is analogous to merge-sort, where the "sortedness" of the individual values is taken advantage of.

It is possible to estimate the size of $R \bowtie_{X=Y} S$, where X and Y are domain compatible attributes, using the following method, Estimate_Join_Using_T-ACM. This method works in the following manner. For every attribute value, $X_p$, of attribute X in relation R, the matching attribute value, $Y_q$, of attribute Y is found using the method, Locate_Matching_Tuple. The corresponding sector index k and the location $\beta$ of the attribute value $Y_q$ within this sector are computed, and then the estimated result size of the selection queries $E(\sigma x = x_p)$ and $E(\sigma Y = Y_q)$ are computed.

Method 5 Estimate_Join_Using_T-ACM

Input: T-ACMs for attributes X and Y.

Output: Estimated join size of the query $R \bowtie_{X=Y} S$.

begin $\hat{\xi}_{XY} = 0$;

for p=1 to $L_x$ do j=p div $l_x$;/* index of the sector where $X_p$ falls */ $\alpha$=p mod $l_x$;/* location of $X_p$ within the sector */

$$\hat{\xi}_X = a_j + \frac{2(n_j - a_j l_X)}{l_X(l_X - 1)} \cdot \alpha;$$

q=Locate_Matching_Tuple $(X_p$, current_ptr);

k=q div $l_y$;/* index of the sector where $Y_q$ falls */

$\beta$=q mod $l_y$; /* location of $Y_q$ within the sector */

$$\hat{\xi}_Y = a_k + \frac{2(n_k - a_k l_Y)}{l_Y(l_Y - 1)} \cdot \beta;$$

$\hat{\xi}xy = \hat{\xi}xy + \hat{\xi}x \times \hat{\xi}y$;

endfor;

and;

End Estimate_Join_Using_T-ACM;

5.2.14 Estimation of Join Error

As in the case with the R-ACM, the estimation error resulting from the size estimation using a T-ACM of an equality join of two attributes are usually much higher than the estimation errors resulting from the equality select and range select operations. The estimation error $\epsilon$ is equal to, $$\epsilon = |(\hat{x}_i \epsilon_y + \hat{y}_j \epsilon_x + \epsilon_x \epsilon_y)|$$

where $\epsilon_x$ and $\epsilon_6$ are the estimated errors resulting from the quality selection queries $\sigma X = X_i$ and $\sigma X = Y_j$ respectively. Substituting the average-case and worst-case errors of equality selection queries that we obtained earlier for $\epsilon_x$ and $\epsilon_y$, to obtain the average-case and worst-case errors of equi-join estimations.

5.2.15 Case for ACM as a Better Estimation Tool

As discussed earlier, the current state of the art estimation techniques use either parametric techniques or sampling based techniques, including probabilistic and non-parametric techniques.

5.2.16 Comparison of ACM and the Current State of the Art

Parametric vs ACM: Estimations based on ACM is advantageous over parametric techniques, because ACM does not make any assumptions about the underlying data distribution. Parametric techniques, on the other hand, approximate the actual data distribution by a parameterized mathematical distribution, such as the uniform distribution, multivariate distribution or Zipf distribution. Obviously the accuracy of the approximation depends heavily on the similarity between the actual and parameterized distribution. Since real data often does not resemble any simple mathematical distribution, such approximations are prone to cause higher inaccuracies.

For example, System R query optimizer assumes that the data distribution is uniform over the entire value domain D. Example 4 compares the selection results based on the System R's uniform parametric model and that of rectangular ACM for a small relation. Note that the estimation using the rectangular ACM is closer to the actual result, 3, since the uniformity assumption is made only within a sector.

With the Rectangular ACM, in addition to the assumption that the data distribution is uniform only within each sector, the frequency values within each sector are assured to be within a given tolerance value to the running mean. This eliminates the problem of widely different frequency values within a sector. With the trapezoidal ACM, data distribution is assumed to take a trapezoidal probability distribution, following the actual distribution very closely within each sector. Experiments also confirm that both the rectangular and trapezoidal ACMs provide a much more accurate result size estimations both in selection and join queries. Thus by appropriately choosing a suitable tolerance value in the case of R-ACM and a suitable number of sectors in the case of T-ACM, one can obtain a very close approximation to be underlying data distribution and the desired accuracy in the result estimation.

EXAMPLE 4

Consider a small relation R(A,B) with total number of tuples, $N_R=11$, selection cardinality of attribute A, $\phi(A,R)=1.38$, and number of distinct values of attribute A, $\delta(A,R)=8$. If the number of tuples with A=5 is estimated, using both $\phi(A,R)$ and its rectangular ACM, the results are given below. Note that in this example the Rectangular ACM happens to be an equi-width rectangular ACM.

| A | B |
|---|---|
| 5 | 31 |
| 5 | 39 |
| 5 | 42 |
| 6 | 37 |
| 6 | 39 |
| 7 | 12 |
| 8 | 13 |
| 9 | 12 |
| 10 | 39 |
| 11 | 53 |
| 12 | 59 |

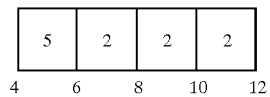

Using $\phi(A, R)$, the number of values when A = 5 is 1.38

Using the ACM, there are 5 tuples for the values of A = 5 and 6. Hence the expected value of A = 5 is 5/2 = 2.5

Sampling vs ACM: Estimations based on ACM is advantageous to sampling techniques. Sampling based methods are mainly designed for run time. Because of this they incur disk I/Os and CPU overheads during query optimization. Moreover the information gathered is not preserved across queries and hence they may incur the costs repetitively. The accuracy of the results mainly depends on the sampling method used and the size of the sampled population. ACM, both rectangular and trapezoidal, on the other hand, maps the entire tuples over the value range of the attribute(s) hence is much more accurate than any sampling method. Since the ACMs of the base relations are not built during run-time, they do not incur the disk I/Os and CPU overhead at the time of query optimization.

Histogram vs ACM: Estimation based on ACM is superior to histogram based techniques. Both R-ACM and T-ACM are improved histogram-like strategies. By using a tolerance value, the frequency values in each R-ACM sector are guaranteed to be close to the running mean frequency. Similarly, in the T-ACM, the trapezoidal sectors very closely follow the actual data distribution, so the estimation errors are minimized. In addition, histograms are usually constructed based on sampling the data distribution, and their accuracy heavily depends on the type of sampling methods and the size of sampling population used. But ACMs are constructed to map the entire data distribution, providing further accuracy. The following example illustrates why the R-ACM is better than the equi-width histogram.

EXAMPLE 5

Consider a hypothetical distribution of attribute age in a relation with N=100 tuples. Assume that age ranges from 20 to 70. Construct an equi-width histogram for this relation with $m_x=10$ equi-width sectors as shown in the figure below.

From the figure, it is observed that the selectivity $\xi_{age<37}$ (i.e: the percentage of the employees who are younger than 37) is, $$0.42 \leq \xi_{age<37} \leq 0.80.$$

The actual fraction of tuples with age<37 can be anywhere between 0.42 to 0.80. If the estimate of $\xi_{age<37}$ is assumed to be the mid-point of this range (i.e: 0.61), then it is obvious that the estimate can be wrong by nearly 0.19.

In general, the maximum error in estimating the result size of $\xi_{X<A}$, where A is a constant, is half the value of the sector in which X falls. For an unlucky distribution of attribute values where the cell with the largest value contains almost 100% of the tuples, a selectivity estimate from an equi-width histogram can be wrong by almost 0.5. It should be noted that such a situation is very common with real world databases.

Hence from this example, the way to control the maximum estimation error is to control the number of tuples or height in each sector so as to maintain the frequencies of every value close to a certain height. This is easily achieved by choosing a suitable tolerance value and forcing the values in every sector to not exceed it, as is done in the rectangular ACM.

A comparison of the worst-case and average-case estimation errors of the traditional equi-width, equi-depth histograms and the new histogram-like techinques proposed here is prepared in Table 16.

TABLE 16

Comparison of Histogram Errors

| Histogram Type | Worst-case Error | Average-case Error |
|---|---|---|
| Equi-width | $\max\left(n_j - \frac{n_j}{l}, \frac{n_j}{l}\right)$ | $\max\left(n_j - \frac{n_j}{l}, \frac{n_j}{l}\right)$ |
| Equi-depth | $\frac{2n_j}{3l_j}$ | $\frac{n_j}{2l_j}$ |
| R-ACM | $\tau\left\|\ln\left(\frac{l_j}{i-1}\right) - 1\right\|$ | $2\tau$ |

TABLE 16-continued

Comparison of Histogram Errors

| Histogram Type | Worst-case Error | Average-case Error |
|---|---|---|
| T-ACM | $\max\left(a_j + \dfrac{2(n_j - a_j l)}{l(l-1)}i,\right.$ | $a_j + \dfrac{2(n_j - a_j l)}{l(l-1)}i - \dfrac{n_j}{l}$ |
|  | $\left. n_j - a_j - \dfrac{2(n_j - a_j l)}{l(l-1)}i \right)$ | |

5.2.17 Maintaining ACMs in the DBMS Catalogue

A major drawback of traditional histograms is that they are mostly generated at run-time during query optimization incurring a high I/O cost. One of the practical advantages of ACMs is that both the types of ACMs defined are easily created and maintained in the DBMS catalogue with only a minimal storage requirement. Looking from an implementation point of view, storing an integer array with a few hundred or thousand entries require only a few kilobytes of disk storage. Unlike the late 1970s and early 80s when the disk storage was considered to be a premium, the 1990s have seen technology yielding unprecedentedly huge storage capacities along with a dramatic drop in the cost of disk storage.

Since a relation with several million tuples can be mapped to an ACM with a few hundred or few thousand entries, and considering that the current technology has made very large capacity and low cost disks possible, ACMs for an entire DBMS can be easily materialized in the catalogue. Even for a complex database, with 100 relations and say 500–1000 distinct attributes, the cost of storing the ACMs would be less than one megabyte, which is less than 0.01% of the size of a typically large database with ten gigabytes of data.

In most commercial database systems, the DBMS catalogue is designed as part of the query optimizer module. Thus storing ACMs in the DBMS catalogue is a natural choice as it would reduce the communication costs. For the intermediate relations resulting from relational operations, the query optimizer constructs the ACMs in the main memory for further optimization.

5.2.18 Experiments Using Synthetic Data

These experimental results based on synthetic data demonstrate the validity of the theoretical results that were presented here, and also set out some advantageous of the T-ACM over the traditional equi-width and equi-depth histograms.

Three distinct sets of experiments on the T-ACM of synthetic data were performed as follows. In the first set of experiments, the actual estimation errors of both the selection and join operations using the T-ACM on various synthetic data distributions were calculated such as:
1. uniform data distribution,
2. Zipf data distribution, and
3. multi-functional distribution.

In the second set of experiments, the variances of the T-ACM and the corresponding percentage estimation errors for various equi-select, range-select and equi-join operations were computed.

The scope of the third set of experiments included a performance comparison study of the T-ACM and the traditional equi-width and equi-depth histograms. As in the case of the experiments with the R-ACM, this set of experiments was performed with various synthetic data distributions for both select and join operations.

5.2.19 Queries Used in the Experiments

As in the case of the experiments with the R-ACM, the following experiments on the T-ACM, included queries that use both the select and join operations.

For estimating the result sizes of select operations, two types of select operations, namely the exact-match select and the range select were used. The exact-match select

TABLE 17

Estimation Accuracy of the T-ACM under Uniform Distribution

| Operation | Actual Size | Estimated Size | Percentage Error |
|---|---|---|---|
| Equi-select | 107 | 112.15 | 4.81% |
| Range-select | 4028 | 3948.64 | 1.97% |
| Equi-join | 395602 | 435795.16 | 10.16% | operation, denoted $\sigma_{x=x_i}(R)$, retrieves all the tuples from the relation R, for which the attribute X has the value $X_i$. The range select operation retrieves all the tuples falling within an attribute value range. For example, the query $\sigma_{x \geq x_i}(R)$, retrieves all the tuples from the relation R, for which the attribute value X has values less than $X_i$. For the join operation, we used the most frequently encountered equi-join operation. The equi-join operation, denoted $R \bowtie_{X=Y} S$, combines all the tuples in the relations R and S whenever the value of attribute X from relation R is equal to the value of attribute Y from relation S.

5.2.20 Estimation Accuracy of the T-ACM under Various Synthetic Data Distribution In this set of experiments, the relative estimation errors for the selection and join operations under the above mentioned data distributions were computed. The relative estimation error was obtained as a ratio by subtracting the estimated size from the actual result size and dividing it by the actual result size. Obviously, the cases where the actual result sizes were zero were not considered for error estimation. The results were obtained by averaging the estimation errors over a number of experiments and are shown in Tables 17, 18, and 19 for the three different frequency distributions. A uniform attribute value domain was consistently used for this group of experiments.

TABLE 18

Estimation Accuracy of the T-ACM under Zipf Distribution

| Operation | Actual Size | Estimated Size | Percentage Error |
|---|---|---|---|
| Equi-select | 413 | 450.99 | 9.20% |
| Range-select | 1607 | 1693.62 | 5.39% |
| Equi-join | 298710 | 368667.88 | 23.42% |

TABLE 19

Estimation Accuracy of the T-ACM under Multi-fractal Distribution

| Operation | Actual Size | Estimated Size | Percentage Error |
|---|---|---|---|
| Equi-select | 98 | 104.24 | 6.37% |
| Range-select | 1813 | 1893.68 | 4.45% |
| Equi-join | 480662 | 563960.72 | 17.33% |

5.2.21 Estimation Accuracy and Variance of the T-ACM

The variance of the T-ACM under the uniform frequency distribution for equality-select, range-select and equi-join operations and the corresponding percentage estimation errors in this set of experiments were completed. The percentage estimation errors and the corresponding variance of the T-ACM are given in Table 20. Note that the row numbers I, II, and III correspond to equality-select, range-select and equi-join operations respectively.

TABLE 20

Variance of the T-ACM and the Estimation Errors, where I, II, and III denotes the equi-select, range-select and equi-join operations respectively.

| | | Estimated Result | | | Percentage Error | | |
|---|---|---|---|---|---|---|---|
| No | Size | $v = 1007$ | $v = 1196$ | $v = 1493$ | $v = 1007$ | $v = 1196$ | $v = 1493$ |
| I | 72 | 74.36 | 75.60 | 78.66 | 3.28% | 4.99% | 9.25% |
| II | 318 | 297.55 | 343.79 | 360.90 | 6.43% | 8.11% | 13.49% |
| III | 163 | 171.67 | 175.06 | 323.72 | 5.32% | 7.40% | 9.86% |

TABLE 21

Comparison of Equi-width, Equi-depth and T-ACM: Uniform Frequency Distribution

| | | Equi-width | | Equi-depth | | T-ACM | |
|---|---|---|---|---|---|---|---|
| Operation | Actual Size | Size | Error | Size | Error | Size | Error |
| Equi-select | 491 | 608.00 | 23.83% | 599.91 | 22.18% | 469.74 | 4.33% |
| Range-select | 20392 | 22251 | 9.12% | 21487 | 5.37% | 21054 | 3.25% |
| Equi-join | 489074 | 627482 | 28.3% | 591779 | 21.0% | 534362 | 9.26% |

TABLE 22

Comparison of Equi-width, Equi-depth and T-ACM: Zipf Frequency Distribution

| | | Equi-width | | Equi-depth | | T-ACM | |
|---|---|---|---|---|---|---|---|
| Operation | Actual Size | Size | Error | Size | Error | Size | Error |
| Equi-select | 191 | 305.22 | 59.8% | 287.26 | 50.4% | 218.35 | 14.32% |
| Range-select | 14560 | 18389.3 | 26.3% | 17457.4 | 19.9% | 15619.9 | 7.28% |
| Equi-join | 125606 | 210264 | 67.4% | 201221 | 60.2% | 153779 | 22.43% |

5.2.22 T-ACM and the Traditional Histograms

This group of experiments were conducted on both the traditional equi-width and equi-depth histograms and the T-ACM. In order to provide a fair comparison, a fixed amount of storage for all three techniques was used, thus varying the build parameters for the structures as required. The build parameter for both the equi-width histogram and the T-ACM is the sector width, whereas the build parameter for the equi-depth histogram is the number of tuples within the sector. As before the percentage estimation errors for the three type of queries, namely, (a) equality-select (b) range-select and (c) equi-join were computed. The experiments were again conducted for the uniform, Zipf and multi-frequency distributions. An analysis of the results follows.

TABLE 23

Comparison of Equi-width, Equi-depth and T-ACM: Multi-fractal Frequency Distribution

| | | Equi-width | | Equi-depth | | T-ACM | |
|---|---|---|---|---|---|---|---|
| Operation | Actual Size | Size | Error | Size | Error | Size | Error |
| Equi-select | 266 | 340.75 | 28.1% | 330.64 | 24.3% | 284.08 | 6.80% |
| Range-select | 24091 | 26668 | 10.7% | 26066 | 8.2% | 25091 | 4.15% |
| Equi-join | 398440 | 574550 | 44.2% | 545863 | 37.0% | 452508 | 13.57% |

5.2.23 Analysis of the Results

As in the case of the R-ACM, the results from the first group of experiments show that the estimation errors with the uniform data distribution are smaller than the corresponding errors with the Zipf and multi-fractal distributions. For example, the percentage estimation error for the equi-select operation using a uniform distribution is 4.81% (Table 17), whereas the percentage estimation errors for the same operation under the Zipf and multi-facial distributions are 9.20% (Table 18) and 6.37% (Table 19) respectively. This is obviously due to the fact that extreme frequency variations within the sectors of uniform data distribution are much lower than that with the Zipf and multi-fractal distributions. The frequency variations are the largest with the Zipf distribution, and consequently the estimation errors from the T-ACM are proportionately larger than that with other distributions.

The result from the second set of experiments show that the estimation accuracy is inversely proportional to the variance of the T-ACM for all three types of query operations considered. For example, considering the range-select query in row II of Table 20, we see that the percentage estimation error from the T-ACM with the variance of V=1007 is only 6.43%, whereas the percentage estimation error from the T-ACM with the variance of V=1493 is equal to 13.49%, which is more than a 100% increase.

The result from the third group of experiments show that the estimation error resulting from the T-ACM is consistently much smaller than the estimation errors from the equi-width and the equi-depth histograms. For example, from Table 21, the percentage estimation error with the T-ACM for equi-select operation on uniform frequency distribution is only 4.33%, whereas for the same operation, the equi-width and equi-depth histograms result in 23.83% and 22.18% estimation errors. This demonstrates that the estimation errors from the T-ACM are indeed a fraction of the estimation errors from the equi-width and equi-depth histograms and proves the superiority of the T-ACM over the traditional histograms. this behavior is observed with both the Zipf and multi-fractal distributions as well, and can be seen from the Tables 22 and 23. This is consequent to the fact that by rendering a trapezoidal approximation valid, the slope of the trapezoid would led to a structure superior to the traditional equi-width and equi-depth histograms where the slope has no bearing. Furthermore the experimental results show that the degree of approximation is much better with the T-ACM than the other techniques, since the average error, which is the error averaged over the entire sector, can be arbitrarily small.

6 Prototype Validation of the R-ACM and T-ACM
6.1 Databases Used in the Experiments Because synthetic data is usually generated as random numbers or on the basis of some mathematical distributions, it is impossible to simulate real-world data distributions using synthetic data. Consequently, two real-world databases, namely, the United States CENSUS database and the database on the performance statistics of NBA players are used to conduct the experiments.

6.1.1 U.S. Census Database

The CENSUS database contains information about households and persons in the United States for the years 1993 to 1995 [U.S. Census Bureau, 1997]. Most of the relations in this database contains hundreds of attributes, both scalar-typed (such as a person's sex and type of job) and numerical (such as salary and age). The Data Extraction System (DES) at the U.S. Census Bureau allows extracting records and fields from very large public information archives such as governmental surveys and census records.

Tables 24 and 25 describe the set of relations and attributes chosen from this database for the experiments. The data distributions of some of the selected attributes from CENSUS are plotted in FIG. 33. The queries for the experiments consisted of either (a) equality join (b) equality selection or (c) range selection operators.

6.1.2 NBA Performance Statistics Database

Due to the unusually high interest exhibited by the American basketball fans, there is a proportionally large amount of statistical analysis done on the basket ball players and games, especially in the news media. These statistics have been compiled by various people for various reasons, such as prediction of player behaviors etc. The database on the NBA players that are used for the experiments is a performance statics of NBA players for the year 1991–92 [National Basket Ball Association, 1992].

TABLE 24

Relations in the CENSUS Database

| Relation Name | No of Tuples | Description |
|---|---|---|
| cpsm93p | 155197 | Population survey for 1993 - Person |
| cpsm94p_1 | 83455 | Population survey for 1994 (Set 1) - Person |
| cpsm94p_2 | 150943 | Population survey for 1994 (Set 2) - Person |
| cpsm95f | 63756 | Population survey for 1995 - Family |
| cpsm95h | 72152 | Population survey for 1995 - Household |
| pums905h | 828932 | Decennial Census Microdata Samples |

TABLE 25

Attributes in the CENSUS Database

| Relation | Attribute | No of Distinct Values | Description |
|---|---|---|---|
| cpsm93p | hours | 95 | No of hours worked/week |
| | industry | 48 | Industry code |
| | wages | 31321 | Person's wages |
| cpsm94p | income | 8143 | Total income |
| cpsm94p_2 | age | 91 | age |
| | hours | 100 | Hours worked/week |
| cpsm95f | income | 32026 | Annual income |
| | persons | 15 | No of persons/family |
| cpsm95h | state | 51 | State code |
| | wages | 10496 | Total wages |
| pums905h | wages | 34668 | Total wages |

This database contains a relation with 50 attributes and 458 tuples. The distributions of few attributes from this relation are presented in FIG. 34.

6.2 Queries Used in the Experiments

Since the select and join operations are the two most frequently used relational operations in database systems, only those queries consisting of these two operations were tested.

For estimating the result sizes of select operations, two types of select operations, namely the exact-match select and the range select were used. The exact-match select operation, denoted $\sigma_{x=x_i}(R)$, retrieves all the tuples from the relation R, for which the attribute X has the value $X_i$. The range select operation retrieves all the tuples falling within an attribute value range. For example, the query $\sigma_{x \geq x_i}(R)$, retrieves all the tuples from the relation R, for which the attribute value X has values less than $X_i$. For the join operation, the most frequently encountered equi-join operation was used. The equi-join operation, denoted $R \bowtie_{X=Y} S$, combines all the tuples in the relations R and S whenever the value of attribute X from relation R is equal to the value of attribute Y from relation S.

All the queries used in these set of experiments were synthetic queries, involving only one of the above elementary relational operations at a time. The attribute values for the matching conditions in the queries were generated for the specific attribute value domain using a random number generator.

Having described the database sets and the query patterns to be used in the experiments, the actual prototype validation on the R-ACM and T-ACM is presented in the following sections.

6.3 Prototype Validation of the R-ACM 6.3.1 Experiment on U.S. CENSUS Database

The prototype validation of the R-ACM on the U.S. CENSUS database involved three distinct sets of experiments detailed below. The rationale for these experiments is to provide a performance comparison of the R-ACM and the traditional histograms, as well as to study its behavior under various distribution criteria and tolerance values.

The first group of experiments were conducted on equi-width, equi-depth histograms and the R-ACM. In each of the experimental runs, different build-parameters for the histograms and the R-ACM were chosen. The build-parameters for the equip-width and equi-depth histograms are the sector width and the number of tuples within a sector respectively. The build-parameter for the R-ACM is the tolerance value, $\tau$.

The relative estimation error was obtained as a ratio by subtracting the estimated

TABLE 26

Comparison of Equi-width, Equi-depth Histograms and R-ACM: U.S. CENSUS Database

| Operation | Actual Size | Equi-width | | Equi-depth | | R-ACM | |
|---|---|---|---|---|---|---|---|
| | | Size | Error | Size | Error | Size | Error |
| Equi-select | 1796 | 1279.1 | 28.8% | 1365.6 | 23.4% | 1702.3 | 5.23% |
| Range-select | 32109 | 30008.3 | 6.5% | 31214.9 | 2.8% | 32319.2 | 0.65% |
| Equi-join | 720988 | 543908 | 24.6% | 610482 | 15.3% | 660183 | 8.43% | size from the actual result size and dividing it by the actual result size. Obviously, the cases where the actual result sizes were zero were not considered for error estimation. A simple query processor was implemented to compute the actual result size. The results were obtained by averaging the estimation error over a number of experiments and are shown in Table 26.

In the second group of experiments, frequencies were generated using the Zipf and multi-fractal distributions and applied them randomly to the value domains of the relations from the CENSUS database. Again the results were obtained by averaging the estimation errors over a number of experiments and are shown in Table 27.

In the third group of experiments, the result estimates from the R-ACM were compared for three different tolerances values. Again (a) exact match select queries (b) range select queries and (c) equi-join queries were compared and obtained the average estimation errors by comparing the estimates to the actual result sizes. The results are given in Table 28. These experiments were also repeated by applying the frequency values generated by the Zipf and multifractal distributions to the attribute value domains of the CENSUS database. The results of these experiments are given in Table 29.

6.3.2 Analysis of the Results

The results from the first two sets of experiments show that the estimation error resulting from the R-ACM is consistently much lower than the estimation error

TABLE 27

Comparison of Equi-width, Equi-depth Histograms and R-ACM: U.S. CENSUS Database, using frequencies from the Zipf and Multifractal distributions.

| | | Equi-width | | Equi-depth | | R-ACM | |
|---|---|---|---|---|---|---|---|
| Operation | Actual Size | Size | Error | Size | Error | Size | Error |
| Equi-select | 932 | 1182.5 | 26.9% | 1127.1 | 20.9% | 989.4 | 6.12% |
| Range-select | 27180 | 29028.2 | 6.8% | 28049.8 | 3.2% | 27533.3 | 1.30% |
| Equi-join | 589066 | 743990 | 26.3% | 688029 | 16.8% | 640904 | 8.80% |

TABLE 28

Result Estimation Using R-ACM: Data - U.S. CENSUS Database

| | | Estimated Result | | | Percentage Error | | |
|---|---|---|---|---|---|---|---|
| Operation | Actual Size | $\tau = 4$ | $\tau = 6$ | $\tau = 8$ | $\tau = 4$ | $\tau = 6$ | $\tau = 8$ |
| Equi-select | 1435 | 1338 | 1292 | 1143 | 6.75% | 9.97% | 20.34% |
| Range-select | 26780 | 26219 | 24918 | 22098 | 2.09% | 6.95% | 17.48% |
| Equi-join | 563912 | 610180 | 680953 | 719320 | 8.2% | 20.8% | 27.56% | from the equi-width and equi-depth histograms. This is consequent to the fact the frequency distribution of an attribute value within an R-ACM is guaranteed to be close to the sector mean since the partitioning of the sectors is based on a user specified tolerance value and the deviation from the running sector mean. Thus in the equip-select operation in Table 26, the percentage estimation error from the R-ACM is only 5.23%, but that of the equi-width and equi-depth histograms are 28.8% and 23.4% respectively, demonstrating an order of magnitude of superior performance. Such results are typical with both synthetic data and real-world data.

The Third set of experiments illustrate that the accuracy of the R-ACM is inversely proportional to the tolerance value. Since smaller tolerance value results in a proportionally larger number of sectors in the R-ACM, there is obviously a trade-off of estimation accuracy and the storage requirements of the R-ACM. From Table 28, for the tolerance value $\tau=4$, the percentage error for the range-select query is only 2.09% whereas when the tolerance value is increased to $\tau=8$, the percentage error for the same operation becomes 17.48%. Such results are again typical.

smaller variance produces better query result size estimations. To demonstrate this results, a number of experiments were conducted on the U.S. CENSUS database for various attribute values and computed the variances of the R-ACM and the estimation errors. The errors between the estimated and actual size of random equality select queries are plotted against the computed variance of the ACM, and shown in FIG. 35. These results, in addition to confirming the relationship between the variance of an R-ACM and the estimation errors, also confirm that the R-ACMs with lower tolerance values produce lower estimation errors.

6.3.4 Experiments on NBA Performance Statistics Database

The prototype validation on the NBA Performance Statistics database involved two different sets of experiments. The first set of experiments were conducted to compare the performance of the R-ACM to that of the traditional histograms. As opposed to this, the second set of experiments were conducted to study the behavior of the

TABLE 29

Result Estimation Using R-ACM: Data - U.S. CENSUS Database, using frequencies from the Zipf and Multifractal distributions for different tolerance values.

| | | Estimated Result | | | Percentage Error | | |
|---|---|---|---|---|---|---|---|
| Operation | Actual Size | $\tau = 4$ | $\tau = 6$ | $\tau = 8$ | $\tau = 4$ | $\tau = 6$ | $\tau = 8$ |
| Equi-select | 2018 | 2121 | 2229 | 2243 | 5.12% | 10.46% | 21.08% |
| Range-select | 39076 | 39849 | 41569 | 45054 | 1.98% | 6.38% | 15.30% |
| Equi-join | 790528 | 866418 | 943495 | 997804 | 9.6% | 19.35% | 26.22% |

6.3.3 Estimation Errors and Variance of the R-ACM

The variance of the R-ACM is Var $(R\text{-}ACM) = N - \Sigma_{j=1}^{s} l_j/n_j$, where N is the total number of tuples mapped by the R-ACM, $n_j$ is the number of tuples within the $j^{th}$ R-ACM sector and $l_j$ is the sector width of the $j^{th}$ R-ACM sector. One of the major results in Section 5.1.7 is that the R-ACM with

TABLE 30

Comparison of Equi-width, Equi-depth and R-ACM: NBA Statistics 1991/92

| Operation | Result Size | Equi-width Size | Equi-width Error | Equi-depth Size | Equi-depth Error | R-ACM Size | R-ACM Error |
| --- | --- | --- | --- | --- | --- | --- | --- |
| Equi-select | 38 | 23.3 | 38.68% | 26.5 | 30.26% | 36.2 | 4.7% |
| Range-select | 119 | 111.0 | 6.7% | 113.7 | 4.4% | 116.4 | 2.18% |
| Equi-join | 242 | 192.8 | 20.33% | 204.1 | 15.7% | 249.5 | 3.09% |

R-ACM under various tolerance values. These experiments are discussed in detail below.

In the first group of experiments, the result estimation from equi-width, equi-depth, and the R-ACM were compared. Here (a) exact match select queries (b) range select queries and (c) equi-join queries were considered. For the join queries, since the NBA database consists of a single relation, various frequency values were generated with the Zipf and multifractal distributions using the same value domain of the joining attribute from the NBA relation as the second relation and joined it with the corresponding attribute from the NBA relation. As in the case with the experiment on the CENSUS database, for each of the experimental runs, different build-parameters were chosen for the histograms and the R-ACM.

As before the relative estimation error was obtained as a ratio by subtracting the estimated size from the actual results size and dividing it by the actual result size, ignoring the cases where the actual result sizes were zero. Actual query result sizes were computed using a simple query processor. The results were obtained by averaging the estimation errors over a number of experiments and are shown in Table 30.

In the second group of experiments, the result estimates from the R-ACM for three different tolerance values were compared. As in the case with the U.S. CENSUS database, (a) exact match select queries (b) range select queries and (c) equi-join queries were compared and the average estimation errors were obtained by comparing

TABLE 31

Result Estimation Using R-ACM: Data - NBA Statistics 1991–92

| Operation | Result Size | Estimated Result $\tau=4$ | Estimated Result $\tau=6$ | Estimated Result $\tau=8$ | Percentage Error $\tau=4$ | Percentage Error $\tau=6$ | Percentage Error $\tau=8$ |
| --- | --- | --- | --- | --- | --- | --- | --- |
| Equi-select | 42.3 | 39.8 | 37.6 | 35.0 | 5.9% | 11.11% | 17.26% |
| Range-select | 132.0 | 129.8 | 126.6 | 124.7 | 1.67% | 4.09% | 5.53% |
| Equi-join | 318.2 | 301.8 | 285.6 | 264.1 | 5.15% | 10.24% | 17.00% | the estimate to the actual result sizes. The results are given in Table 31.

6.3.5 Analysis of the Results

As in the case of the U.S. CENSUS database, the results from the first set of experiments show that the estimation error resulting from the R-ACM is a fraction of the estimation error from the equi-width and equi-depth histograms, again demonstrating the superiority of the R-ACM over the traditional histograms for query result size estimation. As the percentage estimation error with the R-ACM for equi-select operation is only 4.7%, whereas for the same operation, the equi-width and equi-depth histograms results in 38.68% and 30.26% estimation errors.

As before, the second set of experiments show that the accuracy of the R-ACM is inversely proportional to the tolerance value. The choice of the tolerance value is usually left to the database administrator who would have the knowledge of how much trade-off the database system can afford in terms of the disk storage to achieve the desired response time for queries. In the experiment with the NBA database, the R-ACM with the lowest tolerance value ($\tau=4$) gives the smallest estimation error, 5.9% for the equi-select operation. When the tolerance value is increased to $\tau=6$, we see that the estimation error for the equi-select operation is much higher at 11.11% which increases to 17% when $\tau=8$. Such results are typical.

6.4 Prototype Validation of the T-ACM

6.4.1 Implementing T-ACMs for the Experiments

Even though the method, Generate_T-ACM (See Section 5.2.1), explains how to generate a T-ACM corresponding to the given frequency domain, there are a few implementation "tricks" which are preferably used to dramatically improve the computation accuracy in the actual experiments. The following method Implement_T-ACM describes this implementation process.

Let us assume that $T_A$ is the T-ACM derived from the equi-width histogram, $H_A$. Also assume that the frequencies of the starting attribute value of every second histogram sector are available. Observe that this can be computed in $O(s)$ time, as opposed to $O(L)$, where s is the number of sectors. Then it is possible to generate a T-ACM which has a sector width that is half of the sector width of $H_A$ and is much more superior than the initial T-ACM, $T_A$. The strategy to achieve this is given in the method, Implement_T-ACM.

Method 6 Implement_T-ACM

Input: (i) Equi-width histogram $H_A$ with sector width 1.
(ii) Starting frequencies of every $2^{nd}$ sector.

Output: T-ACM with sector width 1/2.

begin
    Merge every two adjacent sectors of $H_A$ to get $H_B$;
    Generate T-ACM, $T_A$ from $H_B$.
    Estimate frequencies of $T_A$'s middle attribute values.
    Generate $T_B$ and $T_A$ using frequencies obtained from last step.
    Estimate frequencies of $T_B$'s middle attribute values.
    Generate $T_C$ from $T_B$ using frequencies obtained from least step.
end;

End Implement_T-ACM

Since the trapezoidal rule of numerical integration is more accurate than the left-end or right-end rectangular rule of numerical integration, it is obvious that by virtue of the construction of the T-ACM, $T_A$ is more accurate than the equi-width histogram $H_B$. Note that the area of a sector in $T_A$ may not be exactly equal to the actual number of tuples falling in that sector. Hence, using the actual number of tuples within the sectors and computing the frequency of the middle attribute value in the sector, it is possible to partition the sectors to obtain the T-ACM, $T_B$, where the sector areas represent the actual number of tuples more accurately. Using the same arguments, the T-ACM, $T_C$, is obtained from $T_B$. The T-ACM, $T_C$, can be expected to be more accurate than the T-ACM, $T_B$, as its boundary frequencies are more accurate estimates based on the actual number of tuples falling within the sectors.

Thus, by invoking a small preprocessing step, a T-ACM that is much more accurate than the original T-ACM derived directly from the corresponding histogram, has been generated. An example highlighting the steps taken by the above method is shown in FIG. 36.

EXAMPLE 6

In this example, the input to the method is an equi-width histogram with two sectors as shown in FIG. 36(a). The number of tuples in the sectors are n=24 and n=36 respectively. Also the starting frequency value of the first sector is 9 and the terminal frequency of the second sector is 15. The first step of the method merges these two sectors to create a single histogram sector shown in FIG. 36(b). The next step generates a trapezoidal sector equivalent to this larger histogram sector. Since the trapezoidal sector is only an approximation of the number of tuples represented by the rectangular sector, its area may not reflect the actual number of tuples (n=60) falling within that sector. Hence in the next step of the method, the middle frequency (i.e.: $I_3$=8) is estimated by considering the total number of tuples in that sector. The resulting T-ACM sectors shown in FIG. 36(d). Since the actual number of tuples contained in these two T-ACM sectors are already known (they are n=24 and n=36), the next step of the method, using the number of tuples within the sectors, estimate the middle frequencies of these two sectors. The result is the T-ACM shown in FIG. 36(e).

TABLE 32

Comparison of Equi-width, Equi-depth and T-ACM: U.S. CENSUS Database.

| Operation | Actual Size | Equi-width | | Equi-depth | | T-ACM | |
|---|---|---|---|---|---|---|---|
| | | Size | Error | Size | Error | Size | Error |
| Equi-select | 1538 | 1138 | 25.98% | 1198 | 22.06% | 1476 | 3.98% |
| Range-select | 29198 | 27178 | 6.92% | 27931 | 4.34% | 28673 | 1.80% |
| Equi-join | 687962 | 532765 | 22.56% | 562967 | 18.17% | 612891 | 10.91% |

6.4.2 Experiments on the U.S. CENSUS Database

The experiments on the T-ACM using the U.S. CENSUS database consisted of three different groups. The first group of experiments were conducted as a performance comparison study of the traditional histograms and the T-ACM, using the row attribute values from the U.S. CENSUS database. The second group of experiments involved in the use of Zipf and multifractal distribution with the U.S. CENSUS database and were collected to study the behavior of the histograms and the T-ACM under various data distribution. The third group of experiments were conducted to verify the variance of the T-ACM and the estimation accuracy.

The first group of experiments were conducted on equi-width, equi-depth histograms and the T-ACM. Different build-parameters are chosen for the histograms and the T-ACM in each of our experimental runs. The build-parameter for the equi-width histogram and the T-ACM is the sector width. The build-parameter for the equi-depth histogram is the number of tuples with a sector.

As in the case of the R-ACM, the relative estimation error was obtained as a ratio by subtracting the estimated size from the actual results size and dividing it by the actual result size. Obviously, the cases where the actual result sizes were zero were not considered for error estimation. A simple query processor was implemented to compute the actual result size. The results were obtained by averaging the estimation errors over a number of experiments and are summarized in Table 32.

The second group of experiments involved using the frequencies generated from the

TABLE 33

Comparison of Equi-width, Equi-depth and T-ACM: U.S. CENSUS Database, using frequencies from the Zipf and Multifractal distributions.

|  |  | Equi-width | | Equi-depth | | T-ACM | |
|---|---|---|---|---|---|---|---|
| Operation | Actual Size | Size | Error | Size | Error | Size | Error |
| Equi-select | 364 | 478 | 31.46% | 466 | 28.12% | 391 | 7.49% |
| Range-select | 18712 | 20079 | 7.31% | 19799 | 5.81% | 19144 | 2.31% |
| Equi-join | 528960 | 735202 | 38.99% | 722401 | 36.57% | 588521 | 11.26% |

TABLE 34

Variance of the T-ACM and the Estimation Errors: U.S. CENSUS Database

|  |  | Estimated Result | | | Percentage Error | | |
|---|---|---|---|---|---|---|---|
| No | Size | $v=$ 1007 | $v=$ 1196 | $v=$ 1493 | $v=$ 1007 | $v=1196$ | $v=1493$ |
| I | 72 | 74.36 | 75.60 | 78.66 | 3.28% | 4.99% | 9.25% |
| II | 318 | 297.55 | 343.79 | 360.90 | 6.43% | 8.11% | 13.49% |
| III | 163 | 171.67 | 175.06 | 323.72 | 5.32% | 7.40% | 9.86% |

Zipf and the multifractal distributions. These frequency values were applied randomly to the value domains of the relations from the CENSUS database to generate a wide range of different data distributions. As before (a) exact match select queries (b) range select queries and (c) equi-join queries were considered. Again the results were obtained by averaging the estimation errors over a number of experiments and are shown in Table 33.

In the third group of experiments, the variance of the T-ACM under different build-parameters for equality-select, range-select and equi-join operations and the corresponding percentage estimation errors in this set of experiments were computed. The average percentage estimation errors and the corresponding variance of the T-ACM are given in Table 34. Note that the row numbers I, II, and III correspond to equality-select, range-select and equi-join operations respectively.

6.4.3 Analysis of the Results

The prototype validating experiment results using the U.S. CENSUS database show that the estimation errors resulting from the T-ACM is consistently much lower than the estimation errors from the equi-width and equi-depth histograms. As alluded to earlier, this is consequent to the fact that the trapezoidal rule of the numerical integration technique is more accurate than the right-end or left-end histogram approximation techniques. Thus, for example, in the equi-select operation in Table 32, the percentage estimation error from the T-ACM is only 3.98%, but that of the equi-width and equi-depth histograms are 25.98% and 22.06% respectively, demonstrating an order of magnitude of superior performance. A similar pattern is observed in Table 33 as well. Such results are typical both synthetic data and real-world data.

It appears that the T-ACM with smaller variance produces better query result size estimations. The results from the third group of experiments confirm this result. For example, as is evident form Table 34, for the equi-select operation (Query I), the percentage estimation error corresponding to the T-ACM variance of 1007 is only 3.28%. Whereas for the same operation, the percentage estimation corresponding to the T-ACM variance of 1493 is 9.25%, which is almost a three fold increase.

6.4.4 Experiments of NBA Performance Statistics Database

In the experiments of the NBA database, as in the case of the U.S. CENSUS database, the result estimations from equi-width, equi-depth, and the T-ACM were compared. Here (a) exact match select queries (b) range select queries and (c) equi-join queries were considered. For the join queries, since the NBA database consists of a single relation, Various frequency values were generated with the Zipf and multi-fractal distributions using the same value domain of the joining attribute from the original NBA relation. The resulting relation was, in turn, joined with the corresponding attribute from the NBA relation. As in the case with the experiments on the CENSUS database, for each of the experimental runs, different build-parameters for the

TABLE 35

Comparison of Equi-width, Equi-depth and T-ACM: NBA Statistics 1991/92.

|  | Result | Equi-width | | Equi-depth | | T-ACM | |
|---|---|---|---|---|---|---|---|
| Operation | Size | Size | Error | Size | Error | Size | Error |
| Equi-select | 41 | 25.1 | 38.78% | 29.2 | 28.78% | 26.3 | 4.61% |
| Range-select | 136 | 124.0 | 8.82% | 126.2 | 7.21% | 129.6 | 4.71% |
| Equi-join | 314 | 236.3 | 24.74% | 251.2 | 20.0% | 269.5 | 14.17% | histograms and the T-ACM were chosen.

Actual result sizes were computed using a simple query processor. Again the results were obtained by averaging the estimation errors over a number of experiments and are summarized in Table 35.

6.4.5 Analysis of the Results

These prototype validating experiments conducted using the NBA statistics database confirm that the estimation error resulting from the T-ACM is a fraction of the estimation error from the equi-width and equi-depth histograms. As in the case of the experimental results with the U.S. CENSUS database, these results again demonstrate the superiority of the T-ACM over the traditional histograms. For example, the percentage estimation error with the T-ACM for equi-select operation is only 4.6%, whereas for the same operation, the equi-width and equi-depth histograms result in 38.78% and 28.78% estimation errors.

7 Improved Attribute Cardinality Maps

The ability of a query optimizer to correctly identify a near optimal QEP heavily depends on how accurately the query result sizes are computed. Obviously, this, in turn, depends on how accurately the attribute cardinally maps, which are used to map the attribute values, reflect the underlying data distributions. Approximation to the underlying data distribution can be improved by changing the various build-parameters of the ACMs. These include, the tolerance value, $\tau$ in the case of an R-ACM and, the sector width and slope of the trapezoids in the case of a T-ACM.

7.1 Cost Model

Estimation accuracy of a query result size using an ACM depends on many inter-related factors such as, 1. Estimation error,
2. Storage requirement for the ACM,
3. Data distribution being mapped, and
4. Type of queries being posed.

The first two factors, namely the estimation error and the storage requirements are inversely related to each other. For example, an ACM with larger number of sectors would obviously result in higher estimation accuracy than an ACM with fewer sectors. The third factor, the type of data distribution is an important one in the result estimation accuracy. For example, a uniform data distribution is invariably associated with small estimation errors, whereas a Zipf or a multi-fractal data distribution tends to produce large estimation errors. Since the information about the underlying data distribution is not known a priori, the ACM design process should not make use of this knowledge. The last factor listed above is actually the interaction of the environment and the DBMS itself, and is obviously difficult to model a human behavior is difficult to predict. Hence, for reasons of simplicity and ease of implementation, assume a fixed storage space amd model the cost function, C, as a function $f(\epsilon)$ of the estimation error as:

$$C = kf(\epsilon),$$

where k is a constant.

7.2 (Near) Optimal Rectangular ACMs

Considering first an R-ACM, the function, $f(\epsilon)$, of the estimation error is either the cumulative worst-case error of the ACM, $E_{worst}$, or the variance of the ACM. The cumulative worst-case error of an R-ACM, $E_{worst}$, is the theoretical maximum worst-case error that is possible for a given R-ACM. Since from Theorem 5 that the worst-case error, $\epsilon_i$, in estimating the frequency of an arbitrary attribute value, $X_i$, is equal to, $$\epsilon_i = \tau \left[ \ln\left(\frac{l_j}{i-1}\right) - 1 \right],$$

the maximum possible worst-case error in the $j^{th}$ sector is, $$\varepsilon_j = \int_{x=2}^{l_j} \tau \left[ \ln\left(\frac{l_j}{x-1}\right) - 1 \right] dx.$$

Hence the cumulative worst-case error for the entire R-ACM becomes, $$\varepsilon_{worst} = \sum_{j=1}^{s} \int_{x=2}^{l_j} \tau \left[ \ln\left(\frac{l_j}{x-1}\right) - 1 \right] dx$$

$$= \sum_{j=1}^{s} \tau[(l_j - 2)(1 + \ln l_j) - (l_j - 1)\ln(l_j - 1)].$$

Similarly, from Theorem 3, it is known the variance of the R-ACM is given by, $$Var(ACM) = N - \sum_{j=1}^{s} \frac{n_j}{l_j}.$$

Hence for an R-ACM, the cost function can be modelled by one of the following expressions:

$$\text{Cost Function} = \begin{cases} C = k\varepsilon_{worst} \\ C = kVar(ACM). \end{cases}$$

Using the cumulative worst-case error, $\epsilon_{worst}$, as $f(\epsilon)$, the smallest possible tolerance value, $\tau$, that satisfies the given storage requirement results in the minimum value for the cost function, C. Hence, generally ignoring other factors, by arbitrarily reducing the tolerance value up to the ceiling imposed by the available storage space, we can correspondingly improve the estimation accuracy of an R-ACM.

7.3 (Near) Optimal Trapezoidal ACMs

In this case, the worst-case error in estimating an equality-select operation lies in the range of $0 \geq \epsilon \geq n_j$, where $n_j$ is the number of tuples in the $j^{th}$ T-ACM sector. Since this is not a narrow range as in the case of an R-ACM, the cumulative worst-case error for a T-ACM will not help us to derive a meaningful cost function. Hence the cost function is defined in this case as a function of the variance of the T-ACM itself.

From Lemma 27, it is known that the variance of the frequency of an attribute value $X_i$ in sector j of a T-ACM is $$Var(X_i) = n_j p_i (1 - p_i)$$

where $p_i$ is given by, $$p_i = \frac{a_j}{n_j} + \frac{2(n_j - a_j l)}{n_j l(l-1)} \cdot i.$$

Let $\theta_j$ be the slope of the $j^{th}$ trapezoid. From the geometry of the trapezoid, $$\tan\theta_j = \frac{2(n_j - a_j l)}{n_j l(l-1)}.$$

Hence the probability $p_i$ can be written in terms of $\theta_j$ as, $$p_i = \frac{a_j}{n_j} + i\tan\theta_j.$$

But the variance of the entire T-ACM is given by, $$Var(ACM) = \sum_{j=1}^{s} \sum_{i=1}^{l} Var(X_i).$$

Hence, $$Var(ACM) = \sum_{j=1}^{s}\sum_{i=1}^{l}\left(a_j - \frac{a_j^2}{n_j} + (n_j - 2a_j)i\tan\theta_j - n_j i^2 \tan^2\theta_j\right).$$

Thus the variance of a T-ACM is dependent on the slopes of the individual trapezoids of the T-ACM. Consequently the variance can be expressed as a function $\phi(\tan\theta)$ of $\tan\theta$. The cost function of a T-ACM is expressed as, $C = k\ \phi(\tan\theta)$ where k is a constant.

This shows that by choosing slopes of the individual trapezoidal sectors appropriately, it is possible to minimize the value of the cost function and improve the estimation accuracy of the T-ACM.

7.3.1 (Near) Optimal T-ACMs: Average Estimation Errors

In this section, a method to optimize the T-ACM originally generated using the method Implement_T-ACM presented earlier is discussed. This optimization process has the effect of minimizing the cost function $\rho = k\Phi(\tan\theta)$ where, as explained earlier, $\tan\theta$ is the slope of a trapezoid. In optimizing a trapezoidal sector, the aim is to find the slope of the trapezoid such that the estimation error is minimized for the equality selected estimate of every single attribute value in that sector. In other words, in finding the best possible slope of a trapezoid, the aim is to minimize the estimation error for every single attribute value within that sector. Since the variance of the frequency of an attribute value is an indicator of how far away the actual frequency value deviates from the mean frequency, minimizing the estimation error for every single attribute value, in turn, has the effect of minimizing the cost function.

In the interest of simplicity, in this work a stationary data distribution is assumed. It is also assumed that the T-ACM to be optimized has already been generated using the Implement_T-ACM method for an equi-width histogram. The strategy works on every two adjacent T-ACM sectors as follows.

It is assumed that for every such pair of sectors, the frequencies of the first attribute value of the first sector and the terminal attribute value of the second sector are fixed or rather known a priori. The aim now is to find the optimal slopes for these two sectors such that the estimation errors for the equality-select operation on each attribute value, within the sectors, are collectively or rather simultaneously minimal. To achieve this end, an optimal frequency needs to be estimated for the attribute value that lies at the boundary of these two T-ACM sectors. The criterion function that required to be minimized is the average error for the frequencies of the entire attribute values within the sector. In other words, the objective is to find the straight line that minimizes the overall average estimation errors.

Without loss of generality, assume that the starting point of this straight line is at the origin $(0,0)$[4]. Hence the objective is to find the slope, m, of the straight line x=ma, where it is assumed that $A = \{\alpha_1, \alpha_2, \ldots, \alpha_l\}$ is the set of attribute values in the sector and that the attribute value $\alpha_i$ occurs $x_i$ times. The following lemma gives an optimal value for the slope m, where the criterion for optimization is the average error over the entire sector.

[4]If this is not the case, it can be obtained by a simple transformation. Thus, in the argument we set $x_i$ to 0.

Lemma 37 Let $A = \{\alpha_1, \alpha_2, \ldots, \alpha_l\}$ be the set of all attribute values in the sector under consideration. Also let $x_i$ be the frequency of the attribute value $\alpha_i$. Given l points in the AX-plane[5], the slope, m, of the straight line which goes through the first point $(\alpha_1, x_1) = (0,0)$ and minimizes the sum of the vertical distances (frequency estimation errors) of the points to this straight line is given by, $$m = \frac{2\sum_{i=2}^{l} x_i}{(l^2 + l - 2)\Delta},$$

where the distances between the successive $\alpha_i$, $1 \le i \le l$, are the same, and equal to $\Delta$.

Proof: Consider an arbitrary point $P_i \equiv (\alpha_i, x_i)$ on the AX-plane. From FIG. 38, the vertical distance of $P_i \equiv (\alpha_i, x_i)$ from the straight line x=ma is, $\epsilon_i = (x_i - ma_i)$.

This vertical distance $\epsilon_i$ represents the estimation error for the frequency of the attribute value $\alpha_i$. The sum of all such distances or estimation errors in the sector noting that there is no error in the estimation of the frequency of the first attribute value, $\alpha_1$–i.e: the straight line passes through this point, is:

$$\epsilon = \sum_{i=2}^{l}(x_1 - ma_i).$$

The average frequency estimation error for an arbitrary attribute value is given as the average of the above sum and is equal to, $$\epsilon = \frac{1}{l}\sum_{i=2}^{l}(x_i - ma_i).$$

Ideally the above error needs to be equal to zero. Setting this value to be zero, $$\frac{1}{l}\sum_{i=2}^{l}(x_i - ma_i) = 0 \text{ or}$$

$$m = \frac{\sum_{i=2}^{l} x_i}{\sum_{i=2}^{l} a_i}$$

$$= \frac{\sum_{i=2}^{l} x_i}{(2 + 3 + \ldots + l)\Delta}$$

$$= \frac{2\sum_{i=2}^{l} x_i}{(l^2 + l - 2)\Delta}.$$

The lemma follows.

Now to find the optimal boundary value for two adjacent sectors, consider two such sectors, $T_1$ and $T_2$. Assume that the optimal slopes for the sectors $T_1$ and $T_2$, using Lemma 37, are $\alpha$ and $\beta$ respectively. Using the optimal slope, $\alpha$, obtained for the sector, $T_1$, a boundary frequency value $x'_b$ for the attribute value in the boundary of the two sectors is obtained. Similarly, using the optimal slope, $\beta$, obtained for the sector, $T_2$, an optimal boundary frequency value, $x''_b$, is obtained. But in order to obtain a pair of continuous trapezoidal lines for both sectors, a common (near) optimal boundary value $x_b$ should be obtained from the above optimal boundary values $x'_b$ and $x''_b$ of the individual sectors $T_1$ and $T_2$ respectively. It can now be shown that the average of $x'_b$ and $x''_b$ is a suitable boundary value that minimizes the frequency estimation errors in both sectors simultaneously.

Lemma 38 The average of the boundary values $x'_b$ and $x''_b$, which are optimal for the respective individual sectors, minimizes the estimation errors for both T-ACM sectors simultaneously.

Proof: In the absence of any better information, assume that the straight lines $x=\alpha\alpha$ and $x=\beta\alpha$ (resulting in the boundary values $x'_b$ and $x''_b$) obtained from Lemma 37 produce zero estimation errors in their respective T-ACM sectors.

The lines AB and CD in FIG. 39 denote the optimal straight lines obtained from Lemma 37. The lines BQ and DQ thus denote the optimal boundary frequencies for the sectors $T_1$ and $T_2$ respectively. Note that $|BQ|=x'_b$ and $|DQ|=x''_b$. The objective here is to find an optimal point P on BD so that it is possible to generate a pair of continuous trapezoidal sectors with straight line segments AP, and PC while minimizing the frequency estimation errors for the two sectors simultaneously. Assume that such an optimal point P lies on the line BD at distance $\rho$ from point D as shown in FIG. 39. Hence the shaded triangular areas ABP and CDP represent the estimation errors resulting from choosing the lines AP and CP as the trapezoidal roofs instead of the initial lines AB and CD which were optimal for their respective individual sectors.

Let the areas $A_1$ and $A_2$ denote the areas of the shaded triangles ABP and CDP respectively. Now the aim is to find an optimal point P on line BD such that the total area $A=A_1+A_2$, representing the overall estimation error, will be minimal. From the geometry of the triangles, $$A_1 = \tfrac{1}{2}(x'_b - x''_b - \rho)l,$$

$$A_2 = \tfrac{1}{2}\rho l.$$

or the total area is equal to, $$A = A_1 + A_2 = \tfrac{1}{2}(x'_b - x''_b)l.$$

Hence the total estimation error resulting from choosing the lines AP and CP as the roofs of the respective trapezoids does not depend on the value $\rho$. Hence it is possible to choose any arbitrary point P on the line BD. But it is better to choose P as the mid-point of BD, for the simple reason that either of the new lines AP and CP will not be too far away from the initial optimal lines, AB and CD respectively. Hence the lemma follows.

The method Age_Error_Optimal_Boundaries computes a (near) optimal T-ACM directly from an equi-width histogram. The only additional information required is the frequency of the staring value of every second histogram sector. Since any additional information about other frequencies is not needed, an initial T-ACM is not required and thus it is possible to by-pass the process of generating a T-ACM using the Implement_T-ACM.

Method 7 Avg_Error_Optimal_Boundaries

Input: An equi-width histogram

Output: A (near) optimal T-ACM.

begin for $(j = 1; j < s; j + 2)$;   /* for every 2nd sector */

$\alpha_j = 0$;

$\alpha_j = \dfrac{2*(n_j - l*x_1)}{(l^2 + l - 2)*\Delta}$;   /* optimal slope */

$x'_b = a_j + \alpha_j * l$;

/* first estimate for boundary freq */

$\beta_j = 0$;

$\beta_j = \dfrac{2*(n_{j+1} - l*x_l)}{l^2 + l - 2)*\Delta}$;   /* optimal slope */

$x''_b = a_{j+1} + \beta_j * l$;

/* second estimate for boundary freq */

$x_b = \dfrac{x'_b + x''_b}{2}$;   /* average boundary frequencies */ update_boundary_frequency($x_b$, $j$);

end;

end;

End Avg_Error_Optimal_Boundaries

Even though Lemma 37 uses actual frequency of every attribute value within the sector to compute the optimal slope, in practice this information is necessary. As can be seen from the method Avg_Error_Optimal_Boundaries, the slope of the trapezoid is completed only with the knowledge of the total number of tuples within the sector, and the frequency of the first attribute value of the sector.

The entire optimization process is illustrated with an example given below.

EXAMPLE 7

Consider the following example with two T-ACM sectors, shown in FIG. 40. The actual frequencies of each of the attribute values are denoted in the Figure. Also the total number of tuples falling within these two T-ACM sectors is n=78. Assume that the starting frequency of the first sector and the terminal frequency of the second sector are fixed. Next step is to minimize the estimation error for each of the attribute values $X_i$, i=1 . . . 7 using the above T-ACM.

Considering the sector $T_1$, since the frequencies of the attribute value $X_1$ is fixed, the T-ACM will return the actual frequency value as the estimate for $X_1$. Thus there is no estimation error in this case.

Let $\alpha$ be the slope (tangent of the angle) which the trapezoidal roof sector $T_1$ makes with the positive X-axis in order to provide minimal estimation error for the attribute values within the sector $T_1$. From Lemma 37, the optimal slope can be obtained as, $$\alpha = \frac{2\sum_{i=2}^{l} x_i}{(l^2+l-2)\Delta}$$

$$= \frac{2*12}{10} = \frac{12}{5}.$$

Let $x'_4$ be the frequency of $X_4$ such that the slope of AB=$12/5$. Hence, $$x'_4 = 10+\alpha*l = 10+12/5*3 = 17\tfrac{1}{5}.$$

Similarly, let $\beta$ be the slope (tangent of the angle) which the trapezoidal roof sector $T_2$ makes with the negative X-axis in order to provide minimal estimation error for the attribute values within the sector. Again from Lemma 37, the optimal slope can be obtained as, $$\beta = \frac{2\sum_{i=2}^{l} x_i}{(l^2+l-2)\Delta}$$

$$= \frac{2*18}{10} = \frac{18}{5}.$$

Let $x''_4$ be the frequency of $X_4$ such that the slope of $$CB = \frac{18}{5}.$$

So, $$x''_4 = 6+\beta*l = 6+\frac{18}{5}*3 = 17\tfrac{2}{5}.$$

Hence the optimal frequency of the boundary attribute value $X_4$ that would minimize the estimation errors simultaneously for all the 7 attribute values in the sectors $T_1$ and $T_2$ is the average of $x'_4$ and $x''_4$, and is, $$\bar{x}_4 = \frac{17\tfrac{1}{5} + 17\tfrac{2}{5}}{2}$$

$$= 17\tfrac{3}{10}.$$

A plot of percentage estimation errors for equality-select operations against the frequency of the boundary attribute value, $X_4$, in the above example is shown in FIG. 41. Observe that the percentage estimation error is near 5% when the frequency of the boundary attribute value is near zero. As the frequency increases, the percentage estimation error gradually decreases and reaches its minimum at the frequency value of $17\tfrac{3}{10}$. The percentage estimation error increases as the frequency increases beyond this optimal value.

7.3.2 Principle of Least Squares

The objective of regression [Kreyszig, 1988] is to evaluate the coefficients of an equation relating the criterion variable to one or more other variables, which are called the independent variables. The most frequently used linear model relates a criterion variable Y to a single independent variable X by the equation, $$\hat{Y} = mX + c \qquad (16)$$

in which c=the intercept coefficient and m=the slope coefficient; c and m are called regression coefficients because they are obtained from a regression analysis. Because Equation (16) involves two variables, X and Y, it is sometimes referred to as the bivariate model. The intercept coefficient represents the value of Y when X equals zero. The slope coefficient represents the rate of the change in Y with respect to change in X. Whereas c has the same dimensions as Y, the dimensions of m equal the ratio of the dimensions of Y to X.

The linear multivariate model relates a criterion variable to two or more independent variables:

$$\hat{Y} = m_1 X_1 + m_2 X_2 + \ldots + m_p X_p + c \qquad (17)$$

in which p=the number of independent variables, $X_i$=the $i^{th}$ independent variable, $m_i$=the $i^{th}$ slope coefficient, and c is the intercept coefficient, where i=1, 2, ..., p.

The values of the slope and intercept coefficients of Equations (16) and (17) are computed using the principle of least squares. The principle of least squares is a process of obtaining best estimates of the coefficients and is referred to as a regression method. Regression is the tendency for the expected value of one or two jointly correlated random variables to approach more closely the mean value of its set than any other. The principle of least squares is used to regress Y on either X or $X_i$ values of Equations (16) and (17), respectively. To express the principle of least squares, it is important to define the error, $\epsilon$, as the difference between the estimated and actual values of the criterion variable:

$$\epsilon = \hat{Y}_i - Y_i \qquad (18)$$

in which $\hat{Y}_i$=the $i^{th}$ estimated value of the criterion variable, $Y_i$=the $i^{th}$ actual value of Y, and $\epsilon_i$=the $i^{th}$ error. The objective function for the principle of least squares is to minimize the sum of the squares of the errors:

$$\mathcal{F} = \min \sum_{i=1}^{n} (\hat{Y}_i - Y_i)^2 \qquad (19)$$

in which n is the number of observation on the criterion variable.

After inserting the method of $\hat{Y}$, the objective function of Equation (19) is minimized by taking the derivatives with respect to each unknown, setting the derivatives equal to zero, and then solving for the unknowns. The solution requires the model for predicting $Y_i$ to be substituted into the objective function.

To illustrate the solution procedure, the model of Equation (16) is substituted into the objective function of Equation (19), which yields $$\mathcal{F} = \min \sum_{i=1}^{n} (mX_i + c - Y_i)^2.$$

The derivatives of the sum of squares of the errors with respect to the unknowns c and m are respectively, $$\frac{\partial \sum_{i=1}^{n} (\hat{y}_i - y_i)}{\partial c} = 2 \sum_{i=1}^{n} (c + mX_i - Y_i) = 0$$

$$\frac{\partial \sum_{i=1}^{n} (\hat{y}_i - y_i)}{\partial m} = 2 \sum_{i=1}^{n} (c + mX_i - Y_i) = 0$$

Dividing each equation by 2, separating the terms in the summations, and rearranging yield the set of normal equations:

$$nc + m \sum_{i=1}^{n} X_i = \sum_{i=1}^{n} Y_i$$

$$c \sum_{i=1}^{n} X_i + m \sum_{i=1}^{n} X_i^2 = \sum_{i=1}^{n} X_i Y_i$$

The summations in the above equations are calculated over all values of the sample. The two unknowns c and m is evaluated by solving the two simultaneous equations as follows:

$$m = \frac{\sum_{i=1}^{n} X_i Y_i - \frac{1}{n} \sum_{i=1}^{n} X_i \sum_{i=1}^{n} Y_i}{\sum_{i=1}^{n} X_i^2 - \frac{1}{n} \left( \sum_{i=1}^{n} X_i \right)^2}$$

$$c = \frac{\sum_{i=1}^{n} Y_i}{n} - \frac{m \sum_{i=1}^{n} X_i}{n}.$$

7.3.3 (Near) Optimal T-ACMs Using the Principle of Least Squares

In order to apply the above method of least squares, the problem is formulated as follows:

Given l points in the AX-plane (attribute-frequency plane), fit a straight line through the given points so that the sum of the squares of the distances of those points from the straight line is minimum, where the distance is measured in the vertical direction.

The following lemma gives an optimal value for the slope m of a straight line, where the criterion for optimization is the sum of squares of error over the entire sector.

Lemma 39 Let $A = \{\alpha_1, \alpha_2, \ldots, \alpha_l\}$ be the set of all attribute values in the sector under consideration. Also let $x_i$ be the frequency of the attribute value $\alpha_i$. Given l points in the AX-lane, the slope, m, of the straight line which goes through the first point $(\alpha_1, x_1)=(0,0)$ and minimizes the sum of the squares of the vertical distances (frequency estimation errors) of the points to this straight line is given by, $$m = \frac{6 \sum_{i=2}^{l} a_i x_i}{l(l-1)(2l-1)}.$$

Proof: Consider an arbitrary point $P_i = (\alpha_1, x_i)$ on the AX-plane. As in the first method, assume without loss of generality that this straight line passes through the origin $(\alpha_1, x_1) = (0,0)$. From FIG. 42, the vertical distance of $P_i = (\alpha_i, x_i)$ from the straight line x=ma is, $\epsilon_i = (x_i - m\alpha_i)$.

The sum of the squares of these distances is, $$\varepsilon = \sum_{i=2}^{l} \epsilon_i^2 = \sum_{i=2}^{l} (x_i - ma_i)^2.$$

Using the method of least squares, choose m such that $\epsilon$ is minimum. Since the least square error $\epsilon$ depends on m, a necessary condition for $\epsilon$ to be minimum is, $$\frac{\partial \varepsilon}{\partial m} = 0.$$

This results in, $$\frac{\partial \varepsilon}{\partial m} = -2 \sum_{i=2}^{l} a_i (x_i - ma_i) = 0$$

Thus, $$m \sum_{i=2}^{l} a_i^2 = \sum_{i=2}^{l} x_i a_i, \text{ or } m = \frac{\sum_{j=i}^{l} x_i a_i}{\sum_{i=2}^{l} a_i^2} = \frac{6 \sum_{j=i}^{l} x_i a_i}{l(l-1)(2l-1)}$$

and the lemma follows.

Having found an optimal slope for the roof of a trapezoidal sector, an optimal boundary frequency for the attribute value in the boundary of two adjacent sectors is computed. The process involves computing the optimal slopes $\alpha$ and $\beta$ for a pair of adjacent trapezoidal sectors and obtaining the optimal boundary values, $x'_b$ and $x''_b$ for the respective individual sectors from them. The question of whether the mean of $x'_b$ and $x''_b$ yields the overall (near) optimal solution for both the sectors remains open.

Method 8 LSE_Optimal_Boundaries

Input: A T-ACM generated from Implement_T-ACM method.

Output: A (near) optimal T-ACM.

begin for $(j = 1; j < s; j + 2)$;    /* for every 2nd sector */

$\alpha_j = 0$;

for $(i = 2; i \leq l; i++)$;

/* optimal slope for sector $T_j$ */

$\alpha_j = \alpha_j + \frac{i * \Delta * x_{ji}}{(i\Delta)^2}$;    /* optimal slope */

$x'_b = a_j + \alpha_j * l$;    /* first estimate for boundary freq */

$\beta_j = 0$;

for $(i = 2; i \leq l; i++)$;    /* optimal slope for sector $T_{j+1}$ */

$\beta_j = \beta_j + \frac{i * \Delta * x_{(j+1)i}}{(i\Delta)^2}$;    /* optimal slope */

$x''_b = a_{j+1} + \beta_j * l$;    /* second estimate for boundary freq */

-continued $$x_b = \frac{x'_b + x''_b}{2}; \quad \text{/* average boundary frequencies */}$$

update_boundary_frequency($x_b$, j);

end;

end;

End LSE_Optimal_Boundaries

The method LSE_Optimal_Boundaries computers a (near) optimal T-ACM directly from a T-ACM generated using the Implement_T-ACM. It is important to note that, unlike the previous method described in Section 7.3.1, the method requires the frequency value of every single attribute value in order to perform the optimization using the least squares method. The frequencies of the attribute values are obtained in a single scan of the attribute value domain from the DBMS catalogue periodically whenever such optimization is deemed necessary. In Method 7.8, a frequency value is denoted by $x_{ji}$, where the first subscript j denotes the sector where the attribute values lies, and the second subscript i denotes the actual frequency value.

Now referring to the previous example, Example 7, an optimal boundary value for the two sectors is obtained using the method of least squares as follows.

An optimal slope $\alpha$ for the first sector is, $$\alpha = \frac{\sum_{i=2}^{l} a_i x_i}{\sum_{i=2}^{l} a_i^2} = \frac{13}{7}.$$

Hence an optimal boundary value $x'_b$ for the two sectors is $x'_b = 10 + 13/7 * 3 = 15 4/7$.

Similarly an optimal slope $\beta$ for the second sector is, $$\beta = \frac{\sum_{i=2}^{l} a_i x_i}{\sum_{i=2}^{l} a_i^2} = \frac{20}{7}.$$

Hence an optimal boundary value $x''_b$ for the two sectors is $x''_b = 6 + 20/7 * 3 = 14 4/7$.

Hence using an argument similar to the one provided in Lemma 37, an optimal frequency of the boundary attribute value $X_4$ can be estimated so as to minimize the estimation errors simultaneously for all the 7 attribute values in the sectors $T_1$ and $T_2$. As mentioned earlier this value is the average of $x'_b$ and $x''_b$, and is equal to, $$\bar{x}_4 = \frac{15\frac{4}{7} + 14\frac{4}{7}}{2} = 15\frac{1}{14}.$$

FIG. 43 is a plot of the percentage estimation errors for the above example, using equality-select operations against the frequency of the boundary attribute value, $X_4$. Comparing this with the plot given in 41, we see that the boundary value estimation using the method of least squares errors is marginally more accurate than using the method of average errors.

8 Further Improvements

In the above noted embodiments, the R-ACM and the T-ACM were treated as two fundamental and distinct schemes for query result size estimation. There is no reason these two schemes cannot be incorporated into a single scheme which has the advantages of the superior properties of both of them.

Accordingly, the automaton decides to partition one or more sectors of an R-ACM with smaller tolerance values generating a new structure with multiple tolerance values. This approach is useful whenever there is a need for a higher degree of estimation accuracy for a particular attribute value range. This idea is easily explained with an example.

Consider an R-ACM (See FIG. 44) which has been partitioned using a tolerance value $\tau = \tau_1$. Suppose that using this R-ACM in a practical-setting, the attribute values in the range of 63 to 118 (belonging to sector 3) are retrieved more heavily than the other attribute values, when a higher estimation accuracy for this attribute value range improves the performance of the query optimizer. The obvious approach would be to partition the entire value domain using a smaller tolerance value $\tau_2 < \tau_1$. But this would, of course, require proportionately larger storage space. Instead, partition only that individual sector (sector 3 in this example), using a tolerance value $\tau_2 < \tau_1$. This is shown in FIG. 45. Here, using the secondary partitioning yields a finer granularization in five smaller sectors, (in this case $3_1$, $3_2$, $3_3$, $3_4$ and $3_5$ respectively), thus increasing the estimation accuracy for the queries hitting the attribute values in this domain.

This shows that by using this hybrid approach instead of a single regular R-ACM sector, generating a structure that gives higher estimation accuracy with modest storage requirements is p[ossible, by appropriately choosing a secondary partitioning schema or tolerance values for heavily used primary sectors.

The automaton or learning mechanism simultaneously decides to partition some of the sectors using a trapezoidal partitioning method resulting in a new structure that combines the properties of the R-ACM and the T-ACM in a hierarchical manner.

As discussed earlier, the goal is to increase the estimation accuracy for the attribute value range which is used more frequently than the others. Since an approximation based on the trapezoidal method would closely reflect the actual data distribution, this strategy would obviously provide a lower estimation error in this interval. FIG. 46 shows an example where one of the heavily used sectors (sector 3) is partitioned using the trapezoidal method. The number of sectors for the secondary partitioning should be based on the available storage.

By extending these ideas and generalizing, It is conceivable to find a way to partition one or more sectors of an ACM based on both tolerance values and trapezoids. This would result in another structure where the secondary sectors can be either R-ACMs or T-ACMs. The decision to partition a sector based on a tolerance valued R-ACM or a trapezoid could be based on the learning mechanism's learning process. In other words, during the process of building the ACM, the learning mechanism chooses either an R-ACM or a T-ACM for partitioning the next sector, based on its current knowledge about the data distribution and the estimation accuracy.

In an alternative embodiment, the ranges are multi-dimensional ranges and the resulting histogram is a multi-dimensional histogram. Multi-dimensional histograms are known and application of the present invention to generating a multi-dimensional histogram is straightforward for one of skill in the art.

Though the present application names some specific applications of a histogram generated according to the present invention, a histogram according to the present invention is useful in any application wherein a histogram according to the prior art is used.

In accordance with its most general aspect of the R-ACM, a known correlation exists between two or more of the values associated with elements within a same bin. Thus, when an arithmetic mean is compared to selected elements to determine whether or not to include them in a current bin, it is known that no element diverged from the arithmetic mean by more than a predetermined amount when added. Typically, some values fall above the mean and some below. Typically, this means that two values are within a predetermined distance of each other. According to such an embodiment, every two successively added elements are within twice the predetermined value from each other. This follows from careful analysis of the present invention.

Even when another statistical value, such as the median value within the bin, is used, since all values are within a predetermined distance from that value, there is a maximum spacing between any two adjavent elements in the bin when sorted by value. This known maximum spacing, provides important information relating to maximum error, average error, and so forth of estimates determined from the histogram.

Similarly, for an optimised T-ACM, error is reduced in a known fashion resulting in useful information for analysing the accuracy of estimates generated from such a histogram. Therefore, the present invention relates to providing a histogram with additional data determinable therefrom, the additional data relating to accuracy of data estimated using the histogram. As such, it is extremely beneficial to use a histogram according to the present invention over one according to the prior art.

Further, a T-ACM is determinable from an R-ACM. As a simple example, create an R-ACM with the predetermined spacing of 2 and the statistical value being the minimium value associated with an element in a bin. A typical bin is skewed in a downward direction. Now, an R-ACM can be formed using the statistical value of the maximum value associated with an element in a bin. The resulting histograms will have longer bins where f(x) is substantially flat or is somewhat monotonically increasing or decreasing. Merging the two histograms results in a plurality of ranges that is extremely useful in generating a T-ACM. The resulting T-ACM has bin sizes that are well suited to approximating the values therein with straight lines while minimizing the error in estimating those values.

Any such combination of R-ACM and T-ACM generation techniques is also within the scope of the present invention. Any R-ACM and T-ACM generation technique which compares the Generalized means to the elements to be included in the bins, and which uses multiplications insetead of divisions, is also within the scope of the present invention.

Numerous other embodiments are envisaged without departing from the spirit or scope of the invention.

REFERENCES

[Astrahan and Chamberlin, 1975] Astrahan, M. M. and Chamberlin, D. (1975). Implementation of a structured English query language. In *Communication of the ACM*, volume 18.

[Bayer and McCreight, 1972] Bayer, R. and McCreight, E. (1972). Organization and maintenance of large ordered indexes. In *Acta Inf.*, volume 1, pages 173–189.

[Bentley and Friedman, 1979] Bentley, J. and Friedman, J. (1979). Data structures for range searching. In *ACM Computing Survey*, volume 11, pages 397–409.

[Blasgen and Eswaran, 1976] Blasgen, M. and Eswaran, K. (1976). On the evaluation of queries in a relational database systems. In *IBM Research Report*, volume RJ 1745.

[Blasgen and Eswaran, 1977] Blasgen, M. and Eswaran, K. (1977). Storage and access in relational database. In *IBM System Journal*, volume 16, pages 363–377.

[Bolour, 1981] Bolour, A. (1981). Optimal retrieval for small range queries. In *SIAM Journal of Computing*, volume 10, pages 721–741.

[Boral and Zaniolo, 1986] Boral, R. K. H. and Zaniolo, C. (1986). Optimization of nonrecursive queries. In *Proceedings of the 12th International Conference on Very Large Databases*, pages 128–137, Kyoto.

[Christodoulakis, 1981] Christodoulakis, S. (1981). Estimating selectivities in data bases. In *Technical Report CSRG-136*, Computer Science Dept, University of Toronto.

[Christodoulakis, 1983a] Christodoulakis, S. (1983a). Estimating block transfers and join sizes. In *ACM SIGMOD 83, Proceedings of the Annual Meeting*, pages 40–54, San Jose, Calif.

[Christodoulakis, 1983b] Christodoulakis, S. (1983b). Estimating record selectivities. In *Information Systems*, volume 8.

[Christodoulakis, 1984] Christodoulakis, S. (1984). Implications of certain assumptions in database performance evaluation. In *ACM Transactions on Database Systems*, volume 9, pages 163–186.

[Clausen, 1980] Clausen, S. (1980). Optimizing the evaluation of calculus expressions in a relational database system. In *Information Systems*, volume 5, pages 41–54.

[Cluet and Moerkotte, 1995] Cluet, S. and Moerkotte, G. (1995). On the complexity of generating optimal left-deep processing trees with cartesian products. In *Proceedings of the International Conference on Databases Theory*, Prague.

[Corporation, 1966] Corporation, I. (1966). Introduction to IBM direct-access storage devices and organization methods. *In Programming Manual*, pages 1649–06.

[Davis and Winslow, 1982] Davis, H. and Winslow, L. (1982). Computational power i query languages. In *SIAM Journal of Computing*, volume 11, pages 547–554.

[Elmasri and Navathe, 1994] Elmasri, R. and Navathe, S. (1994). *Fundamentals of Database Systems*, Benjamin/Cummings Publishing Co., Redwood City, Calif.

[Faloutsos et al., 1996] Faloutsos, C., Matias, Y., and Silberschatz, A. (1996). Modeling skewed distributions using multifractals and the 80–20 law. In *Technical Report*, Dept. of Computer Science, University of Maryland.

[Fedorowicz, 1984] Fedorowicz, J. (1984). Database evaluation using multiple regression techniques. In *Proceedings of the ACM-SIGMOD Conference*, pages 70–76, Boston, Mass.

[Fedorowicz, 1987] Fedorowicz, J. (1987). Database performance evaluation in an indexed file environment. In *ACM Transactions on Database Systems*, volume 12, pages 85–110.

[Flajolet and Martin, 1985] Flajolet, P. and Martin, G. N. (1985). Probabilistic counting algorithms for database applications. In *Journal of Computer and System Sciences*, volume 31, pages 182–209.

[Gelenbe and Gardy, 1982] Belenbe, E. and Gardy, D. (1982). The size of projections of relations satisfying a functional dependency. In *Proceedings of the 8th International Conference on Very Large Data Bases*, pages 325–333, Mexico City.

[Graefe, 1989] Graefe, G. (1989). An extensible and parallel dataflow query processing system. Technical report, Oregan Graduate Center.

[Graefe, 1995] Graefe, G. (1995). The cascades framework for query optimization. In *IEEE Data Engineering Bulletin*, volume 18, pages $19 \geqq 29$.

[Griffeth, 1978] Griffeth, N. (1978). Nonprocedural query processing for databases with access paths. In *Proceedings of the ACM-SIGMOD International Connference on Management of Data*, pages 160–168, Austin, Texas.

[Hall, 1976]Hall, P. (1976). Optimization of a Single Relational Expression in a Relational Database. In *IBM Journal of Research and Development*, volume 20, pages 244–257.

[Hanani, 1977] Hanani, M. (1977). An optimal evaluation of Boolean expressions in an online query system. In *Communication of the ACM*, volume 20, pages 344–347.

[Hasan and Pirahesh, 1988] Hasan, W. and Pirahesh, H. (1988). Query rewrite optimization in starburst. Technical Report RJ 6367, IBM Research Division, Alamaden Research Center.

[Hass et al., 1990] Hass, L., Chang, W., Lohman, G., McPherson, J., Wilms, P., Lapis, G. Lindsay, B., Pirahesh, H., Carey, M., and Shekita, E. (1990). Starburst midflight: As the dust clears. Technical Report RJ 7278, IBM Research Division, Alamaden Research Center.

[Hass and Swami, 1992]Hass, P. and Swami, A. (1992). Sequential sampling procedures for query size estimation. In *Proceedings of the ACM-SIGMOD Conference*, pages 341–350.

[Hou et al., 1991] Hou, W.-C., Ozsoyoglu, G., and Dogdu, E. (1991). Error constrained count query, evaluation in relational databases. In *Proceedings of the ACM-SIGMOD Conference*, pages 278–287.

[Ibaraki and Kameda, 1984] Ibaraki, T. and Kameda, T. (1984). On the optimal nesting order for computing n-relational joins. In *ACM Transactions on Database Systems*, volume 9, pages 482–502.

[Ioannidis and Christodoulakis, 1991] Ioannidis, Y. and Christodoulakis, S. (1991). On the propagation of errors in the size of join results. In *Proceedings of the ACM-SIGMOD Conference*, pages 268–277.

[Ioannidis and Christodoulakis, 1992] Ioannidis, Y. and Christodoulakis, S. (1992). Optimal histograms for limiting worst-case error propagation in the size of join results. In *ACM TODS*.

[Ioannidis and Kang, 1990] Ioannidis, Y. and Kang, Y. (1990). Randomized algorithms for optimizing large join queries. In *Proceedings of the ACM-SIGMOD Conference on Management of Data*, pages 312–321.

[Ioannidis and Poosala, 1995] Ioannidis, Y. and Poosala, V. (1995). Balancing histogram optimality and practicality for query result size estimation. In *ACM-SIGMOD Conference*, pages 233–244.

[Ioannidis and Wong, 1987]Ioannidis, Y. and Wong, E. (1987). Query optimization by simulated annealing. In *Proceedings of the ACM-SIGMOD Conference on Management of Data*, pages 9–22.

[Jarke and Schmdit, 1981] Jarke, M. and Schmidt, J. (1981). Evaluation of first-order relational expressions. In *Technical Report 78*, Fachbereich Informatik, Universitaet Hamburg, Hamburg, FRG.

[Kamel and King, 1985] Kamel, N. and King, R. (1985). A model of data distribution based on texture analysis. In *Proceedings of ACM-SIGMOD Conference*, pages 319–325.

[Kim, 1982] Kim, W. (1982). On optimizing an SQL-like nested query. In *ACM Transactions on Database Systems*, volume 7, pages 443–469.

[Klug, 1982] Klug, A. (1982). Access paths in the ABE statistical query facility. In *Proceedings of the ACM-SIGMOD International Conference on Management of Data*, pages 161–173, Orlando, Fla.

[Knuth, 1968] Knuth, D. (1968). *The Art of Computer Programming*, volume 1. Addison-Wesley.

[Kooi, 1980] Kooi, R. P. (1980). *The optimization of queries in relational databases*. PhD thesis, Case Western Reserve University.

[Kreyszig, 1988] Kreyszig, E. (1988). *Advanced Engineering Mathematics*. John Wiley & Sons, New York, 6th edition.

[Kumar and Stonebraker, 1987] Kumar, A. and Stonebraker, M. (1987). The effect of joint selectives on optimal nesting order. In *ACM-SIGMOD Record*, volume 16, pages 28–41.

[Lanzelotte et al., 1993] Lanzelotte, R., Valduriez, P., and Zait, M. (1993). On the effectiveness of optimization search strategies for parallel execution spaces. In *Proceedings of the 19th VLDB Conference*, pages 493–504, Dublin, Ireland.

[Lecoutre, Jean-Pierre, 1985] Lecoutre, Jean-Pierre (1985). The $L^2$-Optimal Cell Width for the Histogram. In *Statistics and Probability Letters*, volume 3, pages 303–306.

[Lipton and Naughton, 1989] Lipton, R. and Naughton, J. (1989). Estimating the size of generalized transitive closures. In *Proceedings of the 15th VLDB Conference*, pages 165–172.

Lipton and Naughton, 1990] Lipton, R., and Naughton, J. (1990). Query size estimation by adaptive sampling. In *Proceedings of the 9th ACM Symposium on Principles of Database Systems*, pages 40–46.

[Lipton et al., 1990] Lipton, R. Naughton, J., and Schneider, D. (1990). Practical selectivity estimation through adaptive sampling. In *Proceedings of the ACM-SIGMOD*, pages 1–11.

[Mackert and Lohman, 1986b] Mackert, L. and Lohman, G. (1986b). R* optimizer validation and performance evaluation for distributed queries. In *Proceedings of the 12th International Conference on Very Large Databases*, Kyoto, Japan.

[Mackert and Lohman, 1986a] Mackert, L. and Lohman, G. (1986a). R* optimizer validation and performance evaluation for local queries. In *Proceedings of the ACM-SIGMOD Conference*, pages 84–95, Washington, D.C.

Makinouchi et al., 1981] Makinouchi, A., Tezuka, M., Kitakami, H., and Adachi, S. (1981). The optimization strategy for query evaluation in RDB/V1. In *Proceedings of the 7th International Conference on Very Large Databases*, pages 518–529, New York.

[Mannino et al., 1988] Mannino, M., Chu, P., and Sager, T. (1988). Statistical profile estimation in database systems. In *ACM Computing Surveys*, volume 20, pages 192–221.

[Marshall and Olkin, 1979] Marshall, A. and Olkin, I. (1979). *Inequalities: Theory of Majorization and Its Applications*. Academic Press, New York.

[McKenna, 1993] McKenna, W. (1993). *Efficient Search in Extensible Database Query Optimization: The Volcano Optimizer Generator.* PhD thesis, University of Colorado, Boulder.

[Merrett, T. H., 1977] Merrett, T. H. (1977). Database Cost Analysis: A Top-Town Approach. In *Proceedings of the ACM-SIGMOD Conference on Management of Data*, pages 135–143.

[Merrett, T. H., and Otoo, E., 1979] Merrett, T. H., and Otoo, E. (1979). Distribution Models of Relations. In *5th International Conference on Very Large Database*, pages 418–425.

[Montgomery et al., 1983] Montgomery, A., D'Souza, D., and Lee, S. (1983). The cost of relational algebraic operations in skewed data: Estimates and experiments. In *Information Processing*, volume 83, pages 235–241.

[Moore and Yackel, 1977] Moore, D. and Yackel, J. (1977). Consistency properties of nearest neighbor density function estimates. In *Annals of Statistics*, volume 5, pages 143–154.

[Muralikrishna and Dewitt, 1988] Muralikrishna, M. and Dewitt, D. J. (1988). Equi-depth histograms for estimating selectivity factors for multi-dimensional queries. In *Proceedings of ACM-SIGMOD Conference*, pages 28–36.

[Muthuswamy and Kerschberg, 1985] Muthuswamy, B. and Kerschberg, L. (1985). A DDSM for relational query optimization. In *Proceedings of the ACM Annual Conference*.

[National Basket Ball Association, 1992] National Basket Ball Association (1992). NBA Players Performance Statistics, ftp:olympos.cs.umd.edu.

[Niebuhr and Smith, 1976] Niebuhr, K. and Smith, S. (1976). N-ary joins for processing Query by Example. In *IBM Technical Disclosure Bullettin*, volume 19, pages 2377–2381.

[Ono and Lohman, 1990] Ono, K. and Lohman, G. (1990). Measuring the complexity of join enumeration in query optimization. In *Proceedings of the 16th VLDB Conference*, pages 314–325, Brisbane, Australia.

[Palermo, 1972] Palermo, F. (1972). A database search problem. In *Proceedings for the 4th Symposium on Computer and Information Science*, pages 67–101, Miami Beach, Fla. AFIPS Press, Reston, Va.

[Piatetsky-Shapiro and Connell, 1984] Piatetsky-Shapiro, G. and Connell, C. (1984). Accurate estimation of the number of tuples satisfying a condition. In *Proceedings of ACM-SIGMOD Conference*, pages 256–276.

[Richard, 1981] Richard, P. (1981). Evaluation of the size of a query expressed in relational algebra. In *Proceedings of the ACM-SIGMOD International Conference on Management of Data*, pages 155–163, Ann Arbor, Mich.

[Rosenthal and Reiner, 1982] Rosenthal, A. and Reiner, D. (1982). An architecture for query optimization. In *Proceedings of the ACM-SIGMOD International Conference on Management of Data*, pages 246–255, Orlando, Fla.

[Samson and Bendell, 1983] Samson, W. and Bendell, A. (1983). Rank order distributions and secondary key indexing (extended abstract). In *Proceedings of the 2nd International Conference on Databases,* Cambridge, England.

[Schenk and Pinkert, 1977] Schenk, K. and Pinkert, J. (1977). An algorithm for servicing multi-relational queries. In *Proceedings of the ACM-SIGMOD International Conference on Management of Data*, pages 10–20, Toronto, Canada.

[Scheufele and Moerkotte, 1997] Scheufele, W. and Moerkotte, G. (1997). On the complexity of generating optimal plans with cross products. In *Proceedings of the 23rd International Conference on Very Large Databases*, Athens.

[Schmidth, 1979] Schmidth, J. (1979). Parallel processing of relations: A single-assignment approach. In *Proceedings of the 5th International Conference on Very Large Databases,* pages 398–408, Rio de Janeiro.

[Scott, David, 1979] Scott, David (1979). On Optimal and Data-based Histograms. In *Biometrika*, volume 66, pages 605–610.

[Selinger et al., 1979] Selinger, P., M. M. Astrahan, D. C., Lorie, R., and Price, T. (1979). Access Path Selection in a Relational Database Management System. In *Proceedings of ACM-SIGMOD Conference*.

[Shukla et al., 1996] Shukla, A., Deshpande, P., Naughton, J. F., and Ramaswamy, K. (1996). Storage estimation for multidimensional aggregates in the presence of hierarchies. In *Proceedings of the 22nd International Conference on Very Large Databases*, pages 522–531.

[Smith and Chang, 1975] Smith, J. and Chang, P. (1975). Optimizing the performance of a relational algebra database interface. In *Communications of the ACM*, volume 18, pages 568–579.

[Sun et al., 1993] Sun, W., Ling, Y., Rishe, and Deng, Y. (1993). An instant and accurate size estimation method for joins and selections in a retrieval-intensive environment. In *Proceedings of ACM-SIGMOD Conference*, pages 79–88.

[Swami and Gupta, 1988] Swami, A., and Gupta, A. (1988). Optimization of large join queries. In *Proceedings of the ACM-SIGMOD Conference on Management of Data*, pages 8–17.

[Tapia and Thompson, 1978] Tapia, R. and Thompson, J. (1978). *Nonparametric Probability Density Estimation,* John Hopkins University Press, Baltimore, Md.

[U.S. Census Bureau, 1997] U.S. Census Bureau (1977). U.S. CENSUS Database.

[Vander Zander et al., 1986] Vander Zander, B., Taylor, H., and Biton, D. (1986). Estimating block accesses when attributes are correlated. In *Proceedings of the 12th International Conference on Very Large Databases,* pages 119–127, Kyoto, Japan.

[Wong and Youseffi, 1976] Wong, E. and Youseffi, K. (1976). A Strategy for Query Processing. In *ACM Transactions on Database Systems*, volume 1, pages 223–241.

[Yao, 1979] Yao, S. (1979). Optimization of query evaluation algorithms. In *ACM Transactions of Database Systems*, volume 4.

[Zipf, 1949] Zipf, G. K. (1949). *Human Behavior and the Principle of Least Effort.* Addison-Wesley, Reading, Mass.

What is claimed is:

1. A computer-implemented method for estimating the computational efficiency of a search within a database comprising the steps of:
   a. generating a histogram of data, comprising the steps of:
      i. providing a data set representing a plurality of elements from the database and a value associated with each element, the data set having a property defining an order of the elements therein;
      ii. determining at least one range, each of the at least one range having at least an element, an arithmetic mean of each range equal to the arithmetic mean of the values associated with the at least an element within said range, a specific range from the at least one range comprising a plurality of elements from the data set adjacent each other within the defined order, wherein the arithmetic mean of the specific range is within a predetermined maximum distance from a value associated with an element within the specific range, the predetermined maximum distance being independent of the number of elements within the specific range and their associated values;

iii. determining at least a value related to an estimate of a value associated with an element within the range; and iv. for each range storing said value related to an estimate of a value associated with an element within the range and data relating to the size and location of the range, to provide a histogram of said value associated with an element within the range and data relating to the size and location of the range; and b. using the histogram of data for estimating the computational efficiency of a search within a database.

2. A method as defined in claim 1 wherein the at least one range comprises a plurality of ranges, and wherein some ranges from the plurality of ranges have a different number of elements and some ranges from the plurality of ranges have different areas, an area of each range equal to the product of the arithmetic mean of said range and the number of elements within said range.

3. A method as defined in claim 2 wherein the step of determining the at least one range is performed so as to limit variance between the values associated with the elements within a same range from the at least one range, the limitation forming further data of the histogram.

4. A method as defined in claim 3 wherein a value associated with each element within a range from the at least one range is within $$\varepsilon = \left| \tau \left[ \ln \left( \frac{l}{i-1} \right) \right] - 1 \right|$$

where τ is the tolerance value used in generating the R-ACM and i is the location of the element within a histogram sector of length l.

5. A method as defined in claim 3 wherein the at least a value related to an estimate of a value for an element within the range includes a value relating to the arithmetic mean, and wherein the at least data relating to the range comprises data relating to both endpoints of the range.

6. A method as defined in claim 3 wherein the step of determining at least one range comprises the steps of:

a. using a suitably programmed processor, defining a first bin as a current bin;

b. using the suitably programmed processor, selecting an element and adding it to the current bin as the most recently added element to the current bin;

c. selecting an element from within the data set, the selected element not within a bin and adjacent the most recently added element;

d. determining at least a mean of the values associated with elements within the bin;

e. when the most recently selected element differs from a mean from the at least a mean by an amount less than a predetermined amount, adding the most recently selected element to the current bin as the most recently added element to the current bin and returning to step (c);

f. when the selected element differs from the mean from the at least a mean by an amount more than the predetermined amount, creating a new bin as the current bin and adding the selected element to the new bin as the most recently added element to the current bin and returning to step (c); and, g. providing data relating to each bin including data indicative of a range of elements within each bin as the determined at least one range.

7. A method as defined in claim 6 comprising the step of: providing a value, τ, of the predetermined maximum distance.

8. A method as defined in claim 6 wherein the at least a mean comprises an arithmetic mean and wherein the mean from the at least a mean is the arithmetic mean.

9. A method as defined in claim 6 wherein adjacent elements are selected from a start location within the data set in order sequentially toward an end of the data set.

10. A method as defined in claim 6 wherein adjacent elements are selected from a start location in an alternating fashion toward a beginning of the data set and toward an end of the data set.

11. A method as defined in claim 3 wherein the step of determining at least one range comprises the steps of:

a. selecting an element from within the data set;

b. determining a bin with which to associate the element;

c. when the determined bin is empty, adding the element to the bin;

d. when the determined bin is other than empty, determining at least a mean of the values associated with elements within the determined bin;

e. when the most recently selected element differs from a mean from the at least a mean by an amount less than a predetermined amount, adding the most recently selected element to the determined bin and returning to step (a);

f. when the selected element differs from the mean from the at least a mean by an amount more than the predetermined amount, adding the selected element to the determined bin and dividing the determined bin into one of two bins and three bins, one of which includes the selected element and returning to step (a); and, g. providing data relating to each bin including data indicative of a range of elements within the bin.

12. A method as defined in claim 11 wherein the at least a mean comprises an arithmetic mean and wherein the mean from the at least a mean is the arithmetic mean.

13. A method as defined in claim 12 comprising the step of: determining a first arithmetic mean of a first selected bin; determining a second arithmetic mean of a second selected bin adjacent the first selected bin; comparing the first and second arithmetic means; and, when the arithmetic means are within a predetermined distance of each other, merging the first selected bin and the second selected bin to form a single merged bin including all the elements of the first selected bin and all the elements of the second selected bin.

14. A method as defined in claim 3 wherein the step of determining at least one range comprises the steps of:

a. using a suitably programmed processor, defining a first bin as a current bin;

b. using the suitably programmed processor, selecting an element and adding it to the current bin as the most recently added element to the current bin;

c. selecting elements adjacent the most recently added element(s);
d. determining a first mean of the values associated with elements within the bin and determining a second mean of the selected elements;
e. when the second mean differs from the first mean by an amount less than a predetermined amount, adding the most recently selected elements to the current bin as the most recently added elements and returning to step (c);
f. when the second mean differs from the first mean by an amount more than the predetermined amount, creating a new bin as the current bin and adding at least one of the selected elements to the new bin as the most recently added element(s) to the current bin and returning to step (c); and,
g. providing data relating to each bin including data indicative of a range of elements within the bin.

15. A method as defined in claim 14 wherein the step of (f) includes the steps of:
(F1) determining a first element within the selected elements to add to the new current bin;
(F2) adding the selected element(s) before the first element to the previous current bin; and,
(F3) adding the selected element(s) from and including the first element to the new current bin.

16. A method as defined in claim 3 wherein the step of determining at least one range comprises the steps of:
a. using a suitably programmed processor, defining a first bin as a current bin;
b. using the suitably programmed processor, selecting an element and adding it to the current bin as the most recently added element to the current bin;
c. selecting an element from within the data set, the selected element not within a bin and adjacent the most recently added element;
d. determining the Generalized positive-2 mean of the current bin as the sum of the squares of the values associated with elements within the bin divided by the number of the elements within the bin and taking the square root of the resulting quotient;
e. determining the Generalized negative-2 mean of the current bin as the sum of the square-roots of the values associated with element within the bin divided by the number of the elements within the bin and squaring the resulting quotient;
f. when the value associated with the selected element is lower than the said Generalized positive-2 mean, determining a difference between the value associated with the selected element and the said Generalized positive-2 mean, and when the value associated with the selected element is higher than the said Generalized negative-2 mean, determining a difference between the value associated with the selected element and the said Generalized negative-2 mean;
g. when a difference is other than greater than the predetermined amount, adding the selected element to the current bin as the most recently added element to the current bin and returning to step (c);
h. when a difference is greater than the predetermined amount, defining a new bin as the current bin, adding the selected element to the current bin as the most recently added element to the current bin, and returning to step (c); and,
i. providing data relating to each bin including data indicative of a range of elements within each bin as the determined at least one range.

17. A method as defined in claim 3 wherein the step of determining at least one range comprises the steps of:
a. using a suitably programmed processor, defining a first bin as a current bin;
b. using the suitably programmed processor, selecting an element and adding it to the current bin as the most recently added element to the current bin;
c. selecting an element from within the data set, the selected element not within a bin and adjacent the most recently added element;
d. determining the Generalized positive-k mean of the current bin for a predetermined k as the sum of the $k^{th}$ powers of the values associated with elements within the bin divided by the number of the elements within the bin and taking the $k^{th}$ root of the resulting quotient;
e. determining the Generalized negative-k mean of the current bin as the sum of the $k^{th}$ roots of the values associated with elements within the bin divided by the number of the elements within the bin and raising the quotient to the $k^{th}$ power;
f. when the value associated with the selected element is lower than the said Generalized positive-k mean, determining a difference between the value associated with the selected element and the said Generalized positive-k mean, and when the value associated with the selected element is higher than the said Generalized negative-k mean, determining a difference between the value associated with the selected element and the said Generalized negative-k mean;
g. when a difference is other than greater than the predetermined amount, adding the selected element to the current bin as the most recently added element to the current bin and returning to step (c);
h. when a difference is greater than the predetermined amount, defining a new bin as the current bin, adding the selected element to the current bin as the most recently added element to the current bin, and returning to step (c); and,
i. providing data relating to each bin including data indicative of a range of elements within each bin as the determined at least one range.

18. A method as defined in claim 3 wherein the step of determining at least one range comprises the steps of:
a. using a suitably programmed processor, defining a first bin as a current bin;
b. using the suitably programmed processor, selecting an element and adding it to the current bin as the most recently added element to the current bin;
c. selecting an element from within the data set, the selected element not within a bin and adjacent the most recently added element;
d. determining a current largest value as the largest of the values associated with elements within the bin;
e. determining a current smallest value as the smallest of the values associated with elements within the bin;
f. when the value associated with the selected element is lower than the current largest value, determining a difference between the value associated with the selected element and the current largest value, and when the value associated with the selected element is higher than the current smallest value, determining a difference between the value associated with the selected element and the current smallest value;
g. when a difference is other than greater than the predetermined amount, adding the selected element to the current bin as the most recently added element to the current bin and returning to step (c);

h. when a difference is greater than the predetermined amount, defining a new bin as the current bin, adding the selected element to the current bin as the most recently added element to the current bin, and returning to step (c); and, i. providing data relating to each bin including data indicative of a range of elements within each bin as the determined at least one range.

19. A method as defined in claim 18 wherein the predetermined amount is equal to $2(\tau)$.

20. A method as defined in claim 1 wherein the step of determining at least one range comprises the steps of:

a. selecting a group of elements within the data set and adjacent one another within the ordering;

b. determining a mean of the values associated with each selected element within the selected group of elements;

c. comparing a value associated with each selected element in the group to the mean value to determine a difference;

d. when a value is different from the mean by more than a predetermined amount, returning to step (a); and, e. when all values are different from the mean by less than or equal to the predetermined amount, creating a bin including the selected group of elements and returning to step (a).

21. A method as defined in claim 20 comprising the steps of (F1) selecting an element adjacent the bin including the selected group of elements, the selected element other than an element within a bin;

(F2) determining a mean of the values associated with each element within the bin and the selected element; and (F3) when the value of the selected element differs from the mean by less than or equal to the predetermined amount, adding the selected element to the bin and returning to step (F3).

22. A method as defined in claim 1 comprising the step of: providing the mean associated with the range as an estimate of a value associated with an element within said range.

23. A method as defined in claim 22 comprising the step of: estimating a reliability of the estimated value.

24. A method as defined in claim 23 wherein the estimated value is used for estimating the computational efficiency of a search within a database.

25. A method as defined in claim 1 comprising the step of: estimating a value associated with a selected range of elements as a sum of the products of the arithmetic mean for each range and a number of elements within both the range and the selected range.

26. A computer-implemented method comprising the steps of:

a. generating a histogram of data, comprising the steps of:
 i. providing a data set representing a plurality of elements from the database and a value associated with each element, the data set having a property defining an order of the elements therein;
 ii. determining at least one range, each of the at least one range having at least an element, an arithmetic mean of each range equal to the arithmetic mean of the values associated with the at least an element within said range, a specific range from the at least one range comprising a plurality of elements from the data set adjacent each other within the defined order, wherein the arithmetic mean of the specific range is within a predetermined maximum distance from a value associated with an element within the specific range, the predetermined maximum distance independent of the number of elements within the specific range and their associated values;
 iii. determining at least a value related to an estimate of a value associated with an element within the range; and
 iv. for each range storing at least a value related to an estimate of a value associated with an element within the range and at least data relating to the size and location of the range;

b. determining a routing table in dependence upon the histogram; and, c. estimating a value for use in network routing in dependence upon the routing table.

27. A computer-implemented method comprising the steps of:

a. generating a histogram of data, comprising the steps of:
 i. providing a data set representing a plurality of elements from the database and a value associated with each element, the data set having a property defining an order of the elements therein;
 ii. determining at least one range, each of the at least one range having at least an element, an arithmetic mean of each range equal to the arithmetic mean of the values associated with the at least an element within said range, a specific range from the at least one range comprising a plurality of elements from the data set adjacent each other within the defined order, wherein the arithmetic mean of the specific range is within a predetermined maximum distance from a value associated with an element within the specific range, the predetermined maximum distance independent of the number of elements within the specific range and their associated values;
 iii. determining at least a value related to an estimate of a value associated with an element within the range; and
 iv. for each range storing at least a value related to an estimate of a value associated with an element within the range and at least data relating to the size and location of the range;

b. providing the mean associated with the range as an estimate of a value associated with an element within said range; and c. using the estimate for determining an approach to searching within a plurality of different databases given a predetermined limited time for conducting the search, wherein the approach is selected to approximately maximise the probability of successfully completing the search.

28. A computer-implemented method comprising the steps of:

a. generating a histogram of data, comprising the steps of:
 i. providing a data set representing a plurality of elements and a value associated with each element, the data set having a property defining an order of the elements therein;
 ii. determining a plurality of ranges, each of the plurality of ranges having at least an element, a known statistical correlation existing between values associated with elements in a same range, some ranges from the plurality of ranges comprising a plurality of elements from the data set adjacent each other within the defined order, the statistical correlation for those ranges indicative of a maximum error between an estimated value associated with an element within the range and the value associated with the element, the maximum error other than the difference between the total area of the range and the estimated value, wherein an area of each range is equal to the product of the arithmetic mean of said range and the number of elements within said range;

iii. determining at least a value related to an estimate of a value associated with an element within the range; and iv. for each range storing at least a value related to an estimate of a value associated with an element within the range and at least data relating to the size and location of the range; and b. using the histogram of data for estimating the computational efficiency of a search within a database.

29. A method as defined in claim 28 wherein a range from the some ranges define a range of values associated with elements within the range, and wherein the range of values has a maximum upper limit and a minimum lower limit, the lower limit other than zero and the upper limit other than the area of the range.

30. A method as defined in claim 29 wherein a value associated with each element within a range from the some ranges is within a known maximum error of an estimated value for that element and wherein the maximum error is different for some elements in a same range than for others.

31. A computer-implemented method comprising the steps of:

a. generating a histogram of data, comprising the steps of:
  i. providing a data set representing a plurality of elements and a value associated with each element, the data set having a property defining an order of the elements therein;
  ii. determining at least one range having a length such that the value associated with at least one element within the range is within a predetermined maximum distance of at least one other element within the range;
  iii. determining at least a value related to an estimate of a value associated with an element within the range; and
  iv. for each range storing at least a value related to an estimate of a value associated with an element within the range and at least data relating to the size and location of the range; and b. using the histogram of data for estimating the computational efficiency of a search within a database.

32. A computer-implemented method comprising the steps of:

a. generating a histogram of data, comprising the steps of:
  i. providing a data set representing a plurality of elements and a value associated with each element, the data set having a property defining an order of the elements therein;
  ii. determining at least one range having a length such that the value associated with every element within the range is within a predetermined maximum distance of every other element within the range;
  iii. determining at least a value related to an estimate of a value associated with an element within the range; and
  iv. for each range storing at least a value related to an estimate of a value associated with an element within the range and at least data relating to the size and location of the range; and b. using the histogram of data for estimating the computational efficiency of a search within a database.

33. A computer readable program storage medium, the medium embodying one or more instructions executable by the computer to perform method steps, the method comprising the steps of:

a. generating a histogram of data, comprising the steps of:
  i. providing a data set representing a plurality of elements and a value associated with each element, the data set having a property defining an order of the elements therein;
  ii. determining at least one range, each of the at least one range having at least an element, an arithmetic mean of each range equal to the arithmetic mean of the values associated with the at least an element within said range, a specific range from the at least a range comprising a plurality of elements from the data set adjacent each other within the defined order, wherein the arithmetic mean of the specific range is within a predetermined maximum distance from a value associated with an element within the specific range, the predetermined maximum distance independent of the number of elements within the specific range and their associated values;
  iii. determining at least a value related to an estimate of a value associated with an element within the range; and
  iv. storing for each range at least a value related to the mean and at least data relating to the size and location of the range; and b. using the histogram of data for estimating the computational efficiency of a search within a database.

34. A computer-implemented method comprising the steps of:

a. generating a histogram of data, comprising the steps of:
  i. providing a data set representing a plurality of elements and a value associated with each element, the data set having a property defining an order of the elements therein;
  ii. determining a range within the data set, the range comprising a plurality of elements from the data set and adjacent within the order; and,
  iii. storing a plurality of values indicative of a straight line defining an approximate upper boundary of the values associated with each element within the range, the straight line indicating different values for different elements within the range; and b. using the histogram of data for estimating the computational efficiency of a search within a database.

35. A method as defined in claim 34 wherein the range has a mean equal to the mean of the values associated with the plurality of elements within said range and an area of the range equal to the product of the mean of said range and the number of elements within said range; and comprising the steps of:

iv. providing a value associated with specific elements within the range; and v. determining a straight line approximating the determined value for each of the specific elements and having an area therebelow determined according to the value of the straight line at the first element in the range plus the value of the straight line at the last element in the range which sum is multiplied by the number of elements within the range divided by 2, the area below the straight line being approximately equal to the area of the range.

36. A method as defined in claim 35 comprising the steps of:

vi. providing a second range within the data set, the second range adjacent the first range and comprising a plurality of elements from the data set and adjacent within the order, the provided second range having a mean equal to the mean of the values associated with the at least an element within said range and an area of the range equal to the product of the mean of said range and the number of elements within said range;

vii. providing a value associated with specific elements within the second range;

viii. determining a second straight line approximating the determined value for each of the specific elements within the second range and having an area therebelow determined according to the value of the second straight line at the first element in the second range plus the value of the second straight line at the last element in the second range which sum is multiplied by the number of elements within the second range divided by 2, the area below the straight line being approximately equal to the area of the second range; and, storing a plurality of values indicative of the second straight line.

37. A method as defined in claim 36 wherein the step of determining the straight line and of determining the second straight line are performed such that the adjacent endpoints of the first straight line and the second straight line are a same point.

38. A method as defined in claim 37 wherein the step of determining the second straight line is performed in dependence upon the endpoint of the first straight line adjacent the second range.

39. A method as defined in claim 35 wherein the step of determining a range is performed so as to limit variance between values associated with elements in the range and the straight line, the limitation forming further statistical data of the histogram.

40. A method as defined in claim 39 wherein the step of determining a range is performed so as to limit average error between some values associated with elements in the range and the straight line.

41. A method as defined in claim 39 wherein the step of determining a range is performed so as to limit least squared error between some values associated with elements in the range and the straight line.

42. A method as defined in claim 34 wherein the plurality of values are indicative of a range beginning, a range ending, a value at the range beginning and a value at the range ending.

43. A method as defined in claim 42 wherein the plurality of values includes data for determining a straight line approximating the values associated with elements within the range, and differing therefrom by an amount less than a known amount less than each associated value.

44. A computer-implemented method comprising the steps of:

a. generating a histogram of data, comprising the steps of:
i. providing a data set representing a plurality of elements and a value associated with each element, the data set having a property defining an order of the elements therein;

ii. providing a range within the data set, the range comprising a plurality of elements from the data set and adjacent within the order;

iii. determining a straight line indicating different values for different elements within the range; and, iv. storing a plurality of values indicative of a straight line defining an approximate upper boundary of the values associated with each element within the range, the straight line indicating different values for different elements within the range; and b. using the histogram of data for estimating the computational efficiency of a search within a database.

45. A method as defined in claim 44 wherein the provided range has a mean equal to the mean of the values associated with the at least an element within said range and an area of the range equal to the product of the mean of said range and the number of elements within said range; and wherein the step (iii) comprises the steps of:

(iii1) providing a value associated with specific elements within the range; and, (iii2) determining a straight line approximating the determined value for each of the specific elements and having an area therebelow determined according to the value of the straight line at the first element in the range, plus the value of the straight line at the last element in the range which sum is multiplied by the number of elements within the range divided by 2, the area below the straight line being approximately equal to the area of the range.

46. A method as defined in claim 45 comprising the steps of:

v. providing a second range within the data set, the second range adjacent the first range and comprising a plurality of elements from the data set and adjacent within the order, the provided second range having a mean equal to the mean of the values associated with the at least an element within said range and an area of the range equal to the product of the mean of said range and the number of elements within said range;

vi. providing a value associated with specific elements within the second range;

vii. determining a second straight line approximating the determined value for each of the specific elements within the second range and having an area therebelow determined according to the value of the second straight line at the first element in the second range, plus the value of the second straight line at the last element in the second range which sum is multiplied by the number of elements within the second range divided by 2, the area below the straight line approximately equal to the area of the second range; and, storing a plurality of values indicative of the second straight line.

47. A method as defined in claim 46 wherein the step of determining the straight line and of determining the second straight line are performed such that the adjacent endpoints of the first straight line and the second straight line are a same point.

48. A method as defined in claim 47 wherein the step of determining the second straight line is performed in dependence upon the endpoint of the first straight line adjacent the second range.

49. A method as defined in claim 48 wherein the step of determining the straight line is performed so as to limit variance between values associated with elements in the range and the straight line, the limitation forming further statistical data of the histogram.

50. A method as defined in claim 49 wherein the step of determining the straight line is performed so as to limit average error between some values associated with elements in the range and the straight line.

51. A method as defined in claim 49 wherein the step of determining the straight line is performed so as to limit least squared error between some values associated with elements in the range and the straight line.

52. A method as defined in claim 34 comprising the step of estimating a value associated with an element based on the location of the straight line at the element.

53. A method as defined in claim 57 comprising the step of estimating a reliability of the estimated value.

54. A method as defined in claim 44 comprising the step of estimating a value associated with an element based on the location of the straight line at the element.

55. A method as defined in claim 54 comprising the step of estimating a reliability of the estimated value.

56. A method as defined in claim 54 comprising the step of using the estimated value, estimating the computational efficiency of a search within a database.

57. A computer-implemented method comprising the steps of:
   a. generating a histogram of data, comprising the steps of:
      i. providing a data set representing a plurality of elements and a value associated with each element, the data set having a property defining an order of the elements therein;
      ii. providing a range within the data set, the range comprising a plurality of elements from the data set and adjacent within the order;
      iii. determining a straight line indicating different values for different elements within the range; and,
      iv. storing a plurality of values indicative of a straight line defining an approximate upper boundary of the values associated with each element within the range, the straight line indicating different values for different elements within the range;
   b. determining a routing table in dependence upon the histogram; and,
   c. determining an estimate of a value within the routing table for determining a network routing.

58. A computer-implemented method comprising the steps of:
   a. generating a histogram of data, comprising the steps of:
      i. providing a data set representing a plurality of elements and a value associated with each element, the data set having a property defining an order of the elements therein;
      ii. providing a range within the data set, the range comprising a plurality of elements from the data set and adjacent within the order;
      iii. determining a straight line indicating different values for different elements within the range; and,
      iv. storing a plurality of values indicative of a straight line defining an approximate upper boundary of the values associated with each element within the range, the straight line indicating different values for different elements within the range;
   b. estimating a value associated with an element based on the location of the straight line at the element; and
   c. using the estimate for determining an approach to searching within a plurality of different databases given a predetermined limited time for conducting the search, wherein the approach is determined to approximately maximise the probability of successfully completing the search.

59. A method as defined in claim 34 comprising the step of estimating a value associated with a selected range of elements as a sum of areas below the straight lines for portions of ranges within the selected range.

60. A method as defined in claim 44 comprising the step of estimating a value associated with a selected range of elements as a sum of areas below the straight lines for portions of ranges within the selected range.

61. A computer readable program storage medium, the medium embodying one or more instructions executable by the computer to perform method steps, the method comprising the steps of:
   a. generating a histogram of data, comprising the steps of:
      i. providing a data set representing a plurality of elements and a value associated with each element, the data set having a property defining an order of the elements therein;
      ii. providing a range within the data set, the range comprising a plurality of elements from the data set and adjacent within the order;
      iii. determining a straight line indicating different values for different elements within the range; and,
      iv. storing a plurality of values indicative of a straight line defining an approximate upper boundary of the values associated with each element within the range, the straight line indicating different values for different elements within the range and
   b. using the histogram of data for estimating the computational efficiency of a search within a database.

* * * * *